(12) United States Patent
Cardno et al.

(10) Patent No.: US 9,870,629 B2
(45) Date of Patent: Jan. 16, 2018

(54) METHODS, APPARATUS AND SYSTEMS FOR DATA VISUALIZATION AND RELATED APPLICATIONS

(75) Inventors: Andrew John Cardno, San Diego, CA (US); Peter Stewart Ingham, Avalon (NZ); Bart Andrew Lewin, Woodland Hills, CA (US); Ashok Kumar Singh, Henderson, NV (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 1155 days.

(21) Appl. No.: 13/000,323

(22) PCT Filed: Jun. 19, 2009

(86) PCT No.: PCT/NZ2009/000114
§ 371 (c)(1),
(2), (4) Date: Jul. 12, 2011

(87) PCT Pub. No.: WO2009/154484
PCT Pub. Date: Dec. 23, 2009

(65) Prior Publication Data
US 2011/0261049 A1 Oct. 27, 2011

Related U.S. Application Data

(60) Provisional application No. 61/115,036, filed on Nov. 15, 2008, provisional application No. 61/093,428, (Continued)

(51) Int. Cl.
G06F 17/30 (2006.01)
G06T 11/20 (2006.01)
(Continued)

(52) U.S. Cl.
CPC ............ *G06T 11/206* (2013.01); *G06Q 10/10* (2013.01); *G06Q 30/02* (2013.01); *G06Q 40/04* (2013.01)

(58) Field of Classification Search
CPC ................................. G06F 17/30; G06F 17/00
See application file for complete search history.

(56) References Cited

U.S. PATENT DOCUMENTS 5,103,306 A * 4/1992 Weiman .................. G01S 5/163
348/400.1
5,720,018 A 2/1998 Muller et al.
(Continued)

FOREIGN PATENT DOCUMENTS

WO WO 99/26126 5/1999

OTHER PUBLICATIONS

Morimoto, Carlos H., and Marcio RM Mimica. "Eye gaze tracking techniques for interactive applications." Computer Vision and Image Understanding 98, No. 1 (2005): 4-24.*
(Continued)

*Primary Examiner* — Farhan Syed
(74) *Attorney, Agent, or Firm* — Merchant & Gould P.C.

(57) ABSTRACT

In a data visualization system, a method of creating a visual representation of data, the method including the steps of providing instructions to an end user to assist the end user in: constructing multiple graphical representations of data, where each graphical representation is one of a predefined type and includes multiple layers of elements that contribute to the end user's understanding of the data; arranging multiple graphical representations of different types within the visual representation in a manner that enables the end user to understand and focus on the data being represented; and displaying the visual representation.

25 Claims, 87 Drawing Sheets

Related U.S. Application Data filed on Sep. 1, 2008, provisional application No. 61/140,556, filed on Dec. 23, 2008, provisional application No. 61/101,670, filed on Sep. 30, 2008, provisional application No. 61/161,472, filed on Mar. 19, 2009, provisional application No. 61/101,672, filed on Sep. 30, 2008, provisional application No. 61/145,775, filed on Jan. 20, 2009, provisional application No. 61/107,665, filed on Oct. 22, 2008, provisional application No. 61/118,211, filed on Nov. 26, 2008, provisional application No. 61/146,525, filed on Jan. 22, 2009, provisional application No. 61/146,430, filed on Jan. 22, 2009, provisional application No. 61/146,133, filed on Jan. 21, 2009, provisional application No. 61/074,347, filed on Jun. 20, 2008.

(51) Int. Cl.
  *G06Q 10/10* (2012.01)
  *G06Q 30/02* (2012.01)
  *G06Q 40/04* (2012.01)

(56) References Cited

U.S. PATENT DOCUMENTS

| | | | |
|---|---|---|---|
| 6,290,357 B1* | 9/2001 | Massengill | A61B 3/024 351/209 |
| 6,351,335 B1* | 2/2002 | Perlin | G02B 13/00 345/1.1 |
| 6,386,706 B1* | 5/2002 | McClure | A61B 3/024 351/237 |
| 6,400,996 B1* | 6/2002 | Hoffberg | G05B 19/0426 370/218 |
| 6,449,052 B1 | 9/2002 | Sherer et al. | |
| 6,850,252 B1* | 2/2005 | Hoffberg | G06K 9/00369 348/E7.061 |
| 7,007,067 B1* | 2/2006 | Azvine | G06F 3/011 709/202 |
| 7,120,880 B1* | 10/2006 | Dryer | G06Q 30/02 715/831 |
| 7,306,337 B2* | 12/2007 | Ji | G06F 3/013 351/209 |
| 7,593,602 B2* | 9/2009 | Stentiford | G06F 17/30265 358/403 |
| 7,813,822 B1* | 10/2010 | Hoffberg | G06K 9/00369 381/73.1 |
| 7,930,204 B1* | 4/2011 | Sharma | G06Q 30/02 705/7.32 |
| 7,974,714 B2* | 7/2011 | Hoffberg | G06K 9/00369 360/75 |
| 7,974,869 B1* | 7/2011 | Sharma | G06Q 30/02 705/7.31 |
| 8,489,987 B2* | 7/2013 | Erol | G06F 17/30247 707/722 |
| 8,645,991 B2* | 2/2014 | McIntire | H04N 7/17318 725/34 |
| 2001/0032221 A1* | 10/2001 | Anwar | G06F 3/1203 715/209 |
| 2004/0030741 A1* | 2/2004 | Wolton | G06F 17/30873 709/202 |
| 2004/0223003 A1 | 11/2004 | Heirich et al. | |
| 2006/0260624 A1* | 11/2006 | Schur | A61B 5/16 128/898 |
| 2006/0282317 A1* | 12/2006 | Rosenberg | G06Q 30/02 705/14.35 |
| 2007/0053513 A1* | 3/2007 | Hoffberg | G06K 9/00369 380/201 |
| 2007/0146637 A1* | 6/2007 | Johnson | G06F 3/013 351/226 |
| 2007/0250901 A1* | 10/2007 | McIntire | H04N 7/17318 725/146 |
| 2009/0063431 A1* | 3/2009 | Erol | G06F 17/30247 |
| 2009/0087029 A1* | 4/2009 | Coleman | G06K 9/00208 382/103 |
| 2013/0346431 A1* | 12/2013 | Erol | G06F 17/30247 707/758 |

OTHER PUBLICATIONS

Nikolov, Stavri G., Timothy D. Newman, Dave R. Bull, Nishan C. Canagarajah, Michael G. Jones, and Iain D. Gilchrist. "Gaze-contingent display using texture mapping and opengl: system and applications." In Proceedings of the 2004 symposium on Eye tracking research & applications, pp. 11-18. ACM, 2004.*

Blattner. "Special Edition Using Microsoft Office Excel 2003." *Que Publishing ISBN 0-7897-2953-9*. 2004. pp. 505-531.

Jacob. "Eye Tracking in Advanced Interface Design." *Barfield, Woodrow and Furness, Thomas (eds) Virtual Environment and Advanced Interface Design*. 1995.

Bederson et al. "DataLens: A Fisheye Calendar Interface for PDA's." *ACM Transactions on Computer-Human Interactions*. vol. 11. No. 1. 2004.

Byron, Lee, "Last.fm Listening History—What have I been listening to?"; Date Accessed, Jul. 22, 2013; :www.leebyron.com/what/lastfm/.

Crazy Egg; "Crazy Egg—Visualize your Visitors"; www.crazyegg.com.

Entropía; "Más tiempo;" Date Accessed: Jan. 31. 2008; http://www.luispabon.com/entropia/index.php?entry=entry071129-145959.

Felix, B. Tan "Cases on Global IT Applications and Management: Successes and Pitfalls." Idea Group. 2001.

Few, Stephen; from white paper "BizViz: The Power of Visual Business Intelligence;" Mar. 7, 2006; www.perceptualedge.com.

Flemming et al. "Managing Creativity in Small Worlds;" *California Management Review*; vol. 48, No. 4; pp. 6-27 (2006); Date Accessed, Jan. 30, 2008; http://balrog.sdsu.edu/~shu/FlemingManagingCreativityinSmallWorlds.pdf.

Gilbert, Cheryl, et. al.; SearchCIO—Midmarket; "IIOP;" Date Accessed: Jan. 30, 2008; http://searchcio-midmarket.techtarget.com/sDefinition/0,,sid183_gci214019,00.html.

Google; Google Maps; "KML Gallery: Explore the Earth on Google;" Date Accessed: Jan. 30, 2008; http://earth.google.com/gallery/.

IBM; WebSphere Product Pages; "WebSphere software;" Date Accessed: Jan. 30, 2008; http://www-306.ibm.com/software/websphere/?pgel=ibmhzn&cm_re=masthead-_-products-_-sw-websphere.

Information Aesthetics; "travel time maps;" Date Accessed: Jan. 31, 2008; http://infosthetics.com/archives/locative/.

Kimball, Ralph; "A Dimensional Modeling Manifesto;" Date Accessed: Apr. 10, 2008; http://www.dbmsmag.com/9708d15.html.

Kovari et al. "IBM WebSphere V5.0 Security: WebSphere Handbook Series;" First Edition. Dec. 2002. ibm.com/redbooks.

Maya Realities; "Top Visiting Countries for Midnight City;" Date Accessed: Jan. 31, 2008: www.mayarealities.com/top_countries.php.

Mike_d; "The NYT Takes it up a Notch"; *Visual Methods Blog*; Dec. 20, 2007; Date Accessed: Jan. 30, 2008; http://visualmethods.blogspot.com/2007/12/nyt-takes-it-up-notch.html.

Nasdaq; "Nasdaq-I00 Dynamic Heatmap;" Date Accessed: Jun. 10, 2008; http://screening.nasdaq.com/heatmaps/heatmap_100.asp.

Paris Technologies, Inc.; "OLAP;" Date Accessed: Jan. 30, 2008; http://www.olap.com.

Prentice, Callum; Ubrowser; "About;" Date Accessed, Jan. 31, 2008; http://www.ubrowser.com/.

Sam's Publishing; developer.com Gamelan™; "Introduction to EJB's;" http://www.developer.com/java/ejb/article.php/1434371.

Six Sigma; "Subject Matter Expert—SME;" Date Accessed: Jan. 30, 2008; http://www.isixsigma.com/dictionary/Subject_Matter_Expert_-_SME-396.htm.

(56) References Cited

OTHER PUBLICATIONS

Wattenberg, Martin; "Visual Exploration of Mutivariate Graphs;" Visual Commounications Lab, IBM Research; Date Accessed: Jan. 31, 2008; http://www.research.ibm.com/visual/papers/pivotgraph.pdf.
Weather.com; Date Accessed: Jan. 31, 2008; http://weather.com/.
Wikipedia; "Agile Software Development;" Date Accessed: Jan. 30, 2008; http://en.wikipedia.org/wiki/Agile_software_development.
Wikipedia; "Dimensional Modeling;" Date Accessed: Apr. 10, 2008; http://en.wikipedia.org/wiki/Dimensional_modeling.
Wikipedia; "Heat map;" Date Accessed: Jun. 10, 2008; http://en.wikipedia.org/wiki/Heat_map.
Wikipedia; "Julian Day;" Date Accessed, Jan. 30, 2008; http://en.wikipedia.org/wiki/Julian_day.
Wikipedia; "Mean down time;" Date Accessed: Jan. 30. 2008; http://en.wikipedia.org/wiki/Mean_down_time.
Wikipedia; "Mean time between failures;" Date Accessed: Jan. 30, 2008; http://en.wikipedia.org/wiki/Mean_time_between_failures.
Wikipedia; "Mean time to recovery;" Date Accessed: Jan. 30, 2008; http://en.wikipedia.org/wiki/Mean_time_to_recovery.
Wikipedia; "Planogram;" Date Accessed: Jan. 30, 2008; http://en.wikipedia.org/wiki/Planogram.
Wikipedia; "Self-organizing map;" Date Accessed: Jan. 30, 2008; http://en.wikipedia.org/wiki/Self-organizing_map.
Wikipedia; "Software as a Service;" Date Accessed: Jan. 30, 2008; http://en.wikipedia.org/wiki/Software_as_a_Service.
Wikipedia; "Thematic Map;" Date Accessed: Jan. 31, 2008; http://en.wikipedia.org/wiki/Thematic_map.
Wikipedia; "Voronoi Diagram;" Date Accessed: Jan. 31, 2008; http://en.wikipedia.org/wiki/Voronoi_diagram.
Zeiger, Stefan; "Servlet Essentials," Version 1.3.6, Nov. 4, 1999; Date Accessed: Jan. 30, 2008: http://www.novocode.com/doc/servlet-essentials/.

\* cited by examiner

| | | | | Nasdaq prices valid as of Jun. 9, 2008 Market Closed | | | | | |
|---|---|---|---|---|---|---|---|---|---|
| QQQQ -0.53% | | | | | | | | | |
| VRTX 2.54% | STLD 2.53% | RIMM 2.06% | DELL 1.73% | CTSH 1.73% | ATVI 1.65% | EXPD 1.62% | HANS 1.57% | SRCL 1.33% | SYMC 1.24% |
| BRCM 1.21% | MCHP 1.15% | NTAP 1.05% | MSFT 0.80% | LLTC 0.77% | FWLT 0.75% | JNPR 0.75% | ADSK 0.64% | JOYG 0.55% | DISCA 0.55% |
| YHOO 0.53% | PAYX 0.51% | SHLD 0.46% | ADBE 0.40% | ORCL 0.40% | CHRW 0.39% | CEPH 0.36% | WFMI 0.35% | AMAT 0.21% | COST 0.20% |
| AMGN 0.14% | CELG 0.13% | FLEX 0.09% | CMCSA 0.09% | FAST 0.06% | LVLT 0.00% | SIRI 0.00% | CDNS 0.00% | DTV 0.00% | MICC -0.02% |
| CA -0.04% | QCOM -0.06% | PCAR -0.08% | SPLS -0.09% | INTU -0.14% | PDCO -0.15% | CHKP -0.16% | PETM -0.22% | VMED -0.25% | CTAS -0.28% |
| XLNX -0.37% | IACI -0.38% | EXPE -0.40% | MRVL -0.41% | SIAL -0.41% | CSCO -0.41% | INTC -0.62% | TEVA -0.64% | LINTA -0.65% | EBAY -0.65% |
| DISH -0.74% | GILD -0.84% | SBUX -0.85% | RYAAY -0.87% | HOLX -0.94% | VRSN -1.00% | LBTYA -1.10% | CTXS -1.12% | ALTR -1.13% | XRAY -1.15% |
| INFY -1.18% | FISV -1.28% | GENZ -1.30% | JAVA -1.30% | ERTS -1.30% | LRCX -1.34% | MNST -1.39% | AMZN -1.49% | KLAC -1.52% | NVDA -1.54% |
| GOOG -1.61% | NIHD -1.64% | HSIC -1.69% | AKAM -1.79% | BIIB -1.83% | ESRX -1.90% | LEAP -2.06% | ISRG -2.07% | AAPL -2.17% | BBBY -2.26% |
| LOGI -2.63% | APOL -2.68% | GRMN -3.41% | FMCN -3.47% | BIDU -3.78% | SNDK -3.91% | WYNN -4.05% | LAMR -4.16% | UAUA -4.17% | AMLN -10.32% |

-10.32      % Change      10.32

© 2001-2004 SS&C Technologies - www.heatmaps.com    Last update: 2:13:31 PM, NZST

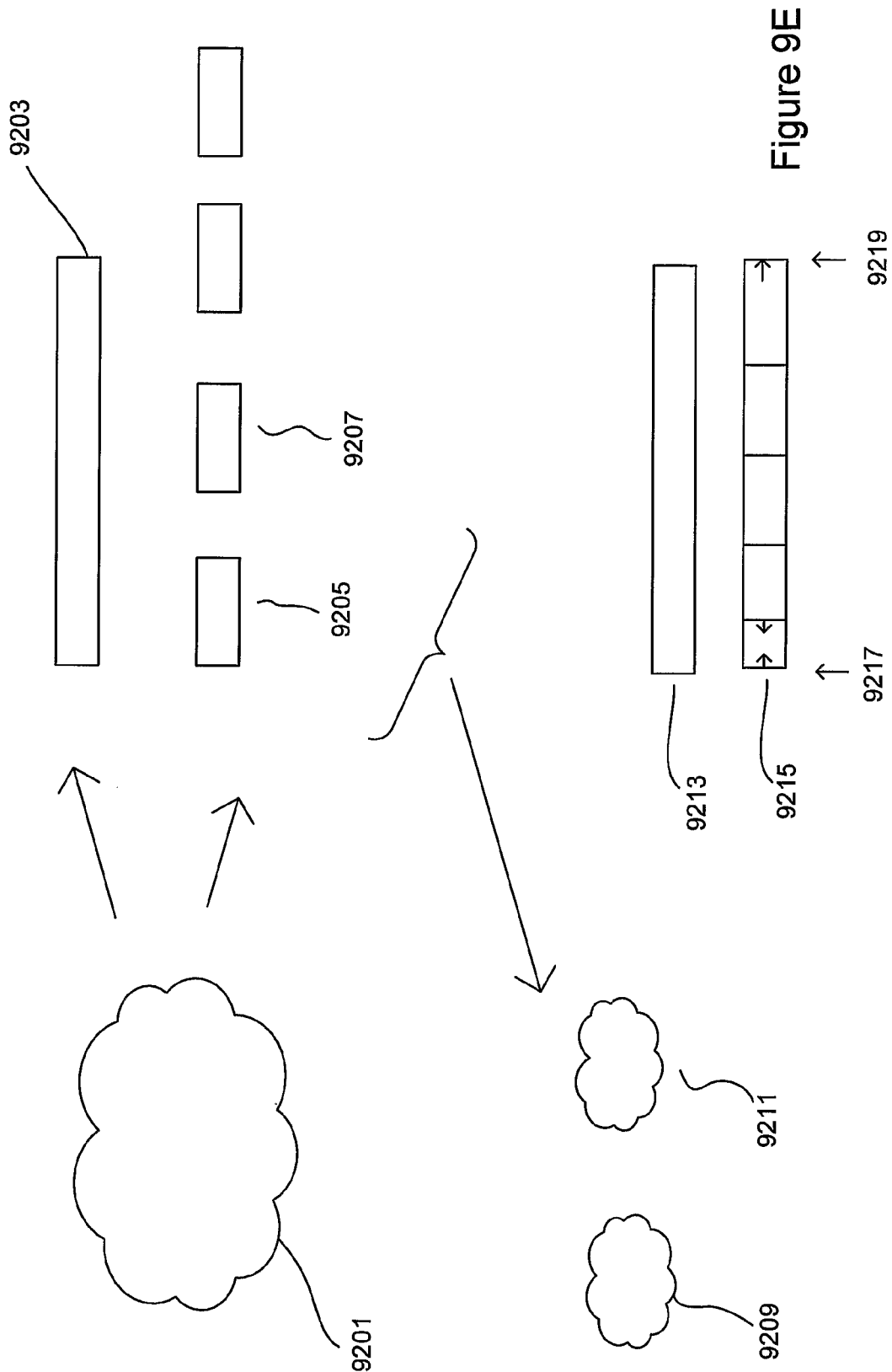

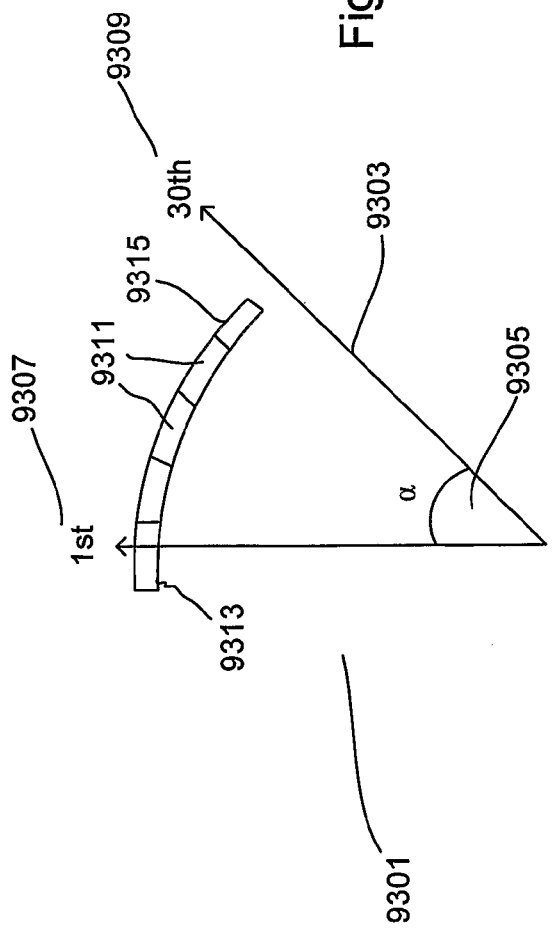
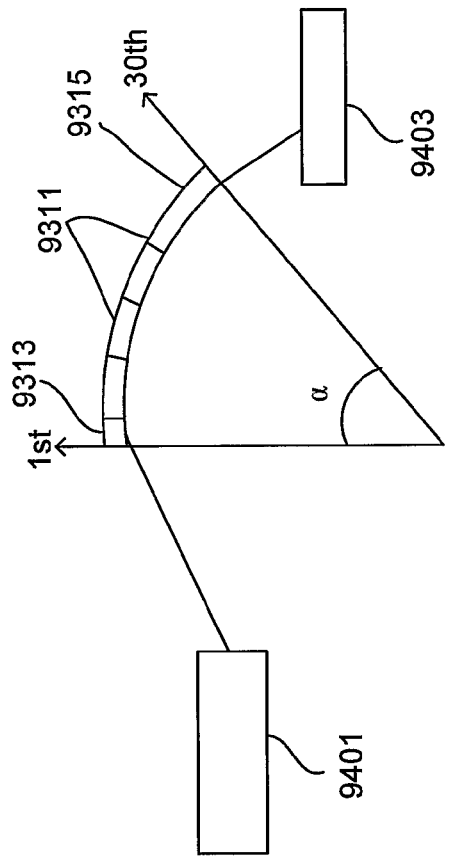
Figure 9F
Figure 9G

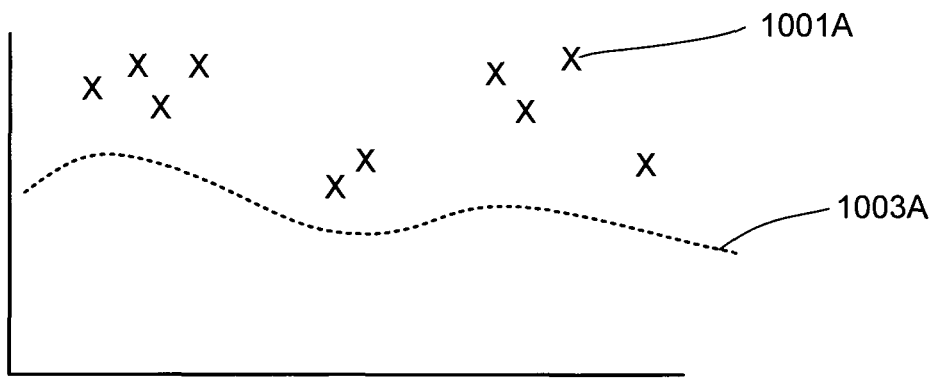
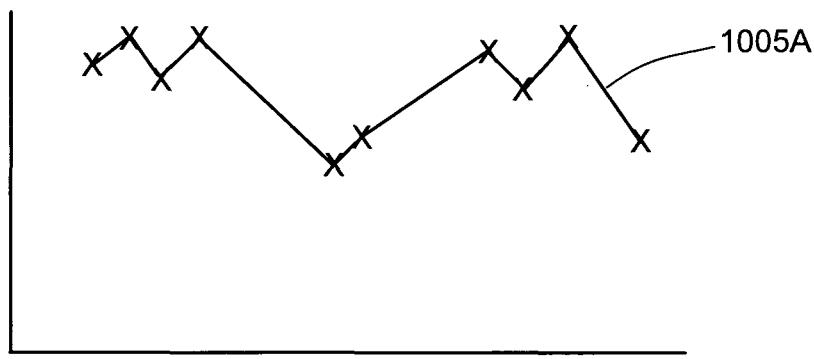
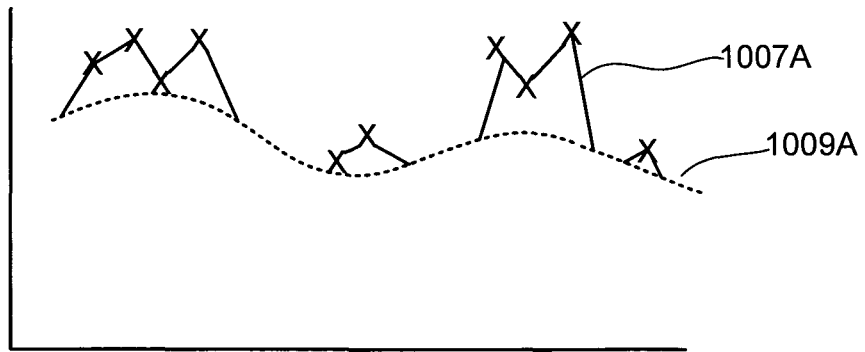
Figure 11M

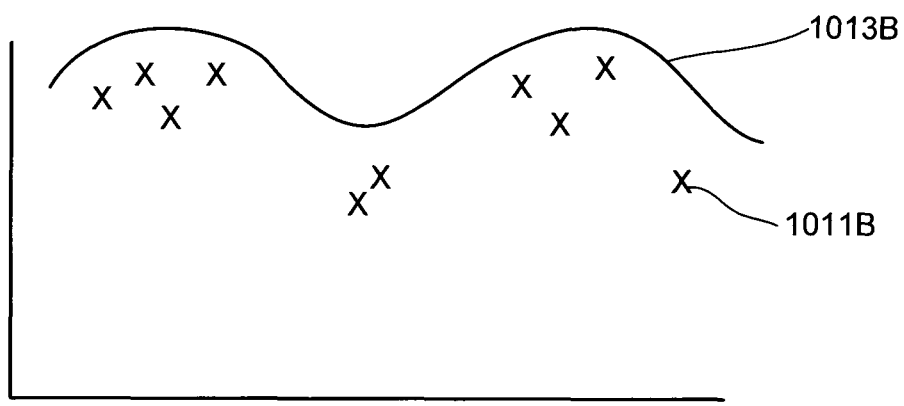
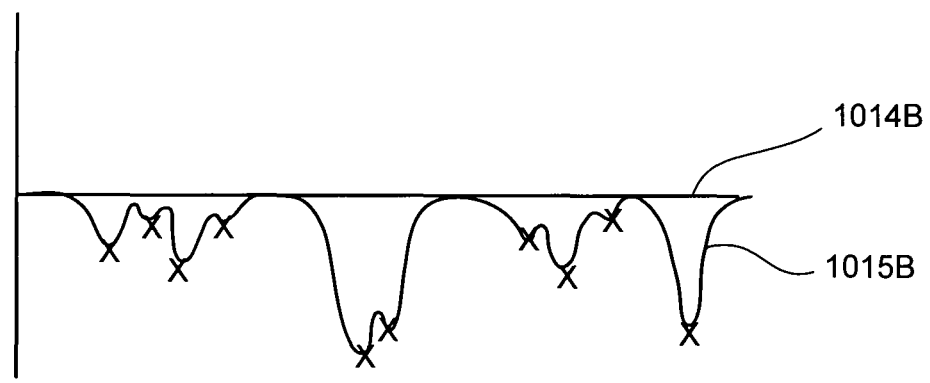
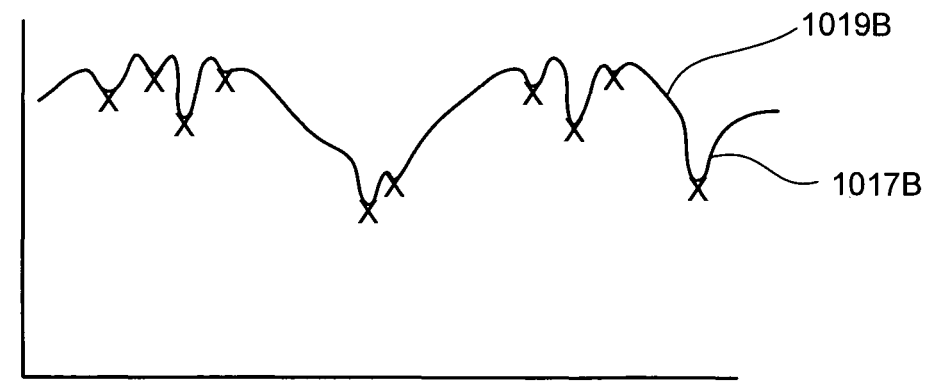
Figure 11N

| 00 | 01 | 10 | 11 |
|----|----|----|----|
| 02 | 03 | 12 | 13 |
| 20 | 21 | 30 | 31 |
| 22 | 23 | 32 | 33 |

Figure 17C

| 98,38,99 | 73 |
|----------|----|
| 50,94,103,40 | 68,81 |

Figure 17D

METHODS, APPARATUS AND SYSTEMS FOR DATA VISUALIZATION AND RELATED APPLICATIONS

This application is a National Stage Application of PCT/NZ2009/000114, filed 19 Jun. 2009, which claims benefit of U.S. Ser. No. 61/074,347, filed 20 Jun. 2008, U.S. Ser. No. 61/093,428, filed 1 Sep. 2008, U.S. Ser. No. 61/101,670, filed 30 Sep. 2008; U.S. Ser. No. 61/101,672, filed 30 Sep. 2008, U.S. Ser. No. 61/107,665, filed 22 Oct. 2008, U.S. Ser. No. 61/115,036, filed 15 Nov. 2008, U.S. Ser. No. 61/118,211, filed 26 Nov. 2008, U.S. Ser. No. 61/140,556, filed 23 Dec. 2008, U.S. Ser. No. 61/145,775, filed 20 Jan. 2009, U.S. Ser. No. 61/145,133, filed 21 Jan. 2009, U.S. Ser. No. 61/146,525 filed 22 Jan. 2009, U.S. Ser. No. 61/146,430, filed 22 Jan. 2009 and U.S. Ser. No. 61/161,472 filed 19 Mar. 2009 and which applications are incorporated herein by reference. To the extent appropriate, a claim of priority is made to each of the above disclosed applications.

FIELD OF THE INVENTION

The present invention relates to methods, apparatus and systems for data visualization and related applications.

BACKGROUND

A chart or graph is described in Wikipedia as a type of information graphic or graphic organizer that represents tabular numeric data and/or functions. Charts are often used to make it easier to understand large quantities of data and the relationship between different parts of the data. Charts can usually be read more quickly than the raw data that they come from. They are used in a wide variety of fields, and can be created by hand (often on graph paper) or by computer using a charting application.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that is most required and relevant to an end user.

In addition, known systems provide a standardized list of options to all users which the user then must wade through and try and determine which of the options available are most suitable for representing their particular data. This can result in the user mismatching the data being represented with the chosen visual representation so that the resultant representation does not clearly, accurately and succinctly identify any issues with, or convey information about, the data. This can result in the user missing particularly important features of the data due to those features not being represented in the most appropriate manner.

Also, although there are many sophisticated visualization algorithms that do exist and are being developed for specific functions, these algorithms are not provided to a user in a manner that guides the user to easily pick the data to be represented, pick the correct summaries of the data, pick the right dimensions to be represented, pick the right forms of visual representation, or choose unique visual designs to create a collection of visualizations that help someone run their business.

Further, the focus of existing known methods is on providing a single visual design, or type of visual or graphical representation, to represent data. That is, to produce, for example, a single bar graph to be displayed, or a single pie chart to be printed. This is very limiting to a user who may want to show various different aspects of the data in a single document.

Business measures are a well known means of identifying a manageable number of algorithms for which to run a business. However, these business measures merely represent a single dimension of the data, or even only a single number, and so are particularly limiting in respect of the data that they represent. Further, the business measures merely represent data and do not include any further functional capabilities.

This is particularly pertinent to at least any one of the Gaming Industry, Retail Industry, Hospitality Industry, Financial Services Industry, Entertainment Industry and Telecommunications Industry. This is because gaming venues, retail venues, hospitality venues (such as hotels etc.), financial institutions, entertainment distributors and telecommunications companies can collect data, which can be in large volumes, or diverse, detailed, timely or accurate information, on their customers' (e.g. business to customer) purchasing behavior and branch or outlet (business to business) purchasing behavior, as well as movements and activities (e.g. of customers or staff) within the facility in the normal course of providing the relevant business or from external sources.

For example, within the Gaming Industry, data may include the amount gambled by game, how much time has been spent playing each game, what has occurred (e.g., winning of jackpots) during customers' game play. Additionally, similar data is collected regarding non-gaming purchases (e.g., food and beverage, special events, lodging). Finally, customers may be issued credit so data associated with granting credit lines (e.g., credit rating, credit limits, etc.) is also collected.

As a further example, within the Retail Industry, data may include temporal aspects related to an individual transaction such as day, time, day of the week, the proximity of the date of purchase to known holidays. This data may also include special aspects such as the location of the outlet, the relative location of items on the shelves (e.g., aisle, placement within the aisle, height of placement on the aisle). Further examples may include data related to products such as quantity of each individual item purchased, other items in the market basket purchased with the item, price of the items, total value of the transaction, profit margins of the items and an item's shelf life.

As a further example, within the hospitality industry, data may include temporal aspects related to an individual transaction such as day, time, day of the week, the proximity of the date of a hotel/motel visit to known holidays. This data may also include special aspects such as the location of the hotel, the distributions of customers and the demographics of the surrounding area, as well as feeder markets for the facility. Further examples may include data related to products such as the number of room nights a customer spent in the hotel/motel, other items in the market basket purchased such as room service or in-room movies, price of the items, total value of the transaction, profit margins of the items etc.

As a further example, within the financial services industry, data may include temporal aspects related to an individual transaction such as day, time, day of the week, the proximity of the date of purchase to known holidays. This data may also include special aspects such as the location of the branch office like the distributions of customers and the demographics of the surrounding area. Further examples may include data related to products such as quantity of each individual item purchased, other items in the market basket purchased with the item, price of the items, total value of the transaction, profit margins of the items and an item's shelf life.

As a further example, within the entertainment industry, data may include temporal aspects related to an individual transaction such as day, time, day of the week, the proximity of the date of purchase to known holidays. This data may also include special aspects such as the location of the outlet, the relative location of items on the shelves (e.g., aisle, placement within the aisle, height of placement on the aisle). Further examples may include data related to products such as quantity of each individual item purchased, other items in the market basket purchased with the item, price of the items, total value of the transaction, profit margins of the items and an item's shelf life.

As a further example, within the telecommunications industry, data may include temporal aspects related to an individual transaction such as day, time, day of the week, the proximity of the date of purchase to known holidays. This data may also include special aspects such as the location of the telecommunication retail stores, areas of coverage, the distribution of customers and the demographics of the surrounding area. Further examples may include data related to products such as quantity of each individual item purchased, other items in the market basket purchased with the item, price of the items, total value of the transaction, profit margins of the items and an item's shelf life.

These potentially large or dispersed data collections may be further refined by collecting the data so it is available from a centrally accessible point. This centrally accessible capability can be implemented in a number of ways including, a data warehouse or a data mart or a federated information collection.

The often related or diverse and sometimes large volumes of data collected by the Gaming Industry, Retail Industry, Hospitality Industry, Financial Services Industry, Entertainment Industry and Telecommunications Industry on a variety of areas of the business, including data on their customers, outlets or branches (e.g. locations), their operations or external data sets, and in the case of telecommunications, call patterns, can all benefit from methods for understanding this data. These methods may range from the simple analytical views to sophisticated analytical methods as herein described.

R-tree indexing methodologies, as well as other indexing methodologies, are used in conjunction with databases to categorize data and place the data in a hierarchical format. It is known to use self organizing maps to visually represent data. However, self organizing maps can be very difficult and arduous to interpret. Also, it has not previously been known to use the indexing methodologies, in particular the R-tree indexing, as a display mechanism on its own.

Classification algorithms, such as fast clustering genetic algorithms or dimension reduction algorithms, can result in highly complicated structures. These may include 2 displays, the R-Tree, which may provide interactive insight.

For example, in the gaming industry, insight into the relationship between a customers' play, the types of games played, and the location of the game relative to other games.

For example, in the retail industry, insight into the relationship between the value of a customer's purchases, the types of products purchased, and the location of the products purchased relative to other products.

For example, in the hospitality industry, insight into the relationship between the value of a customer's purchases, the types of products and services purchased, and frequency of purchases and each product's use (e.g., food items purchased in a restaurant, in-room movies watched, spa services received) relative to other products.

For example, in the financial industry insight into the relationship between the value of a customer's purchases, the types of products purchased, and frequency of purchases and each product's use (e.g., drawing on a home equity loan, credit card transactions) relative to other products.

For example, in the entertainment industry, insight into the relationship between the value of a customer's purchases, the types of products purchased, and the location of the products purchased relative to other products.

For example, in the telecommunications industry, insight into the relationship between the value of a customer's purchases, the types of products purchased, and frequency of purchases and each product's use (e.g., minutes used, data used, messages sent, premium calls—e.g., foreign calls) relative to other products.

Various other references to the prior art and its associated problems are made throughout the following description.

The present invention aims to overcome, or at least alleviate, some or all of the mentioned problems, or to at least provide the public with a useful choice.

SUMMARY OF THE INVENTION

Various concepts are herein disclosed as set out in the claims at the end of the specification.

BRIEF DESCRIPTION OF THE DRAWINGS

Embodiments of the present invention will now be described, by way of example only, with reference to the accompanying drawings, in which:

FIG. 1A shows a NASDAQ Heat Map Example;

Figure 1B:
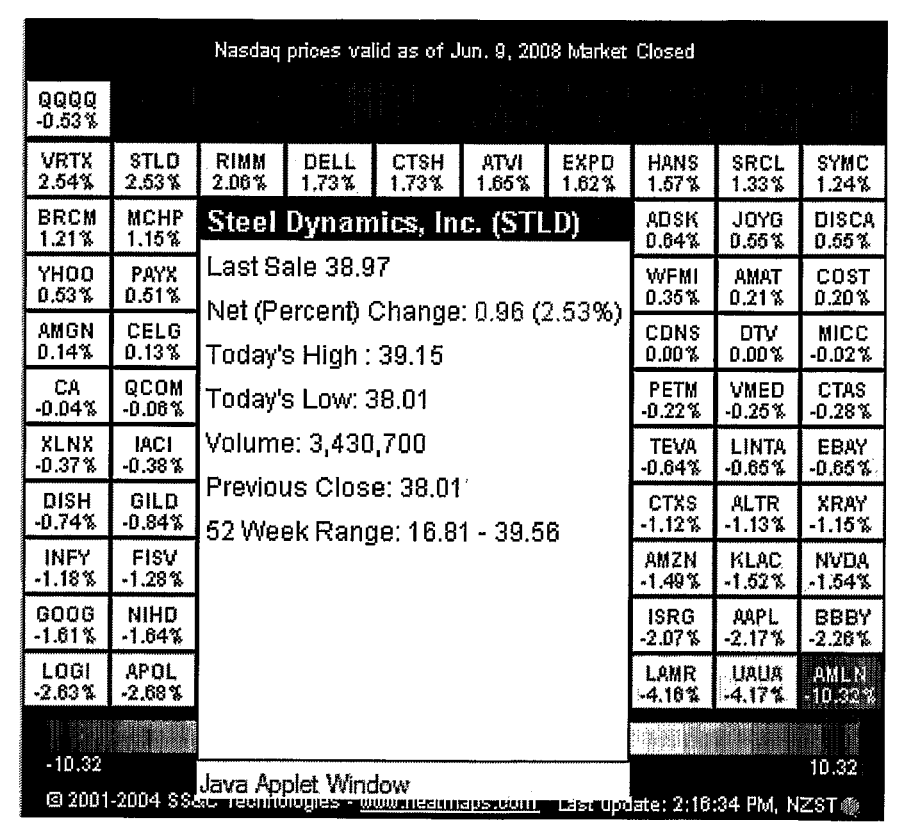

FIG. 1B shows a NASDAQ Heat Map Infra Day Data Example;

FIG. 9E shows a conceptual diagram of aligning data sets with differing periodicities according to an embodiment of the present invention;

FIG. 9F shows a known method of graphically representing data points;

FIG. 9G shows a method of graphically representing data points according to an embodiment of the present invention;

FIG. 9O shows a flow diagram according to an embodiment of the present invention;

FIGS. 11M to 11P show various stages when creating the surfaces according to various embodiments of the present invention;

FIGS. 17A to E show diagrams relating to pivotal visualizations according to an embodiment of the present invention;

DETAILED DESCRIPTION OF THE INVENTION

Figure 1C:
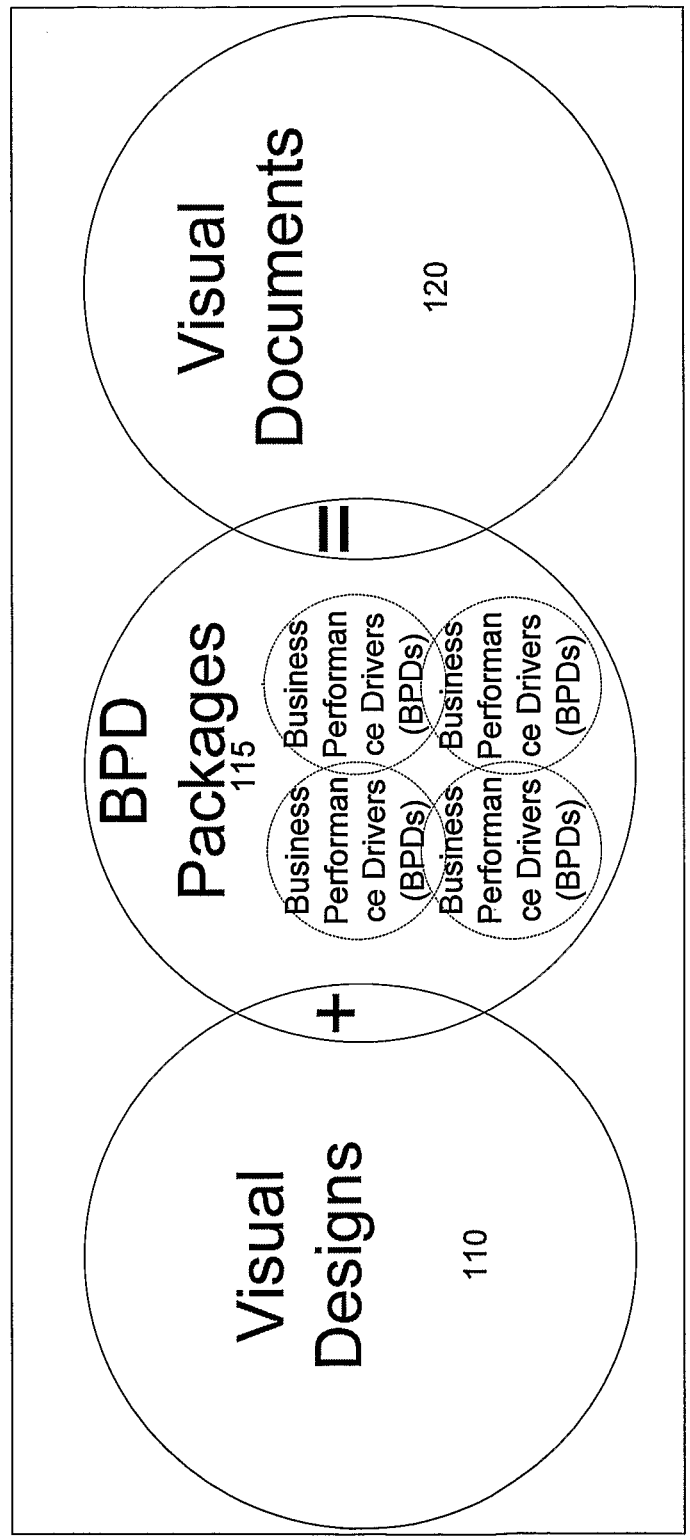
FIG. 1C shows a diagrammatical representation of some key terms.

Embodiments of the present invention are described herein with reference to a data visualization system adapted or arranged to perform various methods and processes.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner As an alternative to, or in conjunction with, the display module, further output modules may be provided to output the results of the alignment module. That is, the raw data retrieved by the data retrieval module is analyzed and converted to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the output data to be interfaced with other data handling modules or storage devices.

The data retrieval module is configured to enable the retrieval of data from a data storage module, which is in communication with the herein described system. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

Further, it will be understood that the visual representations produced by the herein described system are specifically adapted to enable the visual representation of complex data in order to convey useful information while minimizing the use of production printing materials or limiting the space in which the information may be conveyed. That is, by enabling the herein described system to produce a visual representation that has one or more characteristics as described to summarize a complex problem or complex data, a number of technical advantages are immediately provided. For example, the characteristics of the visual representation may include the limitation of the size of the visual representation, the use of a minimum amount of ink, or the creation of the representation using a minimal or bounded area space or minimum amount of time. These characteristics then may solve one or more problems such as the excessive consumption of consumable items by reducing the required consumption of consumables such as paper and ink resources, as well as reducing the energy required to produce the printouts of the visual representations or the displaying of the information on a display module due to the ability to provide the required information in a visual space of a smaller size.

Therefore, the data visualization techniques described herein transform the raw data received into various different arrangements to enable further or hidden information within the raw data to be visually represented in a manner that conveys the information to a user in an efficient manner.

Four key terms (or concepts) form the foundation of the specification set out in this document and accordingly have been defined as follows:

The four key terms are:

Business Performance Drivers (BPD)

BPD Packages

Visual Designs

Visual Documents

The key terms are defined as follows:

Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold. BPDs comprise of:

1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit.

The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
| --- | --- |
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

Examples of a BPD in the Gaming Industry include the theoretical win per gaming position, the average number of rooms cleaned by housekeepers during a single shift, average daily revenue for hotel rooms, and the number of restaurant covers per square foot.

Examples of a BPD in the Hospitality Industry may include maximizing the hotel room occupancy rate for a time period or the average revenue for an occupied room for a time period, maximizing the average profitability of non-hotel room related transactions over a period of time, or the average ratio of high profit items to low profit items within the products and services mix available to consumers.

Examples of a BPD in the Retail Industry may include the maximizing gross sales per unit of area (e.g., square foot, square meter), maximizing the average profitability of transactions over a period of time, or the average ratio of high profit items to low profit items within market baskets.

Examples of a BPD in the Financial Services Industry may include maximizing gross loans issued or deposits processed per unit of area (e.g., square foot, square meter) for example within outlets, maximizing the average profitability of transactions over a period of time, or the average ratio of high profit items to low profit items within the financial product mix available to consumers.

Examples of a BPD in the Entertainment Industry may include the maximizing gross sales per unit of area (e.g., square foot, square meter) for example within outlets, maximizing the average profitability of transactions over a period of time, or the average ratio of high profit items to low profit items within market baskets.

Examples of a BPD in the Telecommunications Industry may include maximizing the number of revenue text messages sent and received during for example a single month, improving call dropped rates, reducing network interconnect rates, maximizing the average profitability of transactions over a period of time, or the average ratio of high profit items to low profit items within the telecommunications product mix available to consumers.

Data visualization techniques as herein described facilitate management of all of these parameters and may include sophisticated methods.

BPD Packages: A BPD Package is made up from a set of related BPDs. This relationship (between a BPD Package and its BPDs) is defined using metadata.

BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps.

The software solution allows users to select one visualization (one visual form within a Visual Design category) to create a Visual Document.

Visual Document: A Visual Document contains visual representations of data. Access to the data used to construct the visual representation is in many ways analogous to a textual document.

A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | |
|---|---|
| Dimensions | Dimensions are data items that can be categorized. For example, Gender; Locations. |
| | Dimensions might be displayed on visualizations. For example product categories on a shop floor. |
| Fact | See Business Performance Drivers (BPDs) |
| Measure | See Business Performance Drivers (BPDs) |
| Normalizations | Can be applied to BPDs. These specify (or alter) the time period the BPD refers to. For example - Daily Units Sold, Monthly Profit. |
| | The combination of BPDs, Restrictions and Normalizations provides the flexibility to create many ways of looking at data without requiring extensive definition effort. Refer to definition of BPDs for examples. |
| Restrictions | Can be applied to BPDs or Dimensions. These filter the data included. For example a restriction of 'State = "CA"' may be specified to only include data for California. |
| | A BPD or Dimension could be restricted by Compound Statements (series of restrictions using AND/OR statements). For example, Revenue from all stores where state = California AND units sold >200 units. Restrictions have the following types: |

| Restriction Type | Definition | Example | Business Context |
|---|---|---|---|
| = | Equal to | State = 'CA' | Revenue earned within the state of California |
| >= | Greater than or equal to | Units Sold >=200 | Revenue earned from stores where units sold were greater than (or equal to) 200 units |
| =< | Less than or equal to | Revenue =<$50,000 | Revenue earned from stores where Revenue was less than (or equal to) $50,000 |
| > | Greater than | Units Sold >200 | Revenue earned from stores where the number of units sold were greater than 200 units |
| < | Less than | Units Sold <200 | Revenue earned from stores where the number of units sold were less than 200 units |
| IN | In (list) | State IN ('CA', 'NY') | Revenue earned from stores within the states of California and New York |
| BETWEEN | Values between X and Y | Product Code between '124' and '256' | Revenue earned from product codes 124 to 256 (inclusive) |
| NOT= | Not Equal to | State NOT = CA | Revenue earned from stores outside the state of California. |
| NOT IN | Not in (list) | State NOT IN ('CA', 'NY') | Revenue earned from outside the states of California and New York. |
| NOT BETWEEN | Values not between X and Y | Store Code NOT Between 105 and 110 | Revenue earned from stores excluding stores with a store code between 105 and 110 (inclusive). |

Heatmaps: A heat map is a graphical representation of data where the values taken by a variable in a two-dimensional map are represented as colors. A very similar presentation form is a Tree map.

Heat maps are typically used in Molecular Biology to represent the level of expression of many genes across a number of comparable samples (e.g. cells in different states, samples from different patients) as they are obtained from DNA microarrays.

Heat maps are also used in places where the data is volatile and representation of this data as a heat map improves usability. For example, NASDAQ uses heat maps to show the NASDAQ-100 index volatility. Source: Wikipedia[i]

This is shown diagrammatically in FIG. 1A. Some blocks are colored green, which means the stock price is up and some blocks are colored red, which means the stock price is down. The blocks have a varying deepening of the relevant color to indicate the direction that the stock is moving; the deeper the color, the bigger the move.

If a user hovers over a stock, additional intra-day data is presented—as shown in FIG. 1B: Source: Nasdaq.com[ii]

The key terms are set out diagrammatically in FIG. 1C. Visual designs 110 are individual visualization techniques. One or more are applied to visualize BPD packages 115 to create visual documents 120.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

One objective of the described solution is to put experts' data visualization techniques in the customer's hands by skillfully guiding the end user through choosing the right parameters, to display the right data, and to create its most useful visualizations to improve business performance.

In the gaming industry, the end user may include, for example, the controlling entity in the casino environment. This may be, for example, the casino gaming manager, hotel manager, catering manager, housekeeping manager, entertainment manager or any other person given the task of overseeing operations in the business environment.

In the retail industry, the end user may include, for example, the controlling entity in the store environment. This may be, for example, the store manager, a department manager, or any other person given the task of overseeing operations in the business environment.

In the hospitality industry, the end user may include, for example, the controlling entity in the hotel. This may be, for example, the hotel manager, a food and beverage manager, or any other person given the task of overseeing operations in the business environment.

In the financial industry, the end user may include, for example, the controlling entity in the branch office. This may be, for example, the branch manager, a loan officer, or any other person given the task of overseeing operations in the business environment.

In the entertainment industry, the end user may include, for example, the controlling entity in the store environment. This may be, for example, the store manager, a department manager, or any other person given the task of overseeing operations in the business environment.

In the telecommunications industry, the end user may include, for example, the store manager, or any other person given the task of overseeing operations in the business environment.

The described solution is a generic tool and can apply to multiple business areas that require decisions based on and understanding massive amounts of data. The resulting browser-based output is defined as a 'Visual Document'.

Figure 2A:
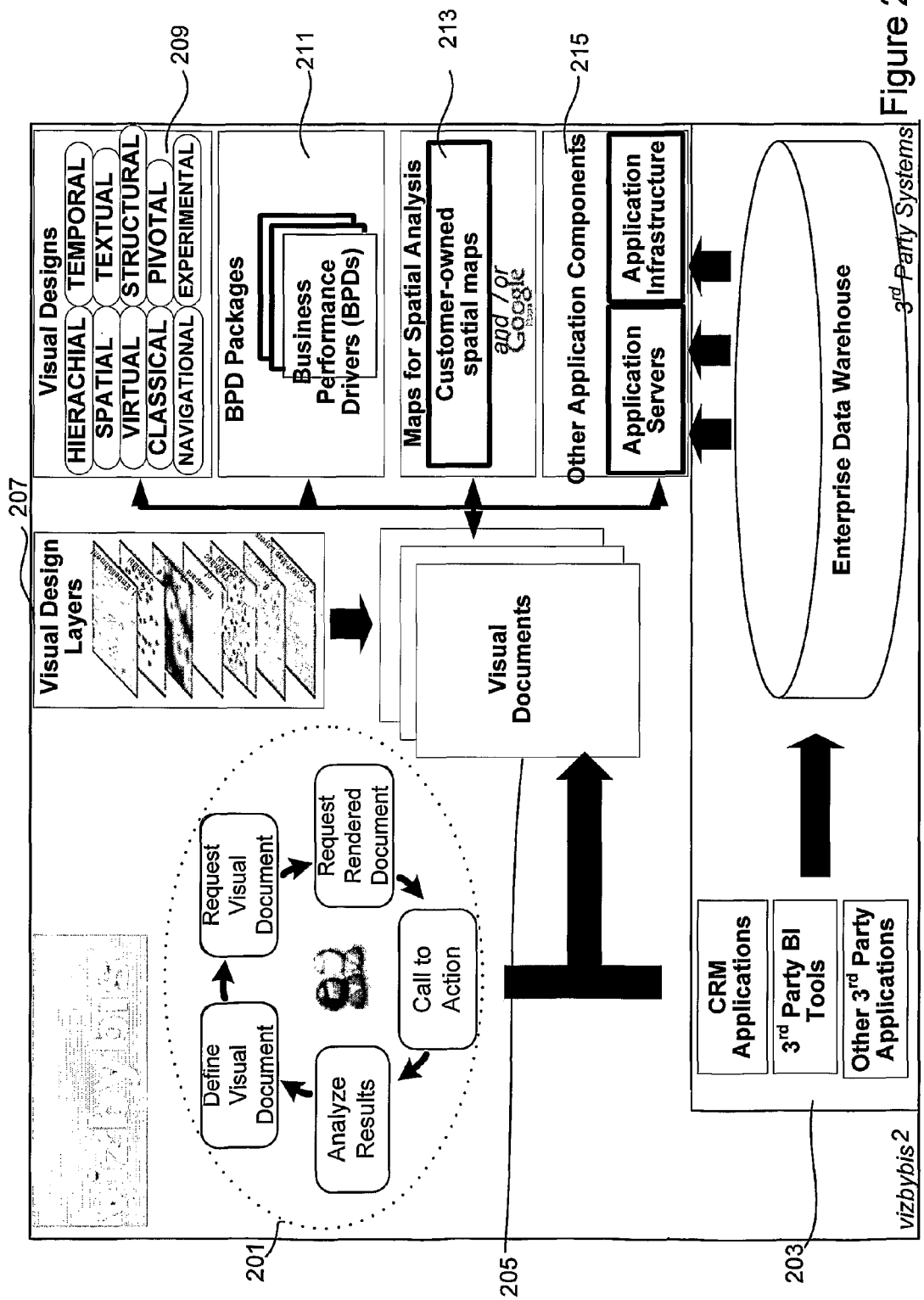
FIG. 2A shows a system concept diagram according to an embodiment of the present invention.

The solution provided is summarized in FIG. 2A.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver(s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

In the gaming industry, examples of a gaming business measure may include, for example, the total theoretical win per gaming position for a particular category of game over a specific period of time (e.g., day, month, year). The total theoretical win per gaming position is usually equal to the total amount bet for each game within the category for the period multiplied by the hold percentage of that game. These amounts are summed for all games within the category and then divided by the total number of games (slots) or seats (table games).

In the retail industry, examples of a retail business measure may include, for example, store profitability per square foot (or square meter).

In the hospitality industry, examples of a hospitality business measure may include, for example, the overall occupancy rate.

In the financial industry, examples of a financial business measure may include, for example, the total amount of outstanding loans meeting a particular risk level.

In the entertainment industry, examples of a entertainment business measure may include, for example, store profitability per square foot (or square meter).

In the telecommunications industry, examples of a telecommunications business measure may include, for example, the total number of products a customer purchases.

In the Visual Document, data is rendered in up to seven layers in one embodiment. However, it will be understood that the number of layers may be varied as needed by the user. Specific Visual Document Layers are described herein. However, it will be understood that further Visual Document Layers may be included over and above the specific types described.

Visual Designs are explicit techniques that facilitate analysis by quickly communicating sets of data (termed BPD Packages) related to BPDs. Once constructed, Visual Documents may be utilized to feed other systems within the enterprise (e.g., Customer Relationship Management (CRM) systems), or directly generate calls to action.

The described solution utilizes the best available technical underpinnings, tools, products and methods to actualize the availability of expert content.

At its foundation, the solution queries data from a high performance enterprise data warehouse characterized by parallel processing. This database can support both homogeneous (identical) and heterogeneous (differing but intersecting) databases. The system is adaptable for use with a plurality of third party database vendors.

A scalable advanced web server framework can be employed to provide the necessary services to run the application and deliver output over the web. A flexible and controllable graphics rendering engine can be used to maximize the quality and speed levels required to support both static and dynamic (which could be, for example, animated GIF, AVI or MPEG) displays. All components can operate with a robust operating system platform and within secure network architecture.

Pre-existing (and readily available) third party components can be employed to manage user security (e.g. operating system security), industry specific applications and OLAP (Online Analytical Processing) or other more traditional reporting. The described solution is designed to facilitate speedy and reliable interfaces to these products.

A predictive modeling interface assists the user in analyzing forecasted outcomes and in 'what if' analysis.

Strict security, testing, change and version control, and documentation standards can govern the development methodology.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

This clash of (a) more data, (b) the increased complexity of decisions and (c) the need for faster decisions was recently recognized in an IDC White Paper (Gantz, John et. al.; IDC White Paper; "Taming Information Chaos: A State-of-the-Art Report on the Use of Business Intelligence for Decision Making" November 2007), which described this clash as the "Perfect Storm" and that this 'storm' will drive companies to make a quantum leap in their use of and sophistication in analytics.

Today's business tools and the way they operate barely allow business users to, cope with historical internal data, let alone internal real time, predictive, and external data.

Hence, a new paradigm in business intelligence solutions is required.

System Overview

As explained above, FIG. 2A shows a high-level overview of the system.

There are five key components to the system. These are:
1. Visual Documents;
2. Visual Designs;
3. Business Performance Drivers (and BPD Packages);
4. Spatial Maps;
5. Application Components.

A description of each of these components is set out below under the respective headings.

Visual Documents

The Visual Documents form the core of the solution from a user perspective. This may include visualization(s), associated data and/or metadata (typically the visual form) that the user defines requests and interacts with. The Visual Documents may consist of single frames or animated frames (which could be, for example, implemented in AVI, GIF or MPEG format or a sequence of still images).

The Visual Document is typically viewed in a dynamic web browser view. In this interactive view the user may observe, select and navigate around the document.

Once created, the Visual Documents may be stored in the database and may be distributed to key persons (printed, emailed etc.) or stored for later use and analysis.

Visual Designs

The Visual Designs are a classification of the different types of visualizations that a user may choose. Within each Visual Design category, there are a number of visualizations. For example, the 'spatial' category can have retail store location maps, network maps or geographical location maps, such as, for example, maps available from Google™ or Yahoo™.

The described system allows users to select one or more visualizations (e.g. one visual form within a Visual Design category) to create a Visual Document.

There are ten Visual Design categories defined below, however it will be understood that further Visual Designs are envisaged, as well as the number of visualizations within each classification and the number of classifications.

Business Performance Drivers (and BPD Packages)

Business Performance Drivers (BPDs) are a metric applied to data to indicate a meaningful measurement within a business area, process or result. BPDs may be absolute or relative in their form of measurement.

In the gaming industry, an example of a gaming metric may be the theoretical win for all gaming positions for a particular period.

In the retail industry, an example of a retail metric may be the number of visits a customer makes to the store within a period.

In the hospitality industry, an example of a hospitality metric may be the average check (bill) amount for individual meals or tables in a restaurant.

In the financial industry, an example of a financial metric may be the number of and amount of credit card charges.

In the entertainment industry, an example of a entertainment metric may be the number of visits a customer makes to the outlet within a period.

In the telecommunications industry, an example of a telecommunications metric may be the number of and amount of talk time coverage charges.

The Business Performance Driver (BPD) concept differs from the known KPI concept by introducing BPDs that
(1) may have multiple dimensions,
(2) place the BPD in the context of the factors used to calculate them,
(3) provide well understood points of reference or metadata around which visual document creation decisions can be made, and
(4) may contain one or more methods of normalization of data.

Common groups of BPDs are called BPD Packages. For example, BPDs relating to one industry (say, telecommunications) can be grouped into one BPD Package. BPDs may be classified into one or more BPD Packages. For example, Net Revenue with normalizations available of per customer or per month may be applicable in a number of industries and hence, applicable to a number of BPD Packages.

Spatial Maps

Spatial maps allow for a user-owned and defined spatial map and/or for the user to use publicly available context maps such as Google™ Maps or Yahoo™ Maps. In either case, the user can display selected BPDs on the chosen spatial map.

Typically, a user-owned spatial map may be the inside floor space of a business and a publically available context map may be used for displaying BPDs on a geographic region e.g. a city, county, state, country or the world.

Application Components

The described application includes two main components, the Application Servers and the Application Infrastructure.

The Application Server includes a number of servers (or server processes) that include the Rendering Engine (to make (or render) the Visual Documents), Metadata Servers (for the BPD Packages, the Visual Designs and the BPDs) and the Request Queue.

The Application Infrastructure is also comprised of a number of servers (or server processes) that may include a Listener (which 'listens' for document requests) and central error logging.

Based on the user selections made above (Visual Documents, Visual Designs and BPDs), the user can click on an action and send a communication to a third party system (CRM, Business Intelligence or other application). The third party system could, for example, load the list from the solution and then send out a personalized email to all members on that list.

According to one embodiment, the described server components of the application are a Java based application and utilize application framework such as the IBM™ WebSphere application server framework, other platforms and server applications may be utilized as alternatives. The client application may be a mashup that utilizes the server components or it could be a rich internet application written using the Adobe™ Flash framework.

Other key elements of the system may include:

Parallelism—Parallel processing to increase responsiveness or to increase workload scalability of queries or Visual Documents. This parallelism may also decrease response time for larger visual documents in particular animated images may be executed in a parallel fashion.

Security—System and user-access security. This security may be a combination of authorization and authentication. The security framework may be implemented using the application framework.

Map Updates—A map management tool to update user-owned spatial maps.

Predictive Modeling—This may be an interface to third-party predictive models.

Configuration Tools—The application may be supported by configuration tools to enable rapid deployment of the application.

Modular Overview

Module Descriptions

Figure 2B:
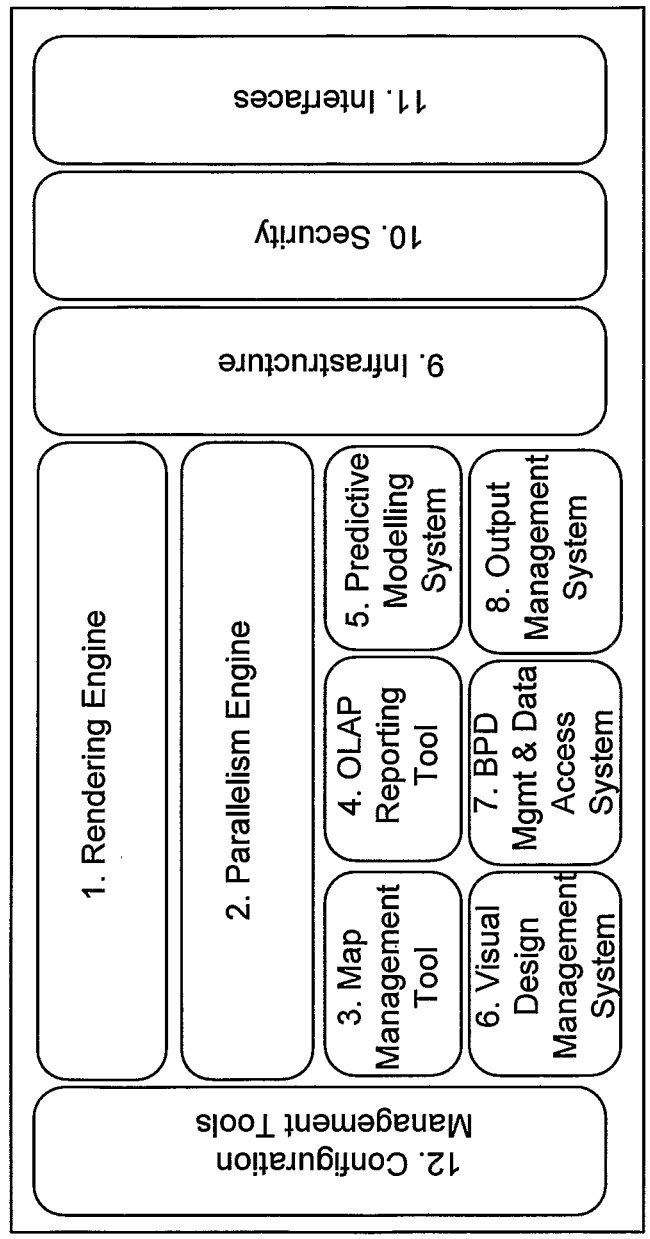
FIG. 2B shows an overview of the software modules in the described system.

The diagram shown in FIG. 2B shows an overview of the software modules in the described system.

These modules are described in the subsequent table. More detailed descriptions and diagrams of each of the software modules are provided below.

The table below outlines the following four items in relation to each module:

1. Technology System Component: This is the name given to the system component; this name matches the name in the above diagram.
2. High Level Functional Description: Describes the role of the software module.
3. Caching: Indicates whether this module uses caching to optimize performance.

| Technology System Component | High Level Functional Description | Caching |
|---|---|---|
| 1. Rendering Engine | Produces images and animations; could use Google ™ Maps or Yahoo ™ Maps for spatial context map. The development of Special Layers enables Visual Document produced to have unique capabilities that were not previously readily available. | Yes |
| 2. Parallelism Engine | Enables parallel execution of requests for high volume of Visual Document output and rapid results delivery to users. The preferred application framework selected is the IBM ™ WebSphere product. This framework enables the application to be scaled across multiple servers. | Yes |
| 3. Map Management Tool | Provides key map editing features (specifically CAD like) and map version control (desktop and enterprise) tools. | Yes |
| 4. OLAP Reporting | Industry standard online analytical reporting. For example, sorting, filtering, charting and multi-dimensional analysis. It is desirable that the user interaction with the data selection process in the data view is seamless with the data visualization view. For example, if the user selects 5 customers from the data view, the same 5 customers should be selected in the visualization view. This means that the solution may be a hybrid view (as discussed later). This hybrid view is a 'simple' view and is an interface to an industry leading OLAP tool. One option includes interfacing to the OLAP tool via a JDBC interface from the described solution or a web service model for the selection management. | Yes |
| 5. Predictive Modeling System | An interface to external predictive modeling engines; may also have some modeling systems. For example, Self Organizing Maps (SOM). | Yes |
| 6. Visual Design Management System | Tools for users to manage the different Visual Designs. | No |
| 7. BPD Management and Data Access System | Tools for users to manage the different BPD Packages and their associated BPDs. Contains Data Access capability that enables data to be queried from RDBMS (or potentially other data sources). | No |
| 8. Output Management System | For management of the documents (Visual Documents) within the system. | Yes |
| 9. Infrastructure | Core system management functions including system logging and Request Queue management. The Request Queue is also described under parallelism and there may be crossover between these two module descriptions. | Yes |
| 10. Security | Enables access to the system (or parts thereof) to be properly controlled and administered. | No |
| 11. Interfaces | Allows services to be called by (or to call) external applications. | No |
| 12. Implementation Tools | Tools to deploy and configure the software system. | Yes |

Architectural Views of the System

This section contains descriptions and diagrams of the architectural views of the system. The architecture shows how the system components fit and operate together to create an operational system. If compared to a vehicle, the wiring diagrams, the physical body, the driving circle and key complex components like the engine would be shown in architectural views.

This view does not describe how the system is written; it describes the high-level architectural considerations.

Architectural considerations are typically implemented by one or more software modules. The modular view described herein lays out a high-level view of how the software modules are arranged.

Figure 3:
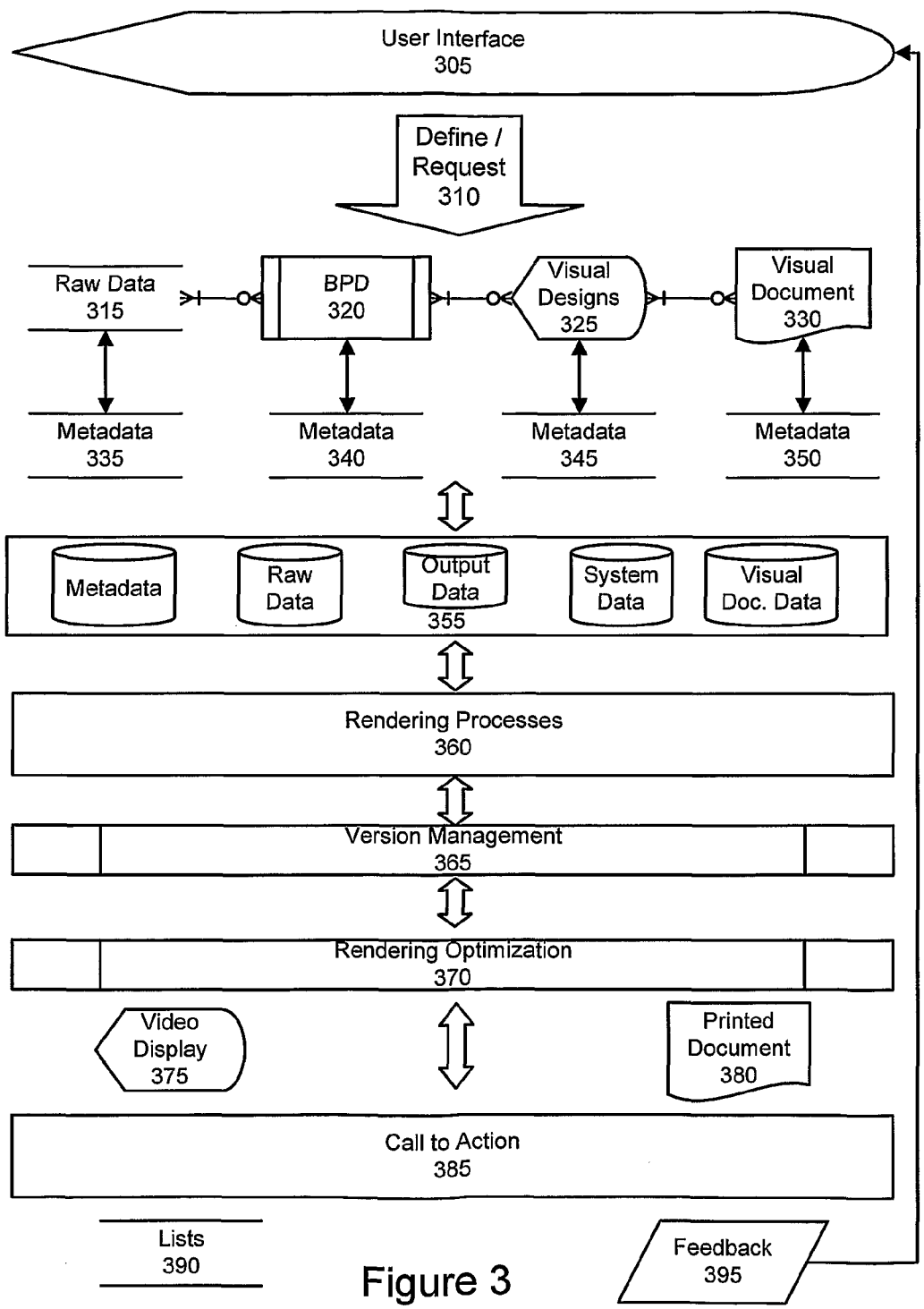
FIG. 3 shows a general overview of the data flow within the system according to an embodiment of the present invention.

FIG. 3 shows a general overview of the data flow within the system.

Figure 4:
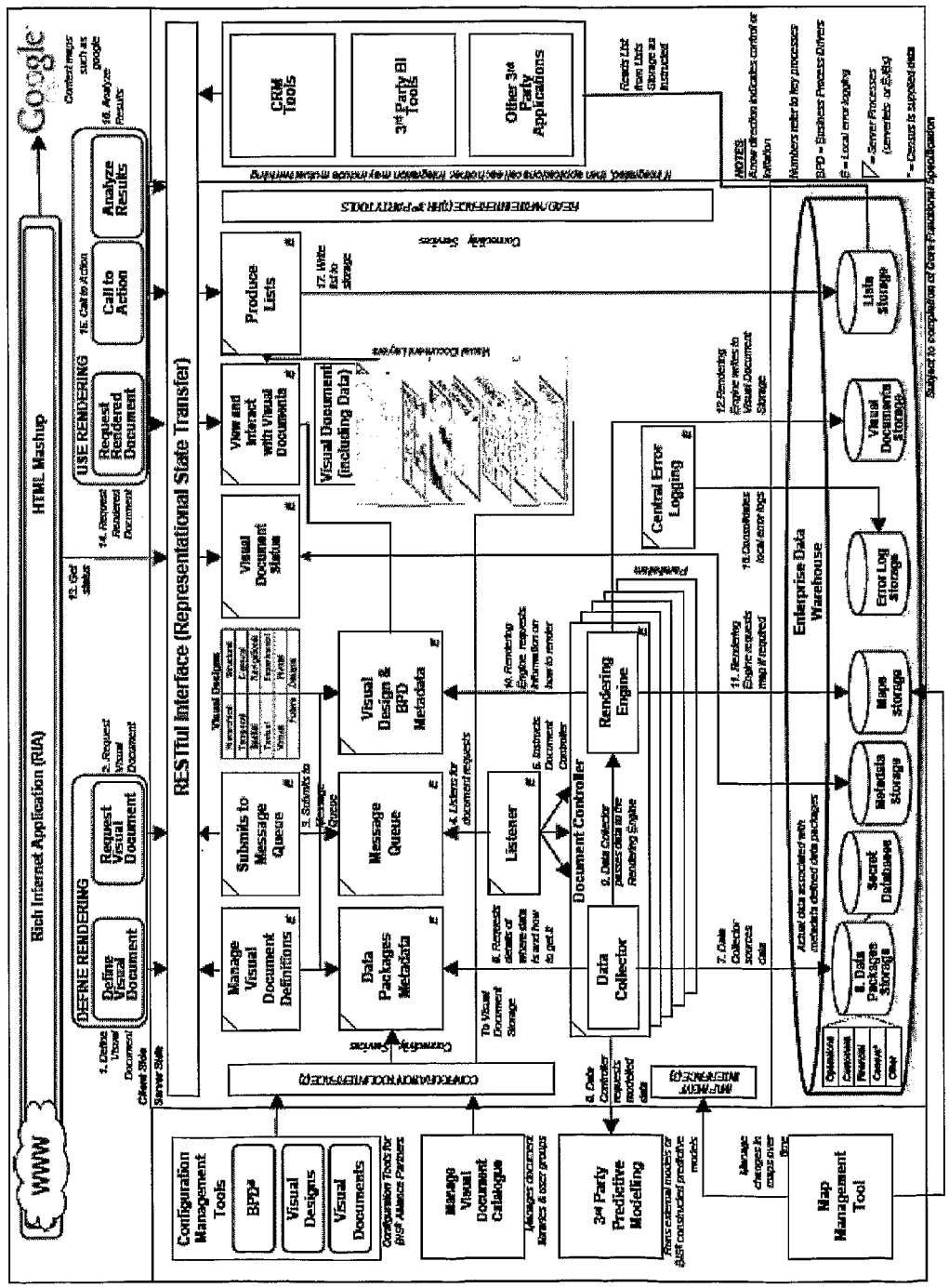
FIG. 4 shows an architectural overview of the described solution according to an embodiment of the present invention.

FIG. 4 shows the architectural overview of the described solution. This diagram is elaborated by the diagrams and descriptions in following sections of this document.

The following modules or components are shown:

Web interface Module 4105: User interfaces are browser based or may be a web services client, a rich internet application or may be a thick client. In all cases the user interface uses the same interface to the back end services.

Rendering Definition Module 4110: The user interface is used to define and request the rendering of Visual Documents Rendering Use Module 4115: Visual Documents are used for analysis, and precipitate calls to action.

Connectivity Services Module 4120: The definition and rendering of Visual Documents is performed through a set of programs or services called the Connectivity Services.

Configuration Management Tools Module 4125: Multiple versions of the basic elements; BPD, Visual Design, Visual Documents; are managed by a set of programs called the Configuration Management Tools.

Visual Document Management Catalog 4130: One such Configuration Management Tool (4125) is a set of programs that manage a users' catalog of available Visual Documents.

Predictive Modeling Module 4135: Predictive modeling is used for forecasting unknown data elements. These forecasts are used to predict future events and provide estimates for missing data.

Map Management Tool 4140: Another of the Configuration Management Tools (21125) is the Map Management Tool. It is designed to manage versions of the spatial elements of a visual design such as a geographic map or floor plan.

Visual Document Definitions Management Module 4145: Visual Document Definitions are managed through the use of metadata (4175).

Message Queue Submission Module 4150: Requests for Visual Documents are handled through queued messages sent between and within processes.

Visual Design Type Module 4155: Visual Documents are comprised of one or many Visual Designs in these categories.

Visual Document Status Module 4160: The status of Visual Documents is discerned from the metadata and displayed on the user interface.

Interaction and Visual Document View Module 4165: The user interacts with the Visual Documents through the user interface, and appropriate changes to and requests to read are made to the metadata.

List Production Module 4170: Where additional output such as customer lists are required, they are requested using the user interface and stored in the EDW (4215).

Data Packages Metadata Module 4175: Metadata is used to describe and process raw data (data packages).

Message Queue Module 4180: Messages may be queued while awaiting processing (4150).

Visual Design and BPD Metadata Module 4185: Metadata is used to describe and process the BPD's and Visual Designs associated with a particular Visual Document.

Visual Documents Module 4190: Visual Documents may be comprised of layered Visual Designs.

Third Party Modules 4195: Visual Documents may be used with or interact with other third party tools.

Listener Module 4200: The listener processes messages (4150) in the message queue (4180)

Document Controller Module 4205: The document controller is used to provide processed data to the rendering or query engines.

Central Error Logging Module 4210: System errors are detected and logged in the EWP (4215).

EDW 4215: All data is typically stored on a database, typically, multiple fault tolerant processors in an Enterprise Data Warehouse.

The following architectural components are described in more detail.

| Architectural Component | Description |
| --- | --- |
| Connectivity Services | This is a common communication service that is used when sending messages between systems (i.e. the described solution and $3^{rd}$ party tools) and between the described application layer and the user interface layer. |
| Configuration Management Tools | Allows specialized users to configure Visual Designs and Visual Documents to their needs - which differ from the default configuration provided. |
| Manage Visual Document Catalog | Gives selected users the ability to search, sort, group, and delete Visual Documents in the Visual Document Catalog. |
| Predictive Modeling | External modeling systems that use data sent from the described solution to perform complex calculations to produce predictive data. This predicted data is piped through the described solution to the user. |
| Map Management Tool | This is an application that enables users to create modify and delete individual maps to manage the complete sequences, this is very appropriate for management of floor plans. |
| Data Packages Metadata | The services responsible for providing metadata that enables the requester (typically, Data Collector) to source the data for the BPD. |
| Visual Design & BPD Metadata | The services responsible for providing the metadata to the requester (typically the Rendering Engine) that enables the construction of the Visual Documents. |
| Request Queue | The Request Queue manages the communication of requests for rendering of Visual Documents. These communications may be scheduled. |
| Document Controller | The Document Controller consists of two components. The first is the Data Collector responsible for reading the appropriate metadata and retrieving the data from the EDW (Enterprise Data Warehouse). This data is passed to the Rendering Engine that is responsible for producing the Visual Document. Document Controllers run parallel Visual Document requests, build and store documents. |
| Read/Write Interface for $3^{rd}$ Party Tools | The described solution provides a common interface for $3^{rd}$ party tools to communicate with e.g. CRM applications. |
| $3^{rd}$ Party BI Tools | One of the $3^{rd}$ party tools that the described solution may integrate with is an external OLAP tool. |
| Secret Databases | Secret databases are a method of sharing encrypted databases and providing a SQL interface that enables end users to run queries against atomic data without discovering the details of the data. |

The following terms have been also been used in FIG. 4. These are explained in more detail below.

| Architectural Component | Description |
| --- | --- |
| Logging | Logging (for example, error logging and access logging) is an inherently difficult activity in a parallel independent and predominantly stateless system.<br>The main issue that arises is that logging presents potential links between systems and therefore dependencies.<br>Typically within the application, each server will be responsible for its own logging. This ensures that the system scales without degradation in performance.<br>A separate process (central log reader) may be used to consolidate these logs dynamically as and when required. |
| Web Server | Web Servers respond to requests from users to provide Visual Documents. They read any required information from the metadata servers and Visual Document storage servers. If necessary they write Visual Document requests to the Request Queue. |
| Metadata Servers/Storage | Metadata servers are responsible for storage and user views of metadata. The metadata servers are also responsible for the validation of user rights to read Visual Documents (within the application). |
| Visual Document Storage | The Visual Document Catalog is a secure storage for all Visual Documents. Access is only possible when security requirements are met. |
| Data Collector | Typically the data collector queries the customer's data warehouse. The data warehouse can be augmented with additional subscribed |

-continued

| Architectural Component | Description |
|---|---|
| | embellishment data. This will provide the raw data that is represented visually back to the user. |
| BPD Packages Metadata | The described solution will use metadata to define groups of BPDs. These groups of BPDs are called BPD Packages. BPD Packages enable both internal data measures to be efficiently installed and external datasets to be provided. BPD packages contain no data. |

Figure 5:
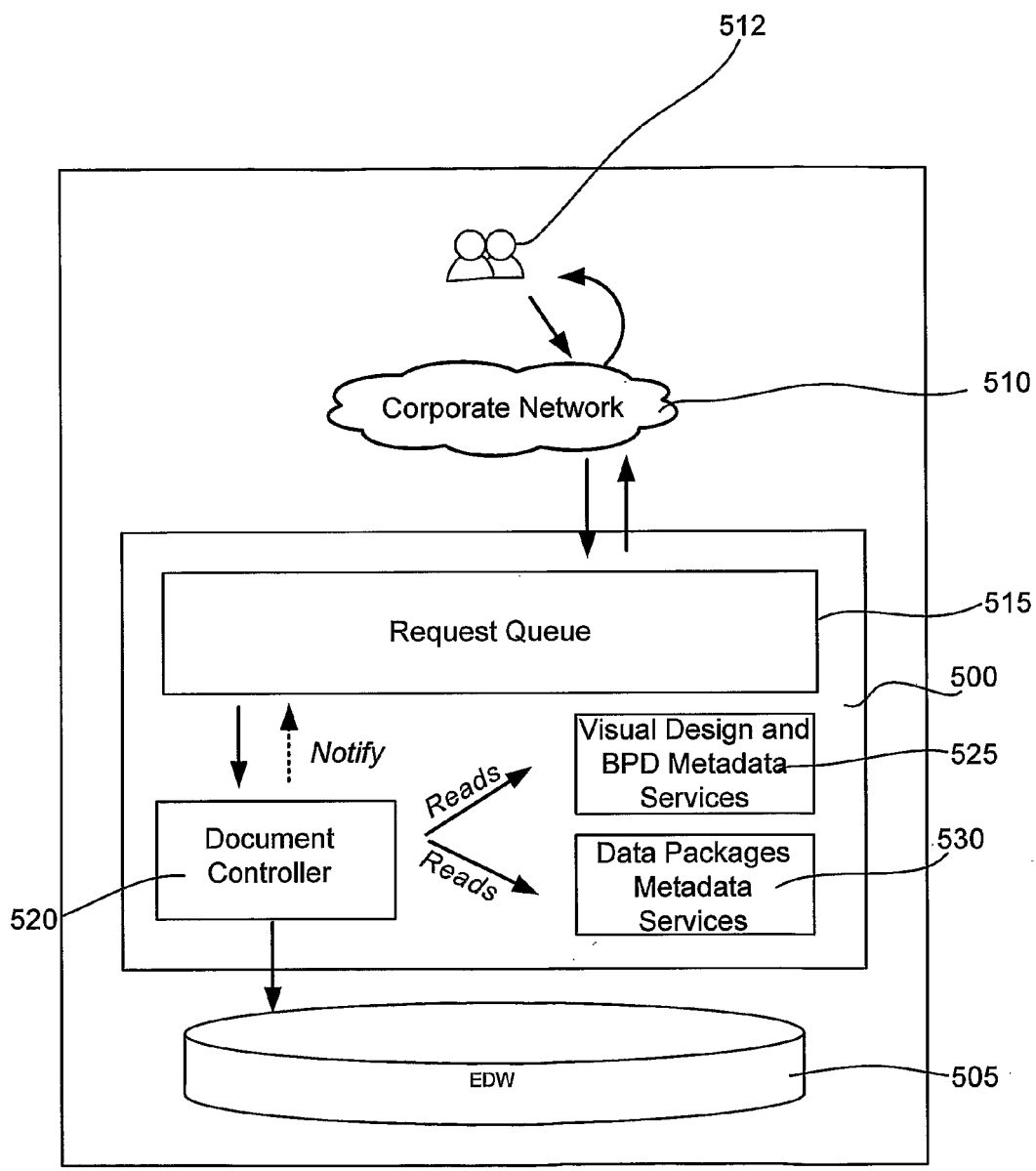
FIG. 5 shows a high-level system delivery overview of the described solution according to an embodiment of the present invention.

A further high-level system delivery overview of the solution is set out as shown in FIG. 5.

The described solution 500 is hosted by the enterprise 510. The figure shows the logical flow from the submission of a request to the end result, viewing the rendered Visual Document.

The data being visualized belongs to the customer 512 and the submitted request is unknown to the entity running the visualization system 500.

The controlling entity, integrators and customers may wish to have summaries of technical performance data (usage patterns, errors etc) sent from the operational system back to the integrator or controlling entity.

The system 500 has access to the data in a EDW 505. The system utilizes a request queue 515 to control requests from a corporate network 510. These requests are forwarded to a document controller 520. The document controller 520 accesses both the EDW 505 and reads visual designs and BPD metadata services 525, as well as data packages metadata services 530.

The system described thus enables various methods to be performed. For example, data is transformed into visually interpretable information. The visually interpretable information is in the form of visual representations that are placed within one or more visual documents.

Figure 6A:
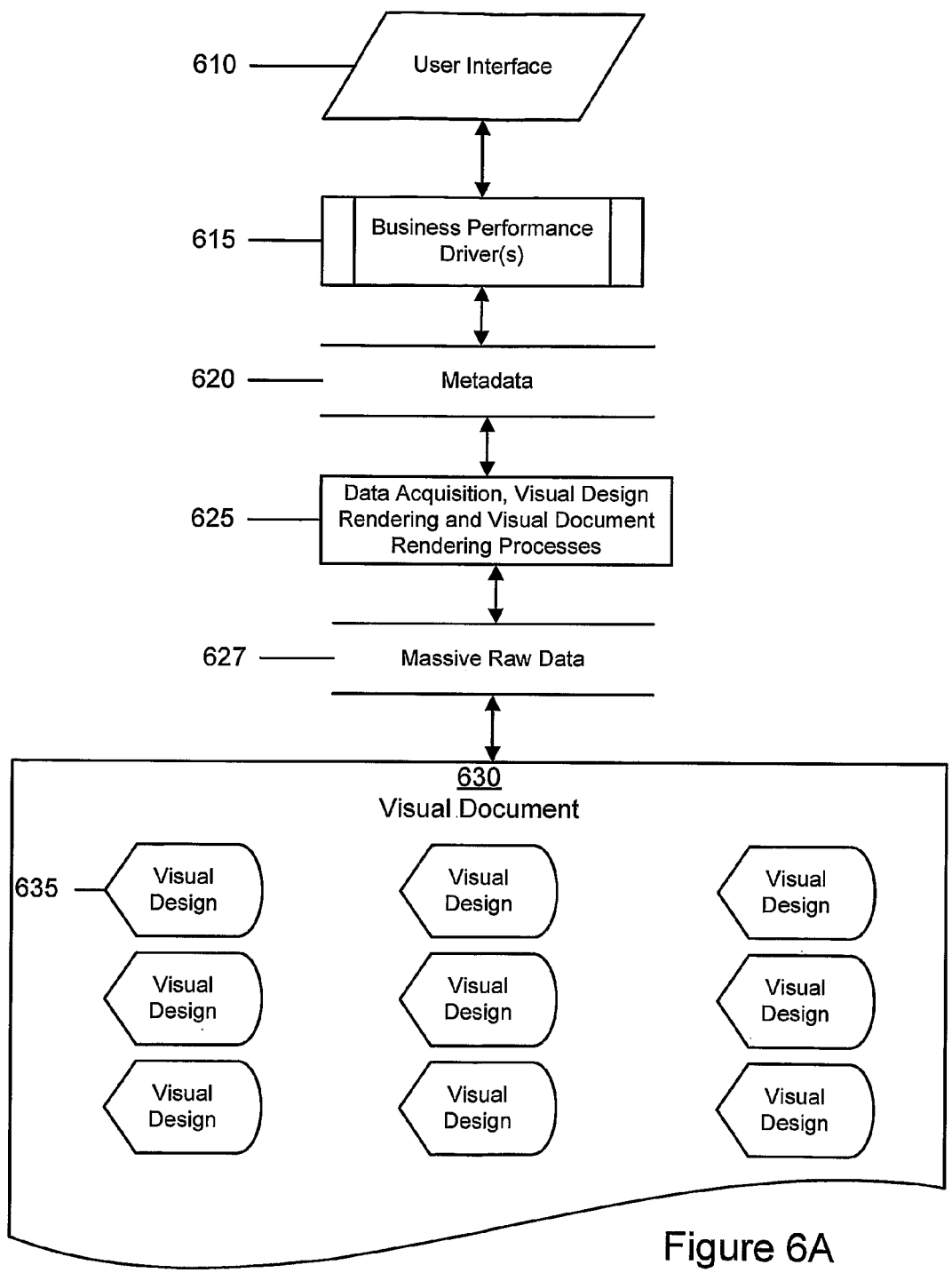
FIG. 6A shows a general data flow diagram according to an embodiment of the present invention.

FIG. 6A shows a general data flow diagram for the described system.

The User Interface 610 allows the user to define BPD's 615 in terms of raw data 627, which become the focus of the Visual Document 630.

Further, the User Interface 610 allows the user, through automated expert help, to create the Metadata 620, the most appropriate Visual Designs 635 that make up the Visual Document 625 in order to provide detailed analysis of data related to the BPD 615. The data acquisition, visual design rendering and visual document rendering processes utilize massive amounts of raw data 627.

The Metadata 620 is used by the Processes 625 to optimize the acquisition of the appropriate Data 627, processing of the data into useful information, and to optimize the creation and rendering of the Visual Designs 635 and the Visual Document 630 that contains them.

This method includes the steps of providing comprehensive yet easy to understand instructions to an end user that has accessed the system and the visual design application. The instructions assist the end user in obtaining data associated with a theme, wherein the theme may be focused on objectives that have been derived from the data. The objectives may be business objectives, for example. In this way, the system guides a user carefully through the many choices that are available to them in creating the visual representations, and the system automatically tailors its instructions according to not only what the user requires, but also according to the data that is to be represented. The system focuses on providing instructions to enable a visual representation to be created that will enable an end user to more effectively understand the data that has been collated.

In the gaming industry, the theme may include a gaming theme, such as, for example, maximizing the theoretical win for all gaming positions for a particular period.

In the retail industry, the theme may include a retail theme, such as, for example, maximizing the total transactions processed by cashiers.

In the hospitality industry, the theme may include a special incentive, such as, for example, maximizing the total number of check-ins performed by a room clerk.

In the financial industry, the theme may include a financial theme, such as, for example, maximizing the total number of new accounts opened by a teller or officer.

In the entertainment industry, the theme may include an entertainment theme, such as, for example, maximizing the total transactions processed by cashier.

In the telecommunications industry, the theme may include a special, such as, for example, maximizing the total number of new accounts opened by a retail outlet or independent dealer.

In the gaming industry, the business objectives may be, for example, maximizing the total theoretical win per gaming position for a particular category of game over a specific period of time.

In the retail industry, the business objectives may be, for example, maximizing the sales of the highest profit items for a particular period.

In the hospitality industry, the business objectives may be, for example, maximizing the average rate for the occupied rooms for a period of time.

In the financial industry, the business objectives may be, for example, maximizing the risk return ratio of a loan portfolio for a particular period.

In the entertainment industry, the business objectives may be, for example, maximizing the sales of the highest profit items for a particular period.

In the telecommunications industry, the business objectives may be, for example, maximizing the risk of dropped calls for a particular period.

Further, the instructions assist the end user in determining one or more summaries of the obtained data that enable the end user to understand the theme, as well as organizing the determined summaries into one or more contextual representations that contribute to the end user's understanding of the theme.

Further, instructions are provided that assist an end user in constructing one or more graphical representations of the data, where each graphical representation is of a predefined type, as discussed in more detail below, and includes multiple layers of elements that contribute to the end user's understanding of the theme.

Finally, instructions are provided to assist an end user in arranging the produced multiple graphical representations in a manner that enables the end user to understand and focus on the theme being represented as well as to display or print the organized graphical representations. The system assists in the organization or arrangement of the representations, elements thereof, within the visual document so as to ensure certain criteria are met, such as, for example, providing a suitable representation in the space available, using the minimum amount or volume of ink to create the representation, and providing a suitable representation that depicts the theme in a succinct manner, or visually simplistic manner.

The data being processed to create the graphical representations may be particularly relevant to the theme being displayed, disparate information or indeed a combination of relevant and disparate information.

There are multiple types of graphical representations that may be included within the visual document. The types are discussed in more detail below and include a hierarchical type, a spatial type, a virtual type, a classical type, a navigational type, a temporal type, a textual type, a structural type, a pivotal type, and an interactive type.

Further, the instructions may assist an end user in arranging the graphical representations in order to display high density data in a manner that conveys important information about the data, rather than swamping the end user with multiple representations that look impressive but do not convey much information.

In addition instructions may be provided to assist the end user in arranging the graphical representations to allow supplementary information to be added, where the supplementary information may be provided in any suitable form. Particular examples provided below depict the supplementary information being provided in subsequent visual layers that overlay the graphical representation. Alternatively, or in addition, supplementary information may include additional elements to be displayed within a single layer of the representation, for example, in the form of widgets.

In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

Figure 6B:
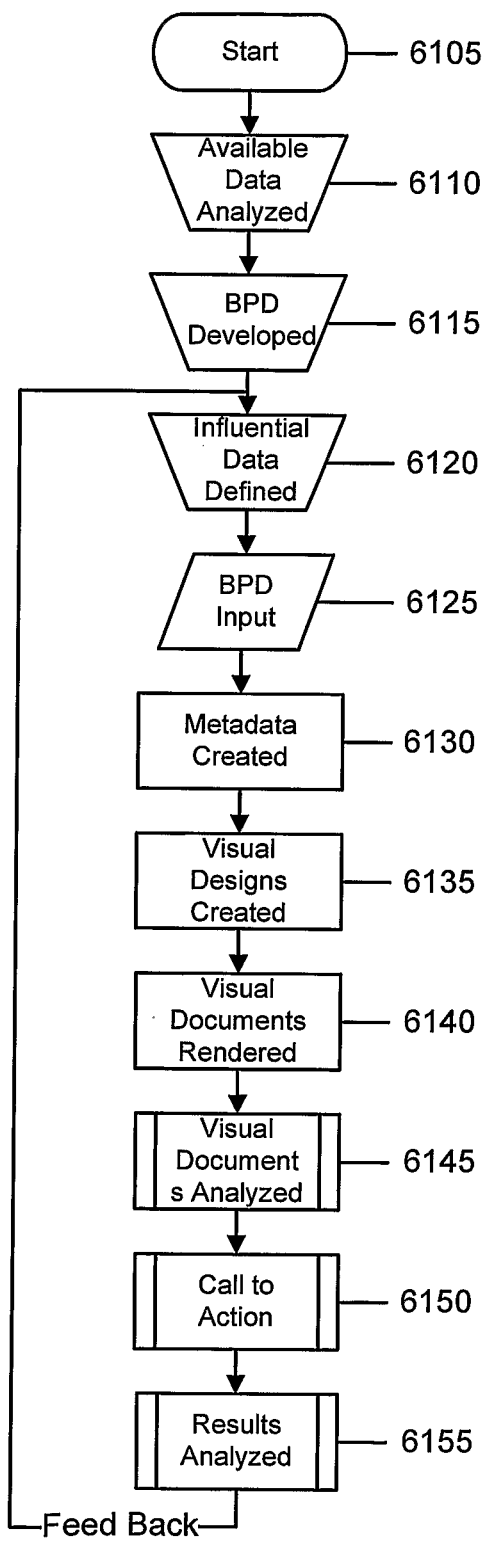
FIG. 6B shows a flow diagram according to an embodiment of the present invention.

FIG. 6B shows a flow diagram according to this embodiment of the invention.

Step 6105: Process Starts. User decides to manage the business.

Step 6110: Available data is identified and analyzed.

Step 6115: Business Process Drivers (metrics defined in terms of the data to indicate a meaningful measurement within a business area, process or result).

Step 6120: Data influencing the BPD metrics are identified.

Step 6125: BPD's are input into a computer system

Step 6130: BPD is categorized and appropriate metadata describing it is generated.

Step 6135: Visual Designs to display the influential data are created.

Step 6140: Visual Designs are aggregated into Visual Documents and rendered. Adjustments are made based on the freshness of all components (e.g., BPD, available data).

Step 6145: Visual documents are analyzed by the end user.

Step 6150: The end user decides on and implements actions based on the analysis in 6145.

As touched on above, business performance drivers (BPDs) are used to enable more efficient data analysis so as to produce accurate and relevant visual representations of the data. A BPD is a form of advanced business measure wherein additional information is included within the BPD that enables the system using the BPD to understand how to manipulate the BPD. That is, one or more intelligent attributes are included with the business measure to form the BPD, where those attributes reference or include information on how the BPD is to be processed or displayed. The form of processing and display may also be varied according to the device type or media upon which the business measures are to be displayed.

The attributes are attached to the business measure by storing the BPD in the form of a mark up language, such as, for example, HTML or XML. It will however be understood that any other suitable format for storing the BPD may be used where the attributes can be linked to the business measure.

In the example of HTML, the attribute is included as a tag. One such example would be to include the data or business measure within the body of the HTML code and follow the business measure with a tag that references the attributes, or dimensions, associated with that business measure.

Further, the attributes may also be modified or deleted, or indeed new attributes added, during or after the processing of the BPD so that the attributes are maintained, or kept up to date, bearing in mind the requirements of the entity using the BPD to visualize their data.

The business performance drivers, or measurable business objectives, are identified in order to create graphical representations of the business objectives, where those representations are placed within a visual document. A business objective may be, for example, a metric associated with a business.

Instructions are provided by the system to the end user, in order to assist the end user in establishing multiple business objectives as functions of available metrics, as well as assisting the user in organizing the business objectives into a contextual form that contributes to the end user's understanding of the business objectives.

Further, instructions are provided to assist the end user in constructing one or more graphical representations of the business objectives, where each graphical representation is of a predefined type, as mentioned above and described in more detail below. Further, each graphical representation includes multiple layers of elements that contribute to the end user's understanding of the business objective.

The elements within the graphical representation may include, for example, a shape, position, color, size, or animation of a particular object.

Instructions are also provided by the system to assist the user in arranging multiple graphical representations in a suitable manner that enables the end user to understand and focus on the business objectives being represented.

Finally, the end user is also assisted with instructions on how to display the organized graphical representations.

The following section describes a method of creating a visual representation of data in the form of a visual design.

The method includes the steps of the system providing instructions to an end user to assist the end user in constructing multiple graphical representations of data, where each graphical representation is one of a predefined type, as defined above and explained in more detail below, and the graphical representation includes multiple layers of elements that contribute to the end user's understanding of the data The system also provides instructions to an end user that assist the end user with arranging multiple graphical representations of different types within the visual representation in a manner that enables the end user to understand and focus on the data being represented, as well as providing instructions to assist the end user in displaying the visual representation in a suitable manner.

The visual representation may be displayed in a number of different ways, such as on a color video screen or a printed page. The information that is forwarded to the display device to create the visual representation may differ according the type of display device so that the visual representation is produced in the best known suitable manner utilizing the advantages of the display device, and avoiding any disadvantages.

The data being displayed may be based on a measured metric or an underlying factor that affects a metric.

The elements within the graphical representation may include a shape, position, color, size or animation of a particular object.

Although a single visual document may include only one type of graphical representation, either in the form of multiple graphical representations or a single representation, there will also be situations where multiple types of graphical representations may be organized within a single visual document in order to convey different aspects of the data, such as, for example, temporal as well as spatial information. The inclusion of different types of graphical representations within a single document can provide an end user with a better understanding of the data being visualized.

Further, the single visual representation may be arranged to be displayed as an image on a single page or screen. This may be particularly useful where space is at a premium yet the user requires the visual representation to be provided in a succinct manner. For example, the user may request certain information to be displayed in a visual representation on a single mobile telephone display, or a single screen of a computer display, in order to show a customer or colleague the results of a particular analysis without the need to flick between multiple screens which can result in confusion, a waste of energy and ultimately a loss of understanding of the visual representations.

The same issue applies to printed representations, where the result of the system enabling a user to arrange a single representation, which may include multiple elements or layers, on a single page not only succinctly represents the data being analyzed but also saves the amount of paper being printed on and the amount of ink being used to print the document.

Further, the amount of ink required for a visual representation may be further reduced by providing instructions to the end user in a manner that directs them to control and use white space in a representation in an efficient manner so as to reduce the requirement of ink.

Multiple types of graphical representations may be merged together within a single visual document, or representation.

As mentioned above, instructions can be provided by the system to assist the end user in adding supplementary information to the visual representation, and the supplementary information may be provided in layers within the representation.

Visualization Framework

The following description provides the visualization framework that will support embodiments of the present invention. The description includes an overview of the importance of Visual Design including a brief historical recount of a world-recognized leading visualization. The description also sets out the Visual Design classifications for the described solution.

It will be understood that the Visual Design examples described in this section are examples for illustrative purposes to identify the concepts behind how the visualization is produced. Therefore, it will further be understood that the concepts described can produce visual designs different to those specifically described. The Visual Design examples shown are also used to help the reader understand the narrative describing the Visual Designs.

The system described is specifically adapted to create actual specific visualization designs relevant to selected vertical and horizontal industry applications being deployed.

A vertical industry application is one that is associated with a solution directed at a specific industry, such as, for example, the entertainment industry. In this example, BPDs relevant to that industry are created, such as rental patterns of movies over different seasons.

A horizontal industry application is one that is associated with solutions across multiple industries. For example, the BPD may be based on CRM analytics, which applies across a whole range of different industries.

Due to the breadth of services offered by the various industries discussed herein, their nature lends itself to both horizontal (within area) and vertical applications (outside area).

For example, in the gaming industry, in addition to providing gambling activities, a typical gaming venue runs significant and varied food service, entertainment, lodging, and other applications. In the retail industry (in particular the "super store" concept), in addition to providing traditional retail product offerings, a retail venue provides significant and varied services including food service, banking, grooming, garment care, and other applications. In the hospitality industry (in particular the on-line, kiosk or by mail delivery concept) in addition to providing traditional hospitality product offerings, a hotel provides significant and varied products including various categories of car rentals, tour and travel services, business services, and other specialized services for consumers and businesses. In the financial industry (in particular the on-line, kiosk or by mail delivery concept) in addition to providing traditional financial product offerings, a branch office provides significant and varied products including various categories of loans, financial planning services, credit and gift cards, payroll services, and other specialized services for consumers and small businesses. In the entertainment industry (in particular the on-line or by mail delivery concept) in addition to providing traditional entertainment product offerings, an entertainment venue provides significant and varied products including videos, merchandise and audio products in various formats. In the telecommunications industry (in particular the product offer capability) in addition to providing traditional voice and data product offerings, a retail outlet provides significant and varied products including phones, phone accessories, entertainment packages, and data, and other specialized services for consumers and small businesses.

Design is now a fundamental part of almost every aspect of how people live work and breath. Everything is designed from a toothbrush to every aspect of a web site. Compare visual design to architectural design—in both cases anybody can draw quite complex pictures. The resulting pictures could have stimulating and well drawn graphic elements. In both cases, the question is why does the world need designers? Exploring this question more deeply one can ask—does it make such a difference to how one perceives and understands a design when it is made by a professional rather than an amateur?

The trend in business intelligence is to design tools to provide flexibility and leave the world of visual design to the amateurs. Stephen Few comments in Information Dashboard Design[iii] that "Without a doubt I owe the greatest debt of gratitude to the many software vendors who have done so much to make this book necessary by failing to address or even contemplate the visual design needs of dashboards. Their kind disregard for visual design has given me focus, ignited my passion, and guaranteed my livelihood for years to come."

Visual Designs within the described framework are well thought through in how the data is displayed. The described system allows good information visualization design concepts to be captured and delivered back to users as Visual Documents using unique data processing and analysis techniques.

Visual Designs
Method or Visual Design Classifications

According to this embodiment, ten Visual Design types are defined and incorporated into the described system. It will be understood that additional Visual Designs may be further defined including the creation of certain examples and actual Visual Designs for specific industry applications.

The visual design types include:
Hierarchical
Temporal
Spatial
Textual
Virtual
Structural
Classical
Pivotal
Navigational
Interactive The following describes a method for the assessment of Visual Design quality. In assessing the quality of a Visual Design the following factors should be considered:

Alternative approaches—To assess the capability of a Visual Design it is important to contrast it with other visualization methods. In particular one should compare the visual design to a classical graph or table of numbers. This comparison is important as many data visualizations add considerable graphic weight but little informational value.

Visual simplicity—Looking at a visualization should not overload the mind. The simplicity of the visualization is important as it enhances interpretation and allows common understanding without training. Some visualizations require considerable training to be applied. In general, the described solution will not use these visual designs.

Data density—the density of data in a visualization is a critical measure of its overall value. Higher density visualizations, if successful in maintaining their simplicity, have considerable potential to increase the flow of information to end users.

Volume of ink used—Is the visual design using negative space to show key information? This use of negative space allows lower volumes of ink to be used while showing the same or higher density of information. In addition, ink required is generally reduced as the number of "views" or pages of data is reduced to convey the same volume of data.

Capability to be illuminated with detail—In the end, data visualization becomes information visualization when the specific details are shown. The ability of a visualization to hold detailed information in specific places, often achieved with labels, is a key element in determining its value as an information visualization.

Visual Design Layers

Figure 7:
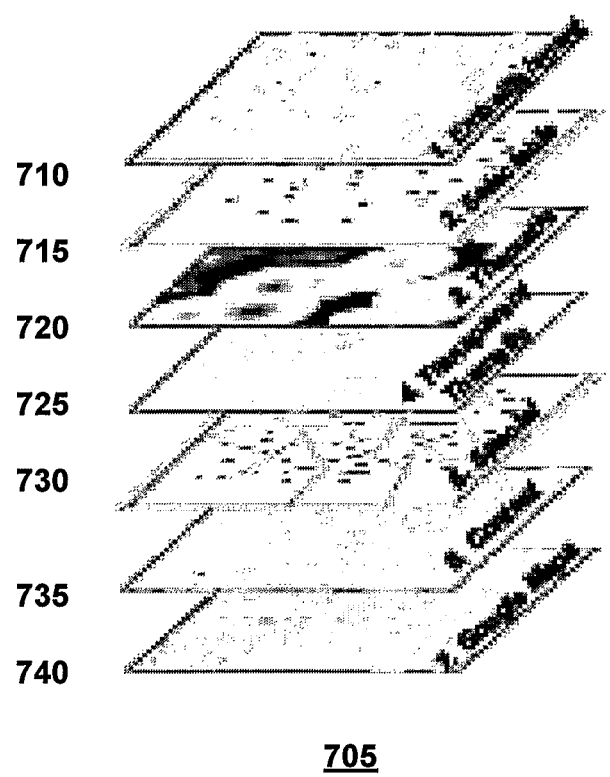
FIG. 7 shows the concept of layers according to an embodiment of the present invention.

There are seven defined Visual Design Layers which are set out diagrammatically as shown in FIG. 7. Other visual design layers may be added as appropriate.

These seven Visual Design Layers are described in the following table:

| Visual Design Layer Type | Description |
| --- | --- |
| 1. Embellishment Layers | Embellishment Layers have labels, symbology and/or other detailed information that is used to illuminate information that is displayed in the lower layers. The overlay can also include controls such as progress bars or spark-lines. |
| 2. Selectable Layers | Selectable Layers are interactive and consist of items that can have associated data. On a retail spatial map it includes store locations as they have associated data. Selectable Layers are typically not obscured by thematic treatments. |
| 3. Thematic Layers | Thematic Layers overlay colors or heatmaps on Special Layers. These thematic treatments become the core visual impact of the final Visual Document. |
| 4. Transparent Thematic Layers | Transparent Thematic Layers are very similar to Thematic Layers (in fact are an alternative). The only difference is that they are graphically merged using a transparent overlay. For example, this kind of layer is necessary to overlay heatmaps on maps.google.com. |
| 5. Special Layers | Special Layers construct the structure of the data. Specifically the Special Layer understands how to automatically draw the data so that other thematic treatments can be applied. Special Layers include mundane layers such as layers of polygons. |
| 6. Context Layers | These are the lowest level of the visualization; they include background maps and other contextual information. |
| 7. Context Map Layers | This is a type of context layer that is rendered from a map such as Google ™ Maps, Yahoo ™ Maps etc. This may be a road map, satellite map or any other map. It is past as is a set of tiled images and as such can only be used as a Context Layer. Typically, a Transparent Thematic Layer will be used to display thematic data on a context map layer. |

In terms of the Special Layer, two examples of Special Layers are set out below:

A. Classic Example of Special Layer: Voronoi Diagram
Source: Wikipedia[iv]

In mathematics, a Voronoi diagram, named after Georgy Voronoi, also called a Voronoi tessellation, a Voronoi decomposition, or a Dirichlet tessellation (after Lejeune Dirichlet), is a special kind of decomposition of a metric space determined by distances to a specified discrete set of objects in the space, e.g., by a discrete set of points.

In the simplest and most common case, in the plane, a given set of points S, and the Voronoi diagram for S is the partition of the plane which associates a region V(p) with each point p from S in such a way that all points in V(p) are closer to p than to any other point in S.

A Voronoi diagram can thus be defined as a Special Layer, where a set of polygons are generated from a set of points. The resulting polygon layer can then be subjected to thematic treatments, such as coloring.

B. Non Traditional Example of a Special Layer: Calendar

A calendar can be generated as a Special Layer for display of a temporal visual document. This Special Layer would require a 'start date' and an 'end date', most other information regarding the nature and structure of the Calendar could be determined automatically. The thematic layers would then use the structure of the calendar as a basis for thematic treatments such as coloring and contouring.

In an example from ENTROPIA[v] a calendar is shown that can be created into a spiral. The structure and layout of this spiral will be the subject of considerable design discussions by information designers focused on issues such as aesthetics and clarity of information. The result of this discussion is a visual design of a spiral calendar Special Layer. This Special Layer can then be used for thematic treatments such as coloring.

Visual Design Types

The ten defined types of visual design will now be described in more detail below.

1. Hierarchical Visual Designs

One purpose of a hierarchical visual design is to present large scale hierarchical data in one display. It is a picture for understanding, monitoring, exploring and analyzing hierarchical data.

A tree structure is one example of a hierarchical visual design. A typical hand drawn example of a tree structure is available at Wikipedia at en.wikipedia.org/wild/Tree_structure. A hand drawn example of a tree structure of a French encyclopedia is shown. In this case the detail of the actual topics in the encyclopedia becomes the detail that allows the visual design to be useful.

It would be possible to overlay information on this visual design such as the average cost per page of building the document to show people the relationship between the natural structure of the document and some financial measure.

The Hierarchical Visual Design is a hierarchical diagram such as an organizational chart or a correlation matrix.

This Visual Design has at least one natural centre and typically has a higher density toward the fringes of the visualization. The Hierarchical Visual Design can typically be considered as a 'tree' structure. The nodes and vertices within the tree structure are best if they are generated automatically from a dataset. This tree structure is a good example of a Special Layer.

The development process includes building a tree that is optimized for this type of Visual Design including heat mapping techniques.

Large scale hierarchical data is represented using various techniques such as mapping to icons, shapes, colors and heights.

Typical uses include mapping of web pages, organizational charts, decision trees and menu options.

Generating a hierarchy from data may be completed with human intervention. For example, when looking at the hierarchy of an encyclopedia it would be possible to rearrange the density of information so there is no overlap between trees. The decision on how much overlap removal may be assisted with human input.

A hierarchy generated automatically often has more than one solution, for example an organizational chart can be meaningfully shown in a number of ways (e.g. horizontally or vertically). One key challenge in automating the tree production is to also describe the cartographic and layout decisions that can be captured into the Special Layers that build the tree.

A specific example is described below in relation to the determining of a hierarchy of data points in a textual type visual design.

Typically tree views have relationships between nodes. These relationships can be directional, bi-directional or non-directional. Relationships may also exist between multiple levels that complicate the process of drawing a useful visual document. Tree views may also be drawn without relationships between nodes. For example, in a fully connected network a relationship is not useful; however, the fully connected nodes may have a hierarchy that can be used to structure the Visual Document.

Potential Layouts include linked hierarchy, single value hierarchy and multiple value hierarchy.

The R-Tree is a traditional method for building an index of a spatially arranged dataset—this is also a natural Special Layer. By overlaying the creation of an R-Tree index over a data set, such as a self organizing map (SOM) or other dimension reducing representation, a hierarchy of the data can be constructed.

The generated R-Tree functions both as an index to navigation of the unstructured data and a summarization of the key components of the data.

It has not previously been known to use the dimensional indexing methodologies, such as the R-tree indexing, the Quad Tree or the Priority of R-tree as a display mechanism on its own. These indexing methods can be used to more easily enable the interpretation of visual representations, such as, for example, the interpretation of self organizing maps or other dimension reducing representation. Dimensional indexing can enable a user to interact with visualizations in a more meaningful manner by selecting data that is arranged in a hierarchical manner in the index and seeing where that data is located within the visualization. The combination of an indexing method and a display mechanism provide for a computationally efficient and technically advanced method for interacting with very large datasets.

Description of Dimensional Index: R-Tree

As defined in Wikipedia, R-trees are tree data structures that are similar to B-trees, but are used for spatial access methods i.e., for indexing multi-dimensional information; for example, the (X, Y) coordinates of geographical data. A common real-world usage for an R-tree might be: "Find all museums within 2 miles of my current location". The data structure splits space with hierarchically nested, and possibly overlapping, minimum bounding rectangles (MBR, otherwise known as bounding boxes, i.e. "rectangle", what the "R" in R-tree stands for).

Each node of an R-tree has a variable number of entries (up to some predefined maximum). Each entry within a non-leaf node stores two pieces of data: a way of identifying a child node, and the bounding box of all entries within this child node.

The insertion and deletion algorithms use the bounding boxes from the nodes to ensure that "nearby" elements are placed in the same leaf node (in particular, a new element will go into the leaf node that requires the least enlargement in its bounding box). Each entry within a leaf node stores two pieces of information; a way of identifying the actual data element (which, alternatively, may be placed directly in the node), and the bounding box of the data element.

Similarly, the searching algorithms (for example; intersection, containment, nearest) use the bounding boxes to decide whether or not to search inside a child node. In this way, most of the nodes in the tree are never "touched" during a search. Like B-trees, this makes R-trees suitable for databases, where nodes can be paged to memory when needed.

A quad tree is a tree whose nodes either are leaves or have 4 children. The children are ordered 1, 2, 3, 4.

The advantage of indexes, such as the R-Tree, Priority R-Tree or Quad-Tree indexes, is that they can classify a two (or higher) dimensional space into a hierarchical tree. This hierarchy is typically used to lookup values, for example to determine all the customers that are near to a store location.

Within the R-Tree, nodes at the same level of the tree may be balanced. This balancing provides for an insightful classification of data within the tree since each layer of the classification contains all data and an automatically generated hierarchy. A similar balancing is desirable for other kinds of spatial indexing functions such as the Priority free.

Embodiments of the present invention are described herein with reference to a system adapted or arranged to perform a method for creating a visual representation of data points from metric data and determining a hierarchy of the data points.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

Figure 8A:
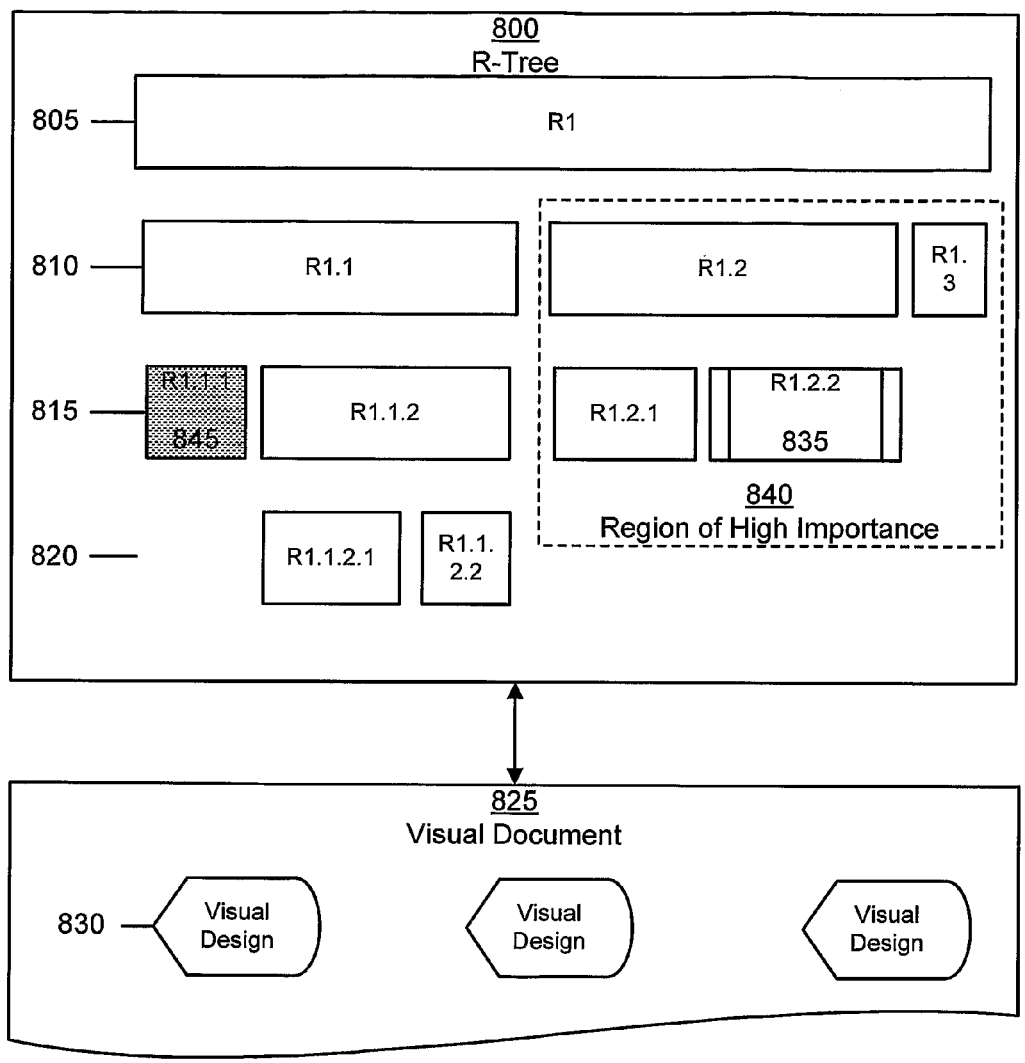
FIG. 8A shows an R-tree representation according to an embodiment of the present invention.
Figure 8B:
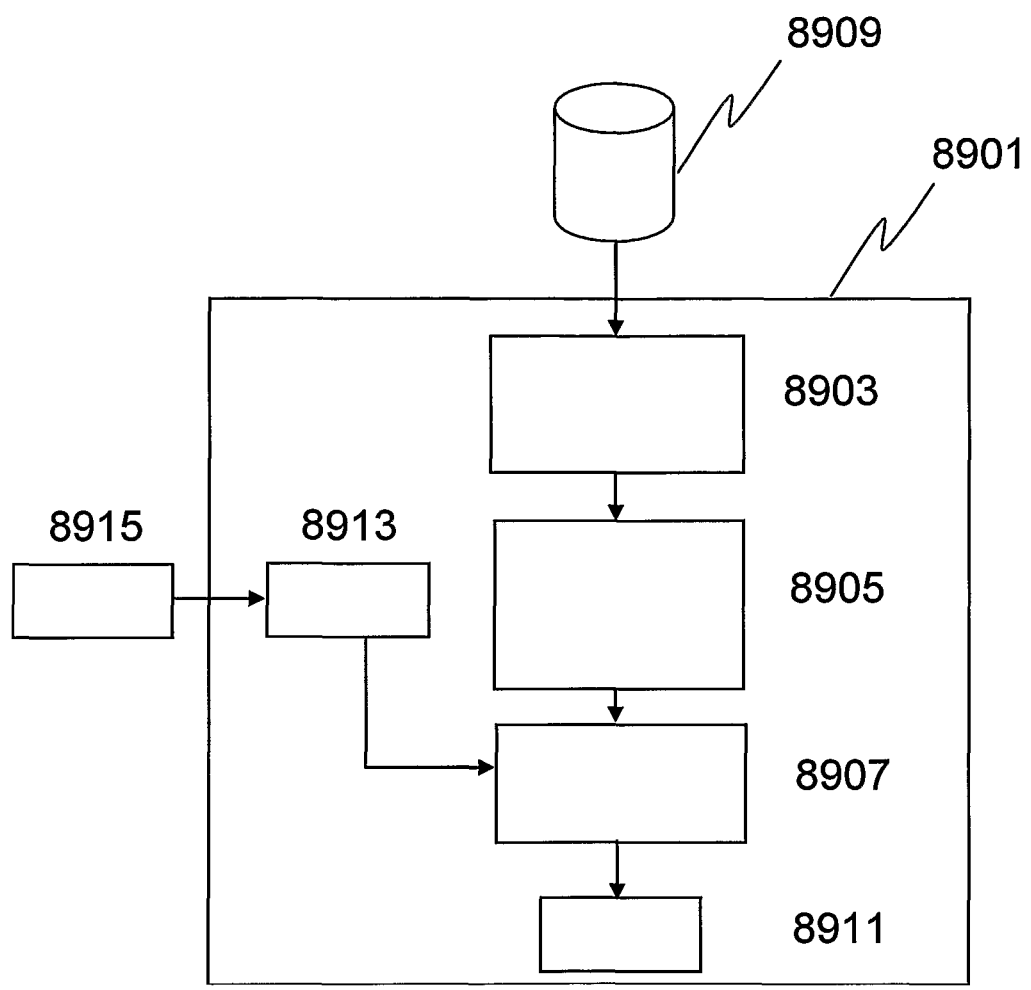
FIG. 8B shows a conceptual block diagram of a system according to an embodiment of the present invention.

According to this embodiment there is shown in FIG. 8B a conceptual system diagram where a data visualization system 8901 includes various modules to provide visual designs (visual representations) using any number of methods as described herein. The visual designs are used to visually represent data in a form that is useful to the end user.

The system further includes a data retrieval module 8903 which is arranged to retrieve metric data from a data storage module 8909, which is in communication with the data visualization system 8901.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

The data retrieval module is configured to enable the retrieval of data from a data storage module, which is in communication with the data visualization computing system. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

A determination module 8905 is provided that is arranged to determine data points for the visualization based on the metric data retrieved from the data storage module 8909. That is, specific values associated with the retrieved metric data determine the data points that are to be displayed in the visualization. For example, the retrieved metric data may define specific manufacturing error or tolerance information associated with specific process levels used to manufacture a particular number of different products. Data values associated with the metric data may be obtained by the determination module and used to determine where the associated data points are to be rendered in the visualization.

A display module 8907 arranges the determined data points to enable them to be displayed or rendered on a display device 8911 according to a predetermined visual representation. The visual representation may be in any suitable format.

Further, the display module 8907 arranges the data points into a plurality of meta groups in a hierarchical manner, and also arranges the meta groups into a plurality of layers, where each layer represents the data points at different levels of granularity. The hierarchy is determined from the metric data. Each layer in the hierarchy is calculated to "contain" or encompass the elements of the lower level. The hierarchy may be validly calculated such that the parent either has exclusive or non exclusive parenthood.

The system also includes a statistical distance determination module 8917 that is controlled to determine a statistical distance between items within the meta groups by analyzing the metric data associated with the meta groups. Based on this determined statistical distance output from the statistical distance determination module 8917, the display module 8907 can arrange the items within the meta groups such that the most statistically similar items are arranged next to each other. This enables more useful information associated with the meta groups and metric data to be conveyed, which may not have otherwise been available to the user.

The statistical determination by the statistical distance determination module may be based on any suitable statistical calculation, such as, for example:
i) analysis using a hierarchical force based algorithm,
ii) determining the statistical distance between data groups,
iii) determining the statistical distance based on the similarity of the data groups,
iv) determining the statistical distance based on the sum of the squares of the data groups,
v) determining the statistical distance based on the output of a heuristic algorithm, such as back propagation neural network values or genetic algorithm associations,
vi) determining the statistical distance based on the output of a neural network, and
vii) determining the statistical distance based on a correlation factor between the data groups, for example by calculating the value normalized by the sum of the squares.

Therefore, the display module may arrange the meta groups into at least two, possibly more, layers wherein the arrangement of meta groups in each layer represents all the data points at that level of granularity. That is, for that level of hierarchy, all the relevant data points associated with the metric data for that level are represented in the visualization.

The display module may also arrange the data points to be evenly distributed among all groups within each of the individual layers, so that each meta group has an approximately equal number of data points as other meta groups in the same layer.

Optionally, the display module may organize a meta group in the first layer so that it represents a similar number of data points as a further meta group in the first layer. Also, the display module may arrange the data points so that common data points are associated with multiple groups within the same layer.

As an alternative to, or in conjunction with, the display module, further output modules may be provided to output the visualization. That is, the raw data retrieved by the data retrieval module is analyzed and arranged to provide the visualization output of the data in a specific format. The output data is provided to the display and/or further output modules to enable a user to visualize the raw data in a manner that conveys more useful or hidden information that would otherwise be lost, as well as to provide the user with the ability to correlate the data hierarchy with the visualization.

The further output module may be a printing device in communication with the described system to receive print control data so that representations of the data may be printed on any suitable print medium. Alternatively, the further output module may be an interface that enables the data output to be interfaced with other data handling modules or storage devices.

The system further includes an activation detection module 8913 that is arranged to detect the activation of a meta group. The activation detection module detects an end user selecting a meta group on the visualization through the use of an input device 8915. The input device in this embodiment is a pointing device, such as a computer mouse, that enables the system to recognize when the user has selected a particular area on the visual representation that corresponds with a meta group.

Upon the activation detection module detecting activation of the meta group, the display module is controlled to provide an indication of the data points associated with the activated meta group in the visual representation. That is, the system determines which meta group has been selected in the visual representation and determines from data within the data storage module which portions of the visual design (representation) are associated with the selected meta group. The relevant portion of the visual design is modified by the rendering engine to indicate to the user which meta groups were selected. For example, the relevant portion of the visual design may be modified so that it flashes, or changes color, etc.

The display module may also overlay a graphical representation of the hierarchy over the visual representation, or display it side by side with the visual representation. According to this embodiment, the display module arranges the groups as a graphical tree representation along with the visual representation.

Further, the system may be arranged to determine the hierarchy of the metric data at substantially the same time as the visual representation is being created by the visualization system. This is accomplished by calculating the distribution of nodes in the representation as they are rendered. This has the advantage of "just in time" calculation and may result in a reduced calculation overhead. For example, some nodes may not require adjustment as they are not visible in the visualization.

Therefore, the display module may arrange icons to be displayed in a tree structure within the visual representation, where the icons represent the meta groups. Each meta group may be arranged for display by the display module using a predefined icon where a relative difference between each icon indicates a relative difference in the metric data associated with each meta group. For example, the relative size or shape of an icon can indicate that the data associated with each meta group is or a larger or smaller value.

As an example, the icon generated by the display module for display on the display device may be a geometric shape, such as a triangle, rectangle or quadrangle. It will be understood that, as an alternative, the display module may create other shapes to represent the data.

The system may also be arranged to enable the display module to display overlapping icons. The overlapping icons may be used to represent a similarity in metric data associated with each meta group.

It will be understood that the data points may represent any type of information that can be visually represented in a hierarchy. For example, product hierarchies, customer segmentation, document table of contents etc. may be represented using the data points.

The display module is further arranged to adapt the visual representation so that it represents data associated with a physical world entity in the form of the physical world entity itself. For example, the physical world entity may be one of a geographic location, road location or road intersection, where the physical arrangement of the locations and intersections are represented in the visualization. Further, the geographic location may be one or more stores or distribution centers, where the representation shows the physical or geographic location of those stores or centers. In order to display the physical location of these elements, the system may incorporate various other databases and systems to retrieve geographical location information and map data in order to render the visualization.

The display module may utilize spatial algorithms to determine the best way to display the data hierarchy on the visualization. That is, the visual representation may be adapted by the system in order to reduce the amount of display space required to display the hierarchy.

According to the embodiments described above, a method is provided that enables an end user to: create a visual representation of data points from metric data, and determine a hierarchy of the data points for displaying with the visual representation.

Figure 8C:
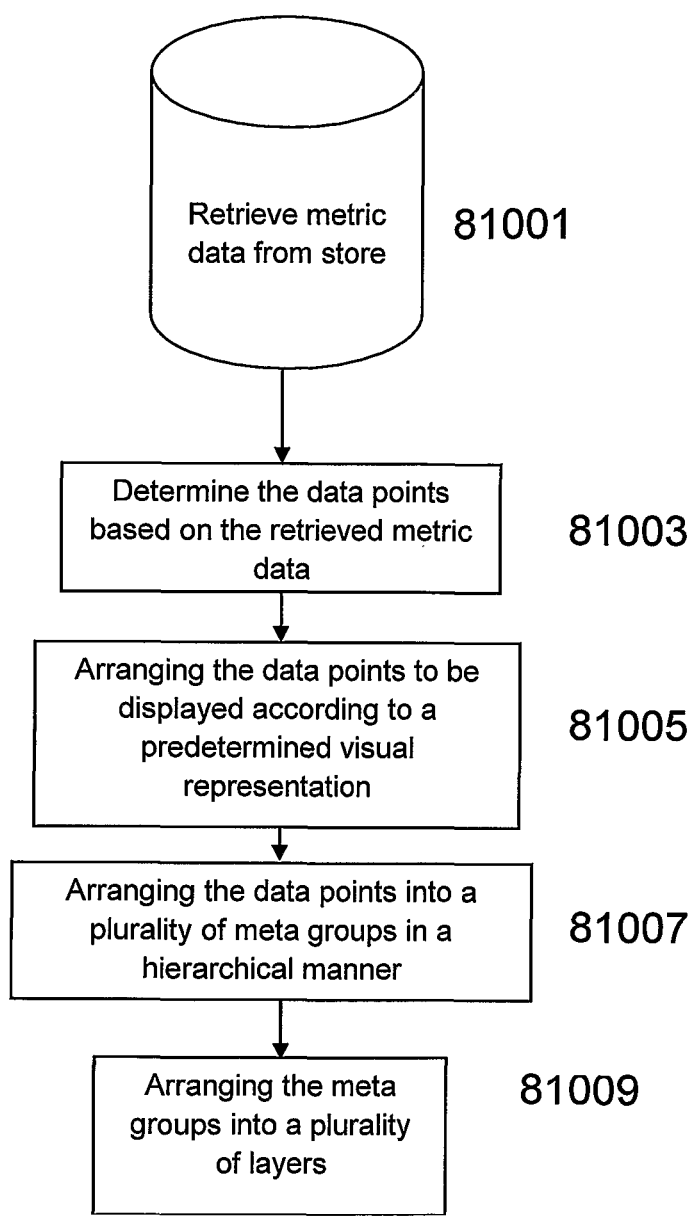
FIG. 8C shows a flow diagram of a method according to an embodiment of the present invention.

As shown in FIG. 8C, this is carried out by retrieving the metric data in step 81001, determining the data points based on the retrieved metric data in step 81003, arranging the data points to be displayed according to a predetermined visual representation in step 81005, arranging the data points into a plurality of meta groups in a hierarchical manner in step 81007, and arranging the meta groups into a plurality of layers in step 81009, where each layer represents the data points at different levels of granularity.

Further, the method includes a statistical distance determination module that is controlled to determine a statistical distance between items in the meta groups in step 81011, and the display module arranging the items within the meta groups based on the determined statistical distance in step 81013.

In the gaming industry, the metric data is gaming metric data, and may include, for example, theoretical win, actual win, the amount of cash on hand, the amount of outstanding credit.

In the retail industry, the metric data is retail metric data, and may include, for example, minimizing the value of the inventory on the shelf and maximizing the retail value of each transaction.

In the hospitality industry, the metric data is hospitality metric data, and may include, for example, minimizing the number of out of order rooms and maximizing the average occupied room rate.

In the financial industry, the metric data is financial metric data, and may include, for example, minimizing the risk of a loan portfolio and maximizing the quantity of outstanding loans.

In the entertainment industry, the metric data is entertainment metric data, and may include, for example, minimizing the value of the inventory on the shelf and maximizing the entertainment value of each transaction.

In the telecommunications industry, the metric data is telecommunications metric data, and may include, for example, the demand for certain mobile phone device categories, and demand for wireless services in an area.

In addition, the method includes the meta groups being arranged into two or more layers, wherein the groups in each layer represent all the data points at that level of granularity.

Also, data points may be arranged to be evenly distributed among all groups within a single layer. Further, a group in the first layer may represent a similar number of data points as a further group in the first layer.

Common data points may be associated with multiple groups within the same layer. Thus, when a user activates one of the groups, for example by clicking on the group in the representation, an indication is made in the visual representation of the data points associated with the activated group.

The hierarchy or granularity may be created from the metric data at substantially the same time as the visual representation is created.

A graphical representation of the hierarchy may be displayed over the visual representation. The groups may be arranged as a graphical tree representation.

Referring to FIG. 8A, an example of a visualization in the form of a tree diagram 800 is shown. The tree diagram visualization is based on R-Tree principles, and may be used by the user to navigate around a Visual Document 825, as well as to proportionately display the significance of the leafs below each hierarchical layer. Data points being visualized are arranged in a plurality of meta groups in a hierarchy. The meta groups are represented by icons, for example, rectangles.

Size is used when drawing the icons in order to represent each level in a manner that indicates the size or significance of the levels below. For example, at level 1 805, the width of the icon (a rectangle in this example) is calculated to be equal to the sum of the widths of the rectangles associated with it in its child level 810. The widths of the rectangles in level 810 are equal to the sum of the widths of the associated rectangles in its child level 815. The width of a single rectangle (R1.1.2) with children in level 815 is equal to the widths of its children (R1.1.2.1 and R1.1.2.2) in level 820. However the widths of each rectangle in each level vary depending on the associated data they represent relative to the other nodes in their level and the parent node.

Although in this example, only the width of each rectangle in the tree representation has been varied to represent the relative relationship between the different rectangles (or meta groups) in each level, it will be understood that other methods may also be employed to display the relative relationship. For example, the relative overall size of each rectangle may be used to indicate the relative number of items associated with that node. Alternatively, the height of each icon may be varied depending on the values associated with the node.

As a further alternative, other shapes, lines, colors or other graphical methods may be used to represent each icon associated with each node in the free in order to indicate the relative difference between nodes, i.e. between each meta group. For example, each meta group may be represented using an icon of any suitable geometric shape, such as a triangle, rectangle or quadrangle, for example, or any other geometric shape of any number of sides, or of an irregular shape. The meta groups may also be represented using organic shaped icons.

It will be understood that one or a combination of the above described methodologies could be implemented at any one time to graphically depict the metric data in different ways simultaneously. Further, each of the nodes may be arranged to overlap with other nodes to indicate that there is similar or overlapping data set associated with the nodes.

Symbols, shading or shapes within rectangles may also be used to communicate information as illustrated in node R1.2.2 835, and R1.1.1 845. For example, if the data being represented has been detected to exceed a preset threshold by the system, the area may be indicated.

The position of the node may also used to communicate additional information. For example, a region of high importance 840 indicates that nodes in that area are significant.

If a node on the R-Tree is selected by an end user, the associated area, such as an individual Visual Design 830 within the associated Visual Document 825 is highlighted. Thus a user can easily determine from the hierarchically arranged metric data where the associated data points are located within the visualization, as well as determining the relative importance of each group of metric data.

Any changes that are made to the Visual Document 825 are reflected in the Tree Diagram 800 and vice versa. This update facility ensures that the tree hierarchy is kept in synchronization with the displayed visualization.

Therefore, the data visualization techniques described herein transform the raw data from the data storage module into both a hierarchical tree like representation conveying structural or hierarchical information about the data along with a visual representation conveying value information obtained from the data. This therefore enables further or hidden information within the raw data to be visually represented in a manner that conveys the information to a user in an efficient manner.

It will be understood that the graphical representation being produced may be adapted specifically so that reproductions of the representation minimize the use of production printing materials. That is, by producing a reproduction or representation that has one or more characteristics to summarize a complex problem a number of technical advantages are immediately provided. For example, the characteristics may include the limitation of the size of the representation, the use of a minimum amount of ink, or the creation of the representation using a minimal or bounded area space or minimum amount of time. These characteristics then may solve the problem of excessive consumption of consumable items, by reducing the required consumption of consumables such as paper and ink resources, as well as reducing the energy required to produce the printouts due to the ability to provide the required information on media space of a smaller size.

According to one example, the representation may be recreated by efficiently utilizing white space rather than producing the representation merely by applying ink to create the representation. Also the representation may be arranged by the display module of the system to reduce the amount of display space required to display the hierarchical information.

As a system option, each of the nodes of the index may be linked with summarized or cached query results. These stored values may be used by the system to rapidly calculate and display business performance drivers (BPDs) as the user interacts with the tree by detecting which nodes are selected by the user and retrieving the associated information.

2. Temporal Visual Designs

One purpose of a temporal visual design is to present temporal based data, such as, for example, revenue per day, in a specially designed calendar or time series view. This calendar view will enable users to view thematic layers that display BPD information such as revenue or sales.

One example of a temporal representation is given by Lee Byron, Megamu[vi]. The key elements show an approach on how to create a histogram representing music listening history.

A further example of a temporal representation is given at ENTROPIA[vii]. This example shows a spiral data visualization showing time periods in 2008 laid out into an increasing spiral.

The display or use of multiple sets of information having a different periodicity has been problematic in the past. For example where calendar years vary it can be difficult to align events known to have a correlation, such as leap years and movable holidays such as Easter.

It would be desirable to graphically display or use data sets having different periodicity so that correlated events are aligned.

As the globalization of communication continues understanding the basic measures of date and time is a key factor in understanding global patterns. The current methods are focused on conversion of one system to a second or third system, however they do not create both a visual representation and a method of interacting with these quite different systems.

When data sets have different periodicity it can be difficult to visually represent the data sets so as to reveal the correlation between events. For example a comparison of sales over two years may lead to erroneous conclusions being drawn if the holidays for each year are not correlated.

Temporal analysis techniques as herein described have particular application to the various industries discussed herein. Holidays, external events, individual days of the week, payday events, family events, natural disasters, life milestones and especially seasons to name a few, have significant impact on revenue.

Because such calendar occurrences change from month to month and year to year, it is difficult to compare periods using traditional charting methods. Many industry operators work within multiple temporal frequencies for analytical and operational observations.

For example operators operate analytics across varied calendars such as national (e.g. Chinese and European calendars), religious (e.g., Jewish, Moslem, Christian) and personal calendars based on data obtained from customers (e.g., anniversaries, birthdays).

In a first case common events may be identified. This may be public holidays or other relevant time based events. The data relating to the common events may be aligned and the intervening data reformatted (this may include omitting, compacting or stretching intervening data). This alignment of data based on events may vary depending upon the granularity at which the data is viewed so that with increasing granularity the data sets are more aligned. Alternatively the data sets may be aligned according to events at all levels of granularity.

The events against which data sets are correlated need not be natural time related events. For example, they could be business events, cultural events, a level of completion etc. For example, the events could relate to stages of a project (the x axis) and the y axis could show the time to complete a stage or some other measure.

According to another aspect the common periodicity between data sets may be determined and all data sets correlated to the common periodicity. For example one set of data may be based on a 5 day week and another set based on a 7 day week. These may both be formatted to a weekly format with the 5 day data stretched to match a 7 day week or nulls used for the weekend.

In another instance absolute time may be common aspect of different calendars, for example Gregorian and Chinese calendars have different periods of absolute time. This invention creates a common representation and mathematical model that enables both the viewing and the querying of data across these two (and potentially other) calendars.

In a further embodiment of this invention the different measures of time and date are used to construct queries in a dataset. For example seasonal measures of time may be used to create queries against a database.

In a further embodiment this invention can be used to show the absolute and relative time of various events, enabling display the personal date or time, the local date or time and the absolute date or time on one easily understandable representation. Furthermore this would enable the user to query information using either personal, local or absolute date or time.

The data visualization techniques described herein transform the raw data received into different temporal arrangements to enable further or hidden information within the raw data to be visually represented in a manner that conveys the information to a user in an efficient manner.

Figure 9A:
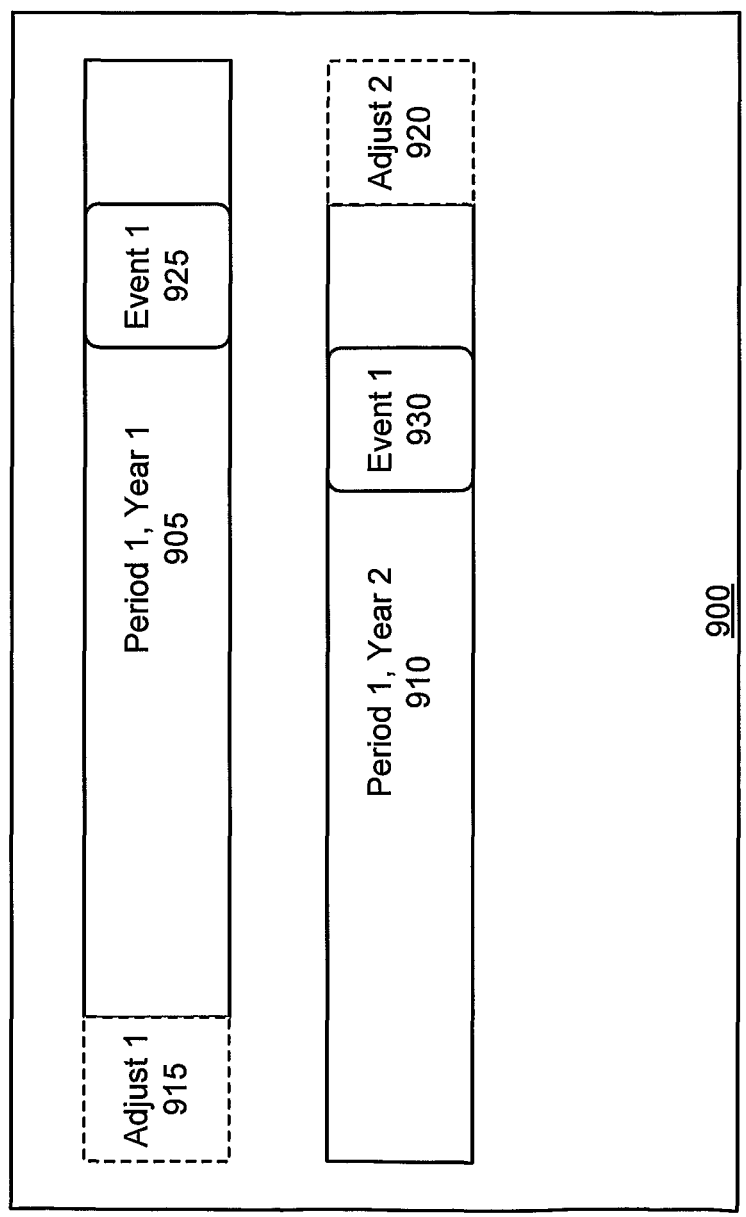
FIG. 9A shows the alignment of data sets with different periods according to an embodiment of the present invention.

FIG. 9A is a simple illustration showing how data sets for different periods 905 and 910 may be aligned. Event 925 may be aligned with event 930 by making a contraction 915 or 920 (or a portion could be expanded). The degree of contraction or expansion may increase with viewing resolution.

Figure 9B:
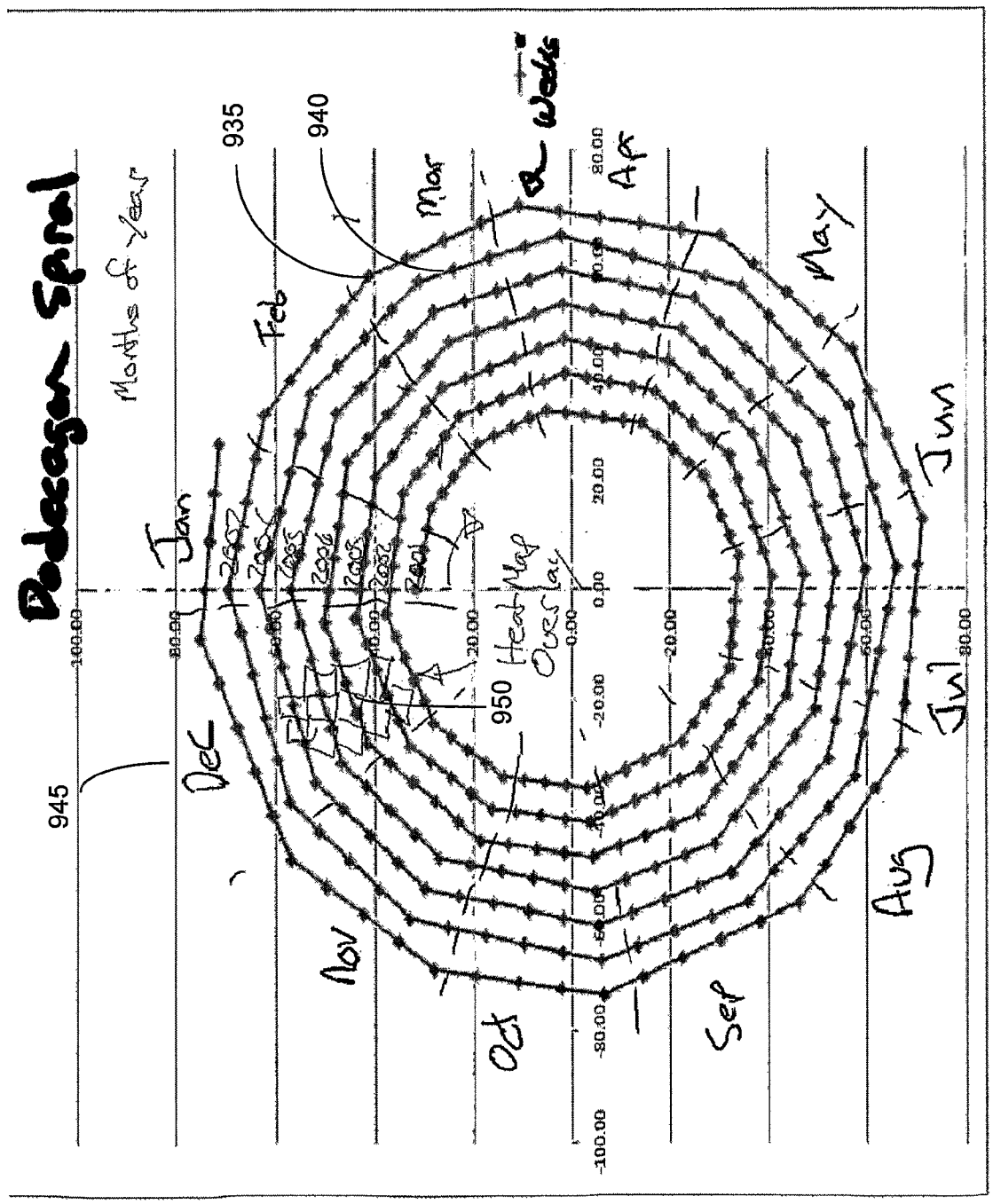
FIG. 9B shows a dodecagon spiral according to an embodiment of the present invention.

FIG. 9B shows a dodecagon spiral which is useful for displaying data for a number of years 935 and 940, each year being one ring of the spiral. In this case each month is allocated a radial slice of 30° (such as December 945) and contraction or expansion adjustments are made within each month to conform to this constraint. Within months dates may be aligned so that the same dates are aligned for months of different length (i.e. April) or holidays are aligned etc. A heat map 950 may be overlaid to reveal meaning between data for different years (e.g. sales levels or profitability).

Figure 9C:
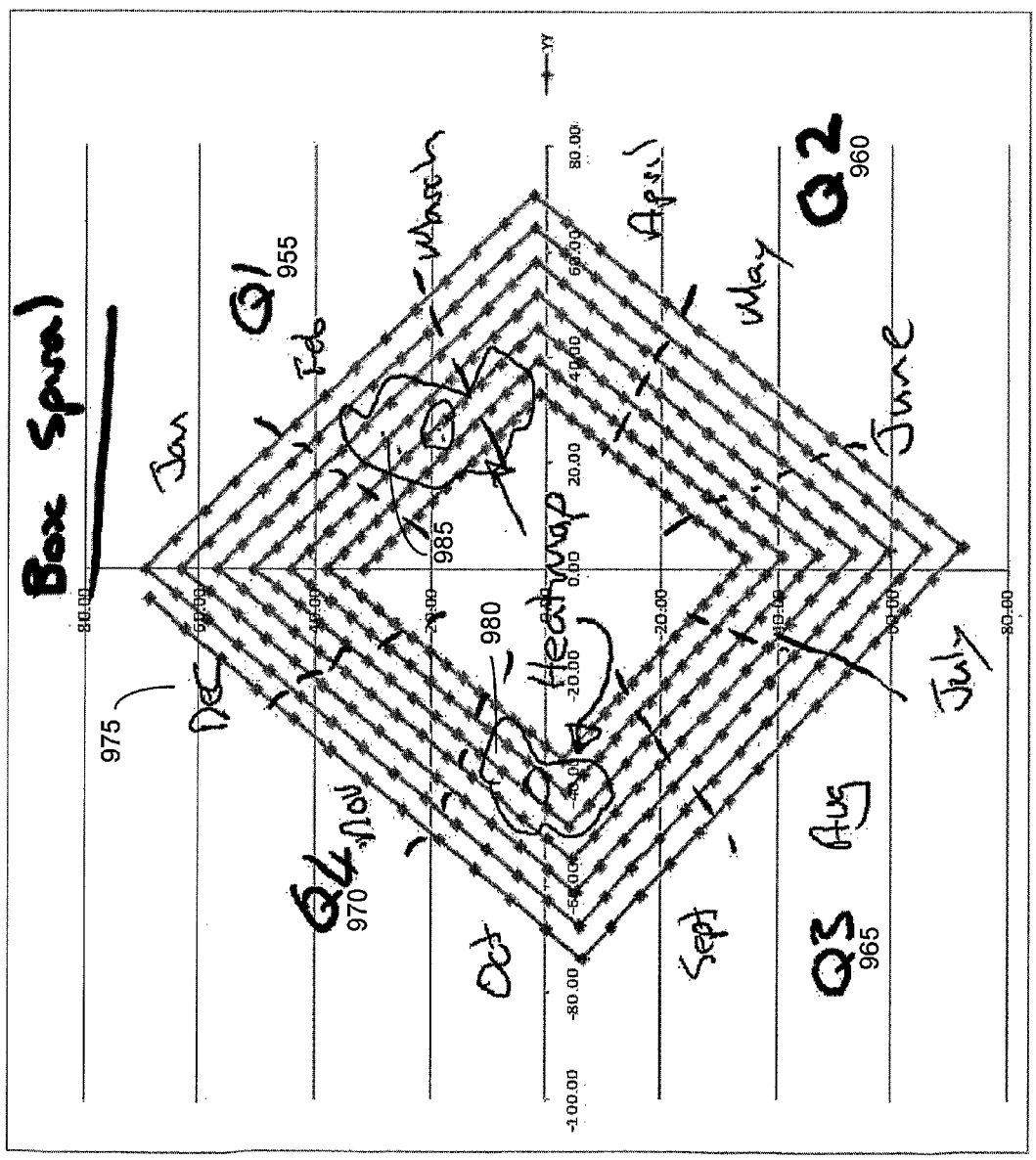
FIG. 9C shows a box spiral according to an embodiment of the present invention.

FIG. 9C shows a box spiral variant in which the year is broken into four quarters, each represented by a side of a cube: 955 for the first quarter, 960 for the second quarter, 965 for the third quarter and 970 for the fourth quarter. Again each month is allocated a radial slice of 30° (such as December 975). Again heat maps 980 and 985 may be overlaid to reveal meaning between data for different years.

A more detailed description now follows.

Although the following example provides details of aligning weekly periods with monthly periods it will be understood that the inventive concept can be applied to align data of any periodicity with data of other periodicities. For example, in test data and error reporting, the test data sets retrieved may be obtained by the system every 100 minutes using any suitable data measurement technique, whereas, the error reporting may be required by the user to be collated and reported every 24 hours at midnight. Therefore, the system is required to align the data in order to take into account the fact that the 100 minute periods do not wholly fit into any 24 hour segment, and that the start times of the 90 minute periods may not start exactly on the hour.

Figure 9D:
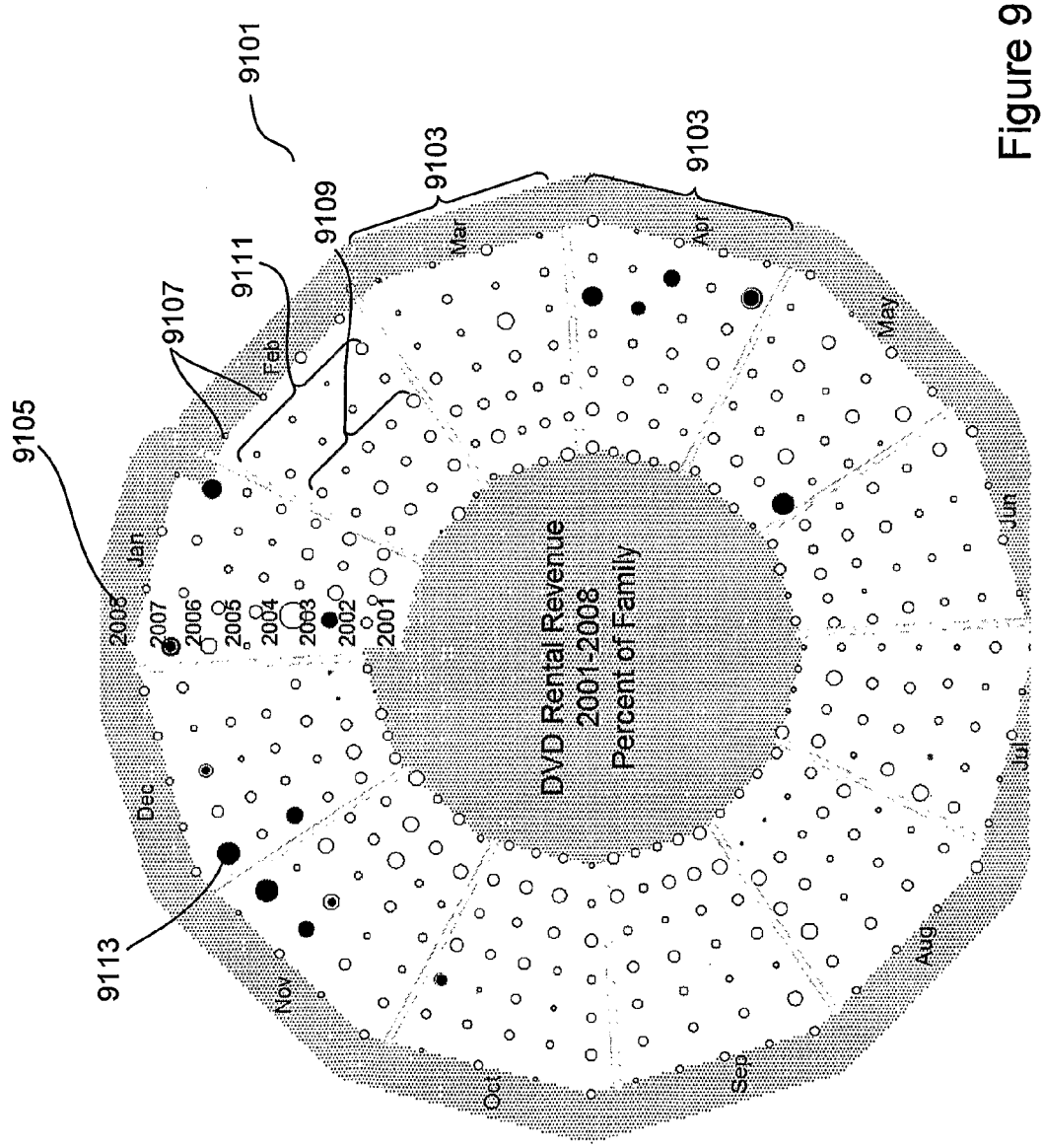
FIG. 9D shows a further dodecagon spiral according to an embodiment of the present invention.

FIG. 9D shows a dodecagon spiral 9101 produced according to the methods described herein. The dodecagon spiral is represented as a dot density map, where each data point is represented by a dot, or circle. The spiral depicts data on a month by month basis 9103 for a number of different years 9105. The data provided is weekly accounting data 9107 for DVD rentals. Each weekly accounting period is represented by the weekly dots 9107. The data visually represents the spread of the revenue for the periods of interest: The spiral includes 12 months, January through to December, shown in a spiral format. Each month is provided with an approximately 30 degree area of space in which the data is to be represented. That is 360 degrees divided by the 12 months being represented. Each year provides a successive layer on the spiral, where each year that passes is included as an outer layer. That is, the earlier years are depicted as progressing towards the centre of the spiral.

The map shows in a clear format the level of rental activity throughout different time periods of the year. For activity beyond a predetermined limit, a symbol 9113 is provided to represent that activity. For example, if the revenue received for a weekly accounting period exceeds a predefined monetary value, then a circle of a particular dimension is displayed to depict that level of revenue. The circle increases in size for increased activity. A first level is depicted as a circle without any black filling, and a second higher level is depicted as circle with a black filling. Thus, a small black circle represents a higher revenue level than a large white circle, the largest black circles represent the highest revenue levels and the smallest white circles represent the lowest revenue levels.

As each month in each year is aligned, it is possible to see where similar peaks or troughs in activity occur throughout the months and years. For example, it can be seen from the change in map details that DVD rental activity around November and December gradually increased from 2003 onwards for these months, with the same levels of activity shown for April each year, both of these time periods being a key promotional period for the release of movies.

Looking at one particular month, such as February, in a little more detail, the spread of the periodic data can be seen to vary. In 2004, 5 weekly accounting periods are provided as shown by the 5 dots, or circles, 9109. In 2006, only 4 weekly accounting periods are provided as shown by dots 9111. The system determines how many accounting periods are to be allocated to any particular month based on a set of rules. In this way, the weekly periodic accounting periods are aligned with the monthly periods. The different methods of alignment are described in more detail below. Therefore, aligning data sets of one periodicity with data sets of a different periodicity provides a more accurate and repeatable representation of the data to enable a better comparison of data sets.

FIG. 9E shows conceptually how the data is aligned in the data sets by modifying one or both of the data sets. Data 9201 is provided to be analysed and aligned, and optionally graphically represented. The data 9201 includes data of a number of different periodicities. A first periodicity 9203 is, for example, a monthly period. A number of second periodicities 9205 and 9207 are, for example, weekly periods. The data associated with these periodicities is arranged into data sets 9209 and 9211. The data within the data sets may be of any type, for example, the data may be accounting data for DVD rentals as depicted above, or test data retrieved from a manufacturing plant identifying error rates for a particular manufacturing process.

Each data set (9209 or 9211) is arranged according to its periodicity. The monthly data set 9209 is arranged to show the monthly data 9213. The weekly data set 9211, including data for a number of weeks 9215, is arranged to align with the monthly data 9213. The weekly data 9215 will include a first portion of data 9217 for a first week, and a second portion of data 9219 for a final week, where the first and final weeks are aligned with the start and end points of the monthly data 9213. Also included in the result, whether it is a data set output from the system or a graphical representation, is the data for the intervening weeks associated with the relevant month.

The data associated with the first week period and final week period are particularly important as it does not align with the start and end points of the monthly period.

The system initially analyses the data provided to check the start and end points of the data sets of different periodicities to see if the start and end points of the different periodicities are in alignment and so directly correspond with each other. If the start or end points do align, then no further alignment is required for that point. That is, if the start of the weekly period aligns with the start of the monthly period, and the end of the final weekly period aligns with the end of the monthly period, then no further alignment is required. Clearly this can only occur for periodicities of weeks and months where the month has a total number of days that is a multiple of 7 (the number of days in the week), and so is only relevant in this particular embodiment when dealing with the month of February in a non leap year.

On the other hand, if either of the start and end periods of the data of one periodicity do not align with the start and end points of the data of the second periodicity, the system follows a set of predefined rules to align those points for the different periodicities.

In this example, the data for the first week includes a number of days at the beginning of that accounting week which do not fall into the monthly data due to the dates of those days. For example, the first two dates in the accounting week may be part of a previous month. Therefore, according to one particular rule discussed below, the system aligns the data associated with that week's accounting data so that it fits within the monthly data, regardless of the fact that the dates associated with the initial part of that week's accounting data actually fall into the previous month. In this case, the data for the first two days is compressed into the rest of the data for that week in order to make it align with the start of the monthly data.

Where the last day of the final week period does not fall on the last day of the relevant month, the final week data is expanded so as to fill in the gap that would otherwise exist at the end of the month.

Various other rules may be utilized to provide similar results whereby data of one periodicity is aligned with data of another periodicity.

As described above, a data set of a first periodicity may be restricted or expanded to align with another data set of a different periodicity.

The restriction of the data sets may be by way of compressing, deleting or moving at least a portion of one or other of the identified data sets.

The expansion of the data sets may be by way of adding new data to a data set, padding out the data set with zeros, arbitrary values, average values or extrapolated values. Further, at least a portion of one of the data sets may be moved in order to effectively expand the data set that is to be aligned. Alternatively, data from another different data set having the same periodicity may be included in the data set being aligned.

In the case where the data is being extracted from a manufacturing system for analysis purposes, such as for example in a testing environment where test data is being analysed to detect the results of a manufacturing process, the original data sets being analyzed may be replaced by aligned data sets in order to allow more accurate data analysis of the results retrieved from the manufacturing process. The aligned data sets may permanently replace the measured data sets, or be stored alongside the original data sets, within a database in communication with the manufacturing system. Further, the data associated with the aligned data sets may be fed back into an analytical system that determines an appropriate response, or the data may be used to provide an output to alter the manufacturing process, based on the analysis of the aligned data. In this way, the manufacturing process can be more accurately controlled through the creation and provision of more appropriately aligned periodic data to the analytical unit.

In addition, or alternatively, the system described herein can provide a graphical representation of the different data sets after they have been aligned. That is, rather than changing the associated data, the system may only modify the graphical representation of the data to align the periods.

FIGS. 9F and 9G show one example of how a graphical representation may be adjusted to visually align a data set of one periodicity with one or more data sets of another different periodicity.

FIG. 9F shows a portion of a graphical representation 9301 of sets of data having different periodicities, where the present invention has not been applied. This example shows a spatial area 9303 of a dodecagon spiral allocated to represent the data associated with a single month. It will be understood that graphical representations other than a dodecagon spiral may be used. One non limiting example is that a box spiral may be used.

The slice is represented over an area spread out from a centre point at an angle of 30 degrees 9305 to cover the 12 months of the year evenly over the 360 degrees available. The start of the month (i.e. the 1st) is at a start point of the area 9307, and the end of the month (for example, the 30th) is at an end point of the area 9309. Also in this example are represented data sets of a weekly periodicity 9311. The first weekly data set 9313 can be seen to overlap with the spatial area 9303 so it also enters, or is part of the previous month, and the last weekly data set 9315 can be seen to sit within the area, but leaves a gap between the end of the weekly data set and the end of the month. Therefore, the weekly accounting period data sets do not align with the monthly period data sets.

Referring to FIG. 9G, an aligned graphical representation of two data sets having different periodicities is shown. It can be seen that the first weekly data set 9313 has been modified to align the start of the weekly data sets associated with the start of the graphical representation of the monthly data set. The interim weekly data sets 9311 did not require any modification as it sits wholly within the monthly representation. The final weekly data set 9315 has also been modified to close the gap previously shown in the monthly graphical representation. In this example, the graphical representation of the weekly data set has been condensed in order to align it within the spatial area allocated for the monthly data representation. The method of condensing may be by way of reducing the size of the graphical representation along one or more of the axes of the representation. Alternatively, the method of condensing may be by way of deleting at least a portion of the weekly data set to provide the condensed graphical representation of the weekly data set. It will be understood that condensing may include one or a combination of constricting, compressing or compacting the data or representation.

In this example, the graphical representation of the final week's data has been expanded in order to align the representation with the available spatial area of the monthly representation. The method of expansion may be, for example, by extending the size of the graphical representation of the weekly data set along one or more axes. Alternatively, new data may be added or inserted as part of the graphical representation to provide an extended graphical representation of the weekly data set. The new data added may be arbitrary data, average data, interpolated data, extrapolated data, data of a similar nature from a different data set or any other data that the user selects for the purpose of alignment.

Also, the graphical representations of the first periodicity may be aligned with the second by moving the graphical representation of the weekly data set so that it is aligned with the spatial area allocated to the monthly data set. Further, the data within the weekly data set may be moved or swapped with another weekly data set.

As can be seen on FIG. 9G, supplementary information 9401 and 9403 may be displayed alongside the graphical representations of the data. The supplementary information may include information associated with one or both of the first or second identified data sets. For example, the supplementary information may identify and label the different periodicities of the two different data sets, and may provide more information as to the relationship between the two. Also, the supplementary information may include information associated with the methods used to align the two data sets.

The above described methods therefore show the distortion of a graphical representation of a first data set of a first periodicity to align it to a second data set of a second different periodicity. The degree of distortion may be increased as the graphical representation of the first identified data set is viewed at increased granularity by the user. That is, as the user zooms into the representation of the examples shown, it may be seen that the daily data sets do not accurately align with the weekly data sets due to the timing of the data retrieval, i.e. the end of day finishes at a time other than midnight. In this case, either the daily data sets or weekly data sets may be adjusted to align the two as the user zooms into that level of granularity.

Although the examples above have described the adjustment of the data or graphical representations of the weekly periodicities or daily periodicities to align with the monthly or daily periodicities respectively, it will be understood that the data or graphical representations of the monthly or daily periodicities could, as an alternative, be adjusted to align with the weekly or daily periodicities respectively.

Figure 9H:
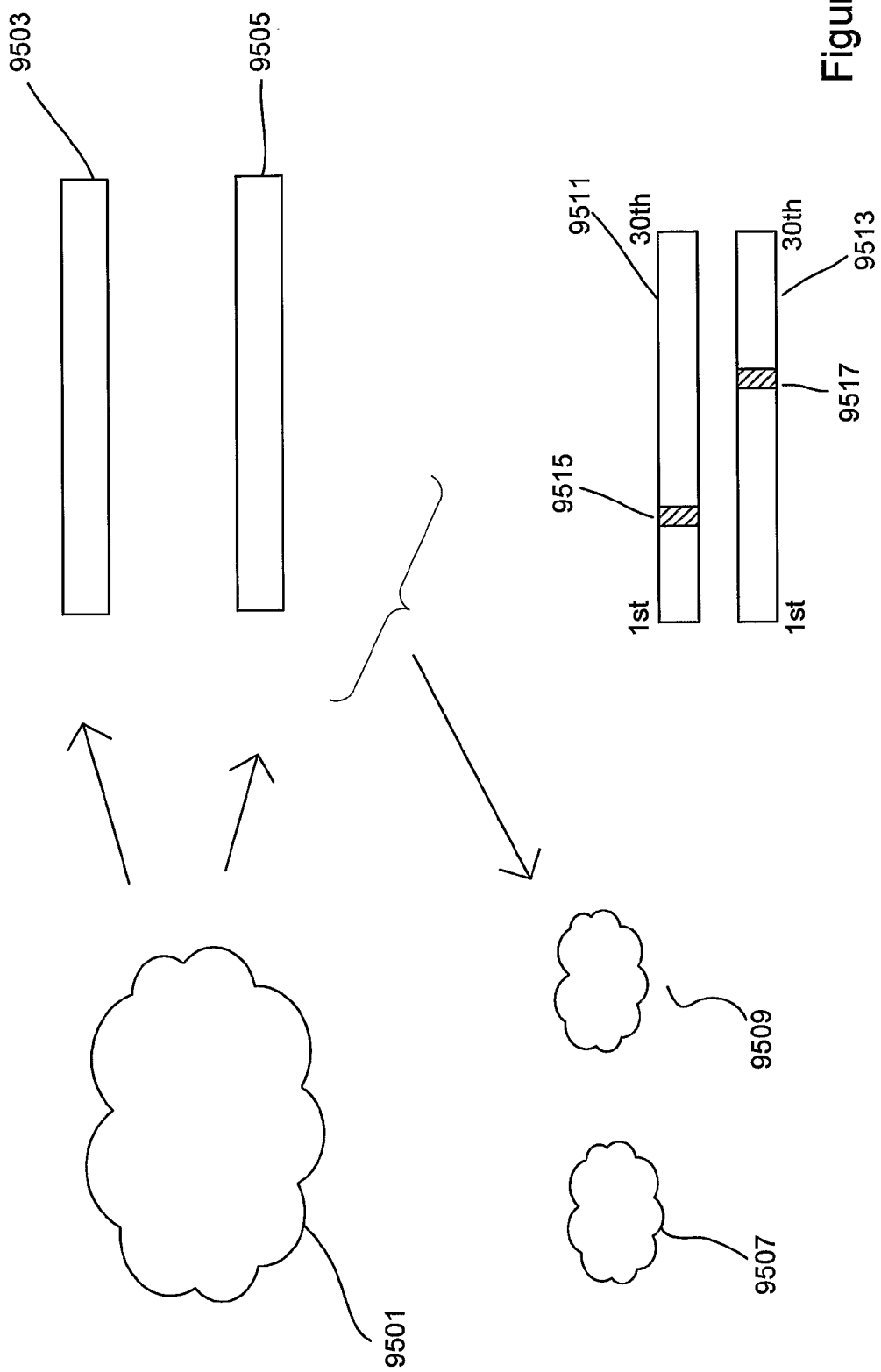
FIG. 9H shows a conceptual diagram of aligning periodic events according to an embodiment of the present invention.

FIG. 9H shows conceptually how periodic events are aligned in data sets in which they occur, by modifying one or both of the data sets. Data 9501 is provided for analysis to detect the periodic events and the periodic data sets in which the events occur, as well as other periodic data sets. The aligned data sets may optionally be graphically represented or stored for control purposes. The data 9501 includes groups of data sets, where in one group are monthly data sets 9503 for a particular year and in another group are monthly data sets 9505 for another year, where those data sets have the same periodicity. The periodicity of the data sets 9503 and 9505 may be, for example, a monthly period. The data associated with particular months is arranged into data sets 9507 and 9509. The data within the data sets may be of any type, for example, the data may be accounting data for DVD rentals as depicted above, or test data retrieved from a manufacturing plant identifying error rates for a particular manufacturing process.

Each data set (9507 and 9509) is analysed to identify instances of the periodic event, and the position of the periodic event within the data set. For example, a first data set 9511 of a monthly periodicity, for example April 2004, and a second data set 9513 of a monthly periodicity, for example April 2003, is shown. Also identified are the instances of the regularly occurring Easter Sunday that occurred in each of those periodicities. In the first data set, Easter Sunday 9515 occurred on 11 Apr. 2004, whereas in the second data set, Easter Sunday 9517 occurred on 20 Apr. 2003. In this example, the alignment is made relatively easier due to the two monthly data sets being associated with the same month (i.e. April), or in the same relative position within the group of data sets, where each group is for a year. Examples are also provided below to show how the system operates to align periodic events when they occur in groups that aren't associated, or aren't in the same relative position within the group of data sets, for example, when Easter does not occur in the same month.

Figure 9I:
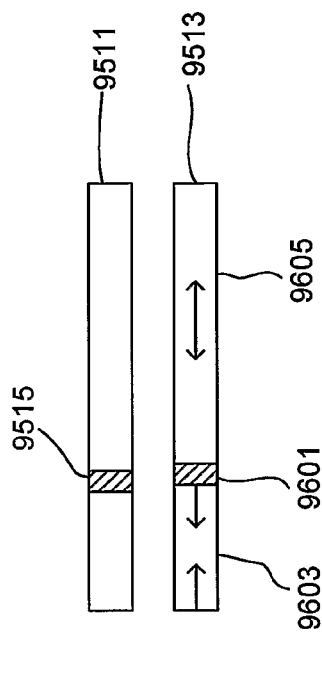
FIG. 9I shows a method of adjusting data according to an embodiment of the present invention.

FIG. 9I shows an example of aligning data associated with a periodic event within two different monthly data sets 9511 and 9513. It will be understood that the alignment or the adjustment discussed herein may be by way of aligning a graphical representation, or changing the actual data in storage in order to use the data for analytical purposes, such as in a manufacturing environment using test data where, for example, the periodic event is a shut down of a machine for maintenance purposes.

In the example shown in FIG. 9I it can be seen that the data set 9511 and position of the data associated with Easter Sunday 9515 is unchanged. However, the relative position of the data for Easter Sunday 9517 in data set 9513 in FIG. 9H has been moved to position 9601 in FIG. 9I. The data has been moved by adjusting the data in portions 9603 and 9605. In the data analysis embodiment, the data associated with portions 9603 and 9605 are adjusted to cause alignment, whereas in the graphical representation embodiment the actual data associated with these portions may or may not be adjusted and the alignment may be realized by merely adjusting the graphical representation alone.

The following provides the description associated with data analysis and adjustment without providing a change in the graphical representation of the data. However, it will be understood that the methods described in this section may be applied in conjunction with the methods described below for the adjustment of the graphical representation of the data.

In this embodiment, the data within the first portion 9603 and second portion 9605 of the data set 9513 associated with the first instance of the event is modified to align the first and second instances of the periodic event. For example, the first portion of the data set 9603 may be restricted. Alternatively the second portion of the data set 9605 may be expanded. Further, both an expansion and restriction of different portions of the data sets may be carried out.

The restriction of the data within the data sets may be carried out by compressing at least a portion of the data within that data set. Alternatively, at least a portion of the data maybe deleted or moved.

The expansion of the data within the data sets may be carried out by adding new data to the data set. For example, the data set may be padded out by including null or zero values, average values, extrapolated values, interpolated values, arbitrary values, values from a similar data set, or any other data values that the user selects for the purpose of alignment.

In this way, the data associated with the first instance of the periodic event (Easter Sunday) can be aligned with the data associated with the second instance of the periodic event by restricting and expanding various portions of the data to align the events.

Figure 9J:
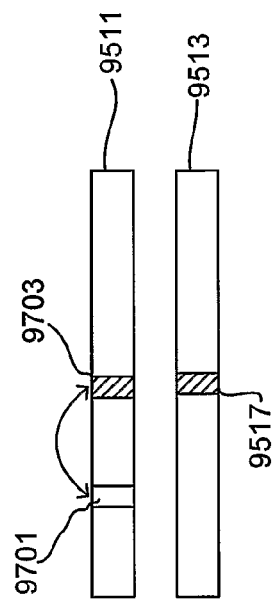
FIG. 9J shows a further method of adjusting data according to an embodiment of the present invention.

Alternatively, as shown in FIG. 9J, a portion of the data within the data set may be moved within the data set in order to align the data associated with the event. The data associated with the event 9701 in the first data set 9511 is moved to a new position 9703 by swapping the data for that Easter Sunday with the data for the day that aligns with the Easter Sunday in the other data set 9513.

Figure 9K:
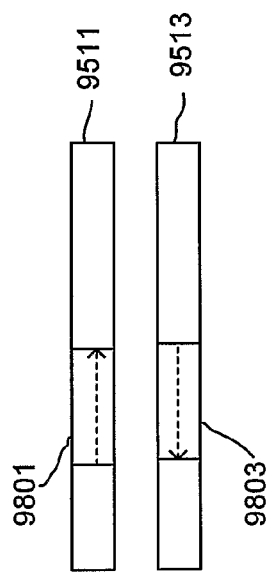
FIG. 9K shows a further method of adjusting data according to an embodiment of the present invention.

Alternatively, the system may determine the two boundaries between the periodic events and average out the data between those boundaries in each of the two data sets containing the instances of the periodic event. Referring to FIG. 9K, a portion of data in the data set 9511 is averaged out over the region 9801 starting at the first identified instance of the event and ending with an equivalent data position for the second identified instance of the event. The same is applied to the second data set 9513 to average out the values over the region 9803 up to an equivalent data point that aligns with the first instance of the event 9515.

Also, the modified data set with the first instance of the periodic event may be analyzed in conjunction with the other data set containing the second instance of the periodic event in a manner that takes into account the aligned data. Thus, the analysis is not carried out on comparatively spurious or inaccurate data and so enables a more accurate analysis.

Once the analysis has been carried out, the original data set may be replaced by the modified data set or may be stored alongside the modified data set.

Any number of identified data sets may be aligned relative to one or more other identified data sets. Further, the step of aligning data sets may include the step of aligning a start period of a first data set with the start period of another data set. Also, the step of aligning may include the step of aligning an end period of a first data set with an end period of another data set. Further, both the start and end periods of the data sets may be aligned to enable the whole of one period to be aligned with another period.

During the step of aligning, the determination module of the system may first determine whether the first data set is wholly encompassed within another data set.

If the determination module does not determine that a first data set is wholly encompassed within another data set, the system may align the first data set so that it is wholly encompassed within the second data set.

Also, the system may modify the first data set so that it aligns with the second data set. This may include restricting the first data set so that it aligns with the second data set. The restriction may be by way of compressing, deleting or moving at least a portion of the first data set.

Also, the system may modify the first data set by expanding it so that it aligns with the second data set. This expansion may be by way of adding new data to the first data set. For example, the new data may include one or a combination of null values, average values, extrapolated values or interpolated values. Alternatively, the expansion may be by way of moving at least a portion of the first data set or including at least a portion of a further data set that the system has detected as having the same periodicity as the first data set.

The system may go on to perform any suitable analysis of the data set once it has been modified or adjusted by the system. Further, the system may replace the original data set with the modified data set.

It will be understood that the periodicity detected by the system may be associated with any period that can be measured. For example, the periodicity may be time related or calendar related.

Further the system is able to determine a lowest common time base from the periodicities that have been determined from the data sets. This enables the system to then base the first data set on this determined lowest common time base. For example, if the minimum time base in the analyzed data sets is in fortnightly testing periods, then this becomes the common time base by which the data sets are aligned.

The following describes how the system changes the graphical representation of the data sets in order to adjust and align the periodic events graphically or visually. However, it will be understood that the methods described in this section may be applied in conjunction with the methods described above for the adjustment of the data in the data sets.

In the herein described data visualisation or graphical analysis system, the modified data sets are arranged so that the graphical representation of a periodic event aligns with the graphical representation of other instances of the same periodic event. This graphical alignment ensures that the user can view the appropriate data associated with the events (and surrounding periods) in the correct context.

The graphical representation may be of any suitable form for graphically representing temporal data. For example, the representations may be in the form of a spiral calendar, a box calendar etc.

The system implements various steps to align the graphical representations of the data, for example by controlling a condensing module that is arranged to adjust or condense the graphical representation of a data set so that a first instance of a periodic event aligns with a second instance of the periodic event. The adjusted or condensed version of the representation is output in a visual form, such as on a graphical user interface, display, printer etc.

This adjustment or condensing step may include one or a combination of the steps of constricting, compressing or compacting the graphical representation.

Further, the adjustment or condensing step may include the step of reducing the size of the graphical representation of a data set along one or more axes of the data set. For example, the condensing module may reduce the x or y (or both) dimensions of the graphical representation in order to align the data sets.

Further, the adjustment or condensing step may include the step of deleting at least a portion of a data set to provide a condensed graphical representation of the data set. For example, by deleting a portion of the data set or representation, the periods in the representation become fully aligned.

Alternatively, an expansion module may be controlled by the system to enable the graphical representation of a data set to be adjusted or expanded so that a first instance of a periodic event is aligned with a second instance of the periodic event. Further, the adjustment or expansion step may include the step of expanding the size of the graphical representation of a data set along one or more axes of the data set. For example, the expansion module may increase the x or y (or both) dimensions of the graphical representation in order to align the data sets.

The extension of a data set by the extension module may be achieved by inserting new data into a data set in order to provide an expanded graphical representation of the data set.

Alternatively, the extension may be achieved by moving at least a portion of the graphical representation of a data set so that a first instance of a periodic event aligns with a second instance of the periodic event. For example, data may be moved from within a first data set to a further data set that has the same periodicity as the first data set.

The graphical representations discussed above may be of any suitable form for displaying temporal information. For example, the graphical representation may be a dodecagon spiral ora box spiral. Further, the data sets may be displayed in any suitable form, for example by being graphically represented in two or more calendar systems.

Further, the various different data sets may be displayed in a hierarchical manner to indicate their temporal relationship with each other, for example.

The system described above may retrieve further information associated with the data sets in the form of supplementary information. This supplementary information is used to display related information on the same visualization. For example, the supplementary information may be used by the system to identify on the graphical representation the different periodicities associated with the various data sets. Alternatively, the supplementary information may include information associated with how the first and second event instances of the periodic event are aligned, i.e. information that indicates which methods were used by the various modules of the system to align the data.

It will be understood that the complex system described above includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

Figure 9L:
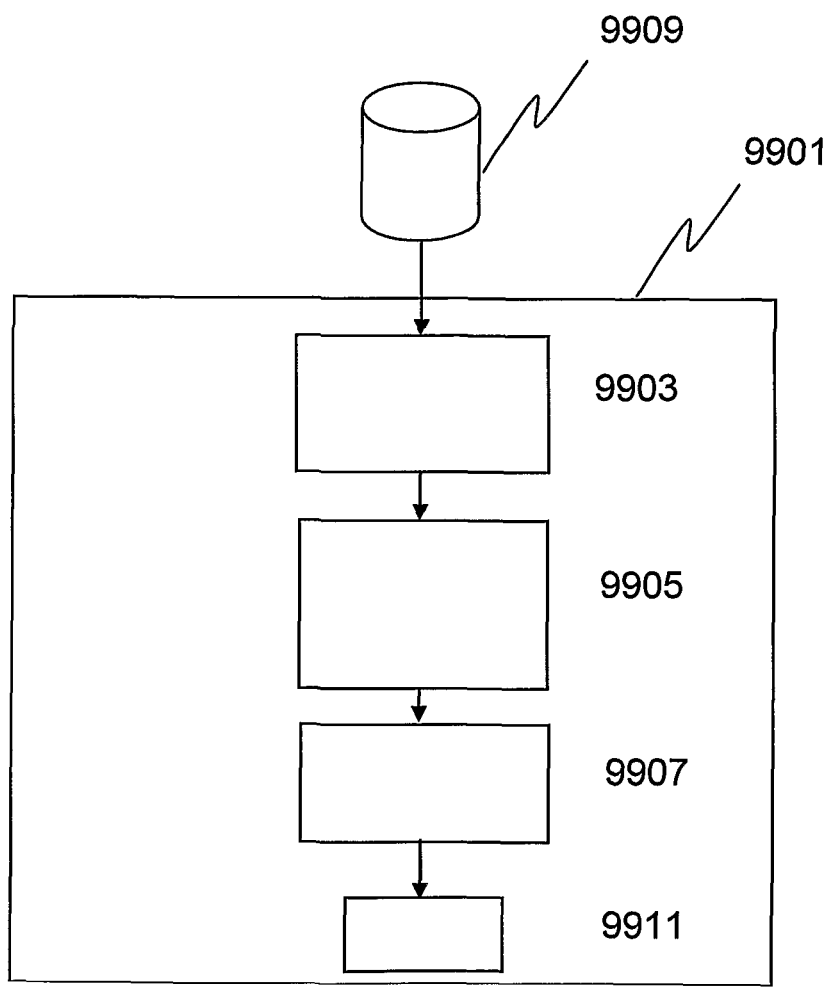
FIG. 9L shows a conceptual system diagram of a graphical analysis computing system according to an embodiment of the present invention.

According to this embodiment there is shown in FIG. 9L a conceptual system diagram where a graphical analysis computing system 9901 includes at least the following elements, a data retrieval module 9903, a periodicity determination module 9905 and an alignment module 9907.

The data retrieval module is configured to enable the retrieval of data from a data storage module 9909, which is in communication with the graphical analysis computing system. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

The data provided as an input to the system may be any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time within a cache memory or may be stored in a more permanent manner prior to it being analyzed.

The data may be retrieved from the data storage module by the data retrieval module 9903 using any suitable known technique, such as, for example, SQL statements.

Further, the alignment module 9907 may be in communication with a display module 9911 that is specifically adapted and controlled by the system 9901 to display the output of the alignment module in a graphical manner.

As an alternative to, or in conjunction with, the display module, further output modules may be provided to output the results of the alignment module. That is, the raw data retrieved by the data retrieval module is analyzed and converted to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the alignment module to be interfaced with other data handling modules or storage devices.

The retrieved data is processed by the periodicity determination module 9905, which determines whether there are a number of different periodicities within the retrieved data. Based on the different periodicities detected, data sets are identified where each data set is associated with a specific period.

These identified data sets are then aligned by the alignment module as herein described.

Figure 9M:
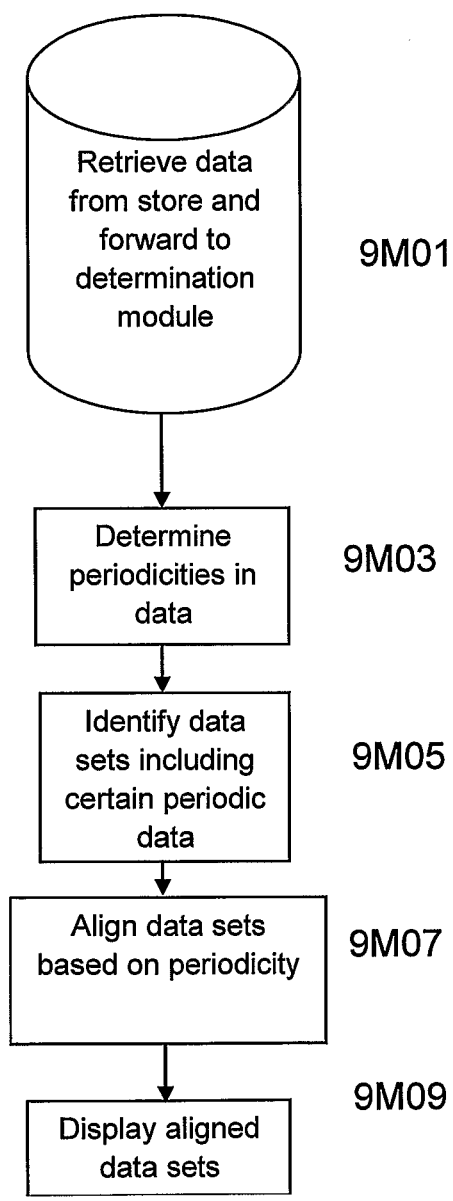
FIG. 9M shows a flow diagram according to an embodiment of the present invention.

FIG. 9M shows a flow diagram of the method steps carried out by the system. The steps include at step 9M01 retrieving data from the data store and forwarding the data to determination module. At step 9M03, periodicities in the data are determined. At step 9M05, data sets with certain periodicities are determined. That is, for any data set, the system determines which periodicities occur within the data of that data set. At step 9M07, the data sets are aligned based on the periodicities of the data within the data sets. At step 9M09, the aligned data sets are provided as an output, such as being displayed on a graphical user interface.

Alternatively or in combination with the above example, the retrieved data may be processed by the periodicity determination module 9905 to identify whether the data sets include instances of a periodic event. The alignment module may then align the data associated with each of the identified periodic event instances relative to each other.

The graphical analysis computing system 9901 is controllable by any suitable pointing device operated by a user. The user may therefore select an identified data set that is displayed on the display module 9911 in order to view that data set at an increased granularity. For example, the data sets shown may have periodicities of weeks and months, whereas the user may wish to drill down into one of these data sets to see other shorter periodicities, such as days, hours, minutes or other non naturally occurring periodicities that are not directly linked with the sun such as a specific machine testing period or business accounting period, for example.

By selecting one of the displayed data sets, the periodicity determination module can analyse the data within the selected data set and determine which other periodicities are present within the selected data set.

Once the periodicity determination module has identified the further data sets of an increased granularity, the identified data set may then be aligned by the alignment module with one or more of the other identified data sets.

The alignment of these new data sets may then be displayed on the display module. In this manner a user is able to drill down into the data using the graphical user interface and see the aligned data sets at each level of granularity.

The periodicity determination module may be programmed, controlled or adapted either by the user or developer to determine a specific period or set of periods. For example, the user may select from a drop down menu which individual or groups of periods or types of periods the periodicity determination module is required to search for in the retrieved data.

The periods may be changed so that the periodicity determination module may determine periods of time, such as, for example, any time period selected from a multiple, whole or portion of a second, minute, hour, day, week, month, or year.

Alternatively, the periodicity determination module may be controlled to determine a multiple, whole or portion of a calendar period, such as a multiple, whole or portion of a day, week, month, year, leap year, decade, century for example.

Further, the periodicity determination module may be controlled to determine a social period such as a weekend or holiday period etc. Further, the periodicity determination module may be controlled to determine a business period such as, for example, an accounting period, sales target period etc.

In relation to events, periodicity determination module may be controlled to determine periodic business related events, such as a product launch event, for example. Also, the event may relate to a level of completion of a business event, such as, for example, how far a certain business project has been completed.

Alternatively, the periodicity determination module may be controlled to determine periodic cultural events, such as, for example Labor Day or May Day etc. These cultural events may be a measure of cultural development.

Further, the periodicity determination module may be controlled to determine periodic religious events, such as, for example, Christmas, Easter, Passover etc.

Further, the periodicity determination module may also identify two separate instances of the periodic event within two different data sets having the same periodicity. The periodicity determination module is then arranged to determine the relative positioning of each of the events in the different data sets.

For example, if the periodicity determination module determines that a first data set is in a different relative position to a second data set, then the alignment module is instructed to align the two data sets, and the alignment module aligns the data associated with the first instance of the periodic event in the first data set with the data associated with the second instance of the periodic event in the second data set.

Alternatively, if the periodicity determination module determines that the first data set is in the same relative position, the alignment module is instructed to align the data associated with the first instance of the periodic event in the first data set with the data associated with the second instance of the periodic event in the second data set.

The alignment module may modify the data within the first data set associated with the first instance to align the first and second instances of the periodic event.

The modification step may be in the form of restricting, compressing, deleting, moving or expanding at least a portion of the data within the first data set to cause alignment.

The step of expanding the data may be implemented by the alignment module adding new data into the data set, such as one or a combination of null values and average, extrapolated or interpolated values for the original data set.

Alternatively, the step of expanding the data may be implemented by the alignment module moving at least a portion of the data within the first data set.

Alternatively, the step of expanding the data may be implemented by the alignment module including within the first data set at least a portion of a further data set that has been identified by the periodicity determination module as having the same periodicity as the first data set.

In a further embodiment, the system herein described may allow queries (such as database queries, for example) to be constructed against data sets having different periodicities. This temporal query computing system enables the determination of the different periodicities within the data sets of the data that is retrieved. A data set query, such as a query written in a database query language, for example SQL, may be analysed, and the temporal parameters within the query may be determined by any suitable mechanism, such as parsing. The system may then resolve the temporal parameters in the query and create data sets according to the resolved parameters.

Figure 9N:
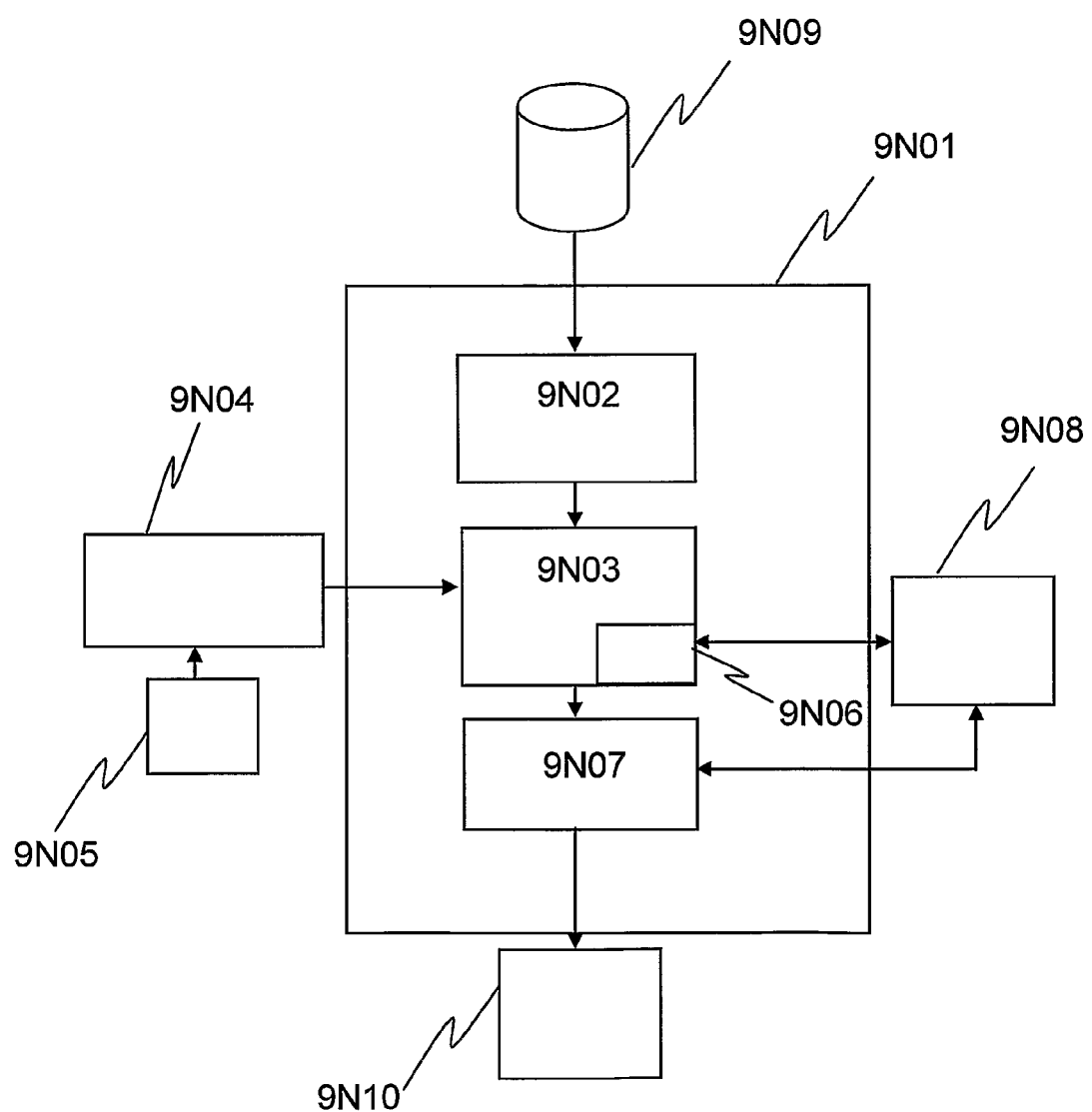
FIG. 9N shows a temporal query system according to an embodiment of the present invention.
Figure 90:
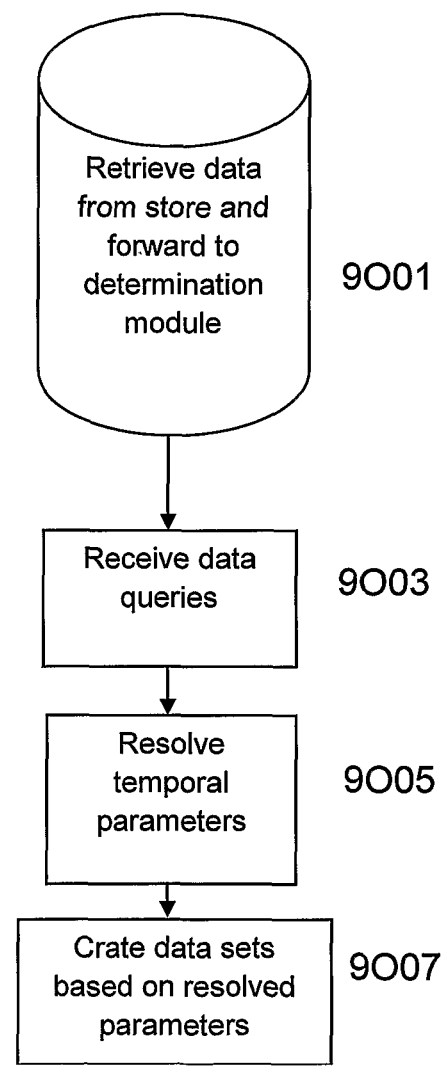

The temporal query computing system of this embodiment is arranged to provide a method of constructing queries against data sets having different periodicity. As shown in FIG. 9N, the temporal query system 9N01 forms part of the herein described system, and in its basic form includes at least the following modules. A determination module 9N02 that is instructed to determine the periodicity of the data sets that are, or are likely to be, referenced in the query. The data sets are retrieved from a storage module 9N09, which may be any suitable type of storage system as described herein.

Data queries are provided to a query resolving module 9N03 from a query module 9N04 that receives data queries from a source 9N05. The source may be a graphical user interface where a user enters queries manually, another module within the system or from a different system. The queries may be of any suitable format, for example an SQL format.

A query resolving module 9N03 then resolves the temporal parameters passed in the query. The temporal parameters may be resolved by an interpretation/parsing engine 9N06 that is arranged to read the components of the query and either interpret or parse the pieces relevant to the temporal parameters. The interpretation/parsing engine may retrieve, from any suitable storage medium, specific knowledge of temporal functions such as month of year, day of week or other date functions. The resolving process results in the construction of a query that includes temporal components. This query may be written in SQL and submitted to a relational database 9N08.

A data set creation module 9N07 is arranged to create data sets according to the resolved temporal parameters provided by the query resolving module 9N03. The data sets may be created by submitting SQL statements to a relational database 9N08 or by combining the results of several database queries.

The output from the data set creation module 9N07 may then be forwarded to any suitable output device 9N10, such that the resultant data sets can be stored, analyzed, displayed, interpreted or processed.

Therefore, as shown in FIG. 9O, the system performs the following steps:

At step 9O01, the data sets are retrieved from the data store. At step 9O03, data queries are provided to the system.

It will be understood that the steps 9O01 and 9O03 may be carried out in a different order, where 9O03 is carried out before 9O01, or substantially simultaneously with 9O01.

At step 9O05, the temporal parameters in the query are resolved. At step 9O07, data sets are created based on the resolved parameters.

According to one example, the temporal parameters in the query may be times in different time zones.

It will be understood that the query resolving module may use an extension of SQL to calculate temporal or relationship functions, and so build the queries.

Also, the query resolving module may use metadata to provide sensible or common-sense defaults in order to calculate temporal or relationship functions for the interpretation of results.

The query resolving module may include a rules engine that is used to resolve queries giving an answer that is most likely to be correct based on a set of rules applied to the engine.

The system can be adapted to use an extended set of SQL statements (i.e. they extend beyond the basic functions) to build a SQL language where they resolution of the temporal functions and relationships are expressed in the language and executed in a database engine that understands the query. Therefore it can be seen that visual or query results may be produced as a result of an extended SQL query against an extended relational database.

The temporal parameters in the query may be resolved using any of the techniques described above, wherein the temporal parameters are aligned through modification, restriction or expansion of the temporal parameters.

According to one example, the input parameters may be times in different time zones, and so an alignment is required to ensure the query takes this into account when accessing the database and retrieving the associated data set that answers the query.

A method of resolving a query is therefore provided wherein the temporal components of the query are arranged to handle the non linear nature of time. This differs from traditional queries as the user can run SQL statements where concepts such as financial account period, Chinese New Year, and Easter are understood by the database engine. This understanding enables the results to multiple temporal sequences to be provided in an efficient manner.

The SQL Statement may be made up from any suitable SQL definitions, including, for example, any of the following clauses:

Select Clause

The "select" clause may include results such as count of number of Easters, or days since Chinese New Year, for example.

From Clause

The "from" clause enables specific tables to be included in the query. These tables have an implicit understanding of the temporal non linear nature of time.

Join Clause

A table may be joined together using the non linear temporal rules. For example join together sales based on weeks including a religious holiday.

Where Clause

A restriction may restrict with questions that require implicit knowledge of one or more temporal sequences. For example, select the years where a full moon is within 3 days of Easter.

Having Clause

A "having" clause can be adjusted to answer temporal questions such as where the sum of revenue for is greater than XX on Christmas days that occur on a Sunday.

Group by Clause

Group by is extended such that the queries have implicit understanding temporal queries. For example group by year can now include Chinese calendar years. Alternatively they can produce a set of results one for each interpretation of calendar year.

Order by Clause

Order by is extended such that queries can be ordered by multiple temporal sequences, producing an array of results.

For example order by months and weeks produces two sets of interrelated results where both sequences are correctly calculated.

Further examples of SQL definitions may be found at en.wikipedia.org/wiki/SQL.

The forgoing methods may further include a hierarchical display of the data sets using a related method, such as a tree method.

These methods may be interactive methods assisting an end user to construct one or more graphical representations of data and/or their underlying attributes with multiple layers of elements that include shape, position, color, size, and animation. This may assist an end user to organize the graphical representations in such a way as to contribute to the end user's understanding of the data represented including assisting an end user to use proportion and positioning to compare temporal events within periods that contain disparate elements.

This type of visual design is a completely data defined Visual Design. The key input values are typically 'start' and 'end' dates along with the 'number' of variables to be displayed.

The simplest, and potentially the most useful, Visual Design Special Layer may be a carefully drawn calendar. The calendar may then become a useful Visual Design for date-based Visual Documents.

Temporal analysis is one of the fundamental methods of almost all analysis. Using temporal high density visualizations, users will be able to overlay high density Thematic Layers on well designed Special Layers such as the spiral data visualization shown in the above examples. This analysis can be applied in everything from customer frequency and spend analysis to analysis of the impacts of time of day on the management of a mobile phone network.

It is considered that temporal design patterns are particularly important in terms of analytics as the majority of analytics are time based. Described herein are several examples of producing temporal visual designs.

Non Contiguous Time—For example, weekends can be represented in some interesting ways. The simplest way being not to show them.

Non-linear Time—This allows multiple years of history to be shown where the oldest data is spatially compressed in the Visual Design.

Temporal Special Layers—These can be used to compare quite disjointed types of data. For example, the relationship between external public events, operational payroll sizes and sales revenue. There exists no easy way to numerically join this data together, visually this data can be joined. The technique combines well with simple correlations as it is possible to combine these distinct datasets to show correlations.

Control—One important consideration in visualizing temporal data is the gaining of scientific control. For example, seasonal variables. This is particularly interesting as one year is always different from the next. Quite simply, the start date of each year is never the same as the next, and moving external events such as Easter and 'acts of God' such as weather make precise comparison very difficult.

3. Spatial Visual Designs

One purpose of a spatial visual design is to present an overview of large scale numerical data in one spatial display (i.e. a space) for understanding, monitoring and analyzing the data.

GIS and mapping tools have been part of business analytics for over 10 years. Syed Nasirin[viii] states "In retailing, GIS is also known as "geodemographics." It is derived from the combination of both geographic and demographic terms. The system was initially employed to support site selection decisions, but have developed to support an array of marketing mix decisions. As GIS 're-engineers' the traditional working approaches and involves continuous commitment from all the parties (senior managers, system developers and users) in the organization, the system fundamentally changes the existing organizational working approach towards site selection and other marketing mix decisions."

Nasirin's statement illustrates the common kinds of uses of GIS for site selection and geodemographics.

The described solution is a next generation of thematic mapping. It mashes together the base maps provided by third parties with rendered thematic layers. These mash-ups are user definable and accessible to users.

Third party base maps may include customer-owned spatial maps or readily available base maps such as those provided by Google™ Maps or Yahoo™ Maps. The system provides powerful thematic layers over one of these spatial base maps.

One example of a spatial visual design is available at www.weather.com[ix]. This map shows two layers—(1) an underlying heat map overlaid with (2) actual temperature at specific cities. The points are useful as the state boundaries allow the user to determine with relative ease which city is being referenced. The underlying heat map is useful as it allows the user to see the overall trend at a glance.

A second example is available at Information Aesthetics[x]. This example shows the travel time from the centre of London outwards using various methods of travel. The use of heat maps here shows very clearly the relationship between distance from the centre of London and travel time.

Within the various industries discussed herein, games, products, hotels, branch offices, retail stores have their position or location frequently adjusted to optimize revenue.

For example, in the hospitality, financial and telecommunications industries, hotels, branches and retail stores are frequently located in areas where the location of competitors, the availability of qualified workers, tax structure and, the surrounding community demographics are conducive to profitable operation.

Many factors are taken into account such as the proximity to entrances, outlets (e.g. service outlets), entertainment venues, kiosks, aisle positions and others.

Spatial visualization techniques as herein described will provide information that enables the optimizing of floor configurations. These spatial visualizations include specific features on how to understand either the whole or part of the operations of the business or optimal business or facilities placement.

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

The described solution provides a flexible way that users can add geographic queries and analysis to their internal EDW (Enterprise Data Warehouse) applications. These can be further extended with the powerful animation capabilities of the described solution. This animation capability enables the extension of the spatial analysis to space/time analytical solutions.

Utilizing any of the visual design methodologies described herein, further improvements can be made by providing indications on a visualization to show an end user where the key areas of that visualization are located. It is not always clear in visualizations where data used to create the visualization correlates, and so important information can easily be missed.

The system described herein can overcome this problem by determining the location of one or more key areas within the graphical representation, wherein the location of one or more of these key areas is automatically determined by the system based on at least one of a characteristic of the data that is being graphically represented in those areas, related actions or related events associated with the data.

That is, the system analyzes the data to detect the characteristics of the data. Each characteristic of the data, related event or related action may be given a different weighting factor by the system. Certain actions, such as, for example, customer centric actions may be detected that relate to the data. Also, relevant or related events that could affect the data are determined by the system using the data or related data. By applying any number of these factors to a determination module, the system is able to determine how data points in the visualization correlate with neighboring data points.

For example, the determination module may be an artificial intelligence engine, or fuzzy logic module that receives all the data characteristics and associated information, and based on a number of rules and weighting factors, determines which data points in the representation correlate with other data points. The results of this can be used to highlight within the representation areas that have correlating data points.

Various different forms of highlighting can take place, such as drawing shapes around the correlated data, overlaying a further visualization, visually highlighting an area etc. Further, textual references, graphical images and axes may be identified or used within the visualization. Also, the key area may be identified in a manner utilizing a shape, positional indicator, color, size, texture, symbology, pattern or animation The important element is that the key area is identified in a manner that focuses the attention of the end user upon that key area.

Therefore, the location of the key area may be determined based on the correlation of the data graphically represented in that area and a predefined threshold. The predefined threshold will depend on the data being represented and will be associated with the level of correlation between the data points.

The determination of the correlation of the data may be based on a number of different algorithms, for example, an R-squared algorithm, a least squares algorithm or a Kriging algorithm can be used either alone or in combination.

The location of the key area may be determined based on the relationship between the data graphically represented in that area and neighboring data points. For example, by overlaying a heatmap on top of a graphical representation of data, where that heatmap provides a further visual indication of how data points in the graphical representation correlate with neighboring data points, it becomes extremely easy to see where there is correlation between the data shown. This provides a unique mechanism of receiving an overall view of the data simultaneously with details of the data.

In conjunction with the herein described hierarchical tree representations it then becomes possible to view a hierarchical meta data view of the data selected. Further, the indicated area or areas may be adjusted by the user to include other data points if the user feels they are relevant. For example, this adjustment may be included within the R-tree representation. The hierarchical tree may be used to display descriptive information about the identified key area.

This type of visualization is particularly useful for high density data visualizations, where the high density can easily obscure important features. By providing indications on the data, the user is able to interact with the data by, for example, drilling down into the data to ascertain other characteristics.

Therefore, the identified key area may be adjusted by the end user, for example to identify further key areas. Further, he identified key area may be adjustable through an interaction of the end user with an input device such as a mouse, or keyboard for example.

Using the above described methodology, the key area may be determined based on the variance of a displayed surface of the graphical representation. Various different algorithms may be used to enable this, such as, for example, Kriging.

Also, an interactive hierarchical diagram may be provided to enable navigation of the graphical representation. The system provides instructions to the end user that assist the end user in selecting an area in the diagram to cause a corresponding area within the graphical representation to be identified to the end user.

Figure 10:
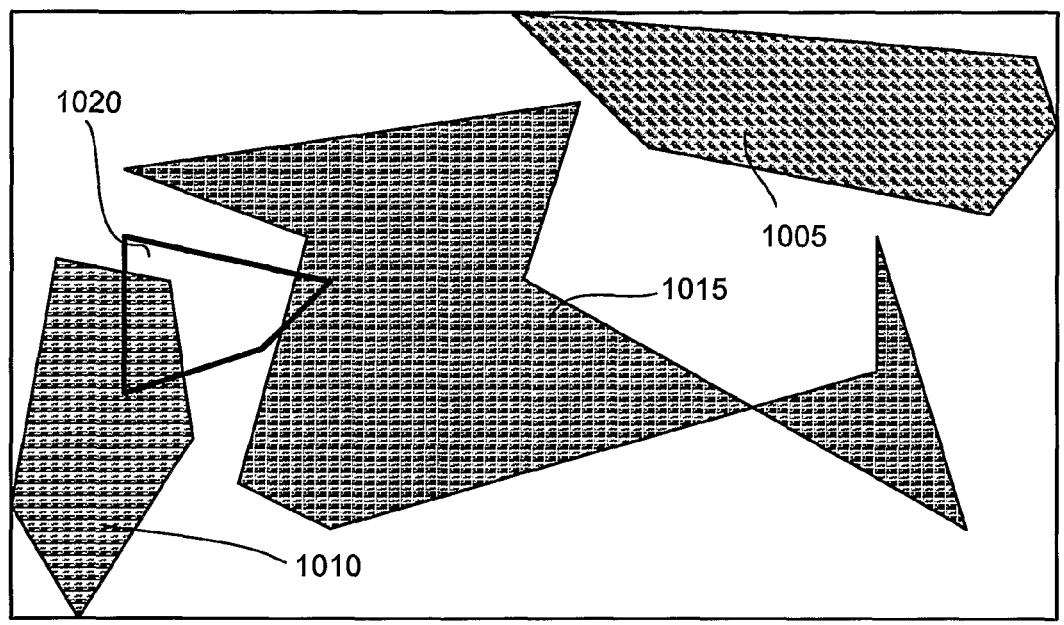
FIG. 10 shows a spatial visual design according to an embodiment of the present invention.

FIG. 10 shows an example. 1000 indicates a heat map that uses space, shape and color to depict related data (1005, 1010, 1015) as designed by an end user.

1020 is an automatically generated transparent shape that uses an algorithm to point out areas of correlated data.

Composite Surface

A method is now described that allows for different densities of data to be displayed on a contiguous surface without the points of data that are close together creating overlapping effects to obscure the results.

This embodiment of the invention relates to a mathematical calculation of a contiguous surface from discrete data. Traditional methods of calculation of this contiguous surface involve applying a formula to the data such as gravity model, these gravity models create visual displays of data that enable much higher density of information to be shown.

The simplest form of the gravity model is sometimes called 'Shepards Method' or Inverse Distance Weighting (IDW) Method of spatial interpolation (Isaaks and Srivastava, 1989), described below.

Inverse Distance Weighting (IDW) Interpolation

We are given n data points $(X_i, Y_i)$ in 2-dimensional real space and also the value $V_i$ at these points of a variable of interest. We will refer to these n points as surface points. We need to calculate the value V at a point (X,Y), which will be called an interpolation point.

We first define the notion of distance $d_i$ between two points (X,Y) and $(X_i, Y_i)$:

$$d_{p,i} = [|X-X_i|^p + |Y-Y_i|^p]^{1/p}, \ p \geq 1.$$

Taking p=2 gives us the Euclidean distance between two points on the real plane.

$$d_{2,i} = \sqrt{(X-X_i)^2 + (Y-Y_i)^2}$$

We next calculate a set of weights $W_i$ to be used in spatial interpolation:

$W_i$=weight of the i-th surface point for calculating $$V \text{ at } (X, Y) = \frac{d_{p,i}}{\sum_{j=1}^{n} d_{p,j}} \sum_{i=1}^{n} W_i = 1$$

The value of V can now be calculated from the interpolation equation $$V(X, Y) = \sum_{i=1}^{n} W_i V_i$$

Example 1

In the following table, we have n=10 surface points $(X_i, Y_i)$, i=1, 2, ..., 10 with known values of the variable V, and one point (X, Y) at which V needs to be calculated. The weights are calculated using the Euclidean distance (p=2). The value of V at the interpolation point (X,Y) is the sum of the last column (54.99) of the following table.

|  | X | Y | V | $h_i$ | $1/d_i$ | $W_i$ | $W_i \times V_i$ |
|---|---|---|---|---|---|---|---|
| x1, y1 | 2 | 7 | 70 | 13 | 0.076923 | 0.079111 | 5.537756 |
| x2, y2 | 2 | 9 | 61 | 25 | 0.04 | 0.041138 | 2.509395 |
| x3, y3 | 3 | 1 | 47 | 20 | 0.05 | 0.051422 | 2.416835 |
| x4, y4 | 6 | 6 | 64 | 2 | 0.5 | 0.51422 | 32.9101 |
| x5, y5 | 6 | 10 | 19 | 26 | 0.038462 | 0.039555 | 0.751553 |
| x6, y6 | 7 | 1 | 0 | 20 | 0.05 | 0.051422 | 0 |
| x7, y7 | 7 | 9 | 52 | 20 | 0.05 | 0.051422 | 2.673945 |
| x8, y8 | 7 | 10 | 40 | 29 | 0.034483 | 0.035463 | 1.418539 |
| x9, y9 | 8 | 2 | 52 | 18 | 0.055556 | 0.057136 | 2.97105 |
| x10, y10 | 8 | 3 | 48 | 13 | 0.076923 | 0.079111 | 3.797319 |
| x, y | 5 | 5 |  | Total | 0.972346 | 1 | 54.98649 |

Figure 11A:
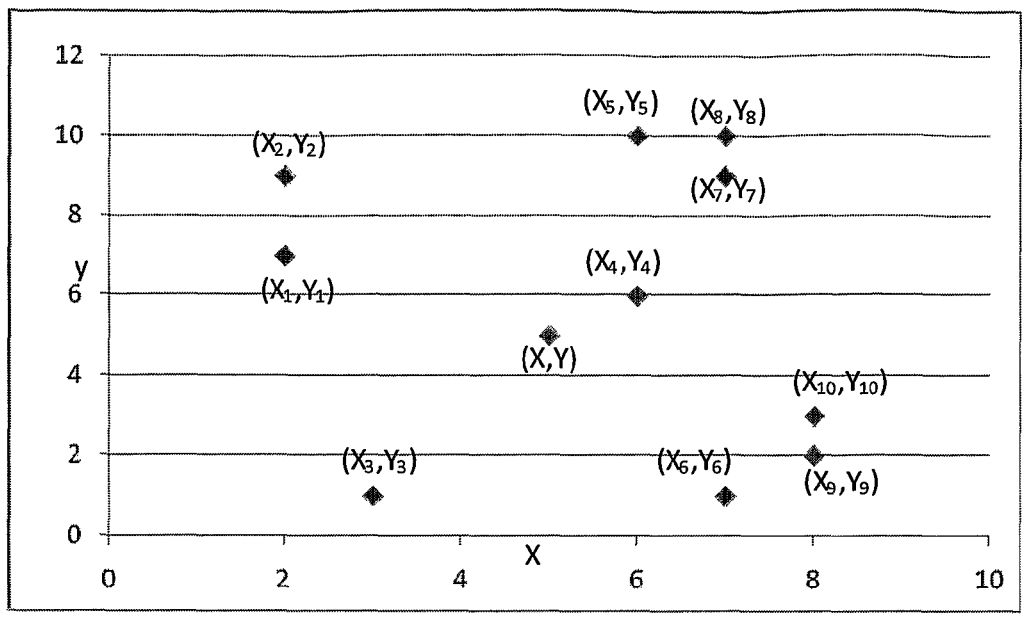
FIGS. 11A to L show diagrams relating to a composite surface visualization according to an embodiment of the present invention.

FIG. 11A shows the locations of the 10 surface points and the interpolation point (X, Y).

Figure 11B:
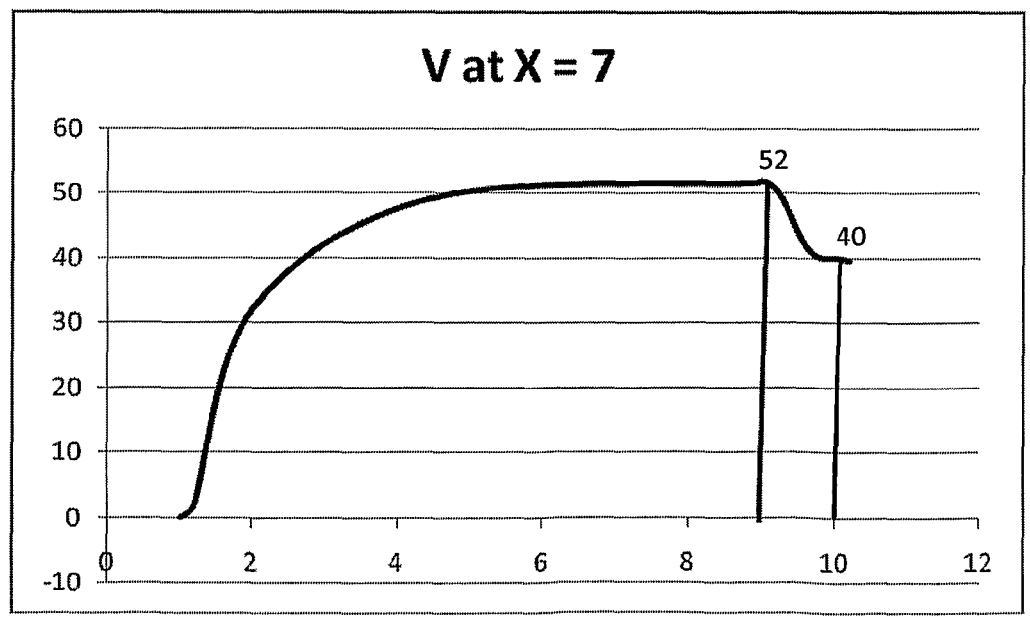

FIG. 11B shows the interpolated values V at a few selected points on the vertical line X=7.

Figure 11C:
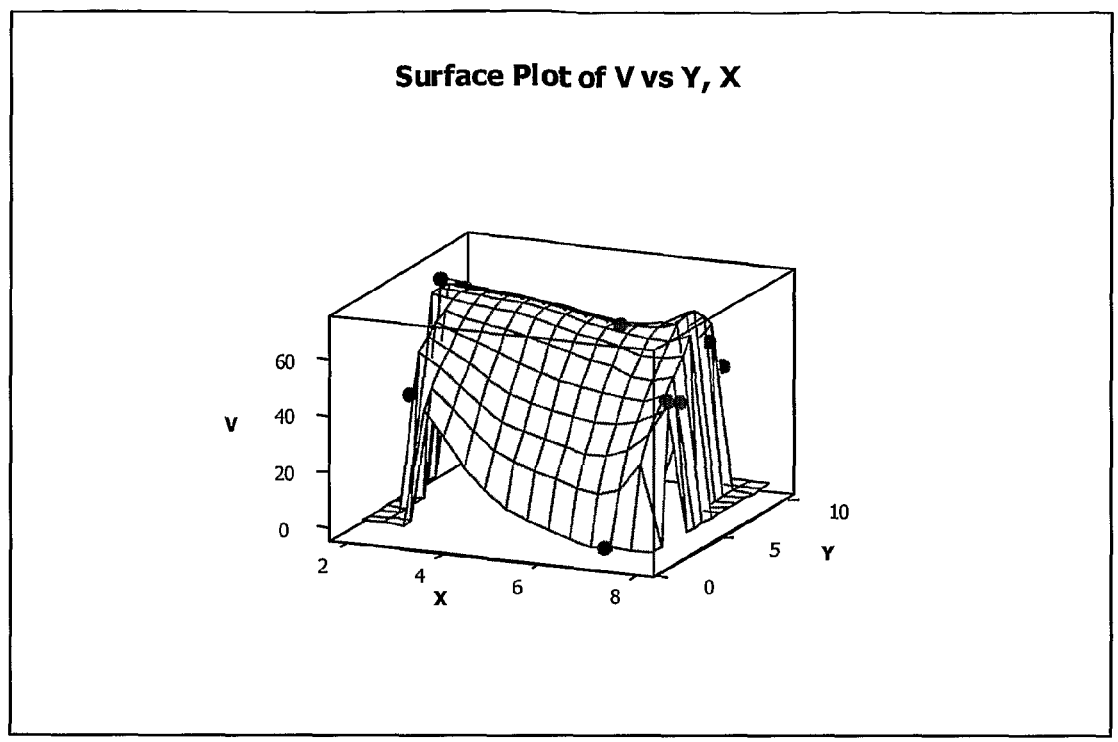

FIG. 11C shows a surface plot of V vs. (X, Y).

The visualization of this invention involves a modification of the IDW method as described below.

Note that as $(X,Y) \to (X_i,Y_i)$ for any surface point i, the distance $d_{p,i} \to 0$ and the weight $W_i \to 1$. In other words, the value of V at $(X_i,Y_i)$ calculated from the above formula will equal $V_i$. For visualization of this invention, in order to show better resolution at each of the surface points, we may prefer to use a surface that is not interpolatory. This can be achieved by using the following weights:

$$W_i' = \begin{cases} 1 + b_i & \text{if } d_{p,i} = 0 \\ \dfrac{d_{p,i}}{\sum_{j=1}^{n} d_{p,j}} & \text{if } d_{p,i} \neq 0 \end{cases}$$

where $b_i$ is a tuning constant.

Figure 11D:
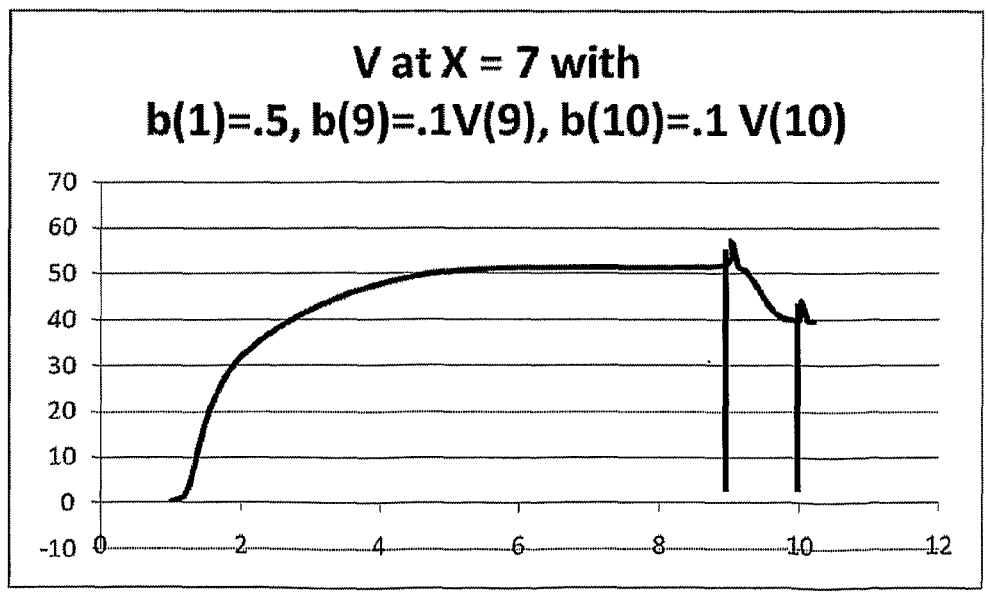

FIG. 11D shows values of V calculated from the modified IDW method on the vertical line X=7 (plotted vs. Y)

we can also add radius effect with weights defined as follows:

$$W_i = \frac{\left(\dfrac{R - d_i}{R d_i}\right)^2}{\sum_{j=1}^{n} \left(\dfrac{R - d_j}{R d_j}\right)^2}$$

where

R=max($d_i$)=distance between (X,Y) and the farthest point $(X_i,Y_i)$

Figure 11E:
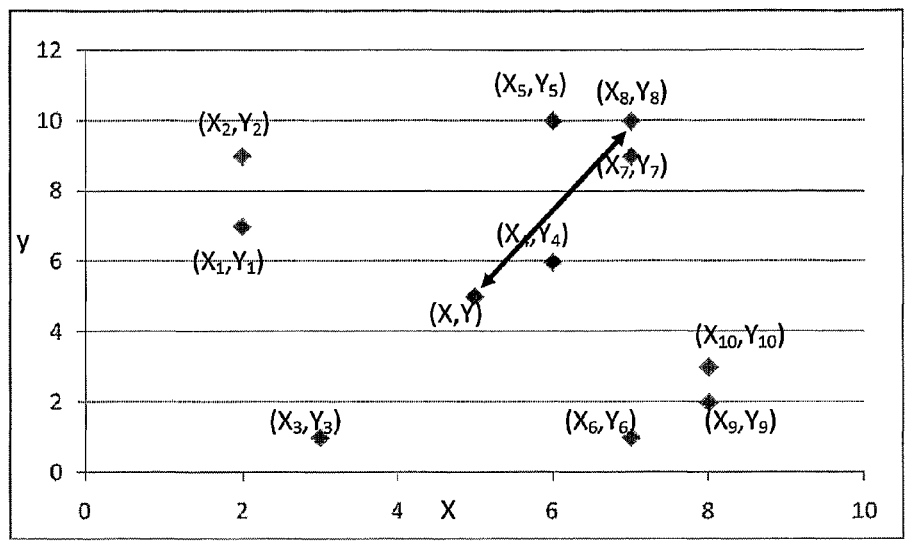

FIG. 11E shows the value R on the plot of the surface points, and shows the distance of the farthest surface point to the interpolation point.

The value of R for the data of Example 1 is R=5.39, which is the maximum of the $d_i$ column in the following table. The calculated V at (5,5) is 51.83.

|  | X | Y | V | $d_i$ | $1/d_i$ | RH | W | VW |
|---|---|---|---|---|---|---|---|---|
| x1, y1 | 2 | 7 | 70 | 3.605551 | 0.27735 | 1.419701 | 0.213068 | 14.91475 |
| x2, y2 | 2 | 9 | 61 | 5 | 0.2 | 0.12789 | 0.019194 | 1.170809 |
| x3, y3 | 3 | 1 | 47 | 4.472136 | 0.223607 | 0.574912 | 0.086282 | 4.055273 |
| x4, y4 | 6 | 6 | 64 | 1.414214 | 0.707107 | 1.08748 | 0.163208 | 10.44533 |
| x5, y5 | 6 | 10 | 19 | 5.09902 | 0.196116 | 0.073409 | 0.011017 | 0.209326 |
| x6, y6 | 7 | 1 | 0 | 4.472136 | 0.223607 | 0.574912 | 0.086282 | 0 |
| x7, y7 | 7 | 9 | 52 | 4.472136 | 0.223607 | 0.574912 | 0.086282 | 4.486685 |
| x8, y8 | 7 | 10 | 40 | 5.385165 | 0.185695 | 0 | 0 | 0 |
| x9, y9 | 8 | 2 | 52 | 4.242641 | 0.235702 | 0.810224 | 0.121598 | 6.323096 |
| x10, y10 | 8 | 3 | 48 | 3.605551 | 0.27735 | 1.419701 | 0.213068 | 10.22726 |
| x, y | 5 | 5 |  | Total | 2.750141 | 6.663138 | 1 | 51.83253 |
|  |  |  | R | 5.385165 |  |  |  |  |

The Cardno Surface

The Cardno Surface is well suited for analysis within the various industries discussed herein in that it allows important distinctions to be discerned from data that is normally obfuscated when aggregated.

For example, in the gaming industry, if a player plays for 10 hours on one type of machine, and tries out another type of machine for 1 hour, the fact that he tried the other machine is important information but will be missed when looking at a normal aggregated representation of play.

For example, in the retail industry, if a customer buys a large quantity of one type of product, and tries out another product by buying a smaller quantity of it, the fact that he tried the other product is important information but will be missed when looking at a normal aggregated representation of purchases.

For example, in the hospitality industry, if a customer segment buys a large quantity of one type of product (e.g., beverages), and tries out another product by buying a smaller quantity of it (e.g., logo wear), the fact that they tried the other product is important information but will be missed when looking at a normal aggregated representation of purchasing behavior.

For example, in the financial industry, if a customer segment buys a large quantity one type of product (e.g., home loans), and tries out another product by buying a smaller quantity of it (e.g., gift cards), the fact that they tried the other product is important information but will be missed when looking at a normal aggregated representation of purchasing behavior.

For example, in the entertainment industry, if a customer buys a large quantity of one type of product, and tries out another product by buying a smaller quantity of it, the fact that the other product was tried is important information but will be missed when looking at a normal aggregated representation of the transactions.

For example, in the telecommunications industry, if a customer segment buys a large quantity of one type of product (e.g., data services), and a second customer tries out another product by buying a smaller quantity of it (e.g. text messaging) at a nearby area, the fact that they tried the other product is important information but will be missed when looking at a normal aggregated representation of purchasing behavior.

Viewing these distinctions is important in that it can show both the overview to the data and the specific exceptions to the trend within one analytical context.

Various embodiments of how a surface (Cardno Surface) is created by the herein described system are provided. The methodologies may involve multiple applications of different order interpolation models as shown above and may optionally be modified by combining the interpolated surface with a smoothing model as described below with increasing levels of accuracy. The final surface created or generated by the system may typically be an interpolation surface that adjusts the smoothed models so that the final data passes exactly through all data points, creating a visualization that consists of minima and maxima, for example, local minima and, local maxima or global minima and global maxima.

As defined in Wikipedia at en.wikipedia.org/wiki/ Maxima and minima:
Maxima and minima are known collectively as extrema, and are defined as the largest value (maximum) or smallest value (minimum), that a function takes in a point either within a given neighbourhood (local extremum, e.g. local minima or local maxima) or on the function domain in its entirety (global extremum e.g. global minima or global maxima).

First Embodiment

Figure 11F:
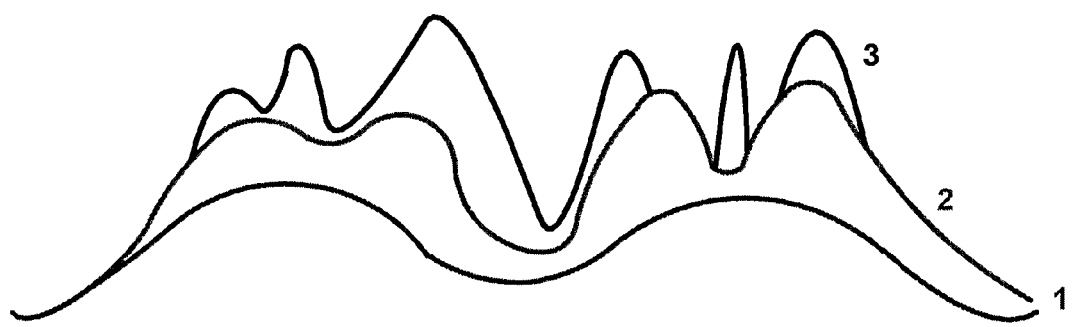
Figure 11G:
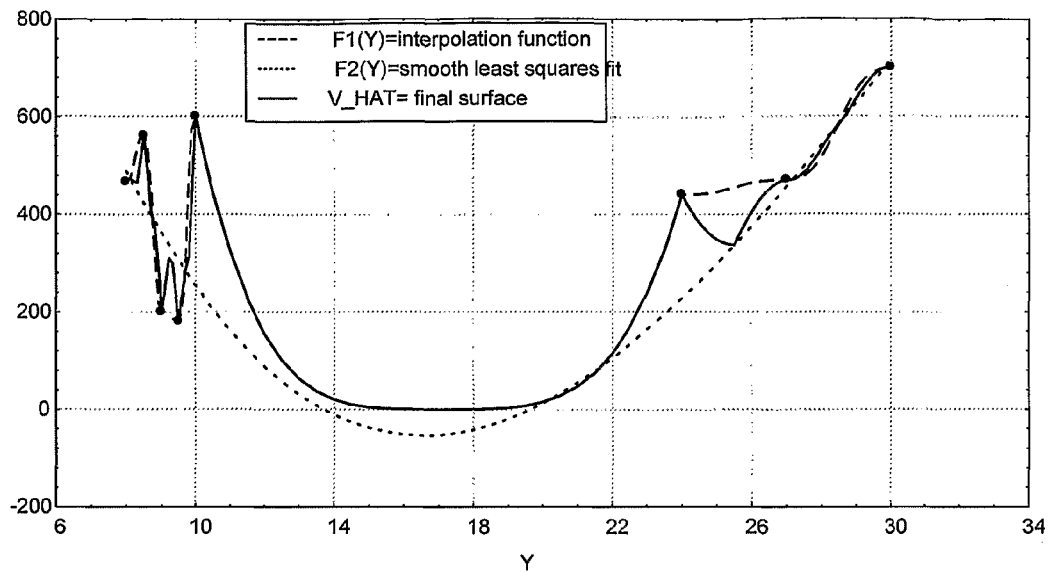
Figure 11H:
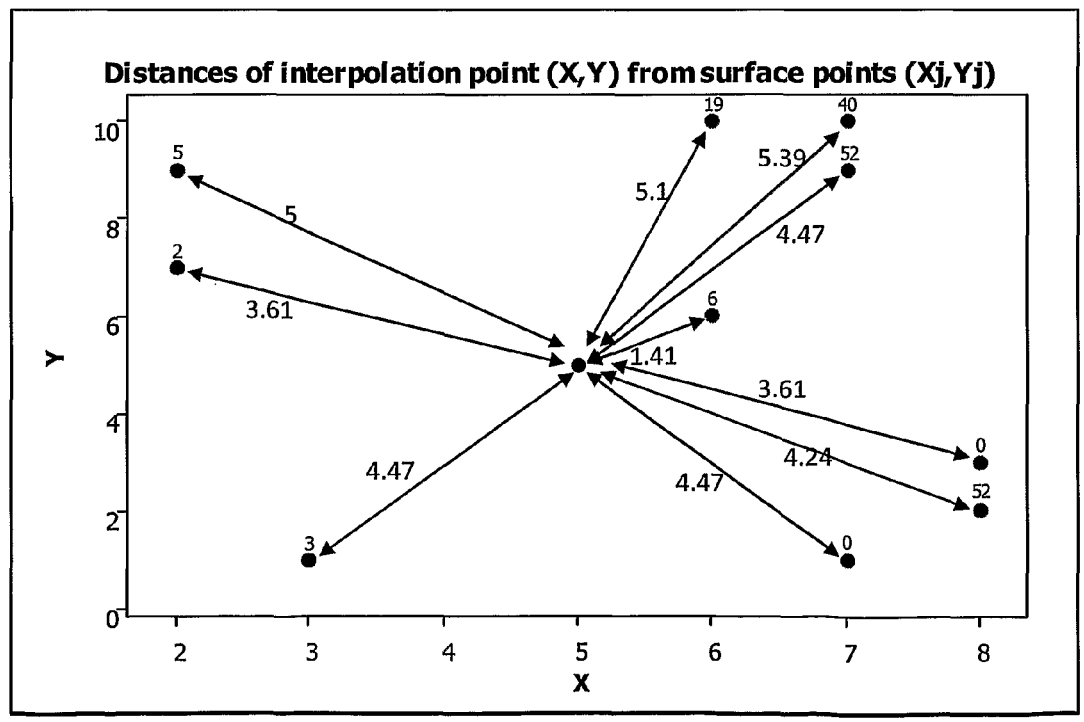
Figure 11I:
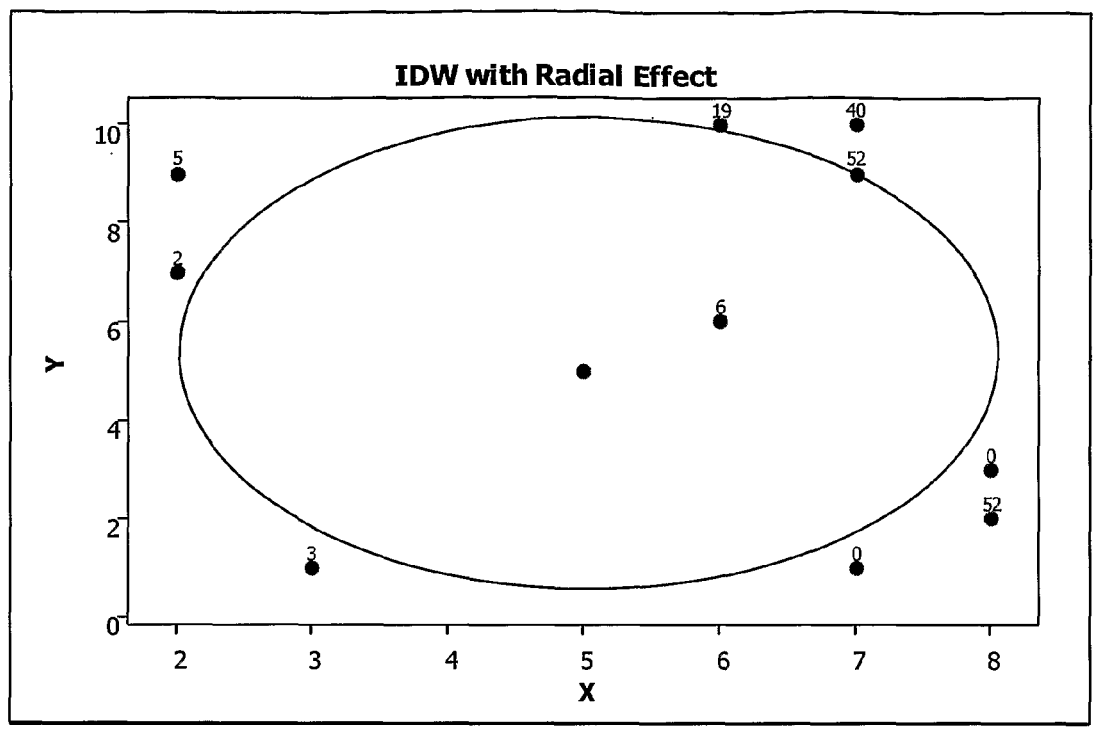
Figure 11J:
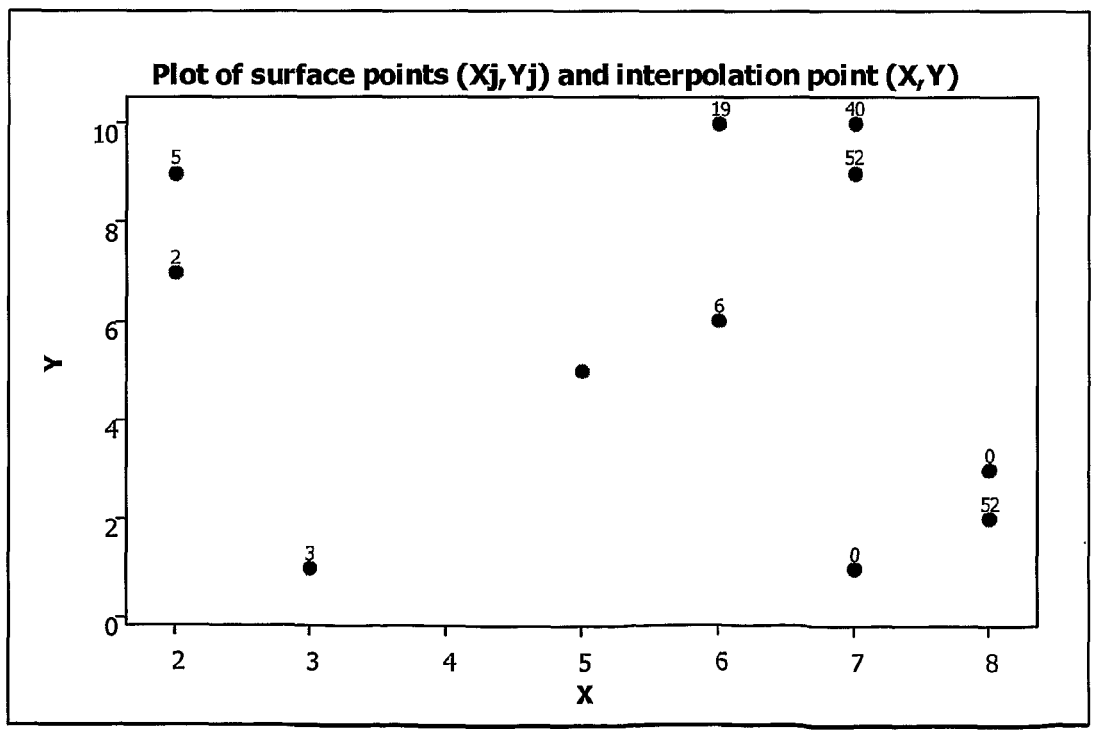
Figure 11K:
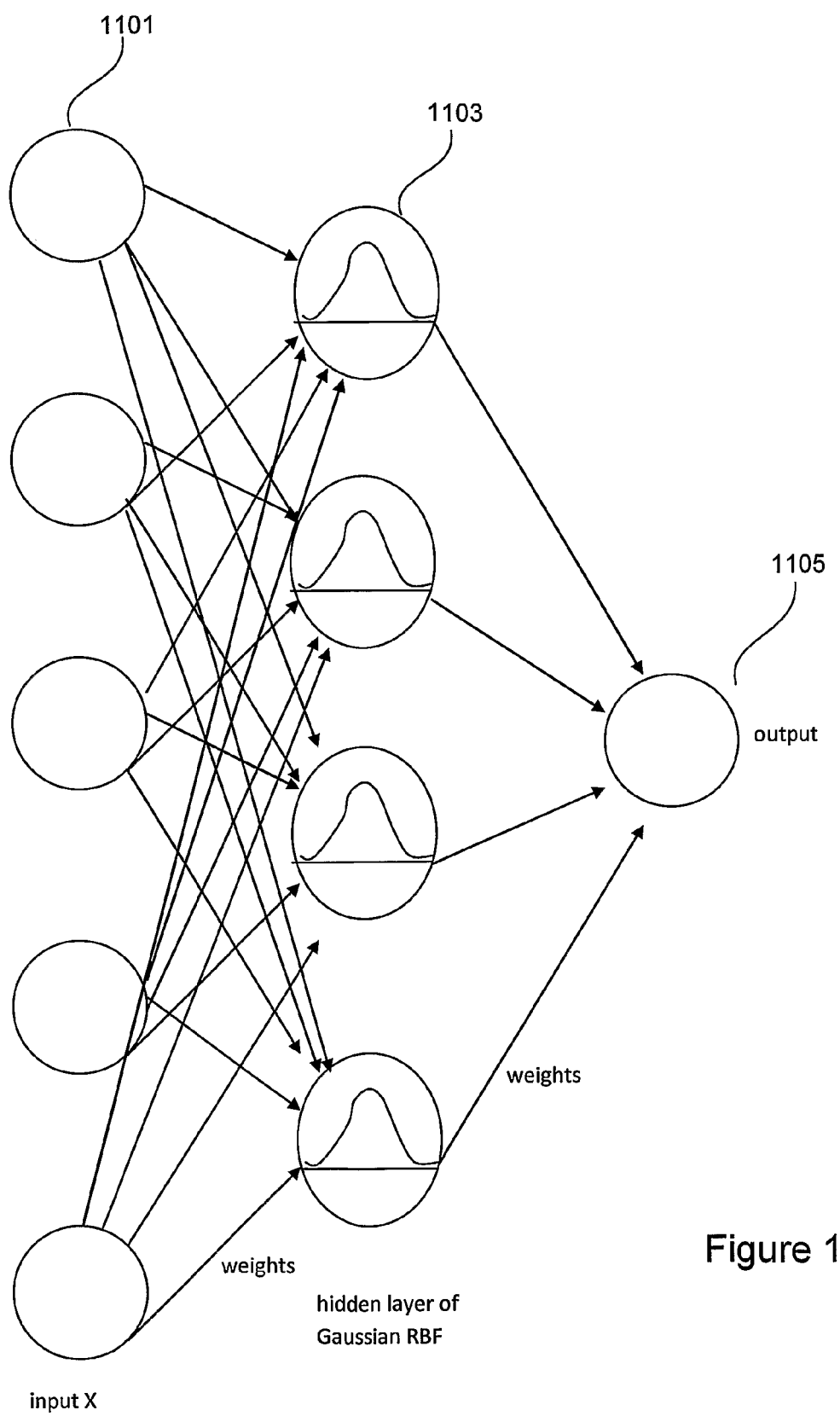
Figure 11L:
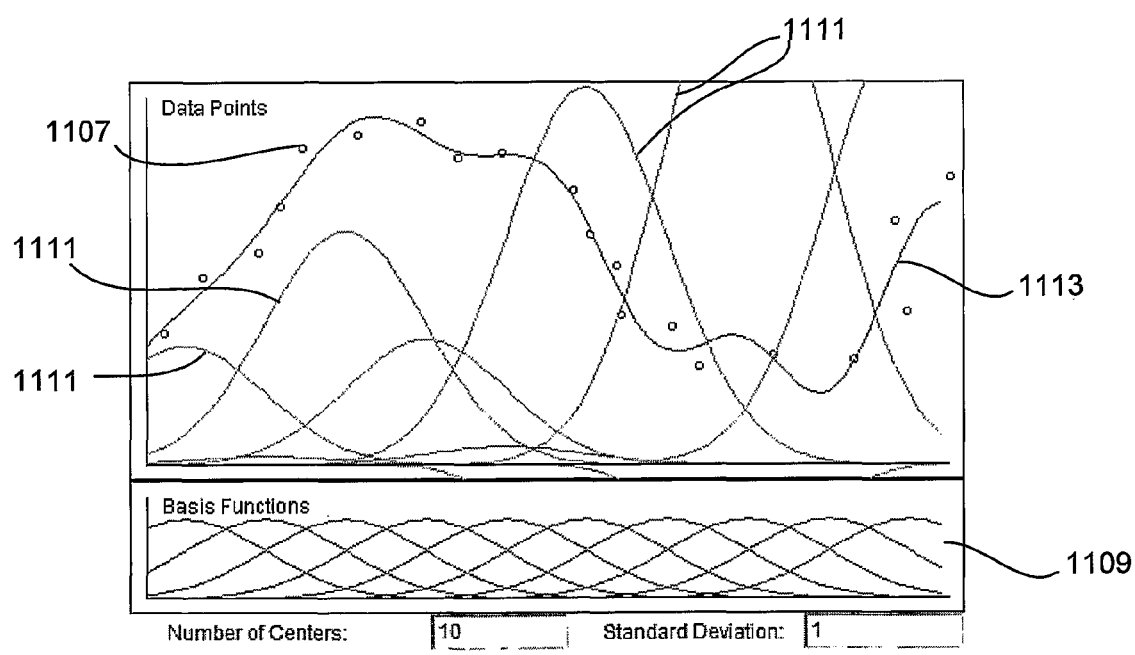
Figure 11O:
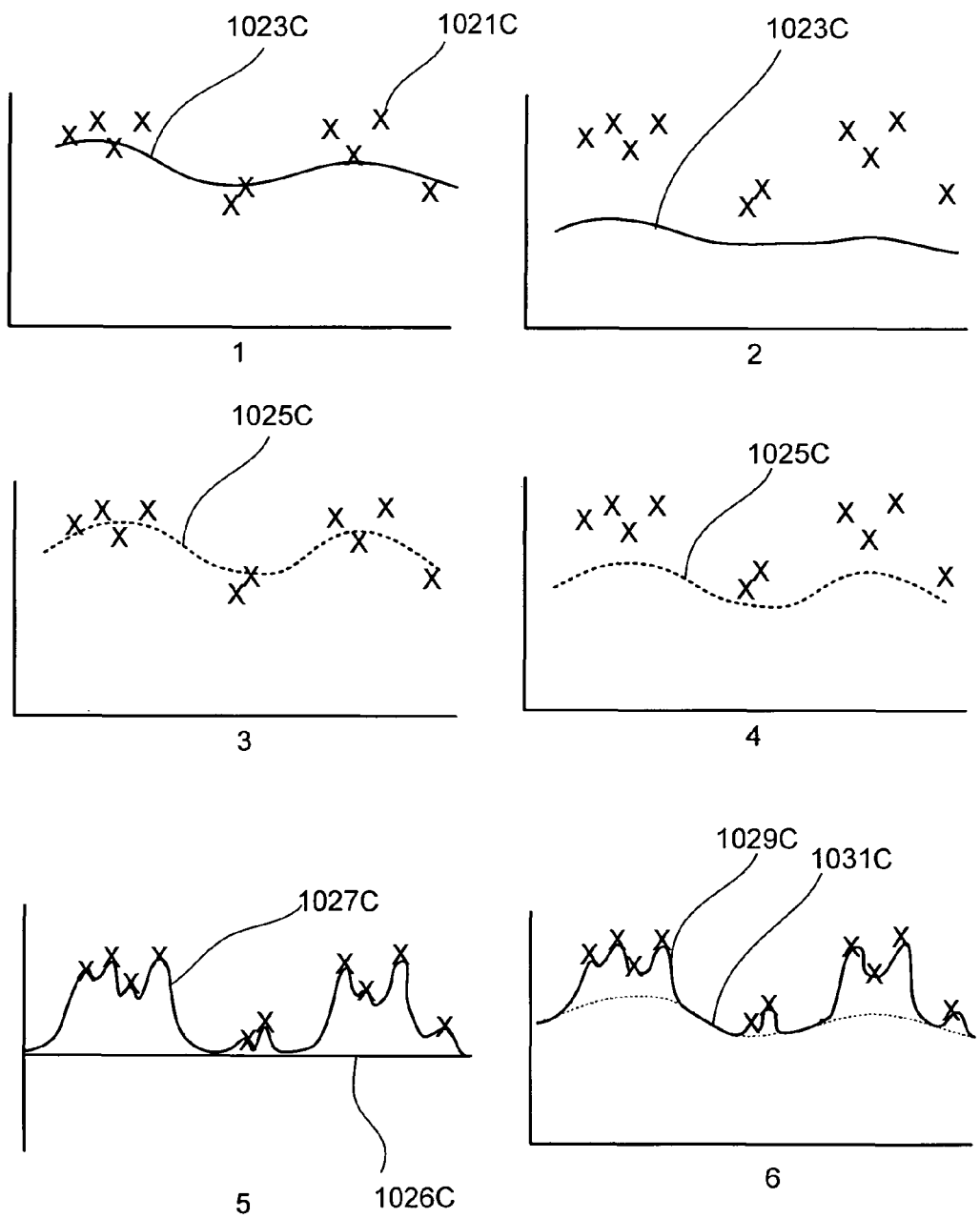
Figure 11P:
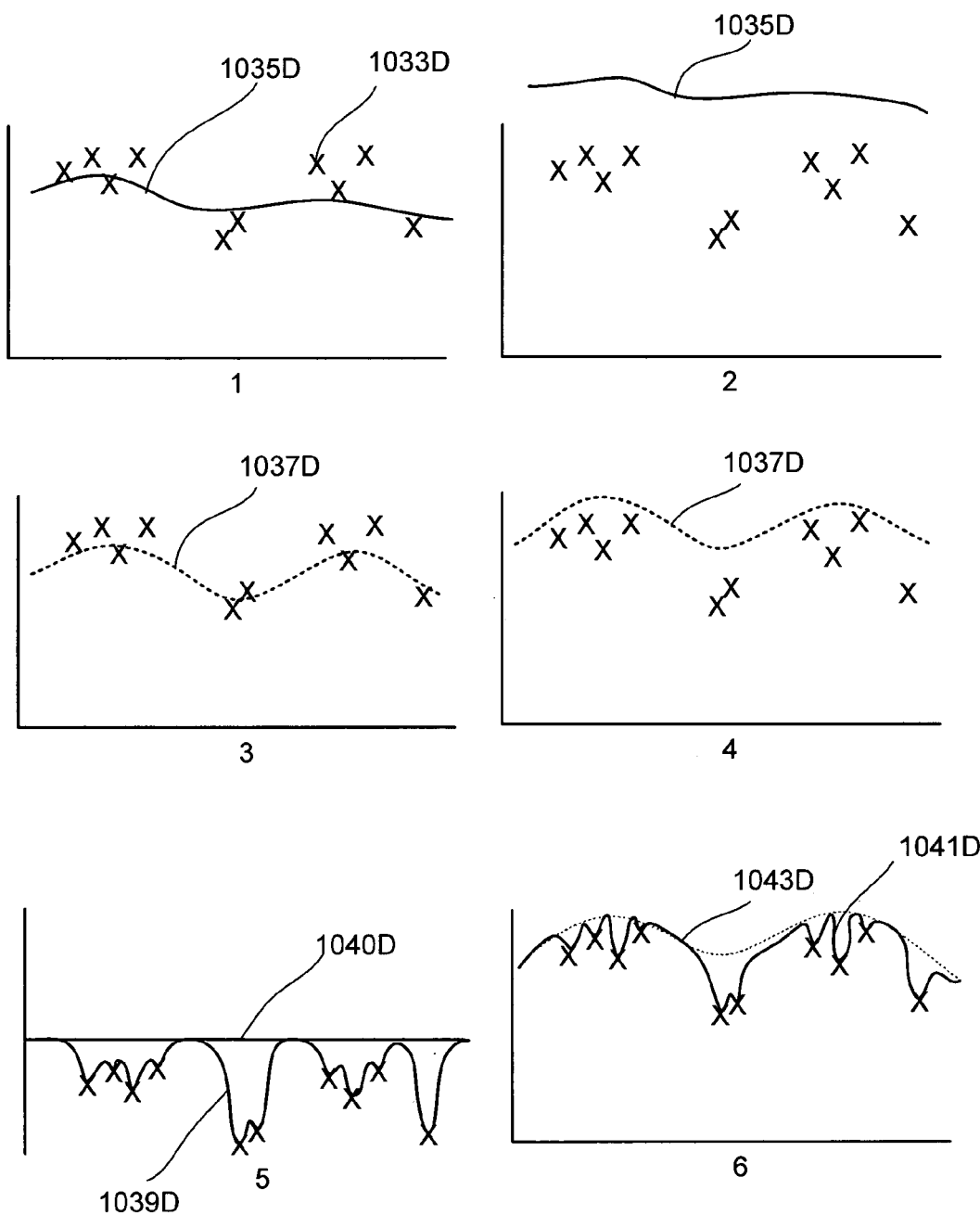
Figure 11Q:
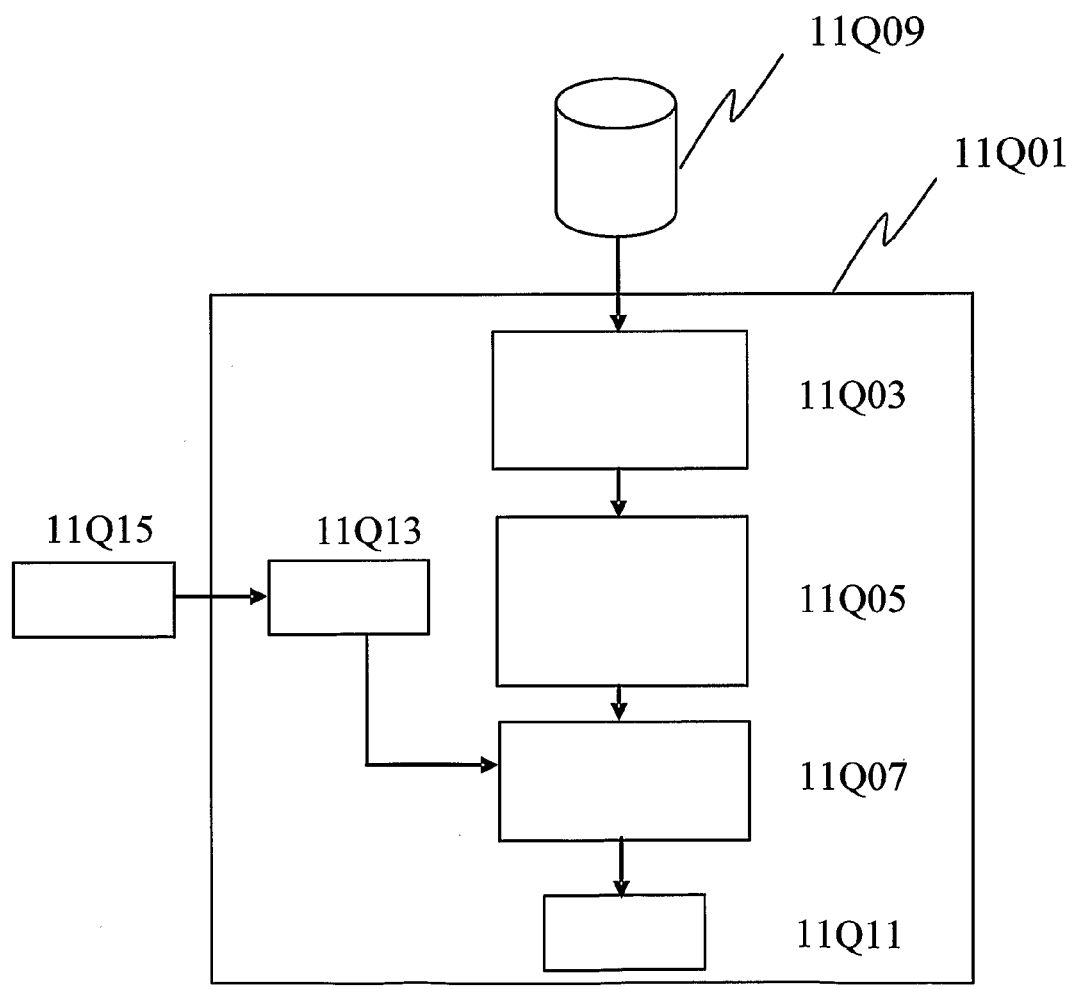
FIG. 11Q shows a conceptual system diagram according to one embodiment of the present invention.

According to this embodiment there is shown in FIG. 11Q a conceptual system diagram of a data visualization system 11Q01 which includes a data retrieval module 11Q03 configured to enable the retrieval of data from a data storage module, which is in communication with the data visualization system.

The system further includes a smoothing module 11Q05 and an interpolation module 11Q07 which are arranged to receive the data obtained by the retrieval module. Each of the smoothing module and interpolation modules are controlled using specific algorithms to create, from the input data, a smoothed surface and an interpolated surface respectively. The smoothed and interpolated surfaces are then combined by a surface combining module 11Q11. The output of the surface combining module is provided to a rendering module 11Q13, which is arranged and controlled to create the appropriate signals for the output device 11Q15, which in this embodiment is a display module, which is used to visualize the data.

In summary, the smoothing module applies a smoothed model to input data to create smoothed surfaces, and the interpolation module applies an interpolation method to the input data to create a precise interpolated surface around the data points.

The surface combining module is used to combine the smoothed surface output from the smoothing module with the interpolated surface output from the interpolation module. The surface combining module 11Q11 incorporates a weighting module 11Q12 that calculates a weighted average of the output of the smoothing and interpolation functions so that the combined output creates a smooth visualization at points for which data has not been observed. The combined surface therefore shows local minima and maxima at the n given points $\underline{x}_1, \underline{x}_2, \ldots \underline{x}_n$ in the 2D plane.

This combined surface enables a user of the system to visualize the overall pattern associated with the output of the smoothing module, along with the surface points that correctly pass through the source as output by the interpolation module. This therefore enables the user to see, simultaneously, in the resultant (i.e. combined) surface, both the overview and the details of the input data provided to the system.

It is important to note that, in this embodiment, the smoothed surface created by the smoothing module is generated so that it does not appear near the data points. That is, the smoothing function acts as a "weighted" mean of the data points.

Examples of how the modules of the system may create a combined surface of the smoothed and interpolated surfaces according to this embodiment are described as follows.

Interpolation Step

The interpolating function applied by the interpolating module in this embodiment is as described in the IDW interpolation example as follows. That is, interpolation of the input data is carried out by using the following IDW method.

Inverse Distance Weighting (IDW) Interpolation Function

The Inverse Distance Weighting (IDW) Interpolation function is a gravity function. The function works by obtaining or retrieving data that includes "n" data points $(X_i, Y_i)$ in 2-dimensional real space, as well as the value (variable) $V_i$ at each of these points of interest. The n points are referred to as surface points. The value V is to be calculated at a point $(X,Y)$, which is an unknown point, and which is called the interpolation point.

The notion of distance $d_i$ between two points $(X,Y)$ and $(X_i, Y_i)$ is defined by the equation:

$$d_{p,i} = [|X-X_i|^p + |Y-Y_i|^p]^{1/p}, \ p \geq 1.$$

Taking p=2 gives the Euclidean distance between two points on the real plane, as follows:

$$d_{2,i} = \sqrt{(X-X_i)^2 + (Y-Y_i)^2}$$

A set of weights $W_i$ to be used in spatial interpolation is calculated where:

$W_i$=weight of the i-th surface point for calculating V at $$(X, Y) = \frac{(1/d_{p,i})^a}{\sum_{j=1}^{n}(1/d_{p,j})^a}$$

and where a, the exponent of inverse distance $(1/d_{pi})$, is a positive constant and $$\sum_{i=1}^{n} W_i = 1.$$

The value of V can now be calculated from the interpolation equation:

$$V(X, Y) = \sum_{i=1}^{n} W_i V_i$$

The common choice for the exponent a=2 is used, as this choice is computationally efficient. Therefore, the weight values $W_i$ for each point are normalized against the total of the multiplicative inverse or reciprocal of the squared distance values, i.e. the weight value is a normalized version of the reciprocal of squared distance function. That is, each weighting value $W_i$ is the $(1/d_i)^2$ value divided by the total of all $(1/d_i)^2$ values for all points.

The following describes a first IDW example of calculating Y) using the above IDW method.

In the following table, n=10 surface points are shown ($X_i$, $Y_i$), i=1, 2, . . . , 10 with known values of the variable V, and one point (X, Y) at which V needs to be calculated. The weights are calculated using the Euclidean distance (p=2) and exponent a=2.

Therefore, the weight values gradually increase for points that are closer to the interpolation point X,Y.

The value of V at the interpolation point (X,Y) is the sum of the weighted variable values Wi×Vi in the last column (54.99) of the following table, where h=$d^2$.

|        | X | Y  | V  | $h_i$ | $1/h_i$ | $W_i$   | $W_i \times V_i$ |
|--------|---|----|----|-------|---------|---------|------------------|
| x1, y1 | 2 | 7  | 70 | 13    | 0.07692 | 0.07911 | 5.53775          |
| x2, y2 | 2 | 9  | 61 | 25    | 0.04    | 0.04113 | 2.50939          |
| x3, y3 | 3 | 1  | 47 | 20    | 0.05    | 0.05142 | 2.41683          |
| x4, y4 | 6 | 6  | 64 | 2     | 0.5     | 0.51422 | 32.9101          |
| x5, y5 | 6 | 10 | 19 | 26    | 0.03846 | 0.03955 | 0.75155          |
| x6, y6 | 7 | 1  | 0  | 20    | 0.05    | 0.05142 | 0                |
| x7, y7 | 7 | 9  | 52 | 20    | 0.05    | 0.05142 | 2.67394          |
| x8, y8 | 7 | 10 | 40 | 29    | 0.03448 | 0.03546 | 1.41853          |
| x9, y9 | 8 | 2  | 52 | 18    | 0.05555 | 0.05713 | 2.97105          |
| x10, y1| 8 | 3  | 48 | 13    | 0.07692 | 0.07911 | 3.79731          |
| x, y   | 5 | 5  |    | Total | 0.97234 | 1       | 54.9864          |

FIG. 11A shows the locations of the 10 surface points and the interpolation point (X, Y).

FIG. 11B shows the interpolated values V at a few selected points on the vertical line X=7.

FIG. 11C shows a surface plot of V vs. (X, Y).

Tuning Constant

A tuning constant may also be included for the reasons as described herein. Note that as $(X,Y) \to (X_i, Y_i)$ for any surface point i, the distance $d_{p,i}$ approaches 0 and the weight $W_i$ approaches 1. In other words, the value of V at $(X_i, Y_i)$ calculated from the above formula will equal $V_i$. For visualization of this invention, in order to show better resolution at each of the surface points, it is preferred to use a surface that is not interpolatory. This can be achieved by using the following weights:

$$W_i' = \begin{cases} 1 + b_i & \text{if } d_{p,i} = 0 \\ \frac{d_{p,i}}{\sum_{j=1}^{n} d_{p,j}} & \text{if } d_{p,i} \neq 0 \end{cases}$$

where $b_i$ is a tuning constant.

The tuning constant may be used to calculate values at the source point only. This is because at the source point, when the distance d=0, an error would occur by causing the system to calculate a value divisible by 0. Therefore, the function is modified at the source point to make d=1 at the source point.

For example, as shown in FIG. 11D, values of V are shown where V is calculated from the modified IDW method on the vertical line X=7 (plotted vs. Y). That is, the distance d=0 at Y=1, 9 and 10 (for x=7) as can be seen in the above table at data points (x6,y6), (x7,y7) and (x8,y8). Therefore a tuning constant b has been selected to be a constant 0.5 when y=1, and a value of 0.1×V (i.e. 10% of V) when y=9 or 10. This ensures that erroneous values are not calculated by causing the system to compute numbers divisible by 0.

Radius Effect Example

As an alternative to the IDW example described above, a further IDW example is provided that incorporates a radius effect to calculate the weight factor as described below.

According to this example, the radius effect may be used to calculate the weight factor $W_i$. The radius value R is calculated based on the direct radial distance to the furthest point. That is, it is calculated by determining the distance for all points by taking the square root of the sum of the squares of the x and y difference values, and using the largest of these distance values. For example, the radius value between points x,y (5,5) and x8,y8 (7,10) is the square root of $(5-7)^2+(5-10)^2=5.385165$, as shown in the table below.

The weight factor is calculated as follows using the calculated R value:

$$W_i = \frac{\left(\frac{R - d_i}{R d_i}\right)^2}{\sum_{j=1}^{n}\left(\frac{R - d_j}{R d_j}\right)^2}$$

where R=max($d_i$)=distance between (X, Y) and the farthest point ($X_i$, $Y_i$)

Therefore, the weight given to the furthest point is 0, whereas the weight given to points as they approach X,Y increases up to a maximum value of 1. The weight value W for each point is normalized against the total of the $R_d$ column in the table below, calculated by the formula:

$$R_d = \left(\frac{R - d_i}{R d_i}\right)^2.$$

FIG. 11E shows the value R on the plot of the surface points, and shows the distance of the farthest surface point to the interpolation point.

FIG. 11H shows the distances of (X,Y) from the surface points.

FIG. 11I shows an IDW method using radial effect.

FIG. 11J shows the surface points and interpolation point (X,Y).

The value of R for the data used in the first IDW example 1 above is R=5.39 for point x8,y8. This is the maximum value in the d column for each of points x1,y1 through to x10,y10 in the following table. The calculated V at (5,5) is therefore 51.83, which is the sum of the weighted V values VW for each of the points x1,y1 through to x10,y10.

The sum of the weights is equal to one, and W is defined in the example shown as $R_d/0.295797=W$ (where $0.295797=\text{sum of } R_d$)

|        | X | Y  | V  | d        | $R_d$    | W        | VW       |
|--------|---|----|----|----------|----------|----------|----------|
| x1, y1 | 2 | 7  | 70 | 3.605551 | 0.008401 | 0.0284   | 1.987992 |
| x2, y2 | 2 | 9  | 61 | 5        | 0.000205 | 0.000692 | 0.042198 |
| x3, y3 | 3 | 1  | 47 | 4.472136 | 0.001437 | 0.004859 | 0.228373 |
| x4, y4 | 6 | 6  | 64 | 1.414214 | 0.27187  | 0.91911  | 58.82306 |
| x5, y5 | 6 | 10 | 19 | 5.09902  | 0.000109 | 0.000367 | 0.006975 |
| x6, y6 | 7 | 1  | 0  | 4.472136 | 0.001437 | 0.004859 | 0        |
| x7, y7 | 7 | 9  | 52 | 4.472136 | 0.001437 | 0.004859 | 0.252668 |
| x8, y8 | 7 | 10 | 40 | 5.385165 | 0        | 0        | 0        |
| x9, y9 | 8 | 2  | 52 | 4.242641 | 0.002501 | 0.008454 | 0.439613 |
| x10,y10| 8 | 3  | 48 | 3.605551 | 0.008401 | 0.0284   | 1.363194 |
| x, y   | 5 | 5  | Total | | 0.295797 | 1 | 63.14407 |
|        |   |    | R 5.385165 | | | | |

As an alternative, the weighting module may apply a function of the distance from the source points to the output to take into account that the surface should preferably drop off between known data points. For example, an interpolation piecewise function may be used as described in the fifth embodiment below.

As a further alternative, the system may use an adapted interpolation module that is controlled using a Kriging algorithm (for example, see) en.wikipedia.org/wiki/Kriging.

Smoothing Step

According to this embodiment, the smooth approximation is implemented by the smoothing module by applying functions of increasing accuracy to the input data. The function applied to the input data is the method of least squares polynomials of increasing degrees that is applied to the input data. The output of the smoothing module is then provided to the surface combining module.

Smoothing Alternatives

However, there may be situations where the least squares polynomials method may provide a poor fit to the data, depending on the type of data being analyzed, in which case an alternative algorithm described below may be implemented by the smoothing module by using a least squares approximation using a Radial Basis Function (RBF) Network as described below.

An RBF network (Landasse et al., 2003; Wang and Liu, 2002) with three layers (input layer 1101, a hidden layer of non-linear RBF functions 1103, and a linear output layer 1105) is shown in FIG. 11K. The RBF network looks very similar to neural networks; neural networks in fact can use radial basis functions in its hidden layer.

$$\hat{V}(\underline{x}) = \sum_{j=1}^{m} w_j \rho(\|\underline{x} - \underline{c}_j\|)$$

where $m$ = number of components (neurons) in the hidden layer $\underline{c}_j$ = center vector for $j$-th neuron $w_j$ = weight of $j$-th neuron in the output $\|\underline{x} - \underline{c}_j\|$ = Euclidean distance $\rho(.)$ = radial basis function Any of the following radial basis function $\rho(\cdot)$ can be used in the RBF network:

$$\phi(r_j) = \exp(-\beta r_j^2) \quad \text{(Gaussian)}$$

$$\phi(r_j) = \sqrt{r_j^2 + \beta^2} \quad \text{(Multiquadric)}$$

$$\phi(r_j) = r_j^2 \ln(r_j) \quad \text{(Thin plate spline)}$$

where $r_j = \|\underline{x} - \underline{c}_j\|$ and $\beta > 0$ is a constant.

Least Squares Approximation by RBF:

An RBF network may be used by the system to implement the smoothing step in the smoothing module as described below. The system controls the smoothing module to make the required calculations, as follows As there is usually no obvious choice for centers; the width $\beta$, and the centers $\underline{c}_j$ are obtained first using steps 1 and 2 below, and then the weights $w_j$ are determined by training the network as shown in step 3 below.

That is, the smoothing module is controlled to perform the following three steps:

Step 1) Determining the Centers $\underline{c}_j$

Centers for the basis functions can be randomly generated, or cluster analysis (Johnson and Wichern, 2002) can be used on the sample points and their centroids can be used as the centers $\underline{c}_j$.

Step 2) Determining the Widths $\beta_j$ $\beta_j = \beta = \max \|\underline{c}_j - \underline{c}_j\|$ = maximum separation between the cluster means.

Step 3) Determining the Weights $w_j$

After the center and the widths of the basis functions are determined, the weights can be obtained from the equation $\underline{w} = G^+ \underline{V}$ where $G^+$ is a pseudoinverse of G, and the n×m matrix G is given by $$G = (g_{ij}) = \rho(\|\underline{x}_i - \underline{c}_j\|)$$

An example of an output produced by the smoothing module arranged to perform least-squares approximation of a function of one variable on the data is shown in FIG. 11L. The example was created using a JAVA applet available at lcn.epfl.ch/tutorial/english/rbf/html/index.html.

In FIG. 11L, the blue circles 1107 are the data points to be approximated, the 10 Gaussian curves 1109 shown in the bottom panel are the Gaussian basis functions with common width 1, and 10 equally spaced centers are being used. In the top panel, the Gaussian curves 1111 shown in green are the individual Gaussian functions multiplied by their respective weights, and the red curve 1113 is the least-squares approximation using the RBF network.

The system performs the following calculations:

Given n data points $(\underline{x}_i, V_i)$, i=1, 2, ..., n, where $\underline{x}_i=(x_{1i}, x_{2i})$ is a point in a 2D plane, compute (a) an interpolating function for use in the interpolation module, where the function is $\hat{V}=f(x_1,x_2)$ that passes through the n given points. Either the IDW method or an RBF network can be used for this interpolation step.

(b) a smoothing function for use in a smoothing module, where function approximations $\hat{V}_{2k}$ minimize the sum of squares of errors based on the following equation $$\sum_{i=1}^{n}(\hat{V}_{2i} - V_i)^2,$$

(least squares polynomials of degrees 1, ... k, or least squares RBF with 3, ..., k hidden layers may be used)

It will be understood that steps a) and b) above may be implemented by the interpolating and smoothing modules at separate times or simultaneously.

(c) compute a combined surface using the surface combining module from the expression:

$$h(\underline{x}) = a(\underline{x})\hat{V}_1 + \sum_{all\,k} b_k(\underline{x})\hat{V}_{2k}$$

where $a(\underline{x})$ and $b_k(\underline{x})$ are weights assigned to the interpolating function and the least squares approximations, respectively, with $a(\underline{x})=1$, and $b_k(\underline{x})=0$ if $\underline{x}=\underline{x}_i$, i=1, 2, ..., n, and $$a(\underline{x}) + \sum_{all\,k} b_k(\underline{x}) = 1$$

As an alternative, a further step b2 may be applied by the smoothing module, where additional zero data points may be added to the data set to encourage the smoothing line to drop to zero when the smoothing moves away from the source points.

As a further alternative, a least squares smoothing function may be obtained by using a computer search method to estimate the coefficients of the smoothing function.

Interpolation Alternatives

As an alternative for the interpolation step, the RBF network may also be used to implement the interpolation step in the interpolation module as described below. The system controls the interpolation module to make the required calculations, as follows.

Given n data points $(\underline{x}_i, V_i)$, i=1, 2, ..., n, where $\underline{x}_i=(x_{1i}, x_{2i})$ is a point in 2D plane, find an interpolating function $V_1 = f(x_1, x_2)$ that passes through the n given points. Taking $\beta=1$ and centers $\underline{c}_j$ to be the given points $\underline{x}_j = (x_{1i}, x_{2i})$ the interpolating equations can be expressed as $$V_i = \sum_{j=1}^{n} w_j \rho(\|\underline{x}_i - \underline{c}_j\|) = \sum_{j=1}^{n} w_j \rho(\|\underline{x}_i - \underline{x}_j\|) = \sum_{j=1}^{n} w_j g_{ij}$$

or $$w_1 g_{11} + w_2 g_{12} + \ldots + w_n g_{1n} = V_1$$
$$w_1 g_{21} + w_2 g_{22} + \ldots + w_n g_{2n} = V_2$$
$$\ldots$$
$$w_1 g_{n1} + w_2 g_{n2} + \ldots + w_n g_{nn} = V_n$$

which can be expressed in matrix notation as $G\underline{w} = \underline{V}$, with $G_{n \times n} = (g_{ij})$ is an n×n matrix and $\underline{V}$ is the n×1 column vector of V-values. The weights $w_j$ can be obtained from the following equation:

$$\underline{w} = G^{-1}\underline{V}$$

Note: The matrix G is known to be non-singular and hence it has an inverse.

In an embodiment where the smoothing and interpolation are performed by the smoothing and interpolation modules using an RBF network, it will be understood that the modules may be combined to produced the outputs simultaneously.

As shown in FIG. 11M, three plots (1, 2 and 3) are shown depicting graphically how the final surface is created. In plot 1, data points 1001A are located, and a smoothed line 1003A based on the data points is plotted underneath the data points.

In plot 2, an interpolated function is applied to the data points to produce the interpolated line 1005A.

In plot 3, the lines 1003A and 1005A are combined or accumulated with appropriate weightings to produce a surface that shows the fine details 1007A, and the general detail 1009A associated with the data points.

Second Embodiment

Figure 11R:
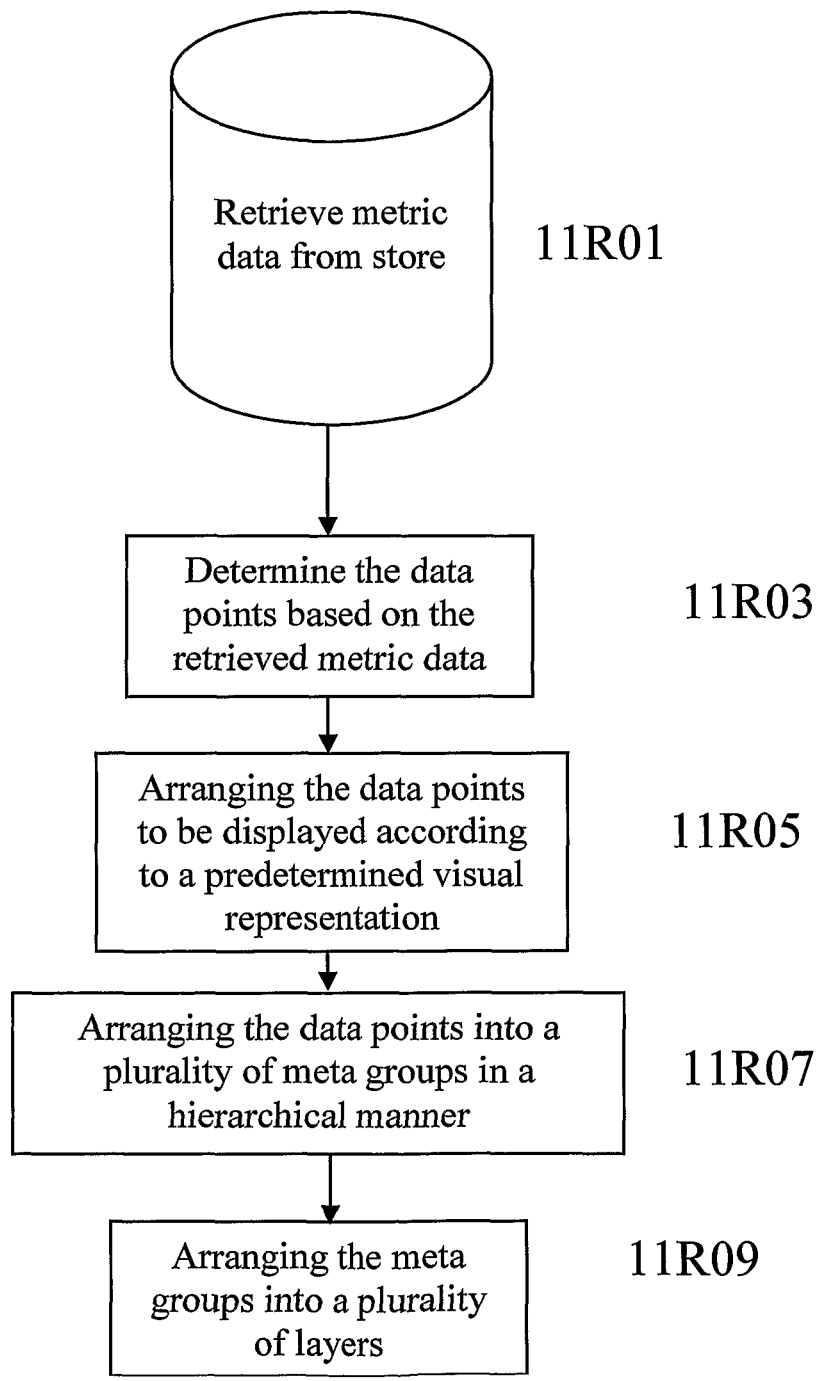
FIG. 11R shows a conceptual system diagram according to a further embodiment of the present invention.

In a second embodiment, the data visualization system 11R101 as shown in FIG. 11R includes a data retrieval module 11R102 arranged to retrieve data from a data store 11R103. Further, a surface cumulating module 11R104 is controlled to produce a cumulative surface. For example, each source point has applied to it a drop off function, for example, a function that produces a conic drop off, and the surface cumulating module 11R104 is arranged to combine or accumulate the drop off functions to provide a cumulative surface.

The resultant cumulative surface is then analyzed using a residual surface module 11R105 to produce residuals and a residual surface.

The residuals are produced by the residual surface module 11R105 by calculating the difference value between the cumulative surface output from the surface cumulating module 11R104 and the actual source points. These residuals are then used by the residual surface module 11R105 to generate the residual surface by applying an IDW function to the residuals.

Finally, the outputs from the residual surface module 11R105 and surface cumulating module 11R104 are weighted by a weighting module 11R107 to produce two weighted outputs (one a weighted cumulative surface, and the other, a weighted residual surface). These two weighted surfaces are then combined using a surface combining module 11R109.

The output of the surface combining module 11R109 is provided to a rendering module 11R111 that is arranged to render the data in any suitable required format, and forward the rendered data to an output module 11R113, such as a display device or printer. The combination of these two surfaces effectively provides dimples in the cumulative surface that touch on or pass through (depending on the weighting values) the source points, to provide an overall view of the data along with a detailed view around the source points.

A further example is now provided as follows.

Step 1

A surface is generated by the surface cumulating module using a simple cumulative function.

As an example: Function (cumulative)=(the effect of a source point)/(distance function1)

The effect of a source point here may be the sum of the surrounding source points. This creates a surface that is often above the value of the source points.

Step 2

A secondary process is applied with distance function2 where distance function2 is typically>than distance function1. That is, distance function2 is a higher order function than distance function1. This secondary process adjusts the surface created in step 1 by creating local dimples in the surface such that the bottom of the dimple is a local minima that touches, or passes through, the source points.

Optionally, the system may include a further step before step 2 (step 1a), wherein the system thresholds the surface created by step 1 so that the surface is forced not to go above the highest source point.

Further, other decay functions or higher order functions may be used as an alternative for step 1a.

A further detailed example of how the system creates a surface according to this embodiment is now provided.

The system generates the surface as follows:

1. Create a cumulative surface using the surface cumulating module, where the surface falls above the given points by using the following expression:

$$\hat{V}_1(x, y) = \sum_{\text{all points } P_j \text{ within distance } r \text{ of point } P} (w_i V_i)$$

where $$w_i = \frac{(a + dist(P, P_j))^{-1}}{\sum_{j=1}^{k} (a + dist(P, P_j))^{-1}}$$

a is a positive constant and dist $(P, P_j)$ is a distance function between the points P and $P_j$.

2. Compute residuals using the residual surface module by applying the following expression $e_i = V_i - \hat{V}_1(x_i, y_i)$. That is, by subtracting the surface obtained in Step 1 (which falls above the known values, and hence is not an interpolating surface) from the known values Vi, the residual values are calculated. Note that all residuals will be negative.

3. Create a surface for the residuals computed in Step 2 using the residual surface module by applying the following function, as follows:

$$\hat{V}_2(x, y) = \sum_{\text{all points } P_j \text{ within distance } r \text{ of point } P} (u_i e_i)$$

where $$u_i = \frac{(b + dist(P, P_i))^{-x}}{\sum_{j=1}^{k} (b + dist(P, P_j))^{-x}},$$

where x is a positive number, b is a positive constant, b<a, and $u_i$ are another set of weights>$w_i$, so that the sum of the weights is =1. That is, the residual surface module applies an IDW method to the residual points to create the residual surface.

4. The final surface is created by adding the residuals (weighted) from Step 3 to the surface (weighted) computed in Step 1 using the surface combining modules and weighting modules.

As shown in FIG. 10B, three plots (1, 2 and 3) are shown depicting graphically how the final surface is created. In plot 1, data points 1011 are located, and a smoothed line 1013 based on the data points is plotted above the data points.

In plot 2, an interpolated function is applied to residual points to produce the interpolated line 1015, or residual surface. That is, the line 1014 in plot 2 represents the smoothed line 1013, and the line 1015 represents the difference between the smoothed line 1013 and the data point values.

In plot 3, the lines 1013 and 1015 are combined or accumulated with appropriate weightings to produce a surface that shows the fine details 1017, and the general detail 1019 associated with the data points.

Third Embodiment

In a third embodiment, the system generates the surface using a three step process wherein a first step includes generating a surface that has primary smoothing, a second step includes secondary smoothing adjustments in order to get a smoother surface, and a third step includes a final interpolation adjustment that makes the surface pass exactly through the data points The first smoothing step may be calculated with a very large radius, for example (more smoothing is applied), whereas subsequent smoothing may use a smaller radius in order to show finer smoothed details. Using this process may on some datasets reduce the visual anomalies caused by varying densities in data points.

The system modules as described, above and in FIG. 11Q may be used to implement the following steps.

Step 1

The smoothing module is used to apply a primary smoothing step to the input data to create a surface that is near to the source points. A function, such as a weighting function, may then be applied, using a weighting module, to the primary surface to lower the surface so that the entire surface is less than or equal to the source points.

Step 2

This process is repeated with secondary smoothing functions where functions created a smoothed surface to reduce the difference between the surface and source points. As in the primary smoothing technique, a function such as a weighting function is applied to ensure the adjustments are below the actual surface.

Step 3

Finally the interpolation module applies an interpolation surface to create local minima and maxima that are used to display the surface.

According to this embodiment, a surface that shows local minima and maxima is created by the system applying the following steps:

1. A smooth approximating polynomial or a smooth approximating RBF network (such as by using the method of least squares) is first obtained using the smoothing module.

2. The smooth surface of Step 1 is multiplied by a constant $c1<1$ so that the entire (adjusted) smooth surface is below the known points.

3. A second higher order smoothing function is applied to the surface of step 2, by applying a weighted smoothing function to the source data and the surface of the reduced surface generated in step 2. This ensures that the resultant smoothed surface is closer to the source points.

4. This smooth surface of step 3 is multiplied by a constant $c2<1$ so that the entire (adjusted) smooth surface is below the known points.

5. The residuals are calculated by the residual surface module by subtracting the surface obtained at Step 4 from the known points $V_i$, and then a least squares polynomial or a least squares RBF network is fitted to these residuals to produce an interpolated surface.

6. The surface for residuals is then added back to the smooth surface obtained in Step 4 using the surface combining module and a final interpolation surface is applied using an IDW technique, for example.

As shown in FIG. 10C, six plots (1, 2, 3, 4, 5 and 6) are shown depicting graphically how the final surface is created.

In plot 1, data points 1021 are located, and a smoothed line 1023 using a first smoothing function is plotted around the data points.

In plot 2, the smoothed line 1023 is lowered below the data points.

In plot 3, a second smoothed line 1025 using a second smoothing function applied to the line 1023 is plotted.

In plot 4, the second smoothed line 1025 is lowered below the data points.

In plot 5, an interpolated function is applied to residual points to produce the interpolated line 1027, or residual surface. That is, the line 1026 in plot 5 represents the smoothed line 1025, and the line 1027 represents the difference between the smoothed line 1025 and the data point values.

In plot 6, the lines 1025 and 1026 are combined or accumulated with appropriate weightings to produce a surface that shows the fine details 1029, and the general detail 1031 associated with the data points.

Fourth Embodiment

In a fourth embodiment the system generates the surface using similar processes to the third embodiment. However, in this embodiment, the constants applied to the smoothed surfaces are >1 so that the smoothed surfaces appear above the data points. Subsequently, the residual surface is added to the smoothed line to create dimples in the surface.

Therefore, the system applies several processes whereby in a first step a smoothing module generates a surface that has primary smoothing, a second step whereby a smoothing module generates secondary smoothing adjustments and a third step where an interpolation module makes a final interpolation adjustment using calculated residuals.

Step 1

The primary smoothing step creates a surface that is near to the source points. The surface may be either above or below the source points Step 2

This process is repeated with secondary smoothing functions where functions create a smoothed surface to reduce the difference between the surface and source points.

Step 3

Finally an interpolation surface is applied to create local minima and maxima that are used to display the surface. In this embodiment the primary and secondary surfaces may be above the source points.

In the following example of this embodiment, the system creates a surface that shows local minima and maxima using the following steps:

1. A smooth approximating polynomial or a smooth approximating RBF network (such as by using the method of least squares) is first obtained.

2. The smooth surface of Step 1 is multiplied by a constant $c1>1$ so that the entire (adjusted) smooth surface is above the known points.

3. A second higher order smoothing function is applied to the surface of step 2 by applying a weighted smoothing function to the source data and the surface of the reduced surface generated in step 2. This ensures that the resultant smoothed surface is closer to the source points.

4. This smooth surface of step 3 is multiplied by a constant $c2>1$ so that the entire (adjusted) smooth surface is above the known points 5. The residuals are calculated by subtracting the surface obtained at Step 4 from the known points $V_i$ 6. The residuals are then added back to the surface obtained in step 4 and a final interpolation surface is applied using an IDW technique, for example.

As shown in FIG. 10D, six plots (1, 2, 3, 4, 5 and 6) are shown depicting graphically how the final surface is created.

In plot 1, data points 1033 are located, and a smoothed line 1035 using a first smoothing function is plotted around the data points.

In plot 2, the smoothed line 1035 is raised above the data points.

In plot 3, a second smoothed line 1037 using a second smoothing function applied to the line 1035 is plotted.

In plot 4, the second smoothed line 1037 is raised above the data points.

In plot 5, an interpolated function is applied to residual points to produce the interpolated line 1039, or residual surface. That is, the line 1040 in plot 5 represents the smoothed line 1037, and the line 1039 represents the difference between the smoothed line 1037 and the data point values.

In plot 6, the lines 1037 and 1039 are combined or accumulated with appropriate weightings to produce a surface that shows the fine details 1041, and the general detail 1043 associated with the data points.

Fifth Embodiment

According to this embodiment, the system uses similar modules as described with reference to FIG. 11Q, where the interpolation module is adapted to apply a series of gravity models and the smoothing module is adapted to smooth using a cubic process. The smoothed surface and interpolated surface are combined to yield a smooth surface that is also capable of showing local minima and maxima.

For example, the interpolation steps carried out by the interpolation module of the third and fourth embodiments above may be replaced by the interpolation module and steps described in this embodiment.

The interpolation module is adapted to implement various embodiments through the use of a combination of multiple order gravity models. In these gravity model embodiments, a series of gravity models with different P-values may be used (say $P_1, P_2, P_k$), where, as the P value increases, the order increases from low to high.

A weighted average of the resulting k surfaces is then calculated by the interpolation module to form a Composite (Cumulative) Surface made up of a combination or accumulation of multiple component surfaces. For example, as shown in FIG. 11F, three surfaces, 1, 2 and 3 from a low, to medium to high order are shown that may be combined or accumulated, using appropriate weighting, to form a cumulative resultant surface.

It will be understood that, as an alternative, an interpolated function other than weighted average may be used, such as, for example, an average or linear function.

Gravity Model Example 1

In this example, the interpolation module implements an IDW model as the gravity model. That is, the interpolation module receives the input data from the data retrieval module, and applies a gravity model to the input data to produce the required output surface. The output of the interpolation module is forwarded to a rendering module to produce an output on an output device, in the same manner as described above.

The following portion of the description provides a first example of how the gravity model is applied using the interpolation module.

Two surfaces are produced by the interpolation module, a first surface V1 having a lower order of P=2 and the second surface V2 having a higher order of P=3. These two surfaces are combined to produce the output surface.

The terms higher and lower order are used in this description in the same sense as it is used in relation to polynomial functions, in that a higher order interpolated surface depicts a higher rate of change of the interpolated data than that of a lower order interpolated surface. For example, a lower order function may produce a line, whereas higher order functions may produce a gradient, or a rate of change of a gradient etc.

In the following example, there are 2 surfaces (k=2) that are to be combined, where the P value for surface 1, $P_1$, =2, and the P value for surface 2, $P_2$, =3;

The interpolation module applies IDW weights using $P_1$=2 and $P_2$=3 as follows:

$$W'_{1i} = \begin{cases} 1 + b_i & \text{if } d_{2,i} = 0 \\ \dfrac{d_{2,i}}{\sum_{j=1}^{n} d_{2,j}} & \text{if } d_{2,i} \neq 0 \end{cases}$$

$$W'_{2i} = \begin{cases} 1 + b_i & \text{if } d_{3,i} = 0 \\ \dfrac{d_{3,i}}{\sum_{j=1}^{n} d_{3,j}} & \text{if } d_{3,i} \neq 0 \end{cases}$$

where $b_i$ is the tuning constant.

The composite IDW surface is then calculated by the interpolation module by using a weighted average of the two IDW surfaces V1 and V2 as follows:

$$V = \alpha \sum_{i=1}^{n} W'_{1i} V_{1i} + (1-\alpha) \sum_{i=1}^{n} W'_{2i} V_{2i}$$

where a is weight for the first surface V1 and (1-a) is the weight for the second surface V2, such that the total weight applied to the two IDW surfaces is equal to one. That is, the interpolation module produces an output surface V that is a weighted sum of a first weighted IDW surface combined with a weighted sum of a second weighted IDW surface.

It will be understood that, as an alternative, modules separate from the interpolation module may be used to apply weights and combine the surfaces, such as a surface combining module and weighting module.

Gravity Model Example 2

A second example of how an interpolation module may be adapted to perform an alternative gravity model is now provided to show how the system may be used to produce a further example of a surface. Data used for this example is shown in the table below, where J indicates nodes 1 to 8 in a data set, X and Y indicates the axis position of each node and V indicates the value for that data point.

| J | X | Y | V |
|---|---|---|---|
| 1 | 7 | 8 | 466 |
| 2 | 7 | 8.5 | 560.375 |
| 3 | 7 | 9 | 200 |
| 4 | 7 | 9.5 | 180 |
| 5 | 7 | 10 | 600 |
| 6 | 7 | 24 | 440 |
| 7 | 7 | 27 | 470 |
| 8 | 7 | 30 | 700 |

It can be seen that, in this data set, there is a wide gap between Y=10 and Y=24. In order to compensate for this gap, i.e. to ensure that the surface produced accurately depicts the gap, an interpolation piece wise function is implemented The interpolation piecewise function f1(Y) is used by the interpolation module as follows:

The interpolation module applies the IDW method for f1(Y) for the following values:

$8 \leq Y \leq 10$ and $24 \leq Y \leq 30$.

The interpolation function f1(Y) in the range $10 \leq Y \leq 24$ is selected so that it has a bathtub shape for the gravity model to indicate that there are no values V associated for Y values between 10 and 24.

The interpolation module may automatically adapt for different data sets in the input data set by detecting which portions of the data set are not associated with any values, such as the range in the above data set for Y between 10 and 24.

The interpolation function f1(Y) used in this example in the range $10 \leq Y \leq 24$ is calculated as follows:

$$f1(Y) = \begin{cases} (Y-17)^4/4.001666667, & 10 \leq Y \leq 17 \\ (Y-17)^4/5.456818182, & 17 < Y \leq 24 \end{cases}$$

In this example, the value 17 has been selected by the interpolation module as it is the half way point between 10 and 24, and the function f1(Y) is being applied over two portions of the data set.

It will be understood that more steps may be applied depending on how large the data gap is in the data and how the data is apportioned.

A first constant value (4.001666667) in the function f1(Y) is calculated by inserting an end point value of Y=10 into the function and calculating a constant value that results in the equation $(Y-17)^4/\text{cons tan t}=600$, where 600 is the value of V at Y=10.

A different constant value for the function f1(Y) is calculated in the same manner for the other end point where Y=24, i.e. where V=440.

For smoothing, the smoothing module produces a least squares smooth surface of the V values by fitting a cubic equation in Y to the V-values as follows.

Values for Y=11, 12, . . . , 23 are added to the data set by the smoothing module by detecting where there are missing values form the input data set. The smoothing module then applies a V value of V=0 for each of the additional data points added to the data set, i.e. where Y=11 to 23.

A least squares method is used to fit a cubic equation to the V values. For example, the following model was obtained using a statistical software package to apply a least squares method to the Y and V values:

$$f2(Y) = 2279 - 320Y + 13.14Y^2 - 0.1403Y^3$$

It will be understood that the smoothing module may apply different smoothing models depending on the input data being analyzed, where the smoothing module may be automatically calculated using any suitable known statistical software package.

A weight function w(Y) as shown in the table below is calculated using a weighting module as follows:

$$w(Y) = \begin{cases} 1 - \frac{2(Y - Y_j)}{(Y_{j+1} - Y_j)}, & Y_j \leq Y \leq m_j \\ -1 + \frac{2(Y - Y_j)}{(Y_{j+1} - Y_j)}, & m_j \leq Y \leq Y_{j+1} \end{cases}, \quad j = 1, 2, 3, 4, 6, 7, 8$$

where $$m_j = \frac{Y_j + Y_{j+1}}{2}$$

is the middle point of the interval $[Y_j, Y_{j+1}]$.

Here $Y_1=8, Y_2=8.5, Y_3=9, \ldots, Y_7=27, Y_8=20$.

That is, the weight function w(Y) is chosen so as to put more weight on f1(Y) near the above 8 nodes (J=1 to 8), and less weight on the smooth function f2(Y). The weight function inside the interval [10, 24], i.e., for j=5, is 1.

The final surface V_hat is calculated by combining or accumulating the two surfaces f1(Y) and f2(Y) using a surface combining module where:

$$V\_hat = w(Y)f1(Y) + [1 - w(Y)]f2(Y).$$

That is, the final surface output by the interpolation module is a sum of the weighted functions f1(Y) and f2(Y), where f1(Y) is a piecewise interpolated function adapted to operate over different portions of the data set based on the data values in those portions, and f2(Y) is a smoothing function applied to the data points.

The following table shows values calculated using the above processes.

| Y | f1(y) | f2(y) | w(Y) | V_hat |
|---|---|---|---|---|
| 8 | 466 | 488.1264 | 1 | 466 |
| 8.1 | 471.5515 | 474.5542 | 0.6 | 472.7526 |
| 8.2 | 495.0385 | 461.1767 | 0.2 | 467.949 |
| 8.3 | 531.3365 | 447.9929 | 0.2 | 464.6616 |
| 8.4 | 554.8235 | 435.002 | 0.6 | 506.8949 |
| 8.5 | 560.375 | 422.2033 | 1 | 560.375 |
| 8.6 | 539.1765 | 409.5957 | 0.6 | 487.3442 |
| 8.7 | 449.4904 | 397.1786 | 0.2 | 407.641 |
| 8.8 | 310.8846 | 384.9511 | 0.2 | 370.1378 |
| 8.9 | 221.1985 | 372.9122 | 0.6 | 281.884 |
| 9 | 200 | 361.0613 | 1 | 200 |
| 9.1 | 198.8235 | 349.3974 | 0.6 | 259.0531 |
| 9.2 | 193.8462 | 337.9197 | 0.2 | 309.105 |
| 9.3 | 186.1538 | 326.6273 | 0.2 | 298.5326 |
| 9.4 | 181.1765 | 315.5195 | 0.6 | 234.9137 |
| 9.5 | 180 | 304.5953 | 1 | 180 |
| 9.6 | 204.7059 | 293.8539 | 0.6 | 240.3651 |
| 9.7 | 309.2308 | 283.2946 | 0.2 | 288.4818 |
| 9.8 | 470.7692 | 272.9164 | 0.2 | 312.4869 |
| 9.9 | 575.2941 | 262.7185 | 0.6 | 450.2639 |
| 10 | 600 | 252.7 | 1 | 600 |
| 10.5 | 446.0798 | 205.2702 | 1 | 446.0798 |
| 11 | 323.8651 | 162.2007 | 1 | 323.8651 |
| 11.5 | 228.6703 | 123.3862 | 1 | 228.6703 |
| 12 | 156.1849 | 88.7216 | 1 | 156.1849 |
| 12.5 | 102.4729 | 58.10156 | 1 | 102.4729 |
| 13 | 63.97334 | 31.4209 | 1 | 63.97334 |
| 13.5 | 37.5 | 8.574388 | 1 | 37.5 |
| 14 | 20.24157 | −10.5432 | 1 | 20.24157 |
| 14.5 | 9.761558 | −26.0371 | 1 | 9.761558 |
| 15 | 3.998334 | −38.0125 | 1 | 3.998334 |
| 15.5 | 1.265098 | −46.5747 | 1 | 1.265098 |
| 16 | 0.249896 | −51.8288 | 1 | 0.249896 |
| 16.5 | 0.015618 | −53.8801 | 1 | 0.015618 |
| 17 | 0 | −52.8339 | 1 | 0 |
| 17.5 | 0.011454 | −48.7953 | 1 | 0.011454 |
| 18 | 0.183257 | −41.8696 | 1 | 0.183257 |
| 18.5 | 0.927738 | −32.162 | 1 | 0.927738 |
| 19 | 2.932112 | −19.7777 | 1 | 2.932112 |
| 19.5 | 7.158476 | −4.82196 | 1 | 7.158476 |
| 20 | 14.84382 | 12.6 | 1 | 14.84382 |
| 20.5 | 27.5 | 32.38296 | 1 | 27.5 |
| 21 | 46.91379 | 54.4217 | 1 | 46.91379 |
| 21.5 | 75.14681 | 78.61099 | 1 | 75.14681 |
| 22 | 114.5356 | 104.8456 | 1 | 114.5356 |
| 22.5 | 167.6916 | 133.0203 | 1 | 167.6916 |
| 23 | 237.501 | 163.0299 | 1 | 237.501 |
| 23.5 | 327.1252 | 194.7691 | 1 | 327.1252 |
| 24 | 440 | 228.1328 | 1 | 440 |
| 24.1 | 440.0356 | 234.9912 | 0.933333 | 426.366 |
| 24.2 | 440.1523 | 241.9095 | 0.866667 | 413.7199 |
| 24.3 | 440.3659 | 248.8869 | 0.8 | 402.0701 |
| 24.4 | 440.6936 | 255.9226 | 0.733333 | 391.4214 |
| 24.5 | 441.1538 | 263.0157 | 0.666667 | 381.7745 |
| 24.6 | 441.7647 | 270.1653 | 0.6 | 373.1249 |
| 24.7 | 442.5433 | 277.3706 | 0.533333 | 365.4627 |
| 24.8 | 443.5036 | 284.6308 | 0.466667 | 358.7715 |
| 24.9 | 444.6552 | 291.9451 | 0.4 | 353.0291 |
| 25 | 446 | 299.3125 | 0.333333 | 348.2083 |
| 25.1 | 447.5311 | 306.7323 | 0.266667 | 344.2786 |
| 25.2 | 449.2308 | 314.2036 | 0.2 | 341.209 |
| 25.3 | 451.0699 | 321.7255 | 0.133333 | 338.9714 |
| 25.4 | 453.0088 | 329.2973 | 0.066667 | 337.5448 |
| 25.5 | 455 | 336.9181 | 0 | 336.9181 |
| 25.6 | 456.9912 | 344.587 | 0.066667 | 352.0806 |
| 25.7 | 458.9301 | 352.3032 | 0.133333 | 366.5201 |
| 25.8 | 460.7692 | 360.0659 | 0.2 | 380.2065 |
| 25.9 | 462.4689 | 367.8741 | 0.266667 | 393.0994 |
| 26 | 464 | 375.7272 | 0.333333 | 405.1515 |
| 26.1 | 465.3448 | 383.6242 | 0.4 | 416.3124 |
| 26.2 | 466.4964 | 391.5643 | 0.466667 | 426.5326 |
| 26.3 | 467.4567 | 399.5466 | 0.533333 | 435.7653 |
| 26.4 | 468.2353 | 407.5703 | 0.6 | 443.9693 |
| 26.5 | 468.8462 | 415.6346 | 0.666667 | 451.109 |
| 26.6 | 469.3064 | 423.7386 | 0.733333 | 457.155 |
| 26.7 | 469.6341 | 431.8815 | 0.8 | 462.0836 |
| 26.8 | 469.8477 | 440.0625 | 0.866667 | 465.8763 |
| 26.9 | 469.9644 | 448.2806 | 0.933333 | 468.5188 |
| 27 | 470 | 456.5351 | 1 | 470 |
| 27.1 | 470.2732 | 464.8251 | 0.933333 | 469.91 |
| 27.2 | 471.1675 | 473.1498 | 0.866667 | 471.4318 |
| 27.3 | 472.8049 | 481.5083 | 0.8 | 474.5456 |
| 27.4 | 475.3179 | 489.8998 | 0.733333 | 479.2064 |
| 27.5 | 478.8462 | 498.3234 | 0.666667 | 485.3386 |
| 27.6 | 483.5294 | 506.7784 | 0.6 | 492.829 |
| 27.7 | 489.4983 | 515.2638 | 0.533333 | 501.5222 |
| 27.8 | 496.8613 | 523.7788 | 0.466667 | 511.2173 |
| 27.9 | 505.6897 | 532.3226 | 0.4 | 521.6695 |

-continued

| Y | f1(y) | f2(y) | w(Y) | V_hat |
|---|---|---|---|---|
| 28 | 516 | 540.8944 | 0.333333 | 532.5963 |
| 28.1 | 527.7386 | 549.4932 | 0.266667 | 543.692 |
| 28.2 | 540.7692 | 558.1183 | 0.2 | 554.6485 |
| 28.3 | 554.869 | 566.7689 | 0.133333 | 565.1822 |
| 28.4 | 569.7345 | 575.4439 | 0.066667 | 575.0633 |
| 28.5 | 585 | 584.1428 | 0 | 584.1428 |
| 28.6 | 600.2655 | 592.8645 | 0.066667 | 593.3579 |
| 28.7 | 615.131 | 601.6082 | 0.133333 | 603.4112 |
| 28.8 | 629.2308 | 610.3732 | 0.2 | 614.1447 |
| 28.9 | 642.2614 | 619.1585 | 0.266667 | 625.3193 |
| 29 | 654 | 627.9633 | 0.333333 | 636.6422 |
| 29.1 | 664.3103 | 636.7868 | 0.4 | 647.7962 |
| 29.2 | 673.1387 | 645.6282 | 0.466667 | 658.4664 |
| 29.3 | 680.5017 | 654.4865 | 0.533333 | 668.3613 |
| 29.4 | 686.4706 | 663.361 | 0.6 | 677.2267 |
| 29.5 | 691.1538 | 672.2508 | 0.666667 | 684.8528 |
| 29.6 | 694.6821 | 681.1551 | 0.733333 | 691.0749 |
| 29.7 | 697.1951 | 690.073 | 0.8 | 695.7707 |
| 29.8 | 698.8325 | 699.0036 | 0.866667 | 698.8553 |
| 29.9 | 699.7268 | 707.9463 | 0.933333 | 700.2748 |
| 30 | 700 | 716.9 | 1 | 700 |

FIG. 11G shows a plot of the values of f1(Y), f2(Y), and V_hat calculated in the above table for points on the vertical line X=7.

It will be understood that, as an alternative, gravity models may be applied to the input data using other functions. For example, a series of gravity models may be applied and a weighted average may then taken to obtain the final surface.

In one further example, a gravity model using $L_p$, Manhattan and Chebychev Distances is provided as follows:

Given n points $(P_i=(x_i, y_i)$ and the value of some function $V_i$, i=1, 2, . . . , n gravity models for the value of V at an unsampled point P=(x, y) can be created by the following equations:

$$\hat{V}_p(x, y) = \sum_{i=1}^{n} w_{pli} V_i, \; w_{li} = \frac{(d_p(P, P_i))^{-1}}{\sum_{i=1}^{n}(d_p(P, P_i))^{-1}}, \; p = 2, 3, 4, \ldots$$

$$\hat{V}_1(x, y) = \sum_{i=1}^{n} w_{1li} V_i, \; w_{li} = \frac{(d_1(P, P_i))^{-1}}{\sum_{i=1}^{n}(d_1(P, P_i))^{-1}}$$

$$\hat{V}_\infty(x, y) = \sum_{i=1}^{n} w_{\infty li} V_i, \; w_{li} = \frac{(d_\infty(P, P_i))^{-1}}{\sum_{i=1}^{n}(d_\infty(P, P_i))^{-1}}$$

Two different composite surface models may then be computed, for example, by using the following algorithms applied to the modules:

$$\hat{V}(x, y) = \sum_{p=2}^{4} \alpha_p \hat{V}_p(x, y), \; \alpha_p = 1/3,$$

composite surface using $L_p$ distances for p=2, 3, 4. $\hat{V}(x,y) = 0.5\hat{V}_1(x,y)+0.5\hat{V}_2(x,y)$, composite surface using $L_1$ and $L_\infty$ distances It can be seen that the various embodiments described herein may be used to solve various technical problems within a number of different industries.

For example, within a manufacturing environment that contains several work processes in different manufacturing lines, measurement data may be obtained from these processes that depicts the quality of the products being produced. For example, automatic testing procedures may be in place that analyse products being manufactured to see if they conform to the quality standards that the manufacturer adheres to. For example, the testing may be by way of making specific measurements on a physical product (for example. measuring the dimensions of a precise engineering product in use in a car engine), or measuring the output of a product (for example, the output of produced LEDs).

This measurement data may be used to determine a quality value associated with the manufactured products, where the quality value can be, for example, associated with specific product lines, specific manufacturing areas in a manufacturing environment, specific factories, regions or countries etc.

Embodiments of the herein described system enable a graphical visualization to be produced that can not only show the quality values for individual products at specific times, but also a general overall quality value for a whole manufacturing environment. This enables a user to see how well different individual aspects of the manufacturing environment are doing within the environment as a whole (for example, if certain work stations or areas in the factory are producing lower or higher quality products than average), as well as the overall picture of how well the whole environment is performing.

These results may be fed back into the manufacturing systems either automatically or manually to adjust how the systems operate to compensate for any consistent detected errors.

Causal Space Allocation

When visual representations are created, a user may wish to adjust variable data that has been used to form data elements within the representation to see how the overall representation is affected by that adjustment. By enabling a user to adjust the variable data directly through the graphical representation, the user gets a better understanding of how the data interacts with other data elements and also provides a greater insight into how those changes affect their business.

Figure 12A:
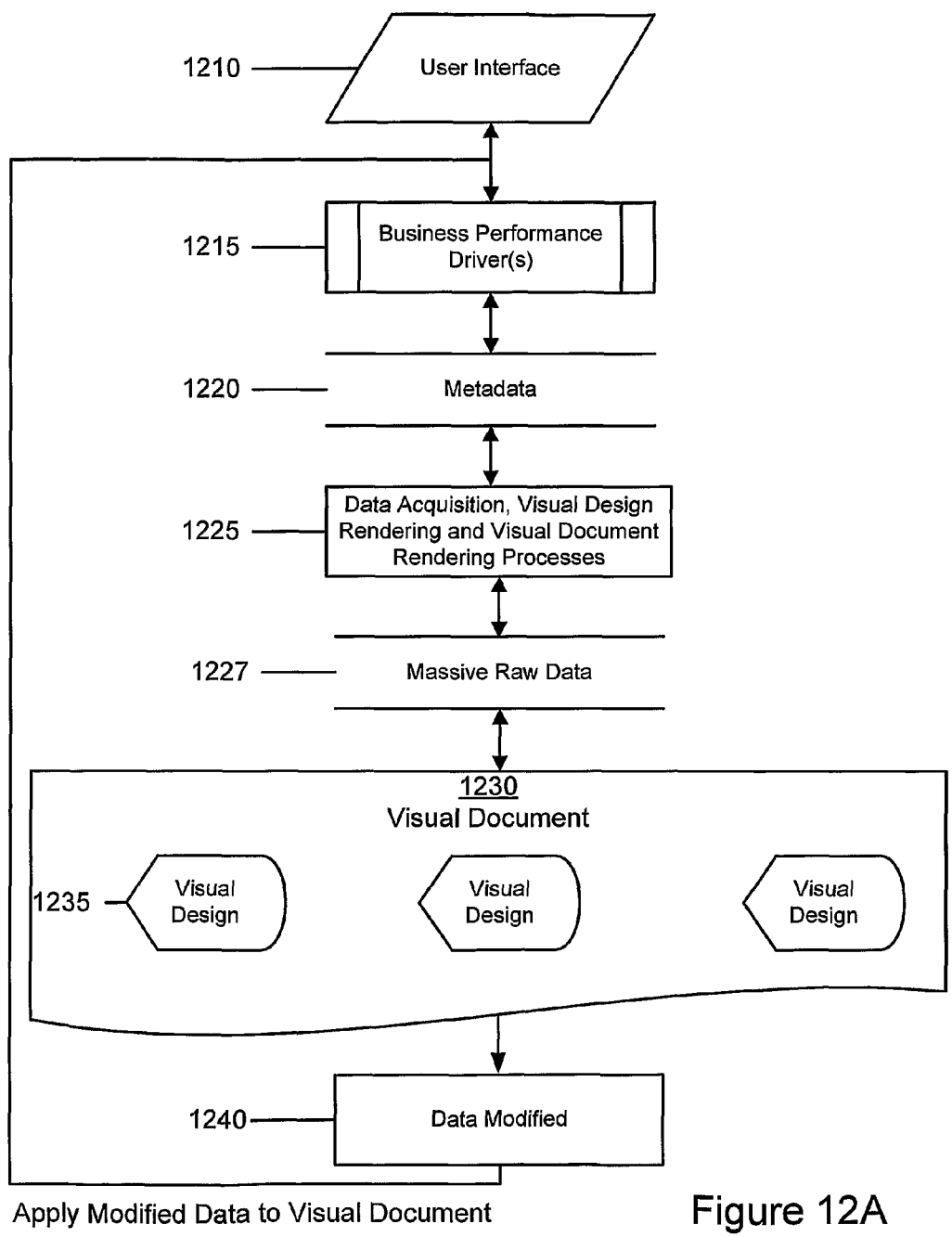
FIG. 12A shows the general flow of data according to an embodiment of the present invention.
Figure 12B:
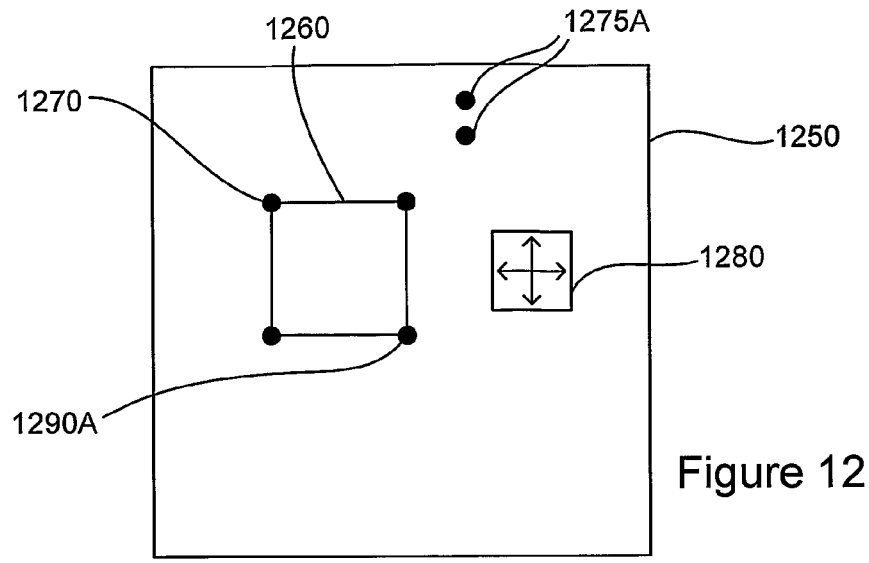
FIGS. 12B to D show an example of a spatial visual design according to an embodiment of the present invention.
Figure 12C:
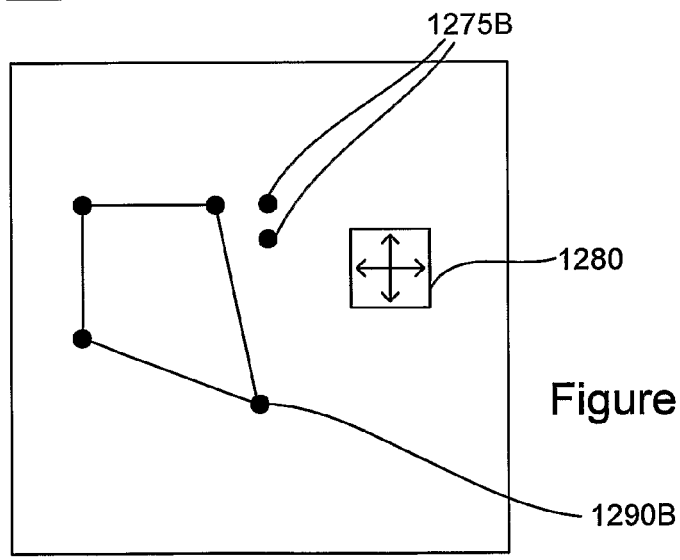
Figure 12D:
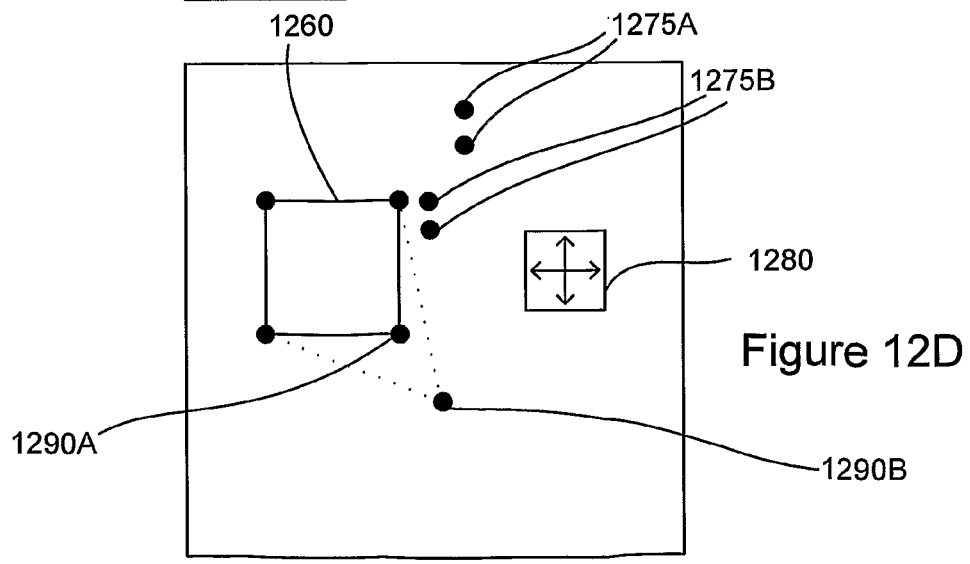
Figure 12E:
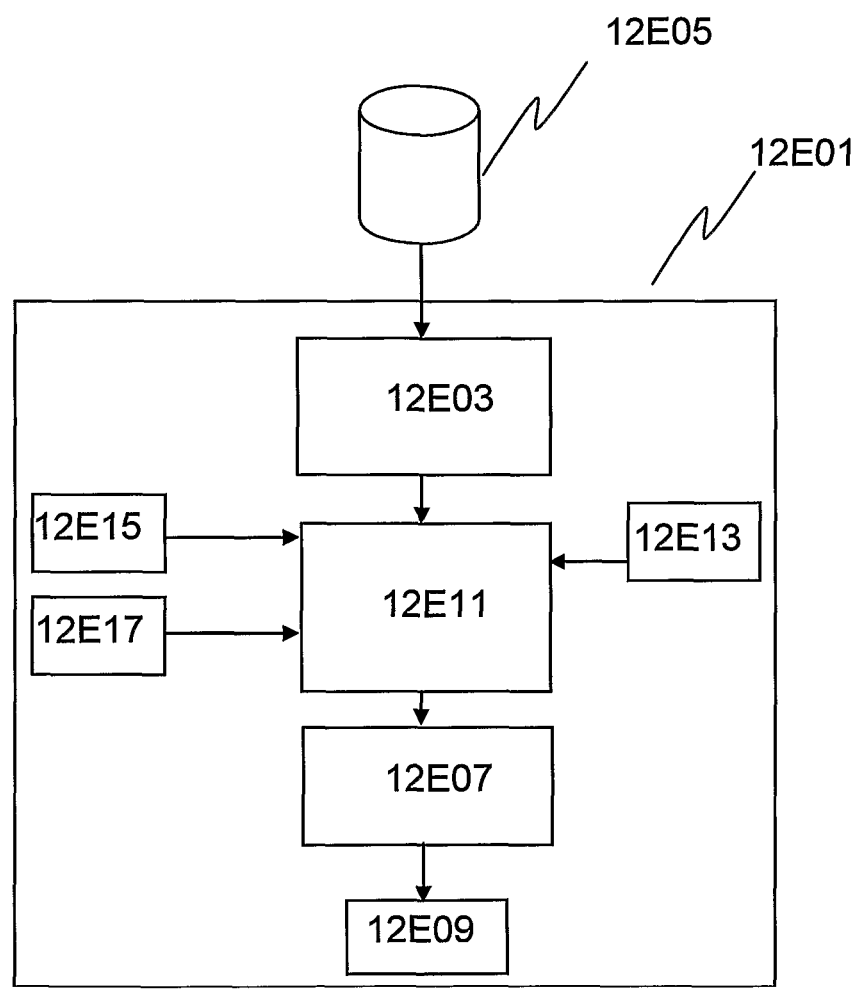
FIG. 12E shows a conceptual system diagram according to an embodiment of the present invention.

According to this embodiment there is shown in FIG. 12E a conceptual system diagram of a data visualization system 12E01 arranged to carry out a method of creating a visual representation of data.

The system 12E01 includes a data retrieval module 12E03 arranged to retrieve data from a data storage module 12E05.

The data retrieval module 12E03 is configured to enable the retrieval of data from the data storage module 12E05, which is in communication with the data visualization system. The data storage module 12E05 may be any suitable type of data storage system. For example, it may be an enterprise data warehouse (EDW), a data mart, a database, a storage array or any other suitable device or groups of devices that can store data for later retrieval. Further, the data storage module 12E05 may be a cache memory used to temporarily store incoming data captured in real time from an external source.

The system 12E01 further includes a display module 12E07 in communication with a display device 12E09 to provide a visual output and a processing module 12E11 to receive instructions. The processing module 12E11 is arranged to provide instructions via the display module and device (12E07 & 12E09) to an end user in order to assist the end user in constructing multiple visual designs (graphical representations) of the data retrieved from the data storage module 12E05.

Each visual design may be one of a predefined type, such as a hierarchical type, a spatial type, a virtual type, a classical type, a navigational type, a temporal type, a textual type, a structural type, a pivotal type, and an interactive type.

The visual design is produced or created by the processing module 12E11 by including, within the visual design, multiple layers of elements that contribute to the end user's understanding of the data retrieved from the storage module. Multiple visual designs, which may be the same or a different type, are then arranged in a visual representation by the display module 12E07 and output to the display device 12E09 to enable the end user to understand and focus on the data being represented.

A determination module 12E13 is in communication with the processing module 12E11 and is arranged to determine one or more data elements within the graphical representations that are based on variable data.

Once the determination module 12E13 has detected which elements are related or associated with variable data, instructions are provided by the processing module 12E11 to the display module 12E07 to display on the display device 12E09 that detected data element in such a manner or form that will indicate that the user may adjust the variable data associated with that data element.

For example, the data element may be displayed in a highlighted or flashing manner to draw attention to the user that this data element includes data that may be adjusted. It will be understood that, as an alternative, the data element may be displayed in any suitable manner to show that it is associated with variable data. Further, signals other than visual signals may be provided to indicate adjustments may be made, such as audio signals for example.

The data element is also displayed to enable adjustment of the data using any suitable input device 12E15, such as a mouse, keyboard etc. For example, specific data points making up the data element may be displayed to enable the user to move the data points by clicking on them and moving them with a mouse.

The system also includes an adjustment detection module 12E17 in communication with the processing module 12E11. The adjustment detection module 12E17 is arranged to detect the adjustment of the variable data, for example by detecting signals received from an input device, such as a mouse, that is causing the data points to move, and feedback this adjustment data to the processing module 12E11.

The processing module 12E11, based on the data received from the adjustment detection module 12E17, provides instructions to the display module to refresh the graphical representation on the display device based on the detected adjustment of the variable data.

That is, all data points in the data element that are caused to change due to the adjustment of the variable data made by the user are displayed in their new positions in the visual representation.

Optionally, the processor may send instructions to the display module to display on the display device the original data alongside the adjusted variable data in the refreshed graphical representation.

Further, the adjustment detection module may detect the user identifying a region within the graphical representation via signals received from the input device. Upon detection of this region, the adjustment detection module may then detect the selection of variable data within the identified region via signals received from the input device.

Alternatively, the system may rely on information concerning changes to data variables coming from external sources, such as other systems that are in communication with the data visualization system. The processing module and adjustment detection module are arranged to automatically detect any of these changes based on the information received, and as such, the display module may be instructed to display the changes to all associated data points on the display device, as described herein.

Figure 12F:
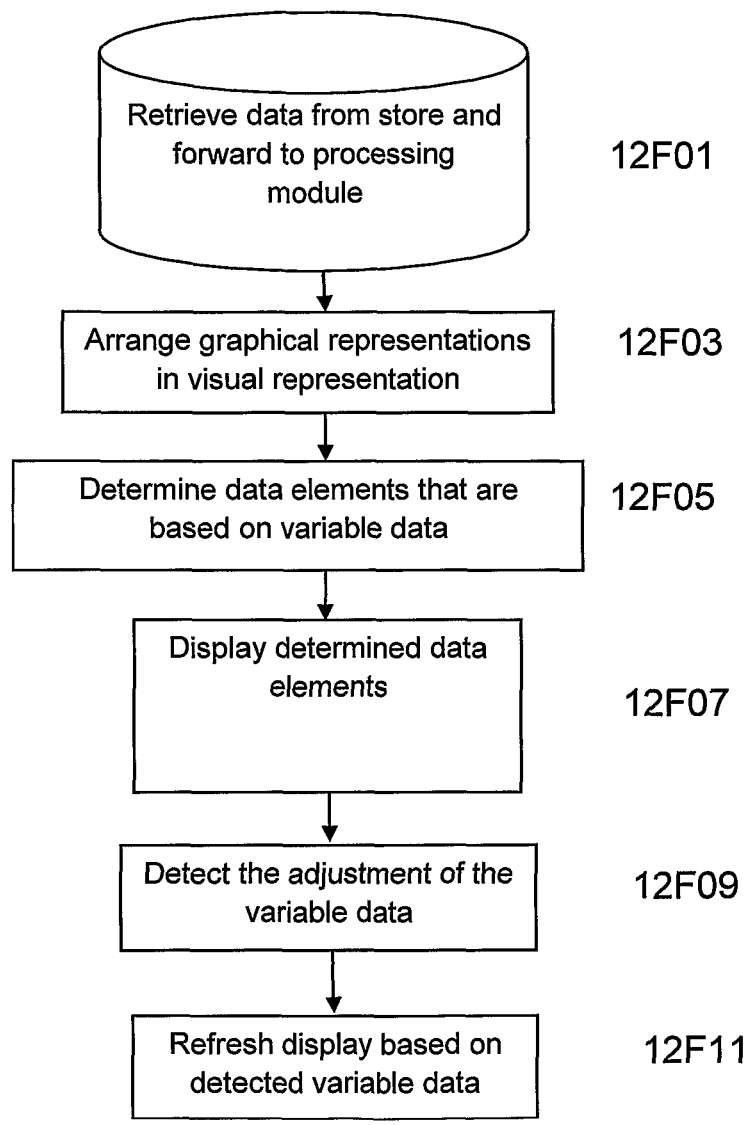
FIG. 12F shows a flow diagram according to an embodiment of the present invention.

FIG. 12F shows a flow diagram of the steps taken in the description above. At step 12F01 data is retrieved from the store and forwarded to processing module.

At step 12F03, multiple graphical representations are arranged in a visual representation.

At step 12F05, data elements that are based on variable data are determined. At step 12F07, the determined data elements are displayed.

At step 12F09, the adjustment of the variable data is detected.

At step 12F11, the display is refreshed based on the detected adjustment of the variable data.

FIG. 12A indicates the general flow of data according to this embodiment.

The User Interface 1210 provides access to raw data and allows the user to define BPD's 1215 in terms of the raw data, which then becomes the focus of the Visual Document 1230. This allows the user, through automated expert help, to create the metadata 1220, as well as the most appropriate Visual Designs 1235 that make up the Visual Document 1230 in order to provide detailed analysis of data related to the BPD 1215. The data acquisition, visual design rendering and visual document rendering processes utilize massive amounts of raw data 1227.

The metadata 1220 is used by the processes 1225 to optimize the acquisition of the appropriate data 1227, process the data into useful information, and to optimize the creation and rendering of the Visual Designs 1235 and the Visual Document 1230 that contains them.

When the data is modified 1240, the modified data is applied to the Visual Document to represent the changes made.

FIGS. 12B, 12C and 12D show a simple representative example of how the changes to the data can be made using the visual representation, and how those adjustments can easily indicate the effect on correlated data within the representation.

FIG. 12B shows a visual representation 1250 rendered by the display module for display on the display device. The visual representation includes a data element 1260 represented using data points (see 1270 and 1290A, for example).

The data points are positioned according to the variable data being analyzed. That is, the system renders the visual representation based on the values of the data retrieved. The data points are plotted according to their associated values.

Data points 1275A are also placed within the visual representation to represent other data, which may or may not be correlated with the data element 1260 and its data points. An icon 1280 is positioned within the representation 1250 to indicate that at least a portion of the data used to create the representation is of a variable type. The user is then able to select a specific data point using a pointing device, for example, and scroll over the icon 1280 in order to adjust the position of that selected data point.

Referring to FIG. 12C, it can be seen that the user has moved data point 1290 to a new position to indicate changes made to the data for that data point. These changes may be due to new information received, the user detecting an error in the old data, an automatic detection of an error in the data or through any other suitable methods. Also, as the data point 1290B has been moved, the user is able to see data points 1275B being moved to a new position by the system from their original position as depicted by data points 1275A.

The visual indication of the movement by the system may be enhanced by causing the icon or data points (or any other portion of the visual representation) to flash, change in color or by utilizing other visual features to highlight the movement. Therefore, the user can see that the data points 1275B correlate with the moved data point 1290B, thus providing a greater incite into the information presented.

An alternative arrangement is shown in FIG. 12D, which shows the new positions of the data points (1275B & 1290B) visually overlaid with the old positions of the data points (1275A & 1290A). This type of overlay may include any form of thematic treatment. For example, these may include changes to the visual display such as an overlay of graduated symbols, transparent layers or added texture to the final display. These treatments enable the user to see how much change in the representation has occurred due to the adjustment. Therefore the original data and adjusted variable data are displayed alongside each other in the refreshed representation.

Figure 13:
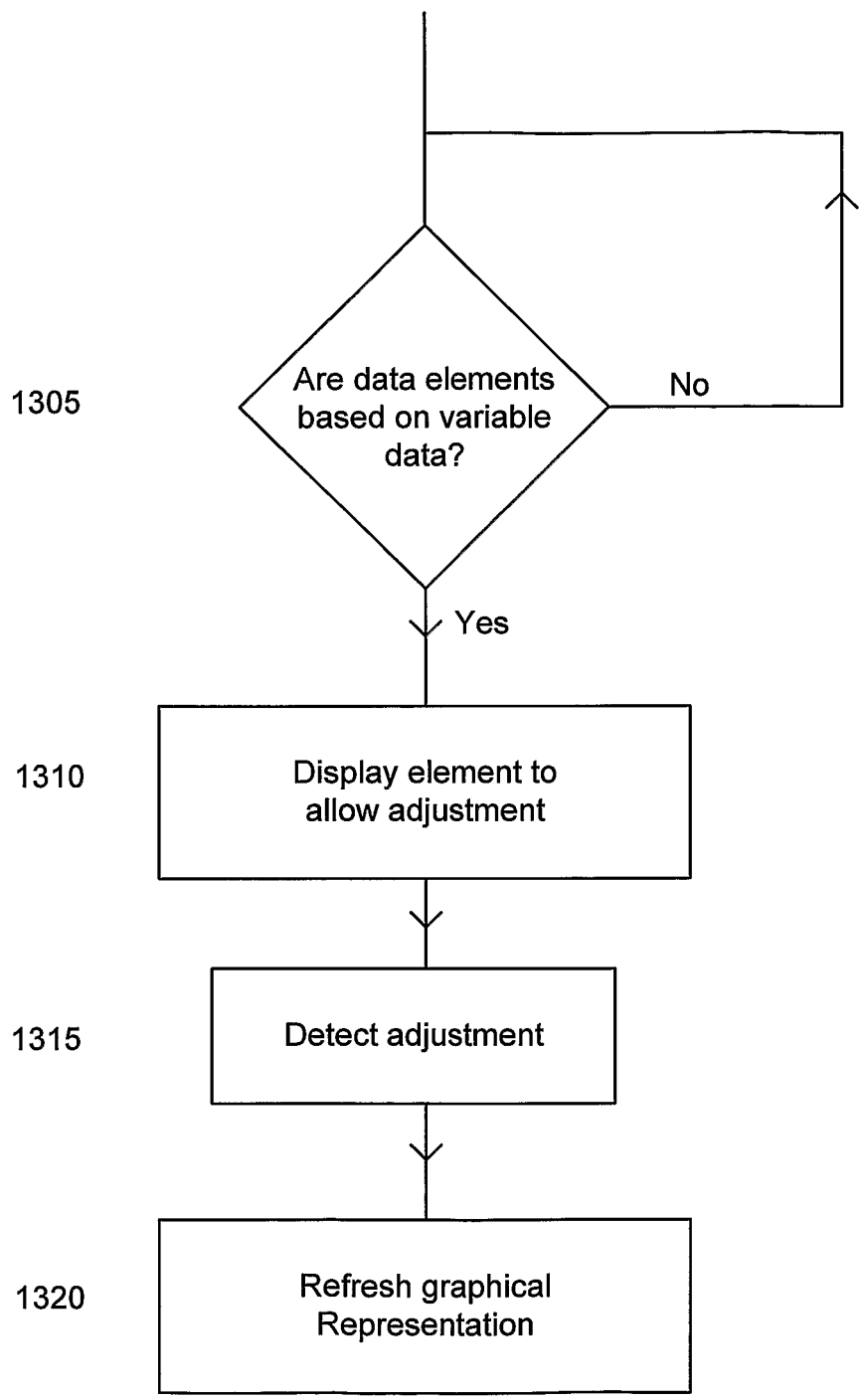
FIG. 13 shows a further flow diagram according to an embodiment of the present invention.

FIG. 13 shows a flow diagram of the method according to this embodiment. At step 1305 the system determines whether one or more data elements that are based on variable data are located within the graphical representation being presented to the user. If so, the adjustable elements are indicated on the screen to allow adjustment, at step 1310. The indication may be made on the screen by the system using any suitable means, such as for example changing the color of the adjustable element, highlighting the adjustable element, include arrows to indicate changes made to graduated symbols, creating visual texture overlays of classical graphs such as bar graphs or trend lines.

The system first detects an adjustment of the data points by, for example, detecting a variation in the amounts shown being outside of a defined tolerance level or another trigger event such as a system interaction or alert. Upon the system detecting the adjustment to the position of the data points at step 1315, the graphical representation is refreshed at step 1320. The refresh step may include moving and re-rendering other data elements that correlate with the adjusted data elements. Alternatively, additional thematic treatments may be added to the visual representation such as overlays of graduated symbols or classical mapping techniques.

It will be understood that the actions of the end user may be detected using any form of input device, such as a mouse, keyboard, eye sensor module, tracker ball, voice recognition module etc.

Information conveying the changes and its effects becomes more easily discernible to the user by allowing the user to see how those changes cause interactions between various portions of data. This becomes increasingly beneficial when dealing with high densities of data. The ability to forecast data in this manner provides increased benefits to the user not only due to the information being provided in a single representation but also because the forecasting of the data becomes more intuitive to the user by enabling them to see how changes affect other parts of the data.

Affinity analysis is a data analysis and data mining technique that discovers the degree of correlation among transaction attributes of specific items. In market basket analysis retailers use it to understand the purchase behavior of groups of customers, for cross-selling, store design, discount plans and promotions.

The algorithms for performing market basket analysis are typically limited to avoid combinatorial explosions (a supermarket may stock 100,000 or more line items).

A major difficulty is that a large number of the relationships found may be trivial for anyone familiar with the business. Although the volume of data has been reduced, a user may be trying to find a needle in a haystack. Requiring correlations to have a high confidence level risks missing some exploitable results.

It would be desirable to provide visualization tools to enable a user to understand and explore relationships in an intuitive manner.

According to another aspect of the invention methods and visualization tools are provided to enable users to have a greater understanding of relationships and explore them via an interactive graphical interface. In a preferred embodiment all correlations between all market baskets (groups of transactions) for all transaction attributes will be determined, whilst it will be understood that great benefits will also be derived when only a subset of market baskets and/or a subset of transaction attributes are considered. By looking at all correlations a user can be presented with correlations that they may not have even considered exploring to reveal unexpected insights. However, where resources are limited a subset of correlations may still reveal useful information.

According to a preferred method correlations between transaction items (e.g. products sold in a retail outlet, telecommunication services or other vendible items) for transaction attributes (location, time, attribute of the item such as category, branding, market segment etc.) are classified using a dimension reduction or classification method (for example, a self-organizing map as described elsewhere in this document). This classification may then be displayed in a hierarchical representation such as the R-tree representation 1415 shown in FIG. 14. This provides the user with a hierarchical index of transaction items with the nodes forming categories that can be labeled by a user or automatically labeled.

Figure 14:
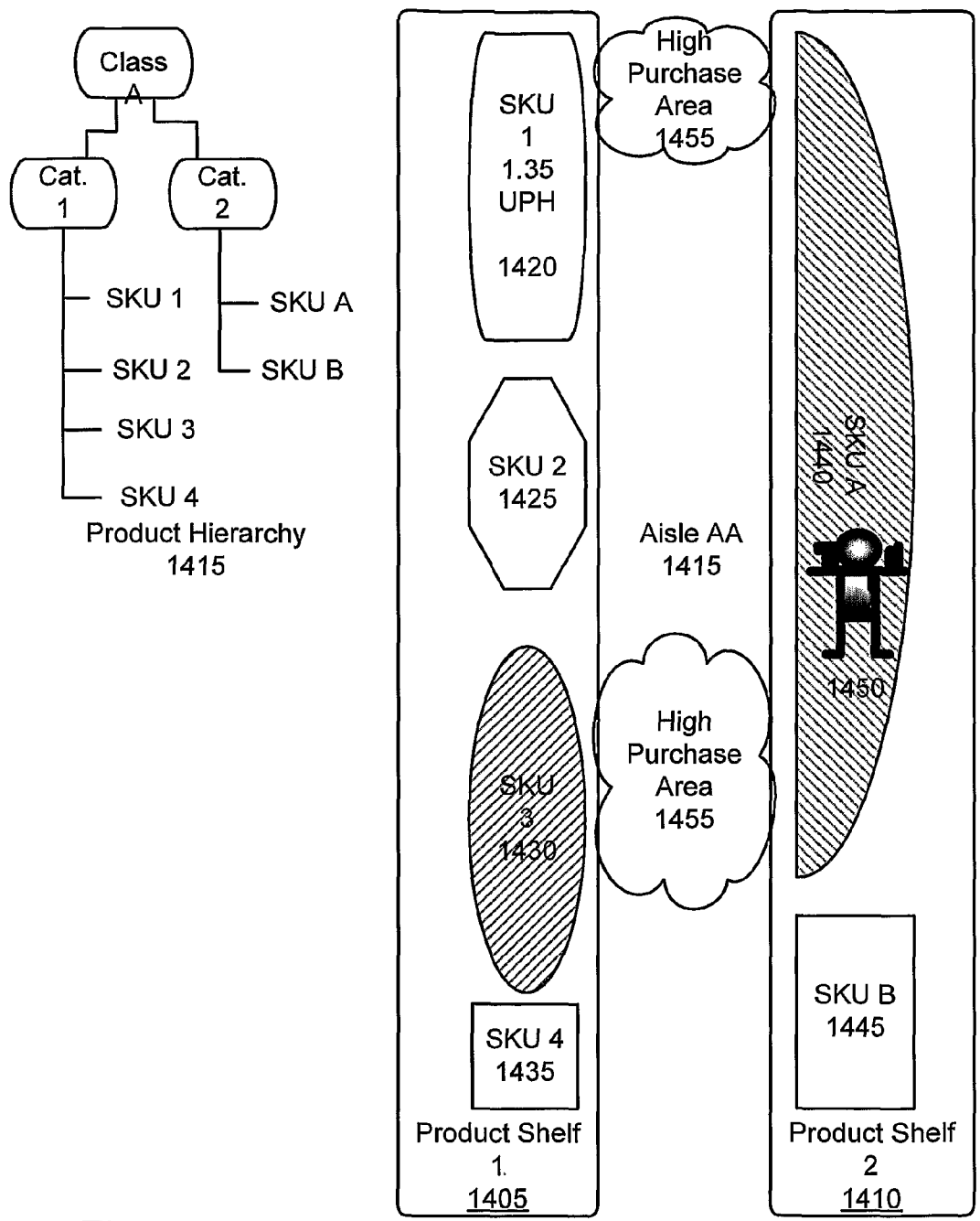
FIG. 14 shows a location based heatmap according to an embodiment of the present invention.

Correlation information can be overlaid over a map of transaction attributes in the form of a heat map. In FIG. 14 a location based heat map is displayed in the form of a department store 1400 having product shelves 1405 and 1410 containing products 1420, 1425, 1435, 1440 and 1445. A heat map indicates high purchase value or volume areas 1455 and highlights products 1430 and 1440. In this embodiment a basket consisting of products 1430 and 1440 is highlighted as a correlation threshold has been exceeded. This threshold may be a magnitude, frequency, time or business performance threshold which may be varied by a user. All correlations between transaction items may be displayed in a more complex heat map. A user may then explore areas of interest by clicking a cursor on the area etc. For example clicking on 1440 may reveal an icon 1450 showing that mainly men buy the item. Supplementary information in numerical, literal or visual form may be displayed as a user explores a region of the heat map. Further detailed information upon which the heat map has been generated may also be displayed.

In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

Information obtained from such analysis may be used to optimize store layout, understand sales associations, supply chain management, marketing campaigns, market segmentation, shrinkage or optimize stocking.

There are some well known thematic treatments for spatial maps; these include coloring, gravity modeling, and graduated symbols. These different thematic treatments that form a part of the described solution are well documented elsewhere, and therefore not repeated in this document. References can be found at Wikipedia[xi] and [xii].

There are opportunities for Special Layers that address specific business areas, for example specific visualization methods relating to the use of RFID inside retail stores or mapping movement of people using tracks generated from face recognition and tracking systems.

4. Textual Visual Designs

One purpose of textual visual designs is to enable business users to interact and query seamlessly from the structured to the unstructured world.

While it is possible to do basic numeric analysis on variables such as hit frequency and number of clicks per hour, the key method is to use a special layer to construct a sensible schematic of the unstructured data then overlay BPDs. Simply put, the described solution will leverage information visualization to bring structure to the unstructured world.

One textual design example is found at Crazyegg.com[xiii]. This example shows the behavior of visitors to a website using a heatmap. More popular sections, which are clicked more often, are highlighted as 'warm'—in red color.

Another example may be found at Visual Methods Blogs[xiv]. This example shows the visualization of the political debates in the U.S. elections. Each line represents a reference from one candidate to another, while the length of each circle segment represents the total words spoken by each candidate during the debates.

A further example may be found at Wikipedia[xv]. Shown here are twenty different self organizing maps. Each map is independently calculated, and presented as a thumbnail in an attempt to show how different political parties vote on different issues. In order to understand the maps the user should spend time studying each one and build an image of what the voting pattern is. The complexity of this method illustrates the need for visualization methods such as the R-Tree visualization methodology as described herein.

An example of where a textual visual design is very effective is the assisting of the marketing department in analyzing its named marketing campaigns. For instance, the provision of a heat map over text using position to indicate time is very useful in quickly determining the most successful campaigns as a function of many parameters. This could further be used to show how alterations in the structure of the text affect characteristics such as customer behavior or the response to marketing surveys.

Unstructured textual information is a huge area of growth in data storage and intuitively, the business intelligence industry expects this data to become a valuable asset. The described solution provides information visualization capabilities that overlay and draw out the non-numeric, but actionable, observations relating to unstructured data, in order to link the numeric data warehouse to the unstructured world.

It will be appreciated that the number of applications of visual intelligence in this area are vast and varied. The uses may extend, for example, from value analysis of patent portfolios to high density views of the skill-sets of employees in an organization. Further examples arise when extending to include examples where the analytics understand key elements of the data, such as those described in the second example above.

There are a multitude of Special Layers that may be used with textual data. These textual Special Layers extend from building self organizing maps of textual information to diagrams showing the syntax hierarchy of the words used in a document.

A self organizing map (SOM) consists of components called nodes or neurons. Associated with each node is a weight vector of the same dimension as the input data vectors and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to find the node with the closest weight vector to the vector taken from data space and to assign the map coordinates of this node to our vector—Source: Wikipedia[xv].

Normally, constructing SOMs creates visualizations that are difficult to interpret. However, the described solution overcomes this setback by providing methods of navigation and analysis of the SOM.

As discussed above, the R-Hierarchical perspective provides one method of doing this.

5. Virtual Visual Designs

One example of a 3D representation is that of a virtual environment. 3D worlds generate far more accurate and complete data than the real world. As these 3D worlds grow in popularity and become more immersive, the potential for business intelligence tools to be applied to this environment grows significantly.

A further example is provided at Mayarealities.com[xvi]. This visualization shows data generated from a 3D environment. Whilst this example breaks most of the conventions for design of information visualization, it does illustrate the need for analytical tools for data from a 3D environment and how best to present that information.

One example application of the use of a virtual visual design is a retail space analysis tool where transaction data is under-laid as the color of the carpet or shelves. In the case of the shelves, the shelves can also show representations of the products on the shelves.

It is generally well known in the various industries discussed herein that the placement of assets has a significant impact on operating costs and revenue. For example, the assets placed may include games, outlets, hotel rooms, hotels, branch offices, processing centers, product formats and products falling within different branches of the product hierarchy (e.g., movie categories or sound tracks), retail outlets and wireless networks.

Providing a familiar context, such as a virtual depiction of the asset overlaid with other visual designs depicting relevant data, will quickly bring to light important correlations relative to position.

As mentioned above, FIG. 14 is an example of a Visual Document used for Retail Space Analysis depicting an Aisle 1415 in a particular Retail Store Department 1400.

Product Shelf 1 1405 faces Product Shelf 2 1410 in the retail store.

Product Hierarchy 1415 depicts the product hierarchy associated with the individual products depicted on the shelves are depicted on the shelves 1420, 1425, 1430, 1435, 1440, 1445. In one embodiment the SKU on the Product Hierarchy 1415 can be selected with and input device such as a mouse and the display will highlight the SKU (e.g., 1425) on a shelf (e.g., 1410).

The shapes associated with the SKU's communicate information. For example, SKU 2 1425 is an octagon shape, and this may indicate, for example, the number of items sold per hour.

The colors or patterns within the shapes also have meanings. For example, the solid white background used for SKU 4 1425 may indicate that this item is usually bought as a single item in the market basket.

Icons 1450 within the SKUs may communicate information such as a strong selling item (higher than average sales for a particular period).

SKU 1 1420 contains numeric information (e.g., 1.35 UPH) which may indicate that 1.35 product units were sold per hour.

Other icons such as cloud shapes 1455 may be used to indicate areas within the aisle where many products are selected for purchased by customers.

Retail space managers could interact with the data in the 3D world, simulate new store layouts and analyze shrinkage and other retail performance attributes.

Combined with security camera tracking systems and RFID, the virtual world can become a proxy for monitoring and management of the real world.

Fly through of a location or destination, customer flows and predictions become possible.

Special layers include, 3D surfaces, 3D representations of the data as it is collected in the data warehouse.

Numeric data is transformed to 3D formation enabling 3D exploration of the data in the virtual environment.

6. Structural Visual Designs

One purpose of a structural visualization is to illustrate the structure of the data. For example, network topology or interconnection between data elements. The interconnections in the examples below show how a simple Special Layer construct can be used to illustrate quite complex connections.

One example of a structural type visual representation is that of the London underground map. The London underground map is a key historic map showing the schematic topology of the London underground. Using this map travelers can intuitively plan out complex routes and interconnects. Without this visualization, navigating the London underground system would be significantly more difficult and complex to understand.

Another example of a structural type visual representation is that by Martin Wattenberg[xvii]. This example shows the 'Technique for visualizing & analyzing complex graph structures, such as social networks'.

A further example is provided by Lee Fleming[xviii]. In this example node sizes reflect the importance of the inventors' patents (as measured by the number of prior art citations from future patents) and the width of ties indicates the number of collaborations. This hierarchy is generated using the Kamada-Kawai algorithm, which is an algorithm that enables the auto generation of a network by minimizing a distance from a particular point in that network. The algorithm iterates on the network to reduce the force between nodes (adjust the maximum) on each iteration. Iterations continue until a minimum is achieved. This is a heuristic algorithm. Kamada-Kawai states that the total balance of the layout which is related to the individual characteristics of the graph is just as important, or can be considered more important than the reduction of edge crossings in the graph given a particular scenario. Kamada and Kawai calculate the total balance of the graph, as the square summation of the differences between the ideal distance and the actual distance for all vertices.

The various industries discussed herein organize their product and service offerings based on hierarchical structures.

For example, in the gaming industry, there is typically a Casino Department, over Slot and Table Game Departments. The Slot Department divides its offerings into several product categories and sub-categories.

For example, in the retail industry, there is typically a Pharmacy Department the Prescription Drug and Health and Beauty Departments. The Health and Beauty Department divides its offerings into several product categories and sub-categories.

For example, in the hospitality industry, there are room categories, which may include various suites, and standard rooms, just to name a few. The categories may also have subcategories including smoking rooms, rooms with particular views, or various bed type configurations.

For example, in the financial industry, there are load categories, which may include home loans, auto loans, and small business loans to name a few. The loan categories may also have subcategories including lines of credit or revolving credit.

For example, in the entertainment industry, there are movie categories (e.g., Family, Action), formats, and merchandise. The movie categories may also have subcategories including versions of the movie in a variety of foreign languages, or director's cut version divides.

For example, in the telecommunications industry, categories may include talk time, home television services, and data services to name a few. These categories may also have subcategories including high, medium or low data transmission rate products.

The herein described system facilitates operational and marketing analysis when presented within this context.

When arranging the data points in a graphical representation it is usual to merely arrange them in a predefined order, such as alphabetically, or some other arbitrary order. Although this still effectively shows the values of those data points individually, there is a large amount of information that can be missed due to the data points not being arranged in a more effective manner. This is due to data within the representation being related across only a single axis. This problem can be exacerbated depending on the type of visualization being used, and in particular with structural visualization types.

For example, a heatmap can show how neighboring data points correlate with each other. However, unless the data points are arranged in a manner that takes into account how those neighboring points correlate, the heatmap can convey spurious information which may lead to false data reporting or analysis.

Therefore, a system that provides analysis of the data points or groups of data points or their metadata in order to determine an optimal or definitive order of the datapoints, groups or metadata is beneficial.

Figure 15A:
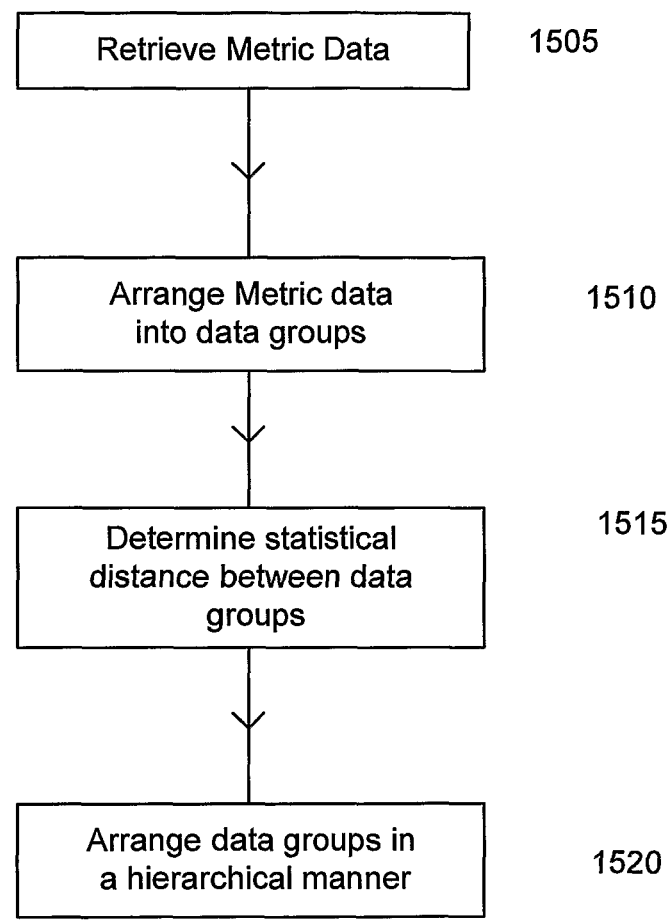
FIG. 15A shows a flow diagram according to an embodiment of the present invention.
Figure 15B:
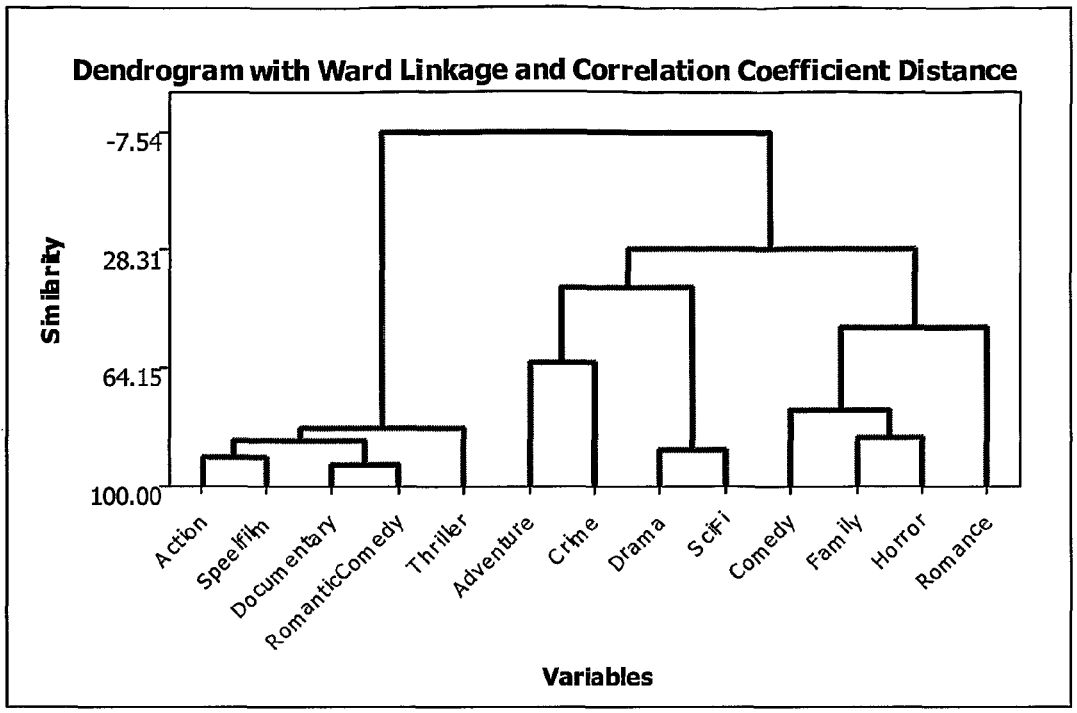
FIGS. 15B and C show correlation diagrams according to an embodiment of the present invention.
Figure 15C:
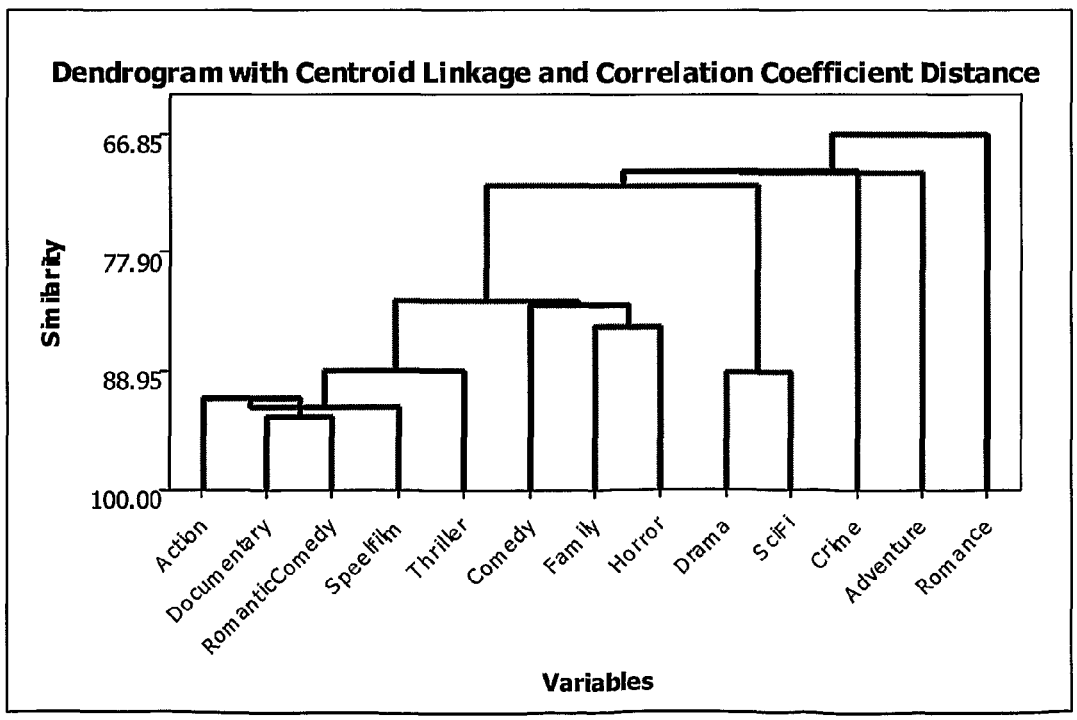
FIG. 15D shows a conceptual system diagram of a data visualization system according to an embodiment of the present invention.
Figure 15D:
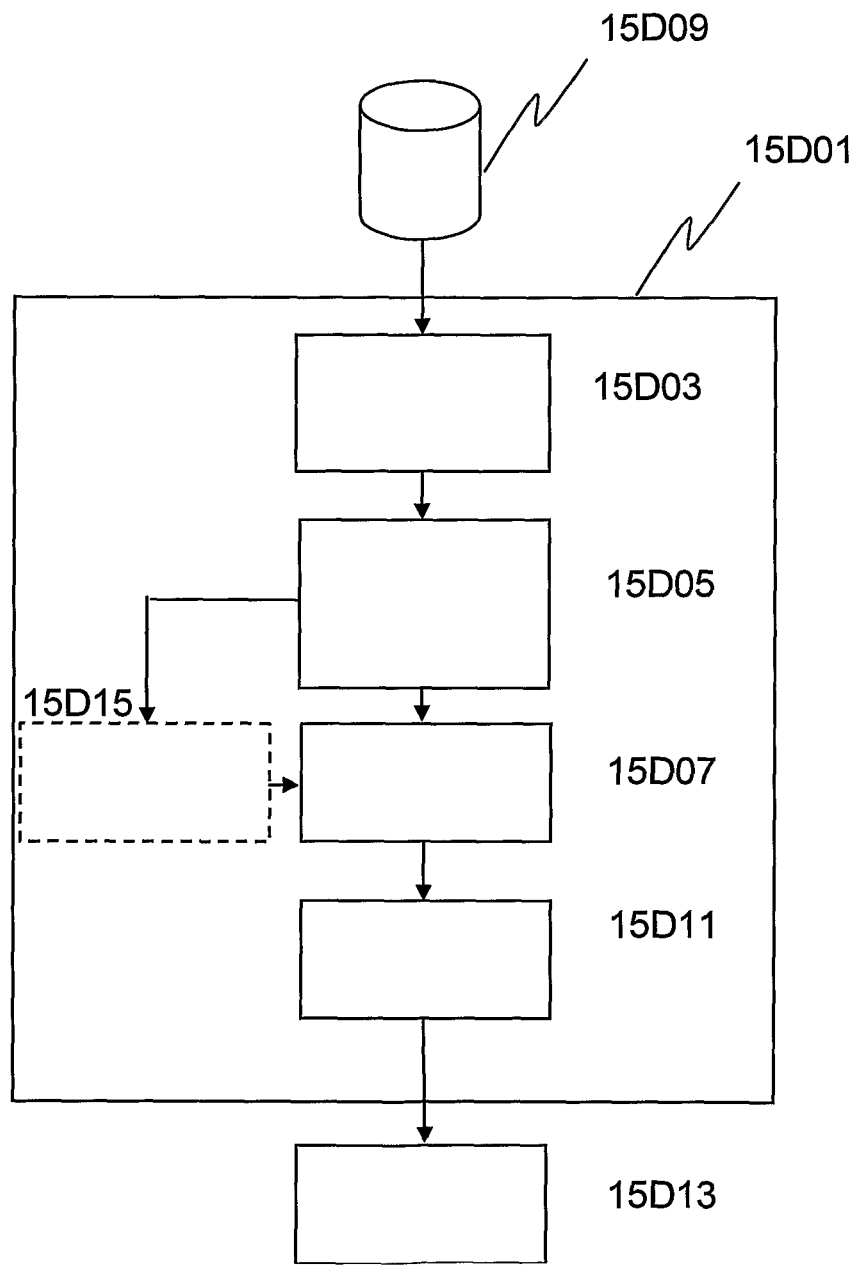

According to this embodiment there is shown in FIG. 15D a conceptual system diagram of a data visualization system 15D01. The system 15D01 is arranged to create a visual representation of data points from metric data in order to provide users with greater understanding of their vast amounts of stored data. The system 15D01 is also arranged to determine an improved positioning of data groups associated with the metric data in the visual representation to provide an optimum positioning arrangement.

The system includes a data retrieval module 15D03 that is configured to enable the retrieval of metric data from a data storage module 15D09, which is in communication with the data visualization system 15D01. The data storage module 15D09 may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

The system includes a data grouping module 15D05 that is configured to arrange the metric data into a plurality of data groups. That is, the data grouping module defines relevant groups of metric data based on the content of the data. The data grouping module may group the metric data by analyzing meta data that is associated with the metric data and using this analysis to group the metric data into relevant groups so that metric data of a similar nature is grouped together. It will be understood that the term group may consist of a single data element.

For example, the grouping of metric data may be by way of specifically located manufacturing plants within a specified region or country.

As another example, the grouping of metric data may be by way of certain product categories where the metric data is test or quality control data associated with those products.

Further, as another example, the metric data may be grouped according to specific financial entities within a business environment. For example, various entities within a casino environment may include gaming machine control, hotel systems, retail systems, business accounts etc.

According to an alternative embodiment, the metric data may be grouped by the data grouping module 15D05 using any suitable classification algorithm associated with the metric data.

It will be understood that the system may apply the herein described methodology to non-sequential data groups. That is the adjustment may not take place in a linear sequence but may, for example, run in parallel.

Optionally, the data grouping module may redefine data groups based on the received determined statistical distance from the statistical distance determination module. That is, the data points associated with the data groups may be rearranged by the system so that the hierarchical structure is optimized.

The system also includes a statistical distance determination module 15D07 which receives the data groups as an input, and analyzes those groups to determine a minimal statistical distance between the data groups. That is, the statistical distance determination module 15D07 determines how each of the groups may be positioned next to each other in the visual representation in a way that minimizes the statistical distance between the neighboring groups. The statistical distance determination module 15D07 analysis uses a hierarchical force based algorithm on the input data as described below to provide an optimal output.

---

Hierarchical Force Based Algorithm (pseudocode)

---

Set up initial node positions randomly // The initial positions may be arranged into hierarchical structure reflecting the R-Tree
Make sure no 2 nodes are in exactly the same position
  loop
    total_kinetic_energy := 0 // running sum of total kinetic energy over all particles
    for each node
      net-force := (0, 0) // running sum of total force on this particular node
      for each layer in the Hierarchy
        for each other node in the layer and one higher layer
          link-weight := 1 if on this layer otherwise interlayer-link-weight //interlayer-link-weight is typically higher than one to attach child nodes together.
          net-force := net-force + Coulomb_repulsion( this_node, other_node, link_weight ) * ( 1+ Statistical_Distance(this_node, other_node)) //Statistical-Distance tends to zero when points should be very near, this will draw similar points together.
        next node
      next layer
      for each spring connected to this node
        net-force := net-force + Hooke_attraction( this_node, spring )
      next spring
      // without damping, it moves forever
      this_node.velocity := (this_node.velocity + timestep * net-force) * damping
      this_node.position := this_node.position + timestep * this_node.velocity
      total_kinetic_energy := total_kinetic_energy + this_node.mass * (this_node.velocity)^2
    next node
  until total_kinetic_energy is less than some small number //the simulation has stopped moving

---

The system further includes a data visualization module 15D11 which receives the output from the statistical distance determination module 15D07 and uses this output to control how the data visualization is rendered. In this embodiment, the output is rendered by visually arranging the data groups on a visual display module 15D13. The data groups are rendered in a hierarchical manner based on the determined statistical distance in order to create the visual representation.

As an alternative to, or in conjunction with, the display module 15D13, further output modules may be provided to output the results of the data visualization module. That is, the raw data retrieved by the data retrieval module is analyzed and converted to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the data visualization module to be interfaced with other data handling modules or storage devices.

The data visualization techniques described herein transform the raw data received into different (and preferably optimal) spatial arrangements to enable further or hidden information within the raw data to be visually represented in a manner that conveys the information to a user in an efficient manner.

The statistical distance determination module is not only arranged to determine the minimal statistical distance between data groups within each level, e.g. a single level, of the hierarchy, but may also be arranged to determine the minimal statistical distance between data groups located within different levels (i.e. between levels) of the hierarchy. Therefore, the data visualization module can utilize the output from the statistical distance determination module to adjust the visual position of each parent and sibling data group pair at different hierarchical levels based on the determined minimal statistical distance between data groups at different hierarchical levels.

It will be understood that the system may be set up to only determine the minimal statistical distance within individual layers or levels of the hierarchy, or only determine the minimal statistical distance between layers or levels of the hierarchy.

The statistical distance determination module may determine the statistical distance based on a number of different methods, algorithms or processes other than the hierarchical force based algorithm described above. For example, the statistical distance determination module may:
i) determine the statistical distance between data groups,
ii) determine the statistical distance based on the similarity of the data groups,
iii) determine the statistical distance based on the sum of the squares of the data groups,
iv) determine the statistical distance based on the output of a heuristic algorithm, such as back propagation neural network values or genetic algorithm associations,
v) determine the statistical distance based on the output of a neural network, and
vi) determine the statistical distance based on a correlation factor between the data groups, for example by calculating the value normalized by the sum of the squares.

Further, the system may also include an indexing module 15D15 that is adapted to arrange, within an index, the order in which the data groups are positioned. The indexing module receives the grouping information from the data group module and creates an index from which the statistical distance determination module may determine the statistical distance between data groups. The statistical distance determination module may then determine the minimal statistical distance for each individual hierarchical layer using the index.

The indexing module may group the hierarchical layers in an index according to a first specified statistical distance, and then group sub-layers in the index according to a second smaller specified statistical distance. This enables the lower levels in the hierarchy to be grouped more aggressively, meaning that child nodes will tend to cluster around parent nodes.

The data visualization module is also enabled so that it can create the visual representation by positioning the data points in the visual representation in a first dimension (such as the x-axis) based on a first pre-determined characteristic, and then position the data points in a second dimension (such as the y-axis) based on the determined statistical distance. Further, the data visualization module is enabled so that it can position the data points in a third dimension (such as a z-axis on a 3D model) based on a third pre-determined characteristic.

The data visualization module is also arranged to create the visual representation by representing the data groups within the visual representation in a hierarchical manner. That is, the data groups are arranged hierarchically, for example in the form of a tree. The data groups are arranged in the visualization according to one or more of a number of factors, such as, for example, the group's position, order, size or color. It will be understood that any other factors may be taken into account when arranging the data groups.

The data visualization module may also be controlled to visually arrange the data groups in a number of different visual formats, such as for example in the form of an R-tree representation, a skewed R-tree representation, a Ward's correlation representation, a Kamada-Kawai representation, an organizational chart, a table of contents or an index hierarchy.

FIG. 15A shows a flow diagram of a method according to this embodiment. Metric data associated with the data being represented in the visualization is retrieved at step 1505. The metric data is then arranged into data groups at step 1510. Using a suitable algorithm as described above, the statistical distance between the data groups is determined at step 1515. The data groups are then arranged in a hierarchical manner according to the statistical distances calculated, as shown at step 1520.

By arranging the metric data groups in this manner the correlation of the data is taken into account when arranging the groups. This reduces the effect of data points being placed adjacent non correlated neighboring data points.

In other words, non-sequential data groups may be arranged to create a visual representation of data points within the data groups, the method may include the steps of determining a statistical distance between the data groups, and arranging the data groups in an order that is based on the determined statistical distance. It will be understood that the term group may consist of a single data element.

By determining how data groups correlate with each other using the above described algorithm, it then becomes possible to arrange the data groups in a more suitable order that enables information to be conveyed to the user that would otherwise not have been conveyed.

FIG. 15B shows one example of the calculated similarity, or correlation, between different variables (film categories) when placed in a random order in a visual representation. The y-axis represents the amount of similarity or correlation between different categories. The smaller the number indicated on the y-axis, the less similar the categories. The value is determined by following the links in the figure, which are created using, in this example, a Ward diagram. Where the links join between the categories, this is the calculated correlation value. For example, Thriller and Crime join together at a value of −7.54, which clearly shows that there is no correlation between these two data groups, yet they are still placed at a position adjacent to each other.

For example, correlation may indicate how often, when one of the movie categories is hired from a DVD rental shop, another movie category is also hired.

FIG. 15C shows a re-ordering of the groups in FIG. 15B according to the determined correlation values. This clearly shows that the worst correlation value is that between Adventure and Romance categories, thus providing a better and more viable representation of the data across all dimensions.

By grouping data sets in this manner based on correlation, an extra dimension is introduced which provides an in increase in the data density within the visual representation. This increase in data density thus enables the user to have a greater understanding of the data in less space and with the use of less processing time. Further, by providing an increase in data density within the representations, the amount of ink required to produce the information is reduced, for example, by enabling a representation to be placed on a single page rather than over multiple pages.

These types of structural visualizations are very powerful and are closely related to spatial visualization types. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

The hierarchy consists of nodes arranged into layers, and these nodes are the arranged individual items. Interconnections may be explicit or implicit. Often the parent and child nodes are shown as interconnected. Typically the interconnections between nodes are used to generate the structure. One important aspect of the structural Special Layer is building the structure in such a way that interconnect line crossing is minimized.

Second Embodiment

Further to the above described embodiment where the methodology is applied to data sets, it is also possible to apply the same methodology to the placement of nodes within a graphically represented tree structure in order to optimize the positioning of those nodes. Therefore, all the relevant steps discussed above may also apply to the arrangement of nodes in a tree structure as described in the example below, rather than the arrangement of data groups. Nodes are the individual items being arranged into the tree structure. Except for leaf nodes, all nodes contain other nodes. This containment defines the R-Tree structure.

A full description on a system that enables the graphical representation of a tree structure in association with a visual design is provided in a co-pending PCT application submitted by the applicant. In summary, a data visualization system is arranged to retrieve data from a data storage system, determine data points based on the retrieved metric data, arrange the data points to be displayed according to a predetermined visual representation, arrange the data points into a plurality of meta groups in a hierarchical manner, arrange the meta groups into a plurality of layers, where each layer represents the data points at different levels of granularity.

By applying the herein described methodology to nodes in a tree structure, the data visualization system can create a hierarchical representation of the data that is displayed within the visual representation. The hierarchical representation may be a tree like representation showing the hierarchical arrangement of the data used in the visual representation. The user may interact with the hierarchical representation (e.g. by selecting a node on the tree) to see where the associated data has been visually represented in the visual representation.

According to this example, at each hierarchical level where there are multiple nodes, the nodes in that level are arranged to be positioned next to the most relevant nodes rather than in an arbitrary fashion as carried out in the prior art. For example, the references in FIGS. 15B and 15C to the movie categories may be graphically represented tree nodes in an index for movies.

The herein described methodology can be applied to any suitable tree structure, such as an R-tree, a standard relationship tree, Quad-Tree, Kamada-Kawai Tree, Wards Linkage Diagram, catalogues, organizational charts, product master files, a system of accounts, etc.

By using this methodology, the nodes are positioned so that they sit next to the most relevant of the other nodes (i.e. they are positioned at a minimum statistical distance to other nodes using the herein described algorithm). This may prove particularly useful in graphical representations of tree structures so that users can navigate the tree structure in a more logical manner by moving through similarly associated nodes that are next to each other.

It will be understood that the system may apply the herein described methodology to non-sequential nodes. That is the adjustment may not take place in a linear sequence but may, for example, run in parallel.

The above described method may also be applied to the printing or publication of more relevant indexes in various different kinds of publications, such as encyclopedias, study guides, reference texts etc, whether in paper form or on the Internet.

These structural visualizations are very powerful and are closely related to spatial visualizations. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

Typically the interconnections between nodes are used to generate the structure. One important aspect of the structural Special Layer is building the structure in such a way that interconnect line crossing is minimized.

7. Classical Visual Designs

Traditional charts provide a simple, common and well-established way of presenting data. However, traditional charts are user-skill dependent and the goal is to apply guided Visual Design techniques to traditional charts to significantly extend their usefulness.

One example would be to show a line chart of Speed Vs Time in a simple two dimensional line graph. This type of basic graph shows the data clearly and allows the user to observe any geometric trends.

In the various industries described herein, the ability to incorporate familiar forms (e.g., pie charts, bar graphs, line graphs) into Visual Documents as herein described will assist in quickly pinpointing key values within the visualization.

Some common charts are as follows:

Scatterplots—Are Cartesian coordinates to show the relation of two or more quantitative variables.

Histograms—Typically show the quantity of points that fall within various numeric ranges (or bins).

Bar graphs—Use bars to show frequencies or values for different categories.

Pie charts—Show percentage values as a slice of a pie.

Line charts—Are a two-dimensional scatterplot of ordered observations where the observations are connected following their order.

8. Pivotal Visual Designs

Different visualization methods have been suggested for high-dimensional data. Most of these methods use latent variables (such as principal components) to reduce the dimensionality of the data to 2 or 3 before plotting the data. One problem with this approach is that the latent variables sometimes are hard to understand in terms of the original variables.

Customers within the various industries discussed herein are segmented and their value ranked based on a large number of parameters—many of which are not applicable to other service industries.

For example, in the gaming industry, not only are there are wide variety of products available, but also each game has a large number of characteristics affecting profitability, attractiveness to particular segments, etc.

For example, in the retail, hospitality, financial, entertainment and telecommunications industries, not only are there a wide variety of products available, but also each product class has a large number of characteristics affecting profitability, attractiveness to particular segments, etc Pivotal analysis as herein described is well suited for quickly correlating this disparate data.

The parallel coordinate (PC) scheme due to Inselberg and others attempts to plot multivariate data in a completely different manner. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

The method of an embodiment of this invention allows the user to display higher dimensional data in a lower dimensional plot. This method may for example be used to display 3D data in a 2D plot.

According to specific embodiments of the invention, various methods are provided that use the referenced system to allow the user to display higher dimensional data in a lower dimensional plot. The methods may for example be used to display 3D data in a 2D representation but is not limited to this, and may be used to display any suitable higher dimensional level of data in a lower dimension plot. The displaying (visual representation) of information may be via any suitable output device, such as a display device, printing device or any other suitable device that can be used to visually represent information to a user. The system described within the reference and herein arranges the data in a suitable format for it to be rendered in a correct manner prior to it being visualized in the chosen format.

In broad terms, the herein described methods involve ranking data based on one variable, while distributing data based on another variable. This enables multi dimensional data to be represented in fewer dimensions in a manner that allows a user to easily discern the context of the data.

Although the method may be applied by ranking data based on a first variable and distributing data based on a second variable, the following example shows a method being applied to data having 3 variables V1, V2, and V3. Wherein the data is stored in a database which has N records; it is assumed that there are no missing values for any of the three variables.

Figure 17A:
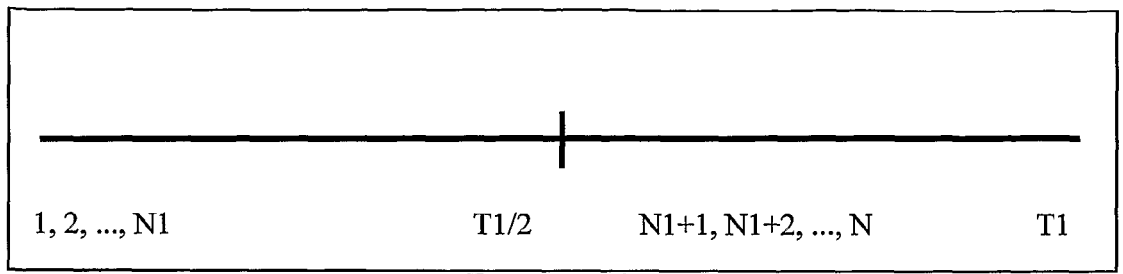
Figure 17B:
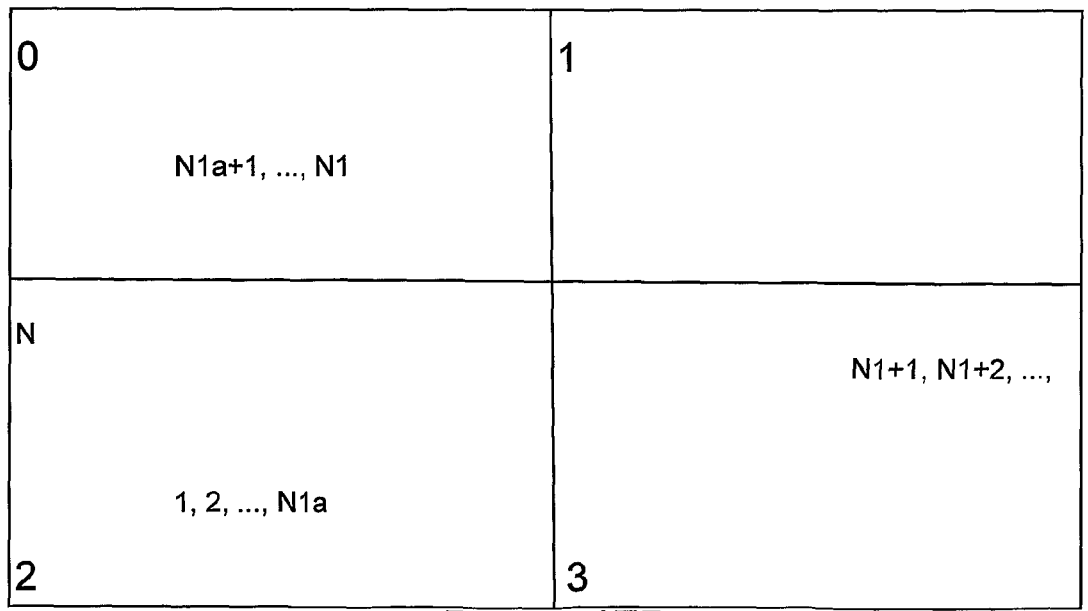
Figure 17E:
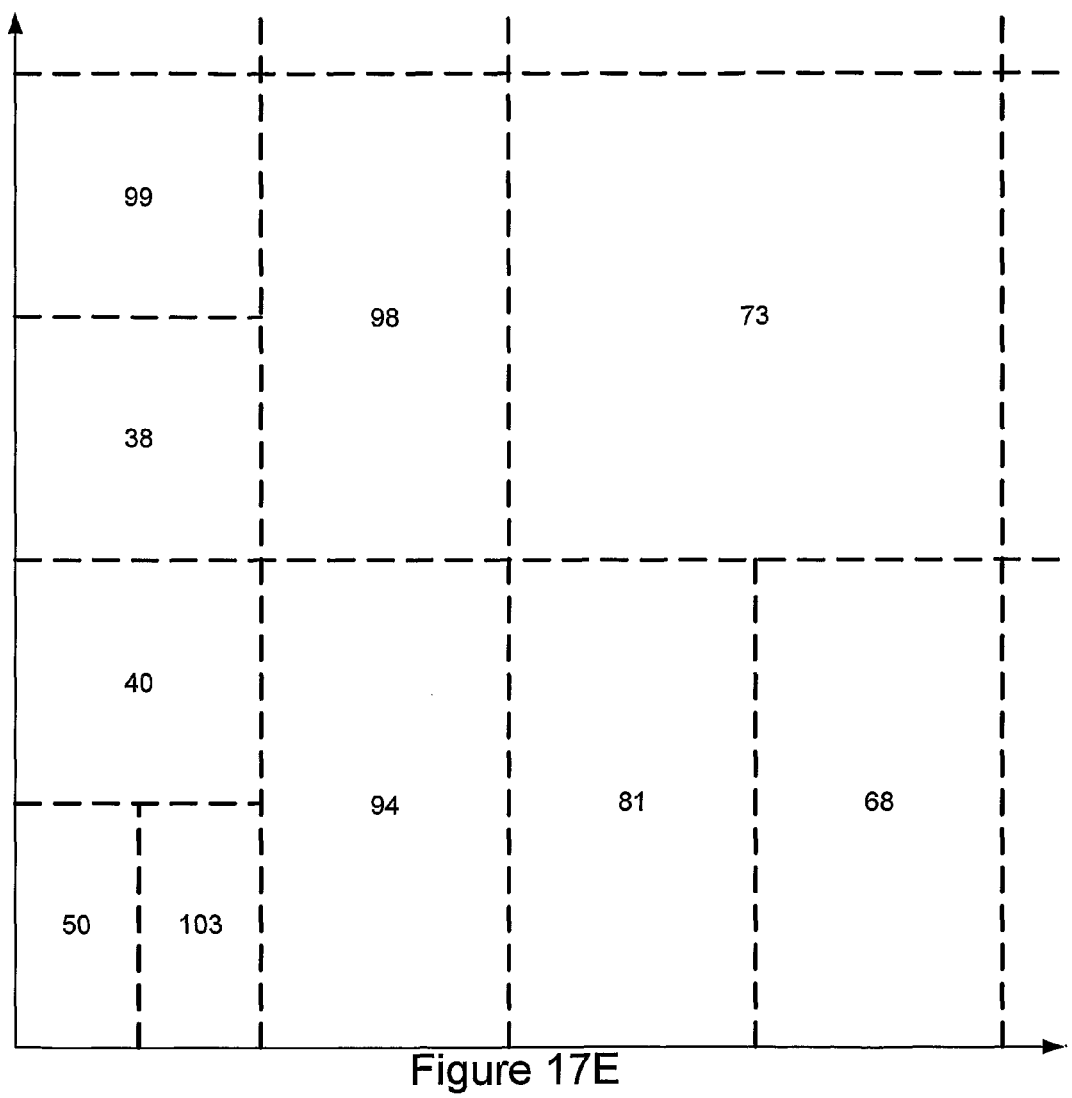
Figure 17F:
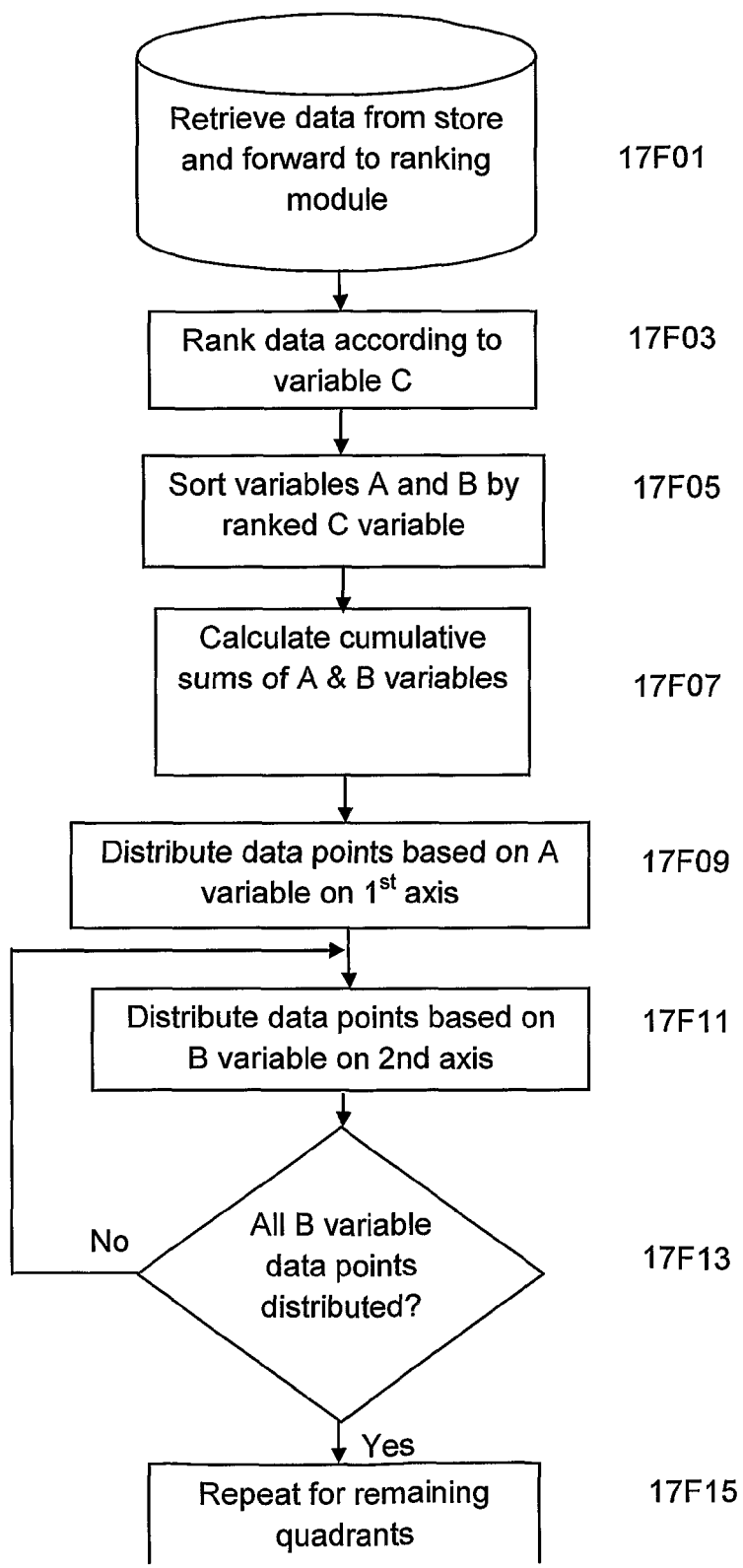
FIG. 17F shows a flow diagram of a method according to an embodiment of the present invention.

The method can be carried out using the following steps, as indicated in FIG. 17F:

The data is retrieved from a data store in step 17F01.

1) In step 17F03, rank a variable, such as the third variable V3.

2) In step 17F05, sort the remaining two variables, such as the first two variables V1 and V2, each by the ranked variable V3.

3) In step 17F07, calculate cumulative sums of V1 and V2 in the order in which they have been sorted in step 2.

4) Let T1=total of V1. Use the cumulative-sum column of V1 to split the N sorted values of V1 into two approximately equal halves. In other words, find an integer N1 between 1 and N so that the sum of values of V1 in rows 1, 2, . . . , N1 approximately equals T1/2, as shown in FIG. 17A. Thus, data points are distributed along the horizontal axis in step 17F09, as shown in FIG. 17A, while retaining the ranking information determined in step 1 above.

FIG. 17A shows splitting of N records into two parts so the sum of V1 in each part is at least approximately equal to T1/2.

5) Calculate the sum of V2 values in the rows 1-N1; let T1a be this sum. Next split the records 1, 2, . . . , N1 into two parts so that the sum of V2 in each part is approximately T1a/2. In other words, find an integer N1a between 1 and N1 such that the sum of V2 for the records 1, 2, . . . , N1a approximately equals T1a/2, and the sum of V2 for the records N1a+1, N1 approximately equals T1a/2 (as shown in FIG. 17B). Thus, data points are distributed along the vertical axis in step 17F11, as shown in FIG. 17B, while retaining the ranking information determined in step 1 above.

FIG. 17B shows splitting of N1 records 1, 2, . . . , N1 into two parts so the summed totals of V2 in each part are equal or approximately equal.

6) In step 17F13, repeat Step 5 above for the remaining V2 records N1+1, N1+2, . . . , N. The records 1, 2, N have therefore been placed in 4 quadrants, labeled 0, 1, 2, 3 in FIG. 17B.

In step 17F15, steps 4-6 above are then repeated for each of the 4 quadrants 0, 1, 2, 3 so that each of the four quadrants is further split into four quadrants, as shown in FIG. 17C.

FIG. 17C shows splitting of each quadrant 0, 1, 2, 3 into four quadrants.

This process may be iterated further to divide the quadrants into smaller and smaller quadrants. This iteration may be continued until each quadrant contains only a single data point.

In more general terms the "ranking function", such as that used for the variable V3, can be any sorting function that is deterministic in nature. For example, the variables may be sorted to minimize the statistical distance between the variables, or items associated with the variables. Alternatively, the variables may be sorted in association with more than one variable. Also, the results of a principal components analysis, or similar function, may be used to rank the variables. It is also possible to use a further variable, V4, which may be used to rank a first axis while V3 ranks a second axis.

In more general terms the "splitting function", such as that used for the variables V1 and V2, can be replaced by any function or set of functions or system of equations that generates a value for the set of items. For example the function might be a log of the total values, or a polynomial function.

An example is where V3 is frequency, V4 is frequency and V1 and V2 are profit. In more general terms the splitting function could be used to split the whole axis into any fraction. For example, the splitting function may use a higher number than 2 (any value is acceptable). Therefore, the axis could be split into multiple portions greater than 2, such as in 10ths, 3rds etc. The number of splits used will follow the same basic rules as defined herein but the value is allocated according to the higher number. Alternatively, any other method of deterministically splitting the items into buckets of equal or approximately equal but ranked values could be used.

This iteration process may create some regions which do not contain data points. Such empty regions may be used to display further information. For example, an empty region could be used to display visual designs of any suitable kind, including any of the various visual designs disclosed or referenced in this specification. The visual design used for an empty region may be of a type different to the particular design described in this example.

A further processing step may be applied to spread the data from source points into surrounding grid cells, this optional step reduces the accuracy of the individual point data but increases the accuracy of the overall image display. One example of the spread function is to half the data from the singleton cell and to create a pseudo point in the adjacent and empty cell with a value equal to half of the total.

In general, data is arranged in n dimensions. The "quadrants" are more generally n-dimensional regions. The data may have n+1 or more variables. The ranking and distribution steps can be applied to any number of axes.

Where n is greater than two, it may be necessary to apply any suitable filtering or dimension reduction technique (such as a projection or a section) to the arranged data before the data can be displayed. This allows higher dimensional data to be displayed in two dimensions. The filtering or dimension reduction process can be chosen to maximize the display of information of interest to a user. In particular, the filtering or dimension reduction process can be designed to maximize display of particular variables of interest. This process may be an integrated part of the method described herein. It can results in a reduction of the data to a point where the values can be displayed.

Principal component analysis (PCA), as described by Wikipedia, involves a mathematical procedure that transforms a number of possibly correlated variables into a smaller number of uncorrelated variables called principal components. The first principal component accounts for as much of the variability in the data as possible, and each succeeding component accounts for as much of the remaining variability as possible. Depending on the field of application, it is also named the discrete Karhunen-Loève transform (KLT), the Hotelling transform or proper orthogonal decomposition (POD).

PCA was invented in 1901 by Karl Pearson. Now it is mostly used as a tool in exploratory data analysis and for making predictive models. PCA involves the calculation of the eigenvalue decomposition of a data covariance matrix or singular value decomposition of a data matrix, usually after mean centering the data for each attribute. The results of a PCA are usually discussed in terms of component scores and loadings (Shaw, 2003).

PCA is the simplest of the true eigenvector-based multivariate analyses. Often, its operation can be thought of as revealing the internal structure of the data in a way which best explains the variance in the data. If a multivariate dataset is visualised as a set of coordinates in a high-dimensional data space (1 axis per variable), PCA supplies the user with a lower-dimensional picture, a "shadow" of this object when viewed from its (in some sense) most informative viewpoint.

PCA is closely related to factor analysis; indeed, some statistical packages deliberately conflate the two techniques. True factor analysis makes different assumptions about the underlying structure and solves eigenvectors of a slightly different matrix.

Therefore, if there are k variables in the data on which PCA is performed, then k PCs (principal components) can be computed. All k PCs together explain 100% of variability in the data. If $p1$, $p2$, $pk$ are proportions of variability in the data explained by PC1, PC2, . . . , PCk, respectively, then $p1 \leq p2 \leq \ldots \leq pk$, and $p1+p2+ \ldots +pk=1$.

Data may be displayed so as to: provide a "complete view" of all variables; provide a partial view which provides complete information for selected variables; or provide a partial view which provides partial information for selected variables. Additional variables may be displayed over the two dimensional plot.

For example a supplementary information map such as a heat map or contour map could be applied. Alternatively (or even in addition to an information map) variables could be displayed using numbers appropriately positioned over the plot. This overlay can be of an additional variable, for example, profit. This will enable visual data discovery based on the herein described method in terms of the additional metric (profit).

It has been determined through analysis that all the different values for the splitting function produce essentially the same location for the data points and that using a splitting order of 2 is computationally most efficient. In particular, where the allocation within the grid is run in parallel across various threads, processors or services using a binary splitting function provide for the maximum amount of parallel processing.

Example

TABLE 1

| | | data | | |
|---|---|---|---|---|
| Customer No. | Total revenue | No. of visits (ranking) | Profit | Items purchased (ranking) |
| 50 | 5000 | 1 | 1000 | 2 |
| 38 | 3000 | 2 | 2000 | 9 |
| 40 | 5000 | 3 | 1000 | 7 |
| 99 | 6000 | 4 | 500 | 10 |
| 98 | 2000 | 5 | 1000 | 8 |
| 103 | 1000 | 6 | 500 | 6 |
| 94 | 12000 | 7 | 1000 | 5 |
| 81 | 9000 | 8 | 1000 | 3 |

TABLE 1-continued

| | data | | | |
|---|---|---|---|---|
| Customer No. | Total revenue | No. of visits (ranking) | Profit | Items purchased (ranking) |
| 73 | 10000 | 9 | 100 | 4 |
| 68 | 11000 | 10 | 500 | 1 |

Table 1 shows a set of data values. The customer no. column shows a number identifying a particular customer. For each customer, revenue and profit data is provided. The customers have also been ranked with respect to both a number of visits and a number of items purchased.

FIG. 17E shows a two dimensional display of the data from Table 1.

The data values are ranked with respect to the x axis using the number of visits variable. The data values are distributed along the x axis using the revenue variable.

The data values are ranked with respect to the y axis using the number of items purchased variable. The data values are distributed along the y axis using the profit variable.

The summed value of all the revenue data values is 64000. The summed value of all the profit values is 8600.

The position of each data point in FIG. 17D is indicated by a number, corresponding to the customer number of Table 1. In this example, the position of each data point has been determined as follows.

From Table 1 we already know the rankings of data points with respect to both the number of visits and number of items purchased variables.

Step 1: The system splits (or divides) the customers along the X axis of the visual representation so that the sum of the total revenue for customers before the split is either equal to 50% of the total, or greater than and close to 50% of the total. That is, the system monitors the cumulative revenue values of the ranked customers and splits the ranked customers after the first cumulative value that is equal to or greater than 50% of the total cumulative value. This is to ensure that the customers are split as evenly as possible, such that each split includes substantially half the total revenue.

For example, referring to the following table 2 of ranked cumulative revenue values for customers 50, 38, 40, 99, 98, 103, 94, 81, 73 and 68 the split would occur after customer 94, so that all customers in the table above and including customer 94 are positioned on the left hand side of the split, and customers 81, 73 and 68 are positioned on the right hand side of the split. That is, the total revenue is 64000, 50% of this is 32000, and 34000 (the cumulative value when reaching customer 94 in the ranking) is the first cumulative value that is greater than 50%

TABLE 2

| Customer ID | Revenue (per customer) | Rank (No of visits) | Cumulative Revenue value |
|---|---|---|---|
| 50 | 5000 | 1 | 5000 |
| 38 | 3000 | 2 | 8000 |
| 40 | 5000 | 3 | 13000 |
| 99 | 6000 | 4 | 19000 |
| 98 | 2000 | 5 | 21000 |
| 103 | 1000 | 6 | 22000 |
| 94 | 12000 | 7 | 34000 |
| 81 | 9000 | 8 | 43000 |
| 73 | 10000 | 9 | 53000 |
| 68 | 11000 | 10 | 64000 |

Alternatively, to ensure each split includes substantially half the revenue, the split may be made before the first cumulative value that is greater than 50% of the total cumulative value. Using the same table above, the split in this example would occur after customer 103, such that customer 103 and all other customers above it are positioned on the left hand side of the split and customers 94 and below are positioned on the right hand side of the split. That is, the cumulative revenue value for ranked customer 94 is 34000, the first cumulative value greater than 50% (32000), and so the split occurs before this, i.e. above customer 103.

As a further alternative, to ensure each split includes substantially half the revenue, the system may determine where to make the split by determining which of the cumulative revenue values is closest to 50% of the total, and splitting the ranked customers at that revenue value so that the split occurs after or before the determined revenue value. Using the same table above, the system calculates that 50% of the total revenue value is 32000, and determines that the cumulative value closest to this is 34000. Therefore, the system may split the customers either before or after the ranked customer 94 where the cumulative value is closest to 50%.

That is, the split or division point is determined by looking for a total cumulative revenue value that is equal to or close to 50% of the total (32000) in the ranked customers and then allocating the ranked variables to the lower half of the split, with the remaining variables placed in the upper half of the split.

As explained above using the first example, the split point follows customer 94, where the sum of the revenues up to this customer is 34000 and prior to this customer is 22,000. Therefore, customers 50, 38, 40, 99, 98, 103 and 94 are positioned on the left hand side of the split, while customers 81, 73 and 68 are positioned on the right hand side of the split.

Step 2: The system splits the customers positioned on the left hand side of the visual representation along a different axis to step 1 by using a different ranking (e.g. items purchased) to that used in step 1 and by using a different accumulated variable value (e.g. accumulating profit values in the ranked order, rather than accumulating revenue values).

That is, the system ranks the customers based on the number of items purchased so that the value of the accumulated profit for the ranked customers before the split is equal or close to 50% of the total for the left hand side with the remaining ranked customers positioned after the split. Any of the described methods in step 1 above may be used to determine where the split occurs. In this example, customers 50, 94, 103 and 40 are positioned in the lower left quadrant, and customers 98, 38 and 99 are positioned in the upper left quadrant.

Step 3: The system splits the customers positioned on the right hand side of the visual representation using any one of the same methods as the left hand side customers were split in step 2. This will result in customers 68 and 81 being placed in the lower right quadrant and customer 73 being placed in the upper right quadrant.

FIG. 17D shows an example of the customer locations in the quadrants of the visual representation following step 3.

Step 4: The system splits the customers in the lower left quadrant of the visual representation into left and right portions (within the lower left quadrant) using one of the same methods described above based on ranking 1 (No. of visits). Therefore, customers 50, 40, 103 are placed in the left portion, and customer 94 is placed in the right portion.

Step 5: The system splits the customers in the left portion created in step 4 into upper and lower portions (within the left portion) using one of the same methods described above based on ranking 2 (Items purchased). Therefore, customers 50 and 103 are placed in the lower portion, and customer 40 is placed in the upper portion.

Step 6: The system splits the customers in the upper left quadrant using one of the same methods described above based on ranking 1 (No. of visits). Therefore, customers 38 and 99 are placed in the left portion of the upper left quadrant and customer 98 is placed in the right portion of the upper left quadrant.

Each portion or region now includes at most two customers. It is possible to make a final split of those regions (here the system simply observes the relative rankings of the two numbers to make the final split). In the example in FIG. 17A, customers 38 and 99 are further split according to the ranking 2 (Items purchased), and customers 50 and 103 are further split according to ranking 1 (No. of visits).

This gives the distribution of data points shown in FIG. 17E.

It can be seen that the splitting of the customers along the x axis of the visual representation is based on a first single ranking criteria (e.g. Number of visits), whereas the splitting of customers along the y axis of the visual representation is based on a second different single ranking criteria (e.g. Number of items purchased).

The display area as shown is divided by dashed lines into a number of regions. Regions of equal width contain approximately equal proportions of the total revenue. Similarly, regions of equal height contain approximately equal proportions of the total profit.

The left hand regions contain a proportion of revenue from the customers who visited least often (since this is how data is ranked). The right hand regions contain a proportion of revenue from customers who visited most often.

Similarly, the upper regions contain a proportion of profit from customers who bought the greatest number of items. The lower regions contain a proportion of profit from customers who bought the least number of items.

In summary, in this described embodiment, each data point (customer) is ultimately positioned within its own region or area of the visual representation as shown in FIG. 17E. The positioning of the data point is based on a first ranking variable and the splitting of a first distribution variable along one axis, and a second ranking variable and the splitting of a second distribution variable along a second axis.

It can be seen in the examples above that the variables (e.g. number of visits or items purchased) used to rank the data set (e.g. customers) being visualized along an axis are different to the variables (e.g. profit or revenue) that are used to split or distribute that same data set along the same axis.

Further, although the herein description uses the terminology x and y axes, it will be understood that the y axis is not a dependent axis. That is, the y axis is not used to record a variable (y) that is dependent on another variable (x). Each axis is used to rank and split (or distribute) independent variables.

In a further embodiment the variable being accumulated may be the same on each axis (e.g. accumulated revenue is determined for different ranking criteria on each of the x and y axis). In this case, each region displayed on the visual representation will contain an approximately equal proportion of the total of that variable. For example, in FIG. 17B, if the distribution or splitting of the customers along both the x and y axes is governed by a single variable (for example, revenue) then the quadrant 0 will contain approximately 25% of the revenue, as will each of quadrants 1, 2 and 3. Further division of the regions may be performed in this example, as described above.

The system may also display a further variable on the visual representation using a supplementary information map, such as a heat or contour map that is placed over the visual representation so it may be viewed with the information described above.

The distribution of the data points may respect the same ranking information or have different ranking information for both the x and y axes.

In one embodiment, a function may be determined for each axis where the function maintains the rank order of one metric for an item and respects the distribution of a second metric. This gives a unique position for each item on the axis. When applied to a two or three dimensional grid the result is a unique position for each item such that the sums of the values for the classification grid are equal. A contour heatmap, or three dimensional object overlay, then shows the density of the metric used for analysis.

Therefore, it can be seen that the herein described system may be used to automatically allocate or position one or a group of items, articles, objects, concepts, entities or things to or in a certain region or portion of a visual representation based on a number of variables associated with that item etc.

The herein described system may be used, for example, to monitor the quality of products coming off a manufacturing line where the different products are allocated a specific region on the visual representation based on rankings and splitting (distribution) variables from any number of different variables.

For example, the variables recorded during manufacturing and testing, as well as values obtained from sales and marketing data recorded in a database, may include mean time between failure (MTBF), mean time to failure (MTTF) or the like, cost to build value, profit margin, rank of popularity, number of items sold, number of return items, number of recalls etc.

By using the system herein described the products as a data set are positioned accordingly in a visual representation. It then becomes easier for a product manager to ascertain relevant information from the data visualization output by the system. For example, the data visualization may convey information to the product manager that indicates which of the higher profit, highly sought after products in the set are causing most or least problems. That is, the data visualization created by the system enables the product manager to note the position of the product data points in the representation and therefore identify where problems affecting profitability the most are occurring within the manufacturing environment.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

Figure 17G:
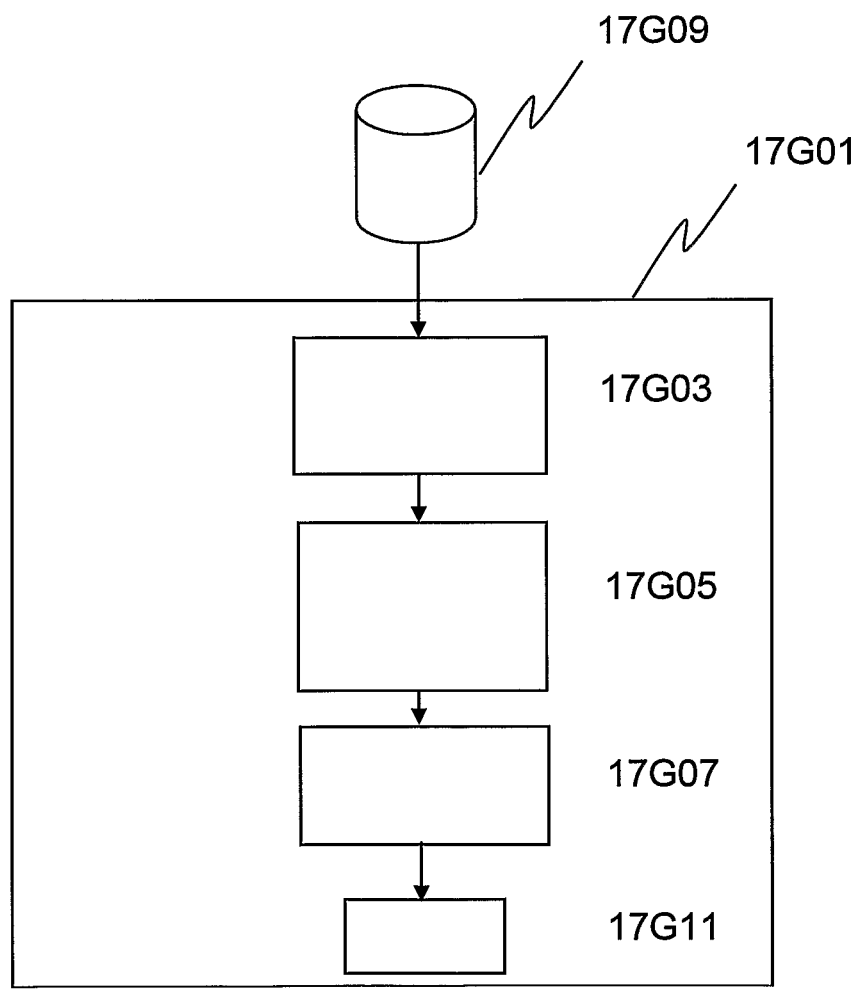
FIG. 17G shows a conceptual system diagram of a data visualization system according to an embodiment of the present invention.

According to this embodiment there is shown in FIG. 17G a conceptual system diagram of a data visualization system 17G01 that is arranged to perform a method of arranging, in n dimensions, data points representing n or more variables.

Data associated with the data points is retrieved from a data storage module 17G09 using a data retrieval module 17G03. The data retrieval module 17G03 is configured to enable the retrieval of data from the data storage module 17G09, which is in communication with the data visualization system 17G01. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

The system 17G01 includes a data point ranking module 17G05 that is arranged to rank a set of data points.

The ranking is carried out with respect to a first axis of a visual representation using a first variable associated with the retrieved data. For example, the first axis may be the axis commonly known as the x-axis or horizontal axis in a two dimensional axis system.

The system also includes a data point distribution module 17G07 that is arranged to distribute the set of data points based on a second variable associated with the retrieved data. The data points are distributed by the data point distribution module along the same axis as the ranking. Further, the distribution of the data points is carried out by the data point distribution module in a manner that ensures the information relating to the ranking of data points determined in the ranking step above is retained.

In this embodiment, the system also includes a display module 17G11 as an output module in order to visually represent the data points along the horizontal axis.

As an alternative to, or in conjunction with, the display module, further output modules may be provided to output the results of the ranking and distribution modules. That is, the raw data retrieved by the data retrieval module is analyzed and converted by the ranking and distribution modules to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the ranking and distribution modules to be interfaced with other data handling modules or storage devices.

The data point ranking module is further arranged to rank data points with respect to one or more further axes using one or more variables. For example, the further axis may be what is commonly termed the y-axis or vertical axis. Also, more than two axes may be used to rank and distribute data.

The ranking module may rank the data points using any suitable ranking methodology, such as a deterministic sorting function.

Further, the ranking module may rank the data points based on at least one of volume, importance, statistical ordering, statistical distance, quantity, or value of the data associated with the data points.

The data point distribution module is further arranged to distribute data points along these further axes while retaining information relating to the ranking of data points determined in the ranking steps described above.

The scale used along the axes used to represent the data points may be varied by the system. For instance, the maximum value allocated to any one axis may be defined by the data values for a particular variable. Alternatively, the system may define the maximum values along any axes by the sum of data values over a particular variable.

Through the use of the output module, the arranged data points, or at least a subset thereof, may be visually represented. In addition, the output module may be controlled by the system to visually represent supplementary information over the displayed arranged data sets as an overlay.

For example, the output module may visually representing the supplementary information in the form of a contour or heat map on top of the arranged data points to convey further information related to the data points.

Therefore, as described above, the data point distribution module is arranged to distribute the data points by dividing the data points between two or more regions in the visual representation. There may be n-dimensional regions created by the system for displaying the data points, where the data points represent n or more variables.

For example, the system may arrange the regions within the visual representation to convey information that is based on proportions of summed variables contained within the regions.

Further, the system is arranged to control the data point distribution module so that it can distribute data points within a region of the visual representation, by creating two or more sub-regions within the region and distributing data points between those sub-regions. The sub regions in the visual representation may then be divided further and the data points distributed within those further divided sub-regions until the representation is arranged to depict a maximum of one single data point within each of the divided sub-regions. Therefore, each data point resides in its own allocated region, and as such, each data point has a unique position in the visual representation that depicts specific information about the variables associated with that data point.

Further, through the distribution of the data points, each data point has a unique position along each axis of the visual representation determined through the operation of the ranking and distribution modules.

As there may be certain regions within the "grid" of sub-regions that do not contain a data point, these areas or regions may be used by system to visually represent supplementary information. For example, the system may control the display module to visually represent the supplementary information in the form of a heatmap. Other alternative types of supplementary information may also be displayed, such as, for example, widgets, static or dynamic objects. Further, different visual design types may be displayed as the supplementary information, such as geographical, temporal, hierarchical, spatial, virtual, classical, navigational, textual, structural, and interactive types.

Therefore, the data points being represented in the visual representation created by the system provide a complete view of information of interest, while minimizing the area or space in which the information is being displayed.

The system may also include a filtering module arranged to filter the data associated with the data points before displaying the data points or associated data on the visual representation.

In order to further minimize the number of dimensions in which the data points are being displayed, the system may also include a dimension reduction module that is arranged to apply any suitable type of dimension reduction technique to the data that is associated with the data points before arranging the data points to be displayed on the representation.

Also, the system may enable the user to selecting a set of data for visual representation, or enable a user to select a view of arranged data points, in order to maximize the visual representation of data or variables of interest associated with the data points. The selection may be monitored by the system by way of monitoring a pointing device in conjunction with a graphical user interface, or by any other suitable input monitoring method and system.

9. Navigational Visual Design

Navigational visualizations use a highly visual interface to navigate through data while maintaining the general context of the data. This data visualization method may use other visual design types so it is differentiated more by the style of how it is used than the implementation standard.

Photosynth for example is a powerful navigational tool for moving between images, its display is designed for navigation of large numbers of linked images. One illustrative navigational representation example is shown by Ubrowser$^{xix}$. This navigational visualization example shows web pages represented in a geometry design. The web pages can be navigated through by spinning the cube shown in the example.

The various industries discussed herein are characterized by middle managers and line employees being responsible for making many on the spot decisions that have significant impact on costs and revenue.

For instance, in the gaming industry, a hotel front desk clerk or shift manager has the ability to upgrade a room or provide discounts in situations where a guest is not satisfied with the service, or appears to be reluctant to pay a quoted price.

For instance, in the retail industry, in a grocery store, the Meat Department manager or Bakery Department manager may use their discretion to feature particular products by displaying them in favorable locations.

For instance, in the hospitality industry, in a hotel, the receptionist may use their discretion to grant room upgrades based on subjective factors. In order to support these spot decisions with data, it is important for relevant information be accessed quickly.

For instance, in the financial industry, in a bank branch, the lending officer may use their discretion to grant loans based on subjective factors.

For instance, in the entertainment industry, in a video rental store, the outlet manager may use their discretion to feature particular products by displaying them in favorable locations.

For instance, in the telecommunications industry, in a retail outlet, the manager may use their discretion to provide a phone upgrade or bill credit based on subjective factors.

In order to support these spot decisions with data, it is important for relevant information be accessed quickly. This is facilitated by navigational aids within a Visual Document as herein described.

An example in the gaming industry is that a manager can quickly determine the effects on occupancy of the hotel due to the occurrence of a particular event.

An example in the retail industry is that a manager can quickly determine which high profit items sell more on the weekends.

An example in the hospitality industry is that an employee can quickly bring a great deal of information to bear to make subjective decisions regarding whether to offer a discounted room to a customer that would otherwise remain unoccupied for the night.

An example in the financial industry is that a manager can quickly bring a great deal of information to bear to make subjective decisions regarding the riskiness of a loan.

An example in the entertainment industry is that a manager can quickly determine which high profit items sell more on the weekends.

An example in the telecommunications industry is that a manager can quickly bring a great deal of information to bear to make subjective decisions regarding the riskiness of a long term contract for a product.

Navigational visualizations are designed for users to interactively move through the data. The objective of the visualization is to present a large volume of data in such a way as to enable users to move through the information and gain an understanding of how the data links together.

A number of display techniques are known for displaying information with regard to a reference image (the combination referred to as primary information). Where the limit of primary information is reached a user may wish to know more but be unable to further explore relevant information. A user may also simply wish to explore other aspects although there is more primary information to explore.

It would be desirable to provide an interactive visual tool for assisting in the exploration of related data.

Figure 18A:
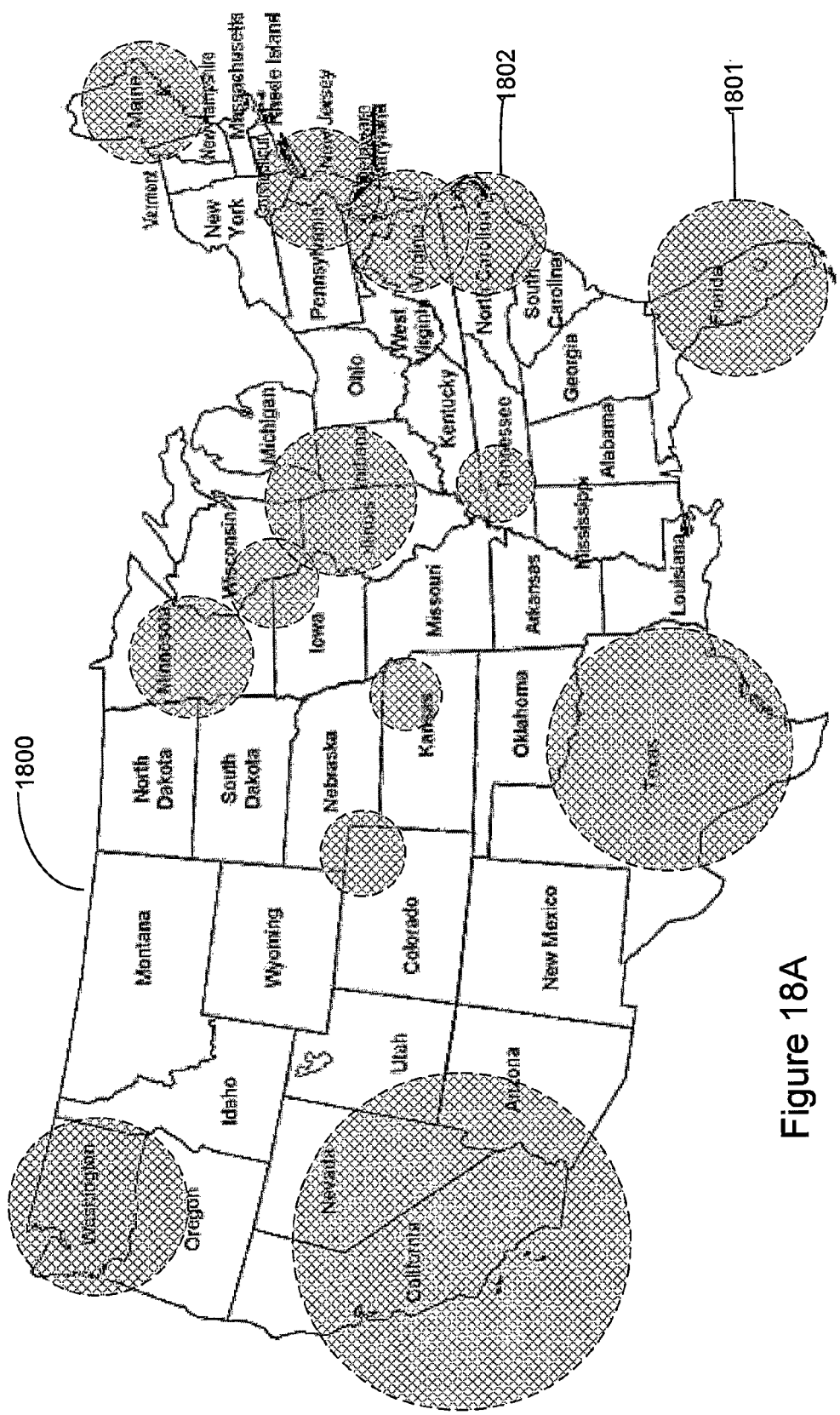
FIGS. 18A to C show heatmap diagrams according to an embodiment of the present invention.
Figure 18B:
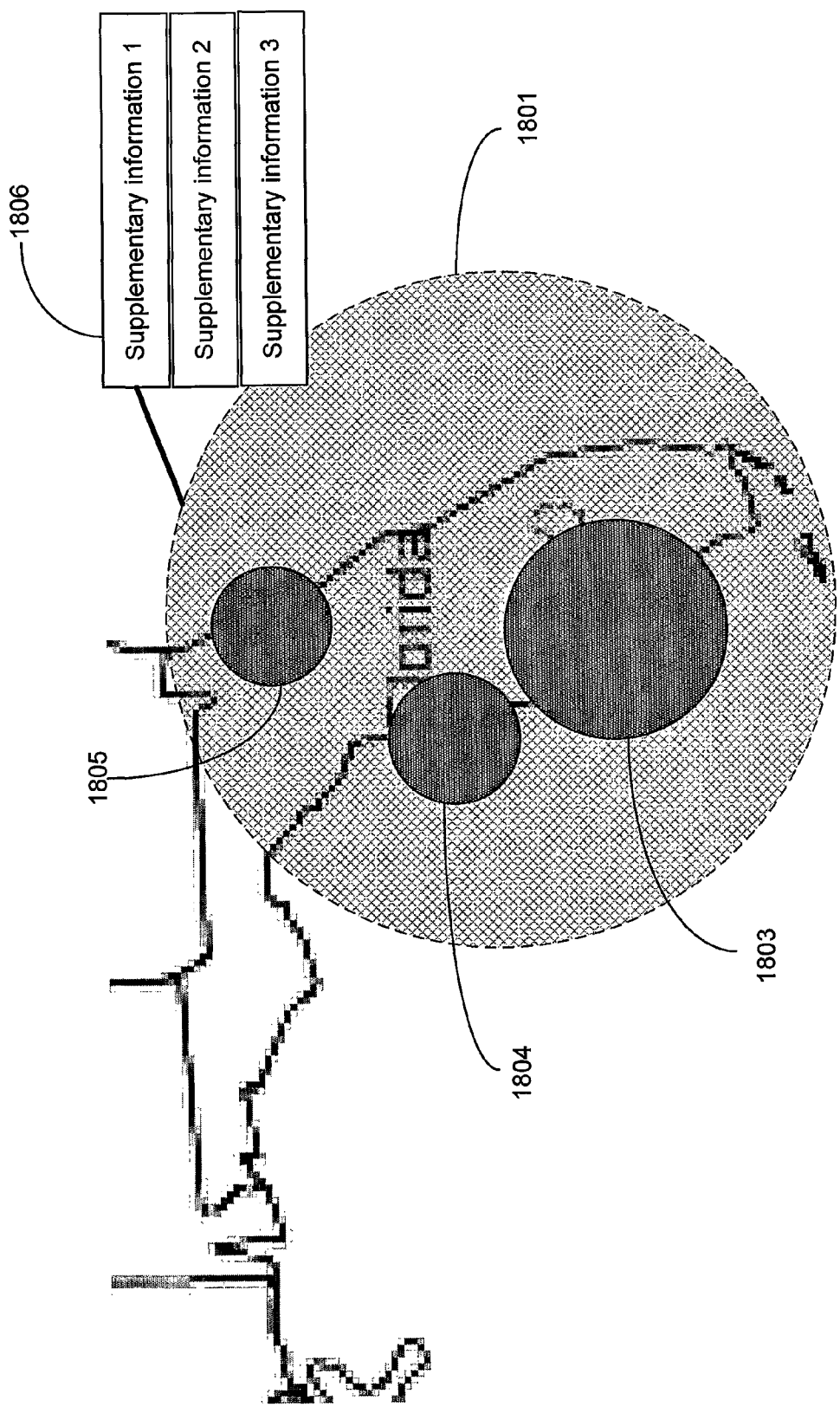

In order to reveal relevant information interactive graphical representations provide an intuitive tool for data mining. FIG. 18A shows primary information in the form of a map 1800 of the United States with a heat map overlaid thereon including regions 1801 and 1802. In this example, regions 1801 and 1802 indicate profitability of clients by the size of the region. If a user selects region 1801 by clicking on the region then an enlarged view of the region 1801 may be displayed showing sub regions of profitability 1803, 1804 and 1805 as shown in FIG. 18B.

Figure 18C:
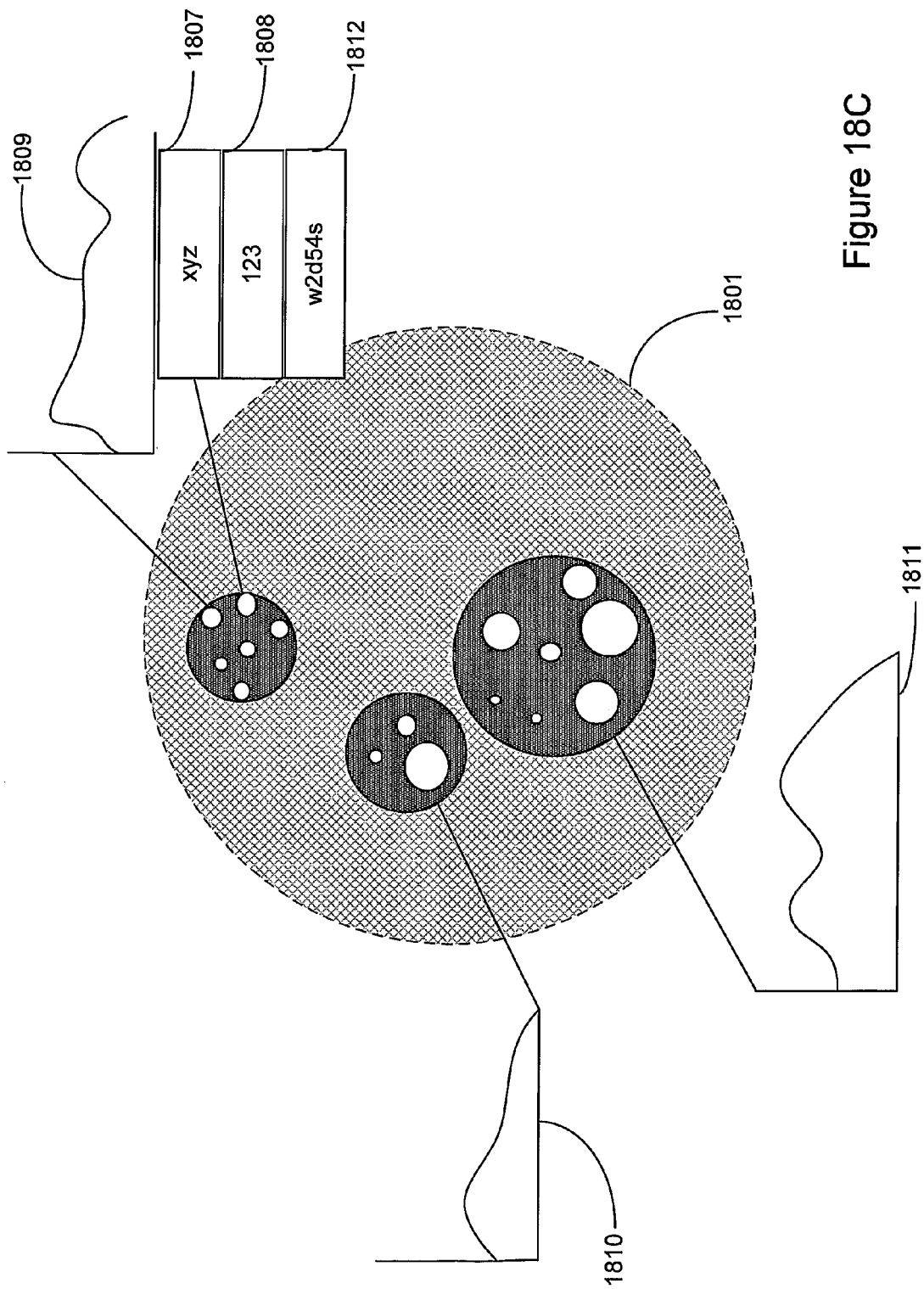

A box 1806 may appear allowing a user to select a type of supplementary information to be displayed. By clicking on one of the boxes supplementary information of the type selected relating to the primary information may be displayed as shown in FIG. 18C. For example a user may request information as to the demographics of clients within a region or some other supplementary information related to the primary information.

According to another embodiment as a user reaches the limit of primary information the display may be supplemented with supplementary information, which may include supplementary dimensions of data. For example if region 1803 is selected and there is no more primary data then supplementary data may be automatically displayed. The supplementary data to be displayed may be selected in a variety of ways. Supplementary information may be selected based upon user behavior. Behavior may be determined based on user query information, user profile information etc. The display of supplementary information may also be invoked at least in part based on intelligent determination of user intention. Intelligent determination may be based on system learning as to supplementary information found to be relevant for similar queries. Supplementary data may also be selected based upon historical prior user selection (i.e. supplementary information found to be relevant to a similar query).

Supplementary information displayed may be in the form of text 1807, numbers 1808, graphical representations 1809 to 1811 or a combination 1812 of these. The supplementary information may also be derived information such as variance (esp. variance of the supplementary information over time—e.g. sales over time), normalized supplementary information (e.g. average sales per year) or some other function applied to the secondary information.

Supplementary information may also be filtered so that only information above or below a threshold (or within a range) is displayed. The threshold may be user specified, contextually set, based on data values of primary information, based on variance of data values of primary information, based on the distribution of data values of primary information.

Supplementary information may be displayed according to forecasting reliability or historical reliability of historical information (which may be determined by a forecasting model).

Supplementary information may be displayed according to relevance to user criteria. This may be search criteria entered by a user or user profile information.

In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

The reliability of information displayed may be indicated graphically (by color or other optical characteristics).

Fractal heatmaps show the structure of the data but also allow the user to interact and zoom into any area of the data.

This can aid a user in understanding customer demographic data and the important aspects of that data. The alternative of OLAP analysis gives a similar capability but uses a numeric approach.

A key element of navigational visual designs is that they are interactive and are designed to assist in data navigation and data way-finding rather than for analytical purposes.

10. Interactive Visual Designs

This classification is for significantly advanced or interactive visual designs which do not fit within the preceding classifications.

These visualizations vary in nature from pure abstract forms to more tangible forms of visualizations. The key difference is that these visualizations may not be classified within the preceding Visual Design classifications due to their advanced nature or interactivity.

Any Visual Design layer considerations will be dependent on the interaction being considered.

There is opportunity to use common associations to provide iconic views of key events; the common associations are created using the interactive tools and asking users for feedback on the relevant icons. This feedback is then developed into a learned interactive system to provide iconic data representations.

As discussed herein, the various industries are characterized by middle managers and line employees being responsible for making many on the spot decisions that have significant impact on costs and revenue. In order to support these spot decisions with data, it is important for relevant information be accessed quickly. This is facilitated by using intelligent automated methods for quickly highlighting relevant information.

Eye movement sensors can be used to control the interactivity and to learn information about relevant icon usage and control interactivity.

A wide range of user interfaces are used in conjunction with computer systems. Generally these are simply used to provide command or data inputs rather than to analyze the underlying behavior of a user in the context of the operation of a software application.

It would be desirable to operate software applications running on a computer on the basis of observed user behavior in the context of a software application.

Figure 19:
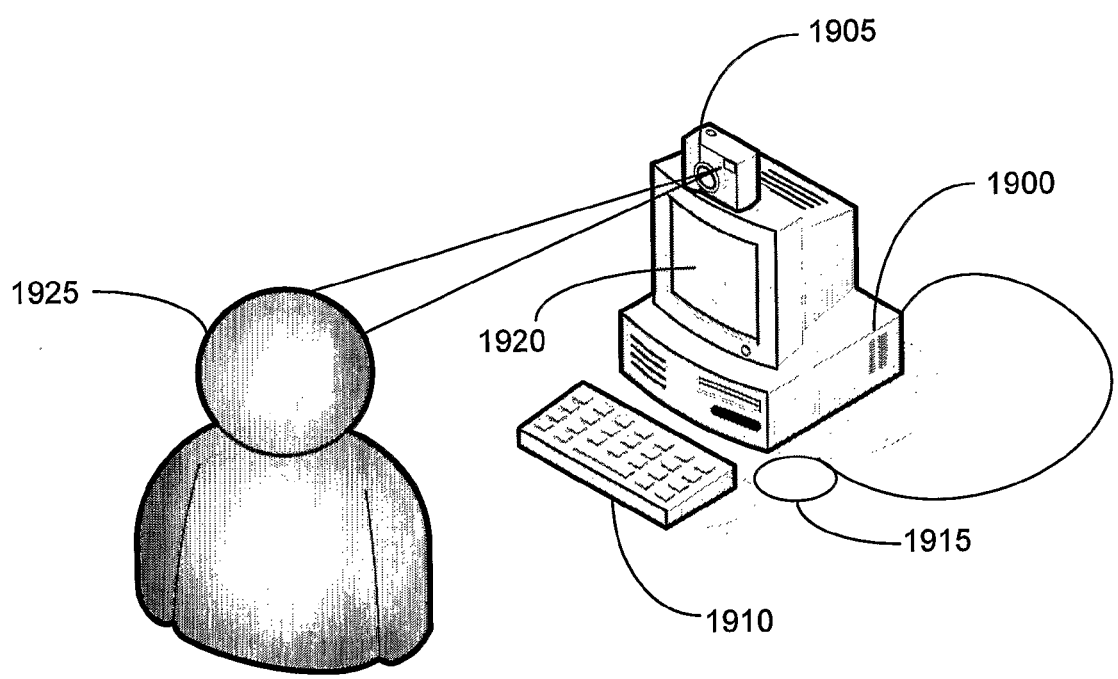
FIG. 19 shows a system diagram of an interactive visualization according to an embodiment of the present invention.

FIG. 19 shows a computer 1900 having user interface devices in the form of a webcam 1905, keyboard 1910 and mouse 1915 connected thereto. It will be appreciated that a range of other user input devices may be employed.

The user interface devices may be used to provide commands to a software application in the usual way or to capture data (e.g. images from the web cam). Inputs from these devices may, however, be further analyzed to determine user behavior attributes. For example by monitoring the eyes of a user the area of focus of the user's eyes may be determined.

Where a user 1925 is focusing towards an extremity of a display 1920 and the software application knows that there is more information to display beyond the extremity then it may scroll the screen to reveal more information to a user. This operation would be based upon parameters relating to user focus (time spent at extremity, historical motion etc.) and the context of the software application (i.e. if the software determines that there is useful information to display to a user—in some cases knowledge of the user query may enable the software application to determine that there is no useful information to display beyond the extremity although there is further non relevant information that could be displayed).

The area of focus of a user may also be correlated with information display regions on screen 1920. The software application may determine that a user is looking in the wrong area, based upon knowledge of a user query etc., and take appropriate action to draw the relevant information to the user's attention. This may be by redisplaying the information so as to draw attention to the important area by color, size, animation etc., to redisplay only the important area, to return to a prior screen etc. Alternatively attributes of operation of the software application may be changed such as information display rate, including not moving to a subsequent screen until critical information has been viewed for a prescribed period.

Color is an important aspect of information display and large amounts of color in a display can distract user attention from an area of interest. By monitoring user focus high color saturation may be maintained in and near the area of focus but be reduced in other areas to reduce distraction from the important information.

Further, information density may be increased in an area of focus. Further information may be displayed when a software application determines that user focus in an area indicates user interest in a relevant area. The further information may be enhanced detail in the information being displayed, different representations (e.g. numerical values superimposed on a visual design) or supplementary information (i.e. previously non displayed information related to information in the area of focus).

In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

The software application may also determine when a user is in a state in which more information can be absorbed ("in the zone"). In this state more information will be conveyed by displaying more information and/or displaying information at a faster rate. When a user is in this state, one or more ancillary devices (e.g. phones and communication devices) may be disabled to avoid breaking user concentration when "in the zone".

The user's state may be determined by monitoring one or more user interfaces. Whether a user is "in the zone" may be determined by monitoring the relevance and persistence of user focus in the context of software operation. User fatigue and stress may be monitored by monitoring the rate of user blinking, blink duration, eye spasms etc. When user fatigue or stress is detected the complexity of information, the rate of information display and/or the amount of information displayed may be reduced. The format of information display may also be changed, such as highlighting important information by color, animation etc.

A user may have a profile that is adjusted based on monitored user behavior in the context of operation of one or more software application. In particular a user's interaction with a software application as compared to the expected interaction may be used to alter a user's profile. An initial profile may be based on user training or be assigned to a user. A trained filter may be used to generate the user profile or it may be created by back propagation through a neural network.

The system described provides a unique functionality that relieves the user of having to make a determination as to which type of visual design is the most suitable to use for multi-dimensional data being represented. The visual design type may be any one of the ten types discussed herein, or may include further design types that have not yet been categorized but that will become available. This embodiment is not limited to choosing a particular visual design in any specific visual design category, but encompasses all available categories.

The system includes a decision module that receives determination data which is analyzed using the decision module in association with data characteristics of the multi dimensional data. The determination data may include at least one of dimensional, cardinal and correlation data characteristics of the multi-dimensional data. That is, the number of data dimensions the data represents, the number of data elements and the relationship between data elements is analyzed by the system to enable the decision module to determine the most suitable visual design type or manner of display of a visual design.

The decision module may be one or a combination of a rules engine, an artificially intelligent module and a genetic algorithm which is arranged to analyze the determination data that is received.

The determination data may be based on at least one of multi-dimensional data provided by an end user, metadata associated with multi-dimensional data, multi-dimensional data associated with one or more queries provided by an end user, or an end user profile. By using this available determination data, the system is able to make a calculated determination of the most suitable visual design type form the available types.

Further, the system is able to determine a number of different visual design types for representing the data where a single type is not suitable. This determination is also based on the analysis of the determination data. The decision to use multiple visual design types may be based upon the system determining that the multi-dimensional data has a number of dimensions that are above a predefined threshold value based on rules controlling the decision module.

The visual design type may be a graphical representation of any of the types described herein including a hierarchical type, a spatial type, a virtual type, a classical type, a navigational type, a temporal type, a textual type, a structural type, a pivotal type, and an interactive type.

The determination of the visual design type may be based on the number of dimensions associated with the multi-dimensional data. Some visual designs are better at representing data with a minimal number of dimensions, whereas others are more suited to representing data with a larger number of dimensions. As such, the determination of the visual design type may be based on an optimal number of data dimensions that can be represented by the visual design types.

The system rules may apply each data dimension with a weighting factor that affects how the visual design types are determined. In this way, certain visual design types are targeted to display certain data dimensions where those visual design types are suitable for displaying those data dimensions.

The system may also include within the determination stage a further step of determining how, or the manner in which, the multi-dimensional data is to be represented in the visual design.

Further, one or more visual designs may be assigned a weighting factor based on the data characteristics of the data to be represented.

In addition, over and above the determination of the actual visual design type, the system may include a further step to determine how, or the manner in which, the multi-dimensional data is to be represented in the chosen type of visual design.

This determination may be based on the proportionality of data elements visually represented in the visual design. For example, when the data elements being represented are of a substantially different size to each other by analyzing their size and shape, it may be determined by the system that some of the data elements are required to be adapted in the representation so that they do not swamp or obscure the other data elements. Also, if there are only a small number of smaller data elements, these may be expanded to fit in and become more easily viewable by the user.

Therefore, the elements of the display may be adjusted so that they are in at least one of a compressed format, extended format, linear format, logarithmic format, a format based on a mathematical function, a statistically determined format, a neural network derived format, a rules engine derived format, or a regression format, for example. In regards to a regression format, the format may be a least squares format.

Also, the system may make a determination on how to visually represent the multi-dimensional data in one or more styles, arrangements or levels of quality of the visual representation based on the data characteristics. That is, the style of a graph may be adjusted or used in relation to the data being represented. For example, the line thickness, number of labels, size and complexity of the legend, and amount of white space may be taken into account by the system in determining how to graphically represent the data. The amount of white space can become an important factor when reproducing a large number of visual representations on a printer, as this can ultimately save the amount of ink used to create the representation and so result in cost savings. That is, the use of white space is equally as important in representing information as the use of ink. Alternatively, arranging a visual representation in a manner that enables it to sufficiently convey information based on the data on a single screen or to be printed on a single page can reduce energy usage and the amount of paper being used.

As a further example, the axis or area of display may be changed to represent the data in the most determined suitable manner. The choice of the number of colors may also be adapted based on the data to ensure that color is only used in the most efficient way, and not used where it could obscure the information the data is conveying.

In one example, the determination data may be obtained or include a query question received from an end user, where the query question is asking the system how to represent certain data. The system will analyze the query to detect whether there are any terms that are related to its stored metadata. By looking at the metadata, the system is then able to determine the type of data to be represented and so analyze the characteristics of the different types of visual designs to find a suitable match. The analysis may be carried out by a rules engine, artificial intelligence module or a genetic algorithm.

As a further example, the mere detection that a query or related data has come from a specific user will enable the system to determine the most suitable or preferred visual design type or form of visual design for that user. This may be based on the user's preferences or may be based on other visual design types that the user has used or rejected.

Figure 16A:
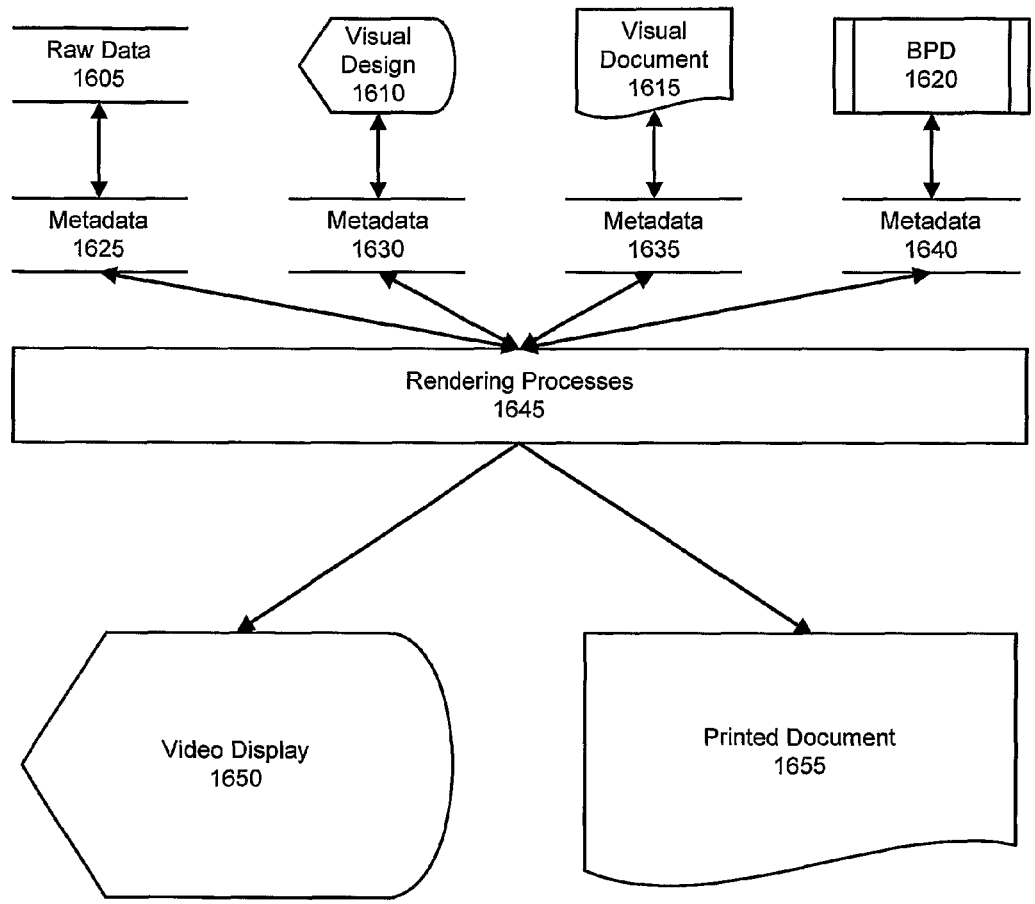
FIG. 16A shows a general flow of data according to an embodiment of the present invention.

FIG. 16A represents the data flow according to this embodiment. Metadata (1625, 1630, 1635, 1640) is associated with the raw data 1605, the visual designs 1610, the visual documents 1615 and the BPDs 1620, making each of these elements independent of one another. However, when a BPD 1620 changes its associated metadata 1635 will then change. The rendering processes 1645 uses the metadata to optimize the video display 1650 of the visual representations as well as the printed documents 1655 that include the visual representations.

Figure 16B:
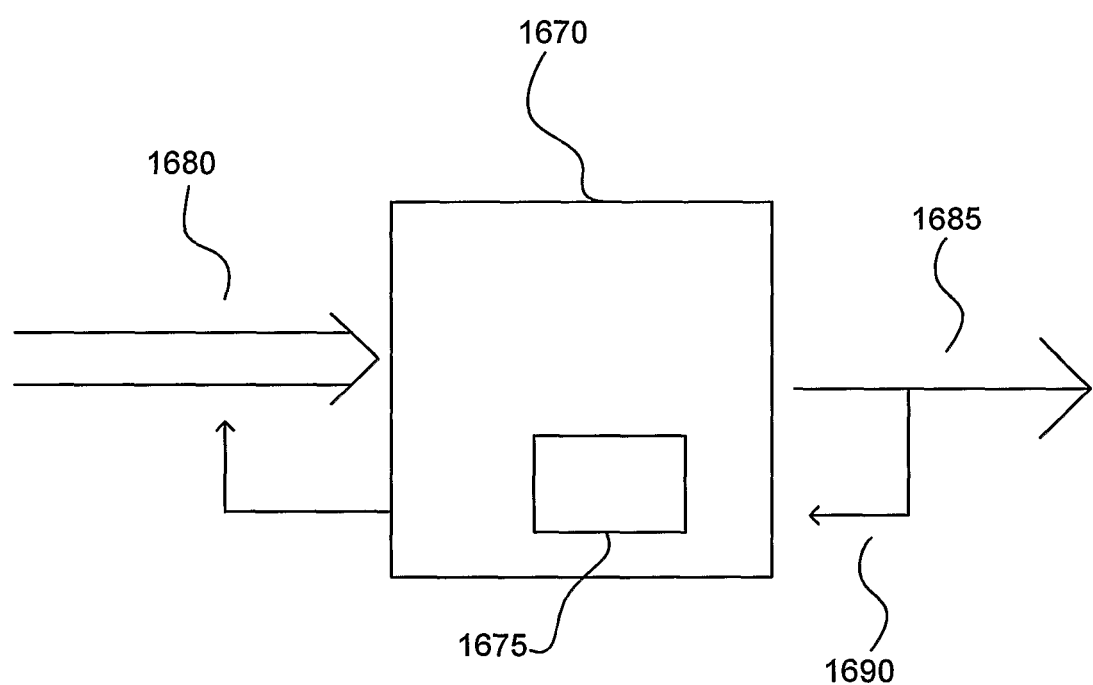
FIG. 16B shows a system block diagram according to an embodiment of the present invention.

FIG. 16B shows a system block diagram of how visual design types and the manner of visual designs can be modified. The decision module 1670 includes stored data characteristics 1675 that it can access. For example, the data characteristics may be stored internally to the decision module or may be stored externally and retrieved when the decision module requires the data characteristic information. The data characteristics may be defined and grouped in a metadata format. The format may be in the form of an index or tree.

Determination data 1680 is received by the decision module 1670, which upon analysis as described above, outputs 1685 a determined visual design type or a manner in which the visual design is to be represented, either on screen or printed. Depending on the type of decision module 1670, the output may be fed back into the system to provide a feedback loop in order to provide a more accurate determination output. This may be particularly relevant when utilizing Artificial Intelligence modules and genetic algorithms to implement this method.

Applications of Secret Database

Reference is made to co-pending US patent application "A system, method, and computer implementation of data obfuscation for secret databases" filed on 12 May 2008, application No. 61052613 wherein Secret databases are discussed in detail.

There are two methods that secret databases deploy.

Application of Secret Databases

The development of secret databases opens a whole new world of data analytics. In this new world users of the information will be able to share detailed atomic level data.

The users of secret databases will not be able to determine the atomic level information. A typical example would be that users would not be able to view lists of customers.

The limitations on the sharing of data places new challenges on the providers of analytical tools. These challenges include the inability for users to drilldown to the atomic data, that a wider group of users may have access to the detailed data, and that databases may become considerably larger as organizations share data at the atomic level.

Potential applications for the herein described methodology include government, retail, manufacturing, financial services, entertainment and gaming organizations.

The various industries discussed herein may closely guard their customer information. Additionally, disclosure of much of the information they collect, especially information that is related to credit cards, the issuing of credit, may be government regulated or may be required to adhere to stated privacy policies. Therefore, it is important that these industries demonstrate they are taking reasonable safeguards to adhere to the standards.

The secret database enables communities of data sharing. The participating organizations are able to share detailed decision enabling data while protecting the privacy of the low level data.

For example in a government organization access to the unemployment database could be provided to officials planning for social initiatives, these officials could run queries, analyze data and make informed decisions. They would not however be able to determine the specific status of any individual in the unemployment database.

Parallelism and Clustering

There are three major algorithms for allocation of Visual Document requests across a cluster:
1. Round robin
2. Load based
3. Random The particular type of algorithm that is optimal depends on the homogeneity of the request and the homogeneity of the server cluster. If both are very homogenous then essentially all algorithms are equal.

If the server cluster is quite heterogeneous then a load-based or capacity-based algorithm are typically most efficient.

If the Visual Documents are quite heterogeneous then the type of algorithm required depends on the variation of the urgency and size of the document. For example, a high urgency request should preferably be sent to the lowest loaded, least frequently used server.

Much of the customer data collected by the various industries discussed herein is done in real time. Much of the information is what could be termed perishable.

For instance, in the gaming industry, after a certain hour, a hotel room cannot be sold for that night and the potential for revenue is lost. As customers move around a casino to play games, advantages may be gained from knowing where they are located and at what level they are playing at a moment in time, so for instance, they can be appropriately welcomed and/or rewarded by an employee.

For instance, in the retail industry, after a certain period, certain items cannot be sold (e.g., a newspaper or dairy product) or must be highly discounted (e.g., bakery goods) and the potential for revenue is lost. As customers move around a retail store, advantages may be gained from knowing where they are located and which products they are selecting or examining at a moment in time so that, for instance, they can be given timely and appropriate offers (e.g., on their cellular phone or on a "smart" shopping cart).

For instance, in the hospitality industry, after a certain period, certain products decline in or lose their value (e.g., an unoccupied room). As financial conditions change, advantages may be gained from knowing the details regarding the nature of these changes at a moment in time, so for instance, the proper demand for rooms assessment analyses may be made, so that the highest potential room rates may be quickly determined based on current data.

For instance, in the financial industry, after a certain period, certain products decline in value (e.g., a bearish housing market) and the potential for adequate loan security. As financial conditions change, advantages may be gained from knowing the details regarding the nature of these changes at a moment in time, so for instance, they proper risk assessment analyses may be made, so that profitable loans may be made quickly based on current data.

For instance, in the entertainment industry, after a certain period, certain products decline in value (e.g., a newly released movie can only be featured as such for a limited time) and the potential for revenue is lost. As customers move around an entertainment store, advantages may be gained from knowing where they are located and which products they are selecting or examining at a moment in time, so for instance, they can be given timely and appropriate offers (e.g., on their cellular phone or on a "smart" shopping cart).

For instance, in the telecommunications industry, after a certain period, certain products decline in value (e.g., a value of data services). As financial conditions change, advantages may be gained from knowing the details regarding the nature of these changes at a moment in time, so for instance, proper risk assessment analyses may be made so that profitable customers can be identified based on current data.

Therefore, the speed in which data can be retrieved and rendered as visual documents as herein described is of particular value.

The use of parallel servers is advantageous in that the speed of processing of various portions of the visualization can be produced by using various algorithms that utilize parallel processing techniques. In one such example described herein, the utilization of parallel processing enables frames to be rendered in parallel in such a way as to reduce the processing time to a minimum for a series of frames.

Animations and Widgets

Much of the customer data collected by the various industries discussed herein is done in real time. Much of the information is what could be termed perishable, as discussed herein. Real time changes in this real time data is effectively illustrated as herein described using animations that can keep up with the changes in the data itself. Where data refreshes are delayed, good quality estimations will effectively assist with timely decision making. Algorithms that allow animations to keep up with the new data flow also increase their effectiveness.

In the various industries discussed herein, the ability to incorporate familiar forms or easily recognized indicators (e.g., a clock face to indicate a particular time of day) into Visual Documents as herein described will assist in quickly pinpointing key values and providing context within the visualization.

Heatmaps are overlaid on images to provide types of Visual Documents. These heatmaps become effective when they are shown as contours, as the contours have edges. The edges of the contours are animated so the Visual Documents are easy for the eye to follow.

Figure 20A:
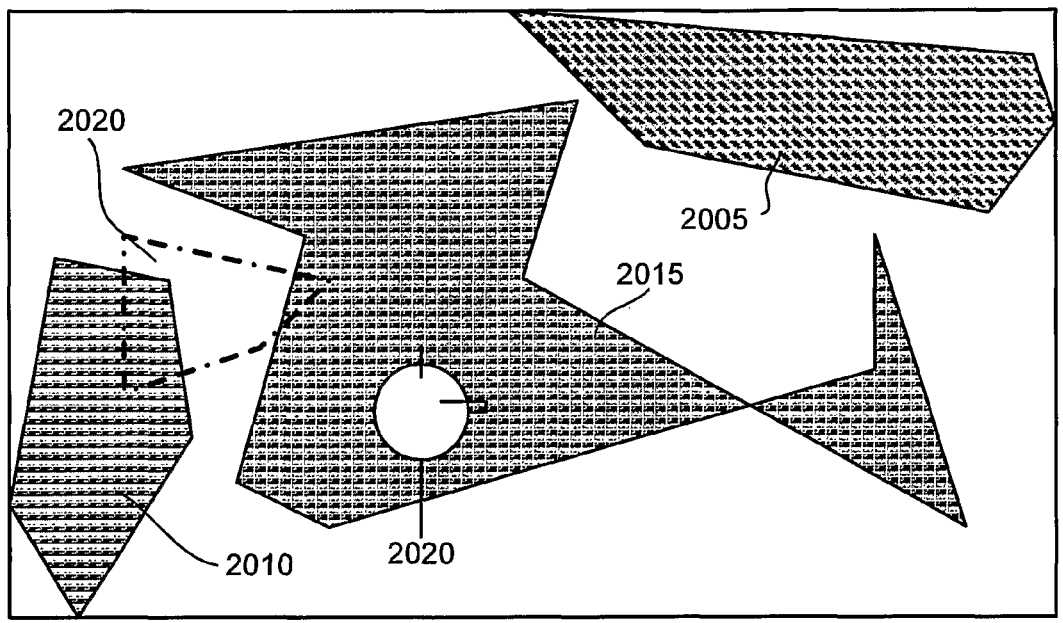
FIG. 20A shows examples of widgets according to an embodiment of the present invention.

FIG. 20A shows an example of using widgets to convey further information within a graphical representation.

A Visual Design 2000 contains several representations (2005, 2010, 2015, 2020) of data using any combination of shape, position, color, size and shading to indicate values and significance.

The shape 2020 is of special interest, and this is indicated by including animated borders on the shape. The animated borders are used to focus attention on a particular area within the Visual Design 2000.

An example of a widget 2020 indicates additional information, such as time events that have occurred, using position to indicate the data associated with the information indicated.

When animating multi dimensional data in a visualization, it becomes difficult to determine what is happening when the animation is stopped or frozen at a particular dimension (for example, frozen at a particular point in time for temporal data, or frozen at a particular dimension for multi dimensional data). The frozen image merely provides a snap shot of the data at that point without providing any indication of what's happened before or after, i.e. the context of the data is lost.

The following embodiment describes an implementation that aims to overcome this problem.

The method used by the system determines supplementary information that can be mapped onto a visual representation of data points. The system is arranged so that data points are arranged to be displayed as an animated visual representation where the data points are displayed in a sequence representative of multiple dimensions of data. Further, the supplementary information is determined based on one or more selected dimensions of the data points, and arranged in order for the supplementary information to provide an animated depiction of how the data points correlate between dimensions.

In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

Where there is a set of multiple dimensions each dimension in the set may not overlap with any other dimension in that set.

Further the determined supplementary information may be overlaid onto the animated visual representation.

Also, the system may arrange the selected dimension of data points to be displayed or printed. This may be a single dimension of data points, or may be two or more selected dimensions arranged to be displayed in sequence.

The animated depiction may be a directional representation to indicate direction of movement.

Further, the directional representation may be an animated change in visual appearance, such as, for example, a change in at least one of: the hue, saturation or value of a color; a texture; an image.

Also, the directional representation may be an animated directional icon, such as an arrow, trail or wave front.

Also, the animated depiction may indicate a correlation between the currently displayed dimension and a further displayed dimension, wherein the further displayed dimension is one of a dimension that has previously been displayed or a dimension that has yet to be displayed.

For example, the further displayed dimension and currently displayed dimension may be displayed in sequence to create the animated visual representation. The correlation may be a change in the data within the currently displayed dimension when compared with the further displayed dimension. The change in data May be a relatively significant change in the data between the currently displayed dimension and the further displayed dimension. Also, the change in data may be a change above or below a predefined threshold value stored by the system, or determined according to a set of defined rules.

As an alternative, the animated visual representation may be an animated heatmap that indicates groups of data points in multiple dimensions. The animated depiction may be arranged to be positioned near boundaries between data point groups.

The system may also determine an existing data boundary within a first dimension of the animated visual representation, and determine a position for the animated depiction in relation to the existing data boundary based on the correlation of data associated with the first dimension and data associated with a further dimension animated in sequence with the first dimension.

Figure 20B:
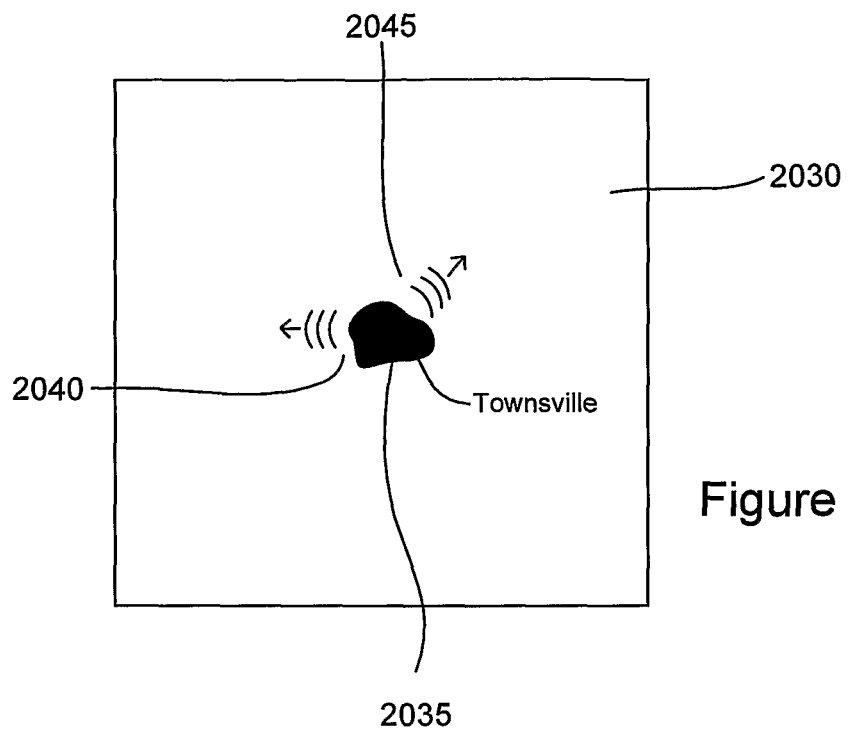
FIGS. 20B and C show a prediction visualization according to an embodiment of the present invention.

FIG. 20B shows an example graphical representation 2030 depicting the area of growth of a town 2035 called Townsville. The representation depicts a specific point in time, but supplementary information has been added in the form of wave fronts and arrows 2040 and 2045 to depict how the data is changing. This supplementary information conveys further details to the user as it indicates that the size of the town is growing over time. That is, the supplementary information conveys predicted values of the data being represented based on the current data and historical data, and how those data sets correlate with each other.

Figure 20C:
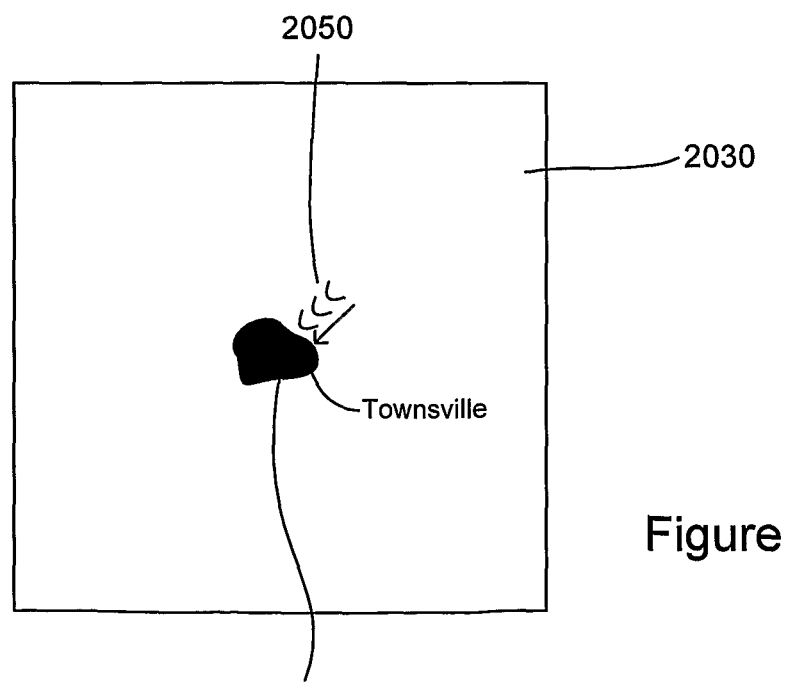

FIG. 20C shows a similar representation 2030 that includes the same data when excluding the supplementary information. However, in this case, the supplementary information 2050 provides a depiction that indicates that the size of the town is getting smaller.

In these examples, the position and number of people living around the town are the selected dimensions of the data points that are being used to determine the supplementary information.

Therefore, supplementary information can be used to animate edges, areas or portions of a representation to convey further information about past or predicted (future) data. The animation of the supplementary information conveys a sense of direction in a more meaningful manner than that of static images.

Data Tween Animations

Data frames in an image are produced using the actual source data. To make the animation smooth, the transition from frame to frame may be tweened.

A data tween is an intermediary frame that is interpolated between actual data frames. The interpolation algorithm is typically a straight linear interpolation. Data tweens are most useful when creating animations where the data has insufficient time resolution to create a smooth animation.

Figure 21:
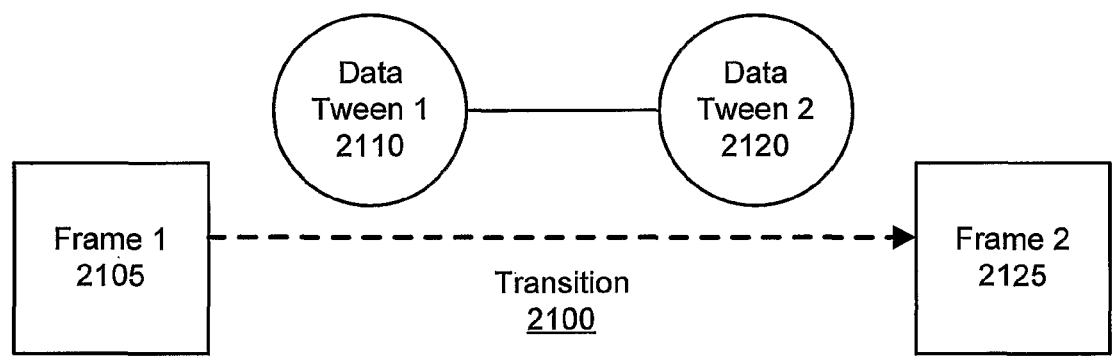
FIG. 21 shows tweens according to an embodiment of the present invention.

FIG. 21 shows an example of using tweens on pivotal and other visualization methods.

Data Tweens 217 may be used to smooth animations when data retrieval is erratic or if there irregular wide gaps between data points.

A transition 500 is depicted from Frame 1 2105 to Frame 2 2125.

The data required to generate Frame 1 2105 and Frame 2 2125 is retrieved. An algorithm is used to evaluate the quality of the animation based on the data retrieved. Two Data Tweens 2110, 2120 are calculated and incorporated into the animation to improve its appearance.

Pseudo Tween Animations

Psuedo Data Tweens 218 may be used to smooth animations when data retrieval results in small gaps in the data, making animations difficult to perceive. They may also consolidate data into fewer way-points.

Pseudo tween is the opposite of a data tween. Pseudo tweens are most useful where the data has too much granularity to make the animation intelligible. These animations are typically generated from a moving average window.

Animation Optimization

Animations normally produce extraordinary numbers of database queries and large amounts of rendering time, and consequently very large Visual Documents.

Animated frames are processed and rendered in sequence. This is time consuming and computationally inefficient. Two adjacent frames may be processed separately (e.g. in parallel) and then joined together afterwards, but non-adjacent frames can not. Alternatively the frames may not be joined but stored as a sequence of still images.

In order to address this problem, the system described herein acts as follows. When an animation request is submitted it may be broken into pieces of at least two data frames so that data interpolation is possible.

One highly efficient animation parallelization algorithm is a b-tree algorithm where each node splits, runs two more Visual Document frames and then is responsible for joining the results. This is depicted as 2200 in the FIG. 22.

The data frames 2205 are depicted in the order in which they will be displayed. That is A, B, C, D, E, F and then G. These frames are required to animate the representation that has been requested.

Each frame is rendered in parallel within a plurality of nodes using a number of different processors. In this example there are seven processors than run in parallel for each of the seven frames. As frame D is determined to be the halfway point, based on a binary tree, this frame is at the top of the hierarchy. That is the group of frames are split in two at D, thus allocating D to a single processor. This allocation step then continues throughout the frames until all the frames are allocated as shown.

Once the frames are rendered by each node they are fed from that node (a child node) to its associated parent node. Once the parent node has received all frames from the child nodes, it can join the received nodes until all frames are processed. In this manner, a visual representation of data points associated with a metric, such as a business metric, can be animated. If the individual frames are not be joined back together the spreading function can simply spread the load until the frames are all running in parallel as there is no need for the back flow through the parallelism engine to join the results.

In this further embodiment where the frames are generated independently without joining them into an animation, additional frames may be added to the sequence at a later date without having any reference to the existing frames.

It will be understood that the frames may be split in any other suitable way, such as in three four etc, depending on the number of processors available, the number of frames to be processed and various other factors that will determine the time to process.

Figure 22:
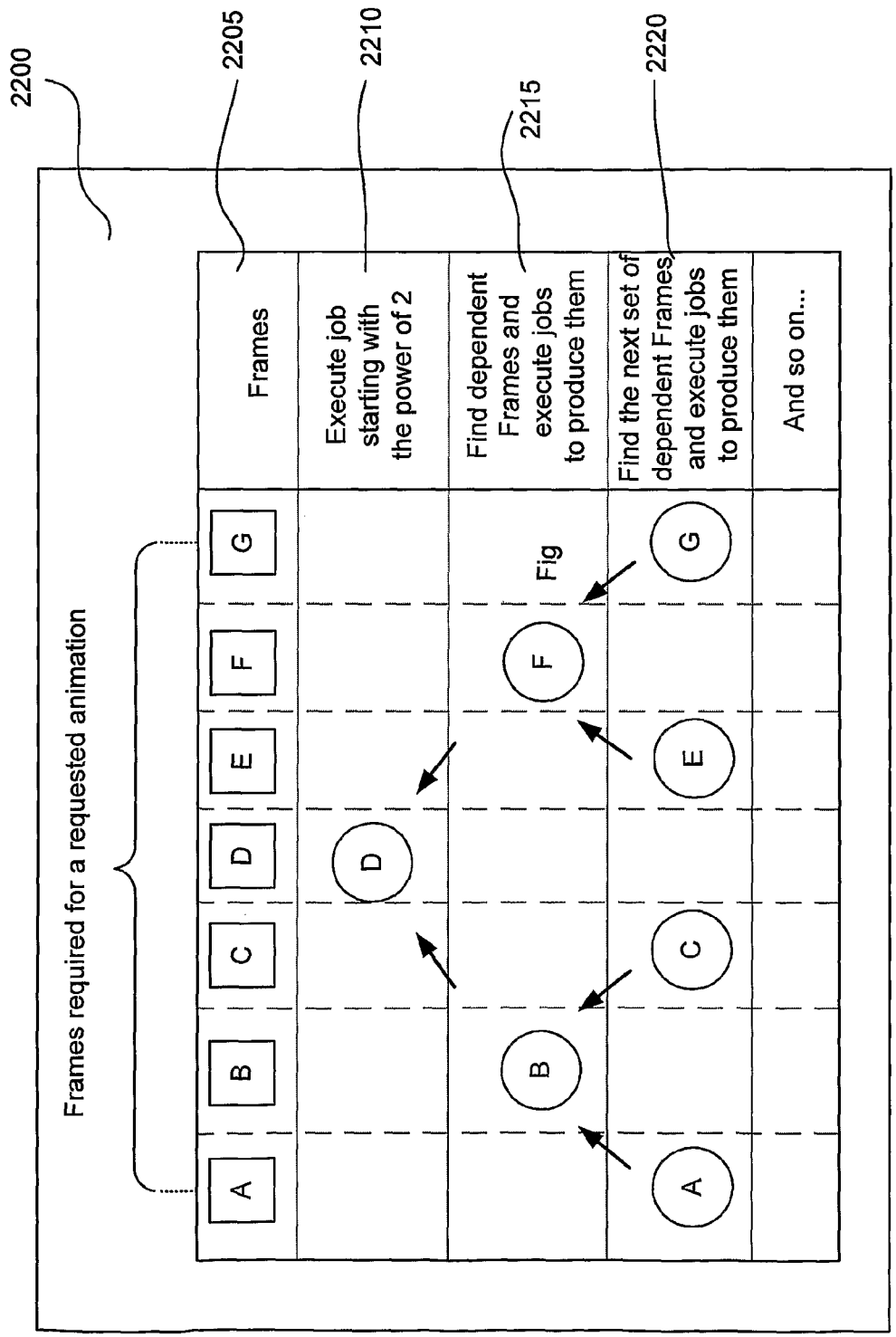
FIG. 22 shows parallel processing of data frames according to an embodiment of the present invention.

The sequence carried out in the example shown in FIG. 22 is as follows. The first frame D is executed by binary splitting the frames at 2205. Dependent frames are then found and allocated, and subsequently processed at 2215. The next set of frames are subsequently allocated and processed at 2220, and this continues until all the frames are allocated and processed. The rendered frames are then fed back up the hierarchy until received at the top of the chain where they are added together to form the complete animated image. It will be understood that the rendered frames may be joined either as they pass up through the hierarchy or when they reach the top of the hierarchy.

Each node of the computational tree may have n number of branches, where n is an integer and equals 2 or more, such that the number of nodes in a first layer of the tree varies by a multiple of n compared with the number of nodes in a second layer directly below the first layer.

Further, the number of processors may be equal to the number of child nodes that aren't also parent nodes. That is, the number of processors may be equal to the number of leaf nodes.

Also, the step of joining the frames at each parent node may be carried out upon receiving the rendered frames from all child nodes of that parent node.

The parent nodes may then feed the resultant joined frames to their parent nodes until all frames have been joined.

Other Optimization Techniques

Differential contour adjustments; in other words the contour grid is adjusted only in areas which change between frames so the entire surface does not need to be re-rendered.

Reduction of visualization grid resolution.

Optimization of visualization queries to the database.

Careful management of the number of Visual Document requests in the library (particularly the scheduled library).

Priority management (background processing).

Widgets

Widgets are dashboard-like in that they have low levels of data density. They can be powerful in that they allow the user to understand the context of the animation.

The following is a list of widgets that could be used for an animation. Depending on the type of animation, and the nature of the data, some widgets may be more suitable than others.

Figure 23:
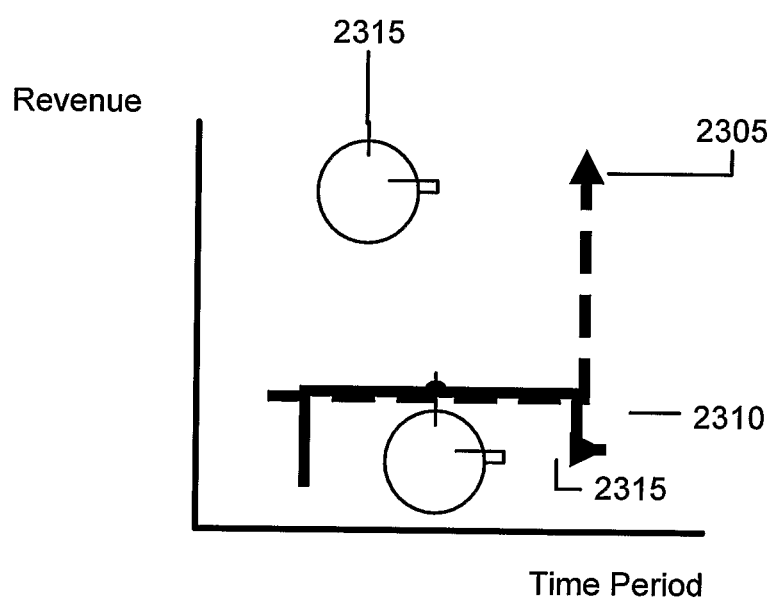
FIG. 23 shows a visual design example according to an embodiment of the present invention.

Looking at FIG. 23 an example of incorporating the use of conventional gauges, charts and graphs (widgets) is shown in a manner that accentuates more sophisticated visual designs incorporating animations.

In the graph 2301, two related time sensitive revenue streams (2305, 2310) are tracked in real time. As new time sensitive data is available, the lines (2305, 2310) are updated.

Because there is a greater lag in receiving the data depicted in 2310 than for that in 2305, clock icons (2315, 2320) are used to show values for a comparable time period.

The following table describes further examples of widgets that may be used.

| Widget | Description |
| --- | --- |
| Progress Bar | A progress bar could be shown to monitor the BPD over the time of the animation. In addition the data on the progress bar could be compared against other meaningful values.<br>The example shows sales being measured on the progress bar compared to the hourly average. Therefore as the animation moves from T1 to T2 the data on the progress bar (dynamic) can be compared to the hourly average (static for each hour). |
| Gauge | A gauge can be shown to provide a summary of the data at a point in time within the animation.<br>For example, in this animation, sales were $98k. |
| Clock | A clock can be used to translate any point in an animation (from T1 to T2) into the time the data was recorded.<br>For example, if the animation was paused at 3:48, then the time on the clock would be the time the sale (being shown on the animation) was recorded. |
| Tabled Data | Selected data attributes can be shown in a table format, the system would then dynamically populate data as the animation moves from T1 to Tn.<br>For example, if the data attributes 'current hour' and 'sales' are selected, the table will show the values for these attributes as the animation moves from start to finish. |
| Directional Arrows | Arrows that grow and shrink as the data varies. They show the direction, magnitude and speed of data movement where possible.<br>For example, a turnover animation would change on the hour based on the hourly increase or decrease in sales. |
| Spark-line | Shows entire range of values scrolled with each frame to show context.<br>For example, sales are plotted on a graph relative to time. The thick bar (marker) represents the point in time through the animation. |

Business Performance Drivers (BPDs)

As discussed above, types of visual designs can be determined by the system based on data characteristics. The following embodiment provides additional examples of how the type and form of the visual design can be determined from characteristics of business measures.

In normal charting procedures, data (business measures) is displayed according to a visual design type chosen by the user. The visual design type is chosen by the user according to what the user thinks is the best visual design type to use. This is not necessarily going to be the most suitable visual design type for the data being displayed. Further, even if the correct type of visual design is selected, the visual design can take on many different forms as defined by the user. However, the selection by the user of the parameters that defines the form of the visual design does not take into account how best to represent the data based on characteristics of the data.

The system described herein includes processing modules that are arranged to determine a type of visual design that is suitable to represent business measures selected by a user. The system does this by processing the business measures and categorizing them based on one or more characteristics of the business measures, and retrieving data associated with the business measures that is to be represented in the visual design.

The system then determines one or more categories for the retrieved data, in order to determine parameters based on the business measures and the determined one or more categories. The parameters are associated with particular types of visual design. The system can thus determine a suitable type of visual design based on the determined parameters.

The system may also determine a particular form of the visual design by which to represent the business measures. The determination of the form or type of visual design may be based on parameters associated with the determined one or more categories.

The retrieved data may be multi-dimensional data or data of a single dimension.

The categories associated with the retrieved data may include SQL, predicted, arithmetic, formulae, time or time difference categories. However, further category types may be added as required.

The system may also be arranged to determine display options based on the determined form or type of the visual design. Subsequently, a menu may be provided, for example, the options may be displayed on the screen. The menu may include a number of determined display options that the end user can then select as he thinks fit. The determined display options will be chosen from a subset of the total display options and will be based on the analysis of the business measure characteristics. In this way, the user is not able to select options that are not at least partially suitable for the business measures being displayed.

The determined display options may be output in an alternative form, such as printed form, data files, or information to be displayed on the screen.

Rather than providing details to the user of the preferred determined display options, the system may instead automatically create the visual design based on the determined display options.

The display options may be determined by ranking the determined parameters automatically. Also, by using a fuzzy logic module or a rules engine, the display options may be determined by applying the determined parameters to one or both of those modules. Optionally, iteration steps may be used on the determined parameters in order to hone in on more suitable and detailed parameters.

The form or type of the visual design may be determined by applying a weighting function to the determined parameters, particularly in the form of an artificial intelligence module or fuzzy logic module.

Normalization steps may be applied when the determined parameters are analyzed and the analysis determines that normalization of the business measures is required, or at least preferred, for the visual design.

Also, with reference to the secret database discussion herein, if it is determined by the system that the determined parameter indicate that the business measure has a confidential characteristic, the determination of the form or type of the visual design may be based on representing the business measure in an obfuscated manner. This ensures that confidential information is not inadvertently placed in the representation.

The data associated with the business measures may be analyzed by analysis modules in the system to determine whether the data includes any errors, and when the analysis module determines an error a suitable form or type of visual design can be determined based on the data analysis.

The data analysis may involve analyzing the data to determine whether any portion of the data is incorrect or missing. Also, the step of analyzing the data may include analyzing the data's history. For example, the history analysis may include at least one of analyzing null values, last update values, and frequency of update values in order to determine if data is corrupt or missing.

At a more intelligent level, the system can use a rules engine or artificial intelligence engine to analyze the data to determine whether the data is correct or accurate in the context of a query that has been made by the user. For example, the data may be analyzed to see if the data is a reasonable result in the context of the query that was made. This determination may be based on a set of rules and threshold values for certain queries.

Figure 24:
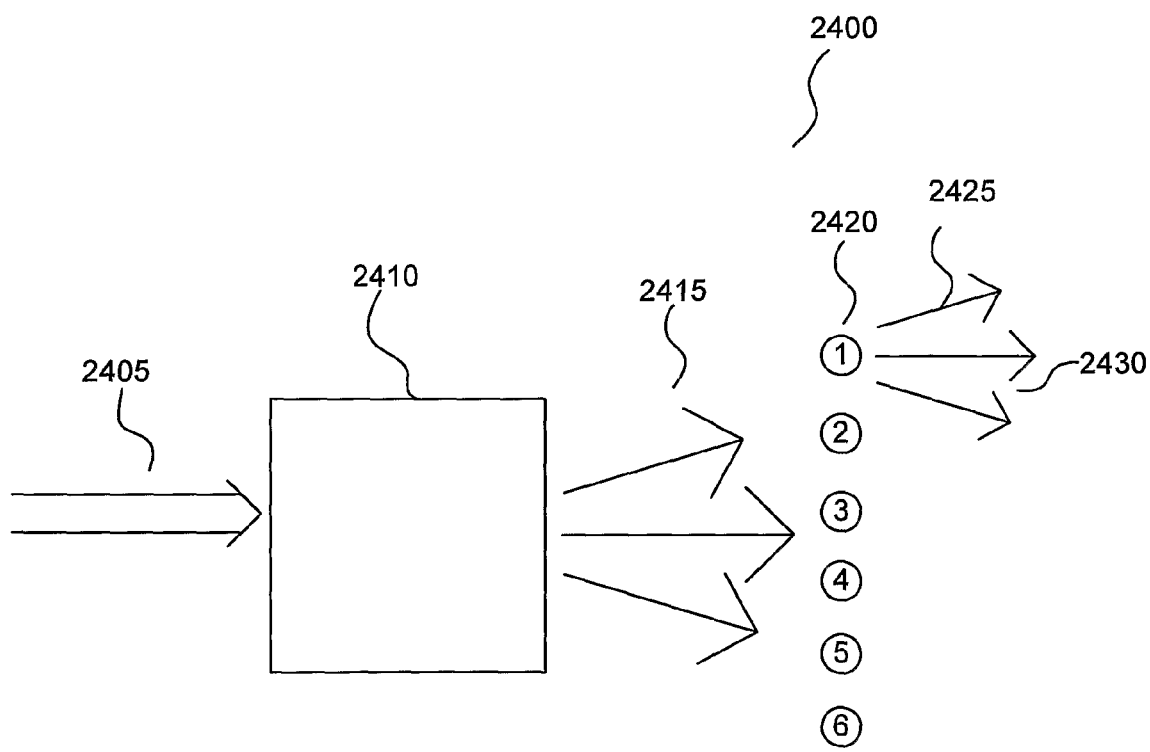
FIG. 24 shows a system block diagram according to an embodiment of the present invention.

FIG. 24 graphically depicts the modules of the system to implement this embodiment. Data 2404 associated with the business measures is input into an analysis module 2410, which provides an output 2415 of a category 2420 to place the data. For each category 2420 a number of parameters 2425 are collated. It is these parameters that provide an output 2430 that determines the type or form of the visual design.

As discussed above, BPDs can be defined to use one of the 6 classes depicted in the following table.

These 6 classes are explained in the following table:

| BPD Type | Key Attributes |
|---|---|
| SQL | Generates one or more SQL statements that are executed against a SQL compliant database. |
| Predicted | These predict BPDs third party modeling engines. |
| Arithmetic | A calculation provides simple arithmetic formulas based on multiple BPDs, the calculation is one row at a time. For example, profit per customer = revenues − expenses. Where revenue and expenses are BPDs in themselves. |
| Formulae | A formula provides a calculation on an entire set of data. For example, Mean, Median, Standard Deviation. These could include calls to external calculation engines.<br>These formulas are defined in metadata. |
| Time | Time operations performed on BPD data with time parameters. Operations include spread, average, mean and others. While it is possible to implement these as formulas the time based BPDs have many methods available, formula based have only the specific formula.<br>These time operations are not defined in metadata. These operations are specifically coded for the BPD type of time.<br>The time BPD type could include seasonality and other behavioral or geographically defined time periods. |
| Time Difference | For a selected BPD, the comparison of 2 time periods. This could be simply the absolute difference in measure, or percentage difference. |

Time includes normalization to a specific time period. Normalization of data values is an intrinsic part of displaying some visual documents.

Many BPDs can have multiple (typically time based) normalization methods available to them. The classic example of normalization is to calculate the BPD per day.

Normalization enables the comparison of different time periods of source data.

One useful normalization is to normalize by the significance of the variation from the mean. The significance can be calculated either from the mean of the current dataset or for all datasets associated with the Visual Document. For example, the significance of a variation from all data frames in an animation as opposed to one data frame in an animation.

BPDs can have one or many methods applied to them. Typically for each of the methods defined, there will be one or many applicable Visual Designs.

In turn, for a Visual Design there will be a number of items (metadata) that define it. For example, for a typical bar graph—bands, colors and scale will be defined as part of the visual design.

Relating BPDs and Dimensions to a Data Source

BPDs and Dimensions are abstract concepts that will generally be mapped to fields in a client's database.

However, this is not mandatory. This allows flexibility (in future releases) to potentially map BPDs and Dimensions to other non-database data sources such as files.

BPDs are always a measure. Therefore we couldn't have a BPD that represents a "String" or "Time" information. Examples of measures are:
  Sales (Number)
  # of DVDs rented (Number)

Dimensions can represent different types of data including "String", "Number" and "Time". For example:
  Name of Product (String)
  Latitude (Number)
  Longitude (Number)
  Date of sale (Time)

Normalization

Typically a BPD represents a measure by unit of time. To represent a BPD we have to inform what unit of time to use from the source data. This concept is called Normalization.

The types of time normalizations (and the definitions for these) are known as Normalization Units, normalization units are often the denominator in the normalization process. These inform a BPD how to convert between different time units.

The normalization units currently defined are:

| Normalization Unit | Definition |
|---|---|
| Hourly | YYYY/MM/DD:HH |
| Daily Cron | YYYY/MM/DD:0000 to YYYY/MM/DD:2359 |
| Yearly | YYYY/1/1:0000 to YYY/12/31:2359 |
| Weekly | YYYY/MM/05 (Sunday) to YYYY/MM/12 (Saturday) |

In order for the system to perform the normalization the following data is needed:

a. The normalization unit of the source data must be configured.

b. The BPD and normalization unit requested by the user

At this point, the system compares these two kinds of normalization and determines how to convert data.

Time Selection

The described solution will inherently eliminate the concept of system time. Visual Documents will typically be generated using either one relative time or one local time definition:

Relative time Visual Documents—data is displayed at the actual moment it occurred. So data for a Visual document at 5 a.m. Pacific Time would show data from 8 a.m. Eastern Standard Time.

Local time Visual Documents—data is displayed at their local date and time. So data for 5 a.m. Pacific Time would be shown along with data for 5 a.m. Eastern Standard Time.

A useful Visual Document would be to provide a visual comparison of different calendars. For example, the Hebrew calendar to the Gregorian calendar. This would enable comparison of a dataset, to say Julian dates.

The Julian day or Julian day number (JDN) is the integer number of days that have elapsed since the initial epoch defined as noon Universal Time (UT) Monday, Jan. 1, 4713 BC in the proleptic Julian calendar. That noon-to-noon day is counted as Julian day 0. Thus the multiples of 7 are Mondays. Negative values can also be used, although those predate all recorded history. Source:

Date and time are very subjective descriptions, and in the real world the way that the date is determined has an impact on its results. For example, the third Monday of a month is quite different to the $18^{th}$ day of the month as the $18^{th}$ day can be on any day of the week.

The described solution understands the following concepts:
1. Time zones
2. Precision
3. A Point in Time
4. Local Time
5. Time Definitions. For Example, 3rd Monday of the month, 4th Business day of the month, quarters, half years, Wal-Mart week, gaming day.
6. Special days. For example, Easter.
7. Relative days. For example, Saturday before Christmas.
8. Seasonal periods e.g. summer, winter, fall, spring
9. Conversion between multiple times. For example, local date/time of observer vs. observed.
10. ISO 8601:2004 Week Numbers.

These concepts of time are used in BPDs to produce meaningful Visual Documents.

Selection for Feedback and Action

Users will have the ability to create a list of data from a Visual Document. The described solution may instruct the external system to read the list. It is preferable that the described solution does not have the responsibility of ensuring a successful write operation to external systems.

The following table describes the 360 degree cycle:

| Step | Description | Example |
| --- | --- | --- |
| 1 | A Visual Document is produced as a result of a user request. | Sales by region for time period T1. |
| 2 | The user creates a list (subset of values) from that data. | A list of customers from specific locations. |
| 3 | The results of the user's action can be fed back through the described solution and queried again. | View the original list, the control list and the list of responses to the survey. |
| 4 | Through a second Visual Document the results of the action can be depicted to determine its success. | View the sales by region for time period T2 and specifically the sales in locations used for the mail outs for time period x + y. |

Visual Documents

Visual Documents are the rendered output along with the data used to generate it. For example, this could be a store layout showing the movement of selected customers between a specific time period, for a particular date and the associated data.

Subclasses of Visual Documents are set out in the following table:

| Subclass | Description |
| --- | --- |
| Visual Only | Only contains the final imagery. For example, no drill-downs or OLAP possible. Imports from external systems are likely to be of this type. |
| Detailed | Contains imagery and the detailed data required to perform low-level investigations. |
| Re-Runable | Contains the required metadata to allow the query to be run again with changed restrictions. |
| Re-Useable | Contains the required metadata to allow the Visual Document to be used as a Visual Design, changing any metrics and/or restrictions. |

Visual Documents should have the following attributes:

| Attribute | Description |
| --- | --- |
| Distribution | The Visual Document should be able to be distributed across users. For example, Manager of Dept A sends the Manager of Dept B a Visual Document for further investigation. |
| Historic | Ideally a Visual Document can be produced from any time in the past and still be accurate - regardless if the properties of that BPD have changed over time. Alternatively, a BPD or Special Layer may be retired. If this happens, the Visual Document subclass will be changed from re-runable or re-useable to either detailed or visual only. For example, if the way a temporal Special Layer is displayed is changed, then a historic Visual Document can no longer be re-run and produce the same result. It must therefore be retired. The system is responsible for controlling how the data is displayed, but the database is responsible for handling the historic data. It may be possible to do an intelligent retire where the user is provided the option of comparing the new implementation with the historic one for verification purposes. |

Caching Design Pattern

Figure 29:
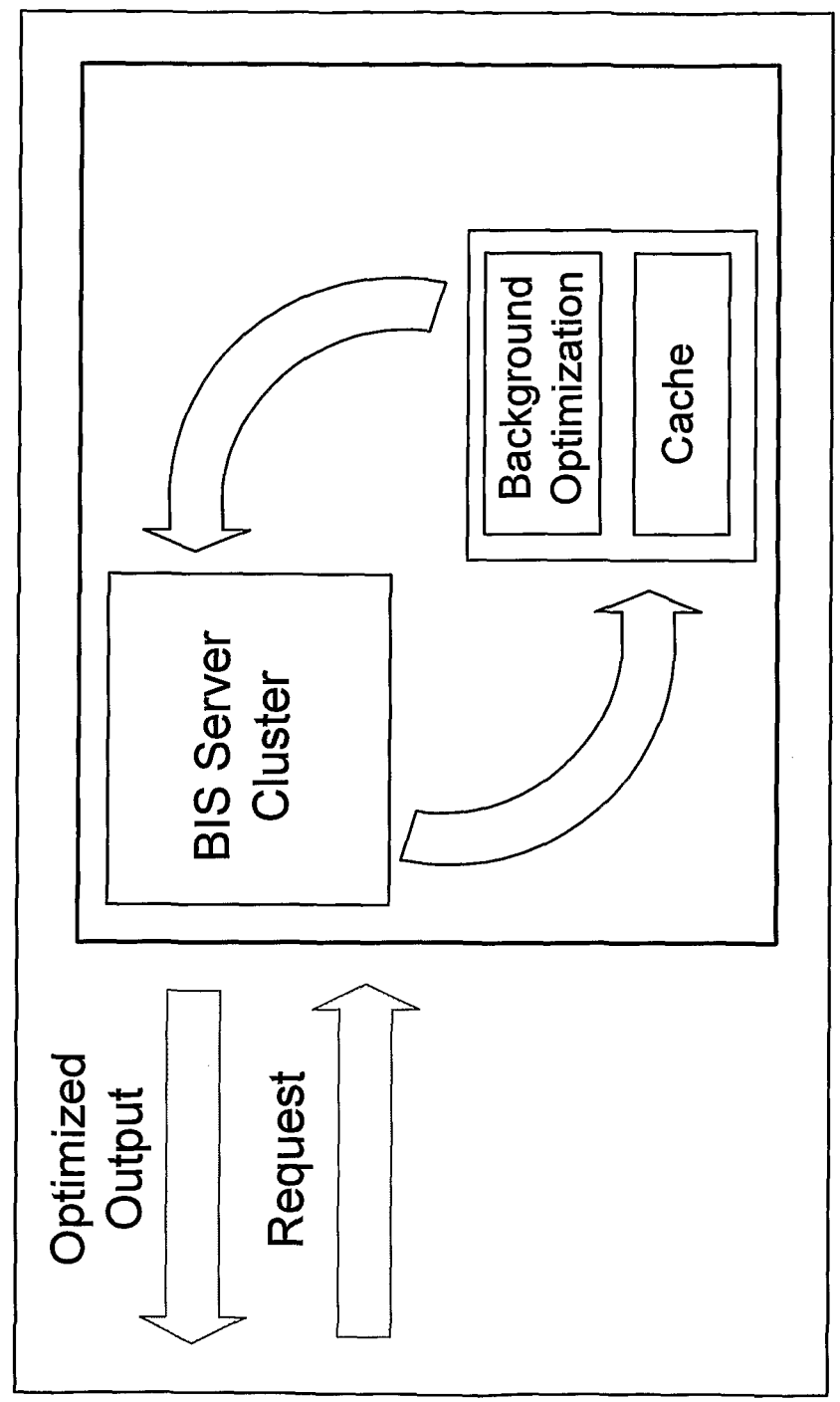
FIG. 29 shows a caching design pattern according to an embodiment of the present invention.

FIG. 29 shows a Caching Design Pattern.

Where appropriate, the results of requests (of data and/or Visual Documents) will be cached.

The described solution will process subsequent requests (queries, Visual Documents) by exploring cached results first.

If the result is not cached, then the result will be produced via the 'normal' process, otherwise the cached result will be used.

In addition to the caching pattern, there may be other background optimization to distribute caches.

The challenge with background optimization is that it depends on the design and the client usage. It might be decided that this is not implemented. It is included in this document so that during implementation, this design pattern is used where appropriate.

One example where background optimization may be considered is the serving of Visual Documents. These documents could be cached across multiple application servers. These could be 'write once never change' documents. This means that a rendering engine could store the object in one place and a background optimizer could replicate it with no chance of conflict.

One example where background optimization could be disastrous is bi-directional caching of ten synchronized volatile Request Queues. Where each Request Queue is receiving updates independently but all Request Queues need to be identical.

An example of caching is depicted below.

Figure 30:
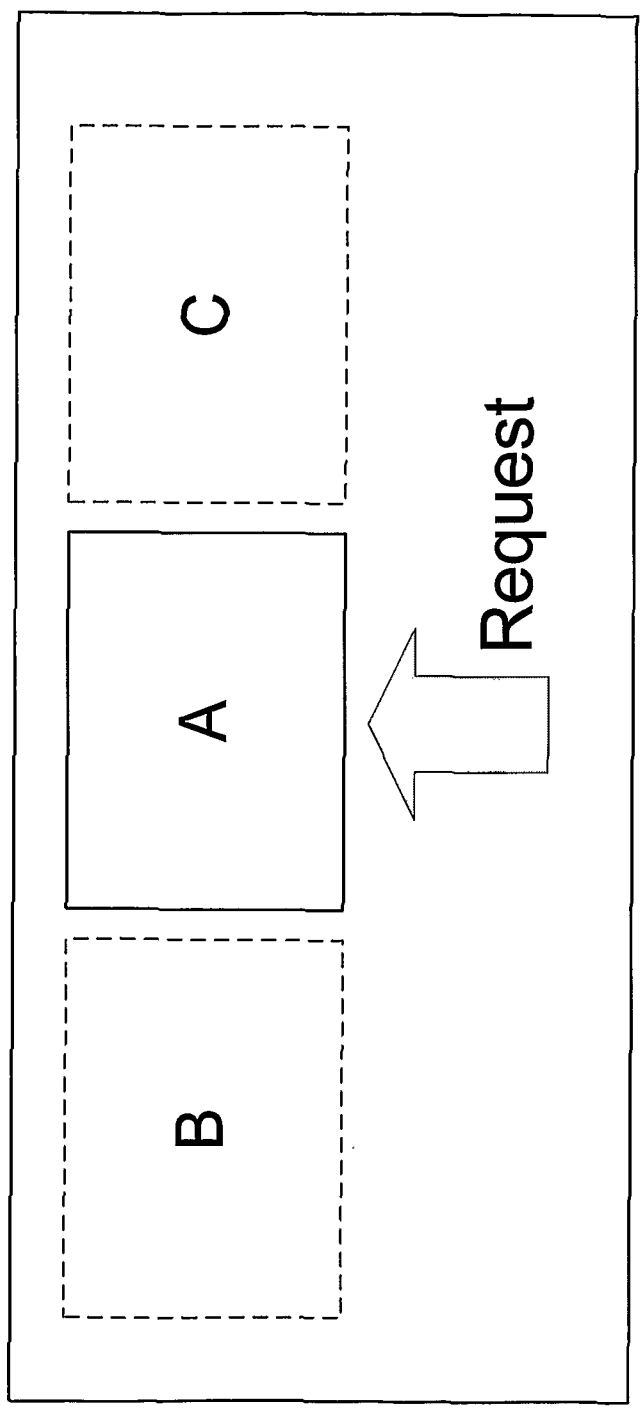
FIG. 30 shows a caching example according to an embodiment of the present invention.

FIG. 30 shows a caching example.

In the above caching example, Visual Document A is requested from the application server. Components A, B and C are related, therefore a background process will replicate Visual Documents B and C (as second priority) to the application server. This is anticipating that the user is likely to request these at a later time.

Impact of Heatmaps

Heatmaps have a widespread impact on visualization. This section describes the impacts of heatmapping and how it can be imbedded into various applications.

Heatmaps may produce organic shapes representing the data. These organic shapes provide two principal benefits to the consumer of the visual analytics. The first benefit is that they enable higher density of data to be displayed; secondly they lend themselves to animation.

Advantages of using heatmaps may include the ability to:
1. Show 10 times more data than other methods;
2. Enable animation as data is absorbed by users very rapidly;
3. Display heatmaps on most visual designs;
4. Provide generic functionality (for example, zoom; drill-down) that applies to most Visual Designs.

A preferred method of providing the overlay view is to use a semi transparent overlay similar to what will be done to overlay heatmaps on Google™.

One important technique with overlay may be to fade the color or intensity in the background tree so that the visualization data is highlighted.

BPD History

Figure 31:
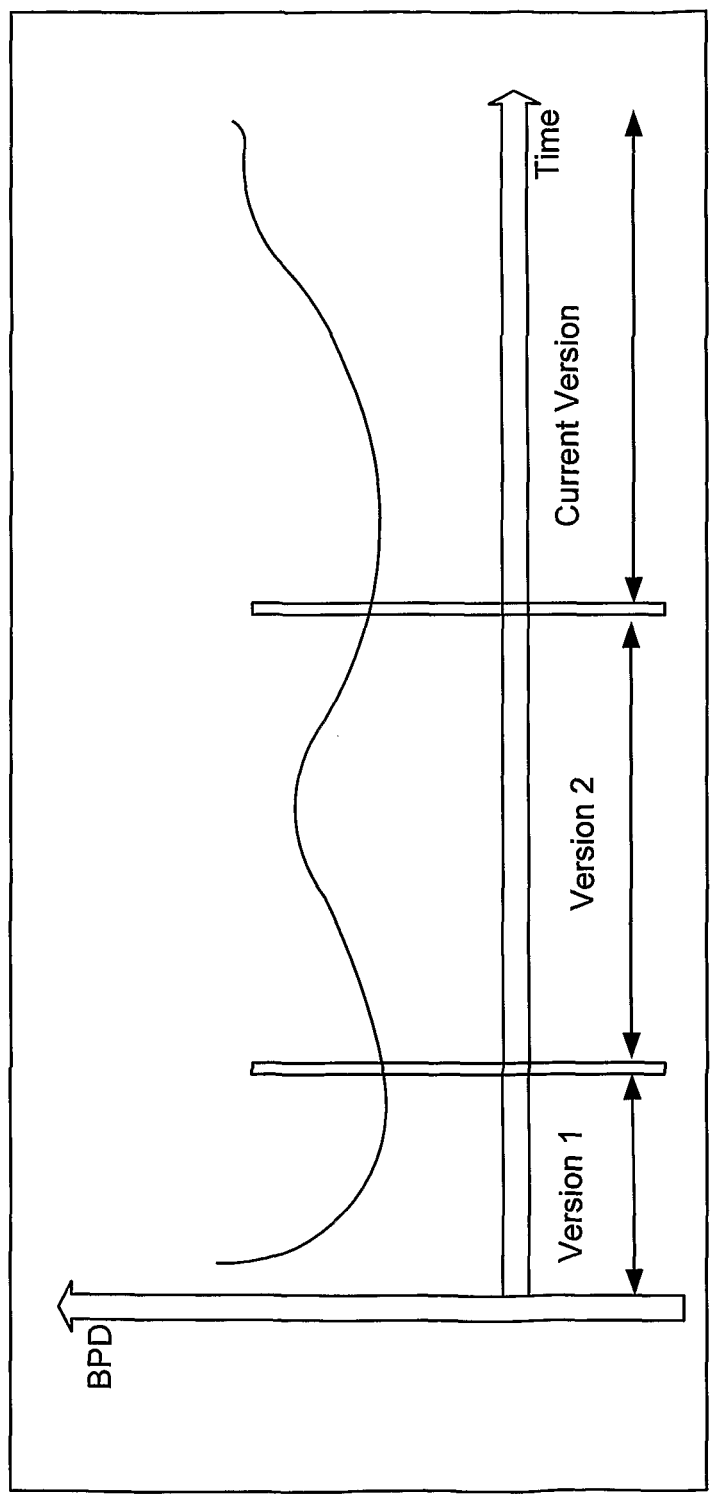
FIG. 31 shows an example of BPD history according to an embodiment of the present invention.

FIG. 31 shows an example of BPD history.

A BPD is measured over time; the Visual Documents with the resulting dataset are stored for future use. BPDs may have one ending date/time; this ending date/time is the last date/time that the BPD is valid to. For example, as a BPD is edited if the break points are changed, it either has an end date or retired date added.

A retired BPD is not used to generate Visual Documents.

Scheduling

Similar to the parallelism and clustering requirement, the request scheduling servers should be independent of any other layer in the application. This allows the various application layers to operate in a distributed fault tolerant way.

Constrained by and utilizing the features of the application framework, the objective is to construct a server cluster in such a way that most things are assumed to have failed until there is specific notification of success. For example, the Request Queue will not remove the Visual Document request from the pending list until there is notification that the document has been completed successfully in all aspects.

Visual Document Creation Process

End User Perspective

Steps are explained in the following, table:

| Step | Description | Example |
|---|---|---|
| 1 | Select the Visual Design category required. Within each category there will be a selection of Visual Design types. | Spatial heat map of store layout. |
| 2 | For the selected Visual Design type, there will be a set of applicable Visual Document layers and BPDs. The required BPDs are associated with the Visual Document layers. | BPD selected is 'Sales Revenue'. This BPD is associated with the embellishment layer. |

-continued

| Step | Description | Example |
|---|---|---|
| 3 | The selected BPD can be further defined by applying time parameters and restrictions. These restrictions are applied generically to all BPDs in the Visual Document. | The time parameter defined is for the month of February 2009. The result will be sales revenue generated by all customers during February 2009. Restrictions are applied as follows: Normalization = Daily Gender = Male State = CA |

The result will be daily sales revenue generated by all male customers in the state of California during February 2009.

Shortcut Visual Document Creation Mechanism (Step 2 By-Passed)

| Step | Description | Example |
|---|---|---|
| 1 | Select the appropriate already executed Visual Document. | Spatial heatmap of store layout showing customer count per bay for the month of June 2009. |
| 3 | Modify the restrictions/date applied to the already executed Visual Document. | Change the period from June 2009 to July 2009. |

The result will be customer count per bay for the month of July 2009.

System Perspective

From a system perspective this process is slightly more complex. The request is tracked through a series of state transitions.

When a user requests a Visual Document (run or re-run), the system creates a 'request' in the request queue. These 'requests' are managed via a series of statuses. Each status and its transition are shown below.

The following table outlines each state.

| | Action | Transition |
|---|---|---|
| A | User Submits Request to create a Visual Document (this could be a future request i.e. a scheduled request or an ad-hoc request). | [null] to Created. |
| B | User's request is added to the 'request queue' | Created to Queued |
| C | The 'listener' passes the request to the 'document controller' for processing. | Queued to Processing. |
| D | The 'document controller' processes the request and produces the visual document. | Processing to Completed. |
| E | The user decides to cancel the request. | Queued to Cancelled; or Processing to Cancelled. |

To give the user a rough indication of progress, an action within each state is hardcoded with a percentage value. This is explained below:

| State | Action | Percentage Value |
|---|---|---|
| Created | User submits a request | 0% |
| Queued | Request added to request queue | 0% |
| | 'Listener' passes the request to the 'Document Controller' for processing | 0% |
| Processing | 'Data Collector' submits query to data source | 10% |

| State | Action | Percentage Value |
|---|---|---|
| | 'Data Collector' receives the query results and send them to the 'Rendering Engine' | 50% |
| | Rendering begins | 95% |
| Completed | Visual Document saved to Catalog | 100% |

Figure 32:
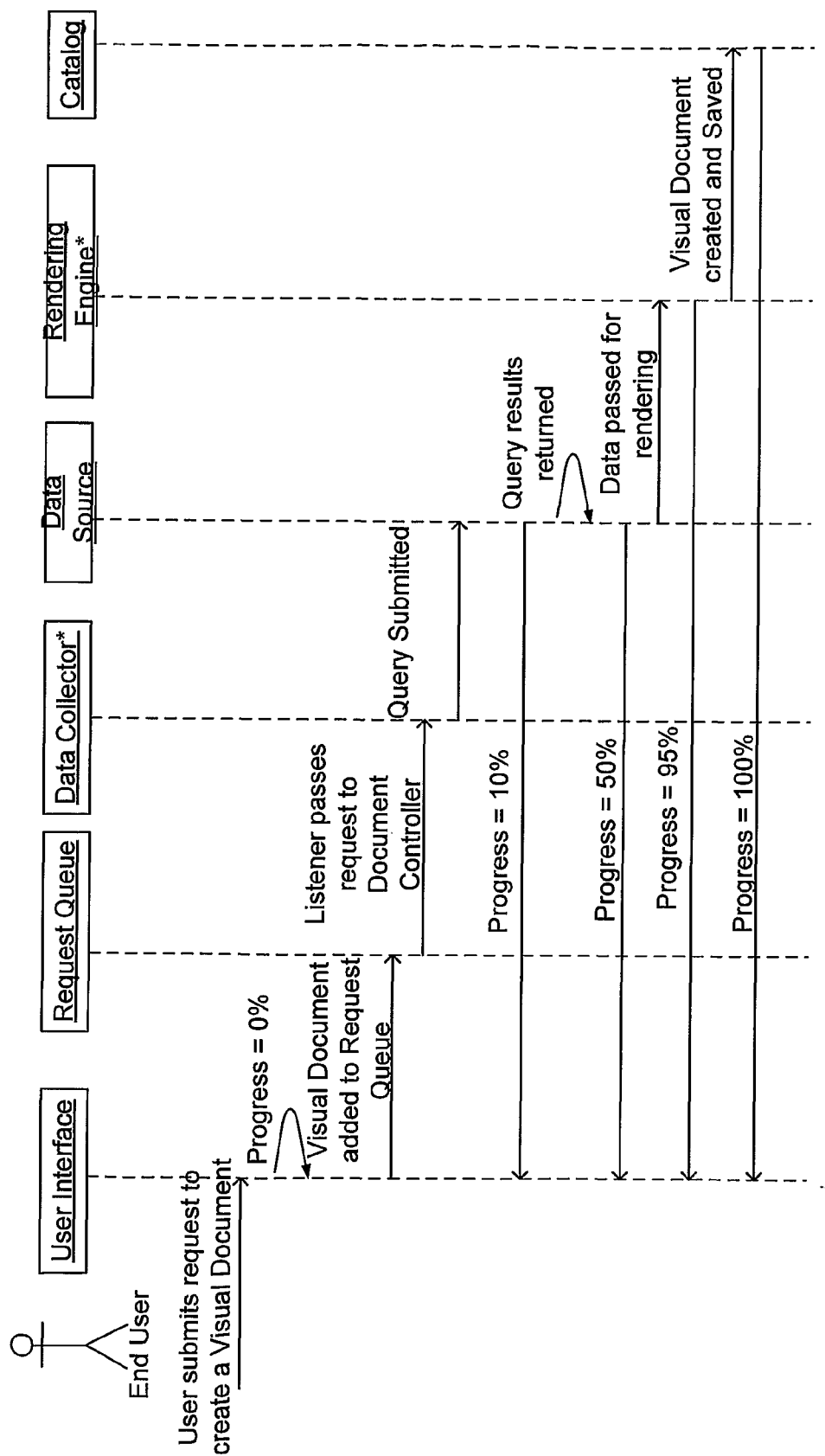
FIG. 32 shows a visual document creation process from a system perspective according to an embodiment of the present invention.

This sequence is depicted below:
FIG. 32 shows a visual document creation process from a system perspective.
*The 'data collector' and 'rendering engine' are components of the 'document controller'

Software Module

This section provides more detailed descriptions of the modules that are in the described solution.

Rendering Engine

The user requests that a Visual Document is generated. The rendering engine reads the appropriate metadata required to be selected from the database and then renders the multi-layered output using the defined Visual Document.

The user's request may be split into smaller requests by using the herein described parallelism engine. The rendered Visual Documents are then stored for later use.

Printing

Printing Visual Documents is considered a high priority; therefore most Visual Documents will have a printable form. For example, rendered Visual Documents may have PDFs generated. For animations, this PDF may contain a sequence of thumbnails.

The problem of creating output so that users can apply the output characteristics of different kinds of output devices, each output having the same overall objective but containing different content and information such that the output device characteristics are best utilized to create an output. The characteristics that can be applied may result in a reduction in cost of production, improvement in production speed or reduction in the volume of media required to store the output.

Output systems typically produce the output on various devices, such as printers, screens of various resolutions with the objective of showing the same image or the same information.

Outputs are human readable images, these outputs are created from devices on different mediums including printers, inkjet printers, laser printers, LCD screens, low resolution screens or 3D printing devices. Outputs can be stored on physical media including paper, high quality paper, scanned and stored in computer media or stored in a digital format or in a web page. These different mediums have quite different characteristics, as some mediums have much higher resolution or handle different volume of color.

Existing output systems are focused on optimizing output on one medium and then altering it for the second medium. These existing systems are not designed to alter the content of the output to be optimized for each device. Traditional approaches are focused on adjusting the image by changing resolution or color saturation, rather than making outputs designed specifically for each kind of display device.

There are a number of known techniques for optimization of printer output Crosby Wyman and Tegtmeier (2003) described a method and apparatus for producing a dynamic content in either a static or dynamic environment. This invention describes how the output for a dynamic environment can be altered to be displayed on a static environment.

When creating data images consideration of the output device is of critical importance as the various devices have substantially different characteristics. The existing systems typically create an output for one device and enable the user to define the output for a second, (often printer).

One embodiment of the invention uses the detection of the kind of printhead and other characteristics of the printer to alter the content by adjusting the formatting attributes of the visual representation so that it is displayed in a different or optimized way. This different or optimized way may have alterations to characteristics such as consumables, print speed and cost of printing.

In a further embodiment of the invention the characteristics of the output are adjusted to minimize the production cost while maintaining an acceptable quality of output.

In a further embodiment of the invention the characteristics of the output are optimized such that there is a reduction in bleeding in the ink. This embodiment may include optimization for the various kinds of paper including plain paper or high quality photo paper.

In a further embodiment of the invention the characteristics of the output are optimized to address the issue of displaying more information on less display real estate. In this embodiment the increased density of display has two main benefits firstly it reduces the cost/time of production as there is less output required and secondly it decreases the time taken to understand the information presented. The density of display may be adjusted based on resolution of the output device.

In a further embodiment of the invention the characteristics of the output are optimized to alter the legend to describe the appropriate level of information. This appropriate level of information is adjusted depending on the interactivity of the output mechanism. For example on a printed medium more information may be added to the legend to embellish the user's ability to understand the depth of information displayed on the image.

In a further embodiment of the invention the characteristics of the output are optimized to alter the output data tables to include the appropriate level of information. This appropriate level of information is adjusted depending on the interactivity of the output mechanism. For example on a printed medium more information may be added to the output data tables to enhance the users ability to understand the depth of information displayed on the image.

In a further embodiment of the invention the characteristics of the output are optimized to alter the saturation, font, labels, color selection or provide icon substitution that provide for an appropriate or cost effective mechanism for display or end user consumption of the displayed information. In this embodiment the saturation is the intensity of the colors used labels are the annotations on the image that are used to denote actual values and icons are visual representations of the data in a small graphic form. The font used is the typographic style of writing; this font may be optimized for readability or ink usage.

In a further embodiment of the invention the characteristics of the output are optimized such that the animations are altered to be shown as a sequence of frames, each frame having alteration in its actual display. The frames may be visually linked or sequenced.

In a further embodiment the image may be smoothed in different ways to create an appropriate level visual shift that enables users to read and interpret the image.

In a further embodiment the image may have additional supplementary information generated. For example, this could be additional pages of printed material. This supplementary information may include data tables or detailed legends. In the gaming industry, the supplementary information may include, for example the holidays or local special events occurring during a period, the number of airline flights serving a casino's location, and general economic factors affecting the primary market. Further, the supplementary information may include the geographical location of an individual, the spending habits of an individual or the gaming habits of an individual.

In the retail industry, the supplementary information may include, for example the holidays or local special events occurring during a period, the traffic count for the roads that may access the entries, and general economic factors affecting the primary market.

In the hospitality industry, the supplementary information may include, for example the consumer confidence index or local special event factors, the traffic count for the roads that may access the hotels, and other general economic factors affecting the primary market.

In the financial industry, the supplementary information may include, for example the consumer confidence index or local real estate factors, the traffic count for the roads that may access the branches, and other general economic factors affecting the primary market.

In the entertainment industry, the supplementary information may include, for example the holidays or local special events occurring during a period, the traffic count for the roads that may access the outlets, and general economic factors affecting the primary market.

In the telecommunications industry, the supplementary information may include, for example the consumer confidence index or local real estate factors, the traffic count for the roads that may access the retail outlet, wireless network, and other general economic factors affecting the primary market.

In a further embodiment 3D images can be created, these images have significantly different interaction capabilities, mechanisms as described in the invention for manipulation of what are classically called 2D images can be applied to the 3D image. This 3D image production could include 3D printouts, this invention is very relevant when considering 3D images as the volume and density of data that can be displayed is typically significantly higher than 2D outputs.

Thus it is desirable to create a system that uses the base rules that build the output to construct a new output for each device so that the output is consistent across multiple devices but contains information that exploits the specific benefits of each device. Traditionally a visual representation is just displayed or printed according to user set parameters. Parameters are not automatically optimized for the type of output device.

Figure 25A:
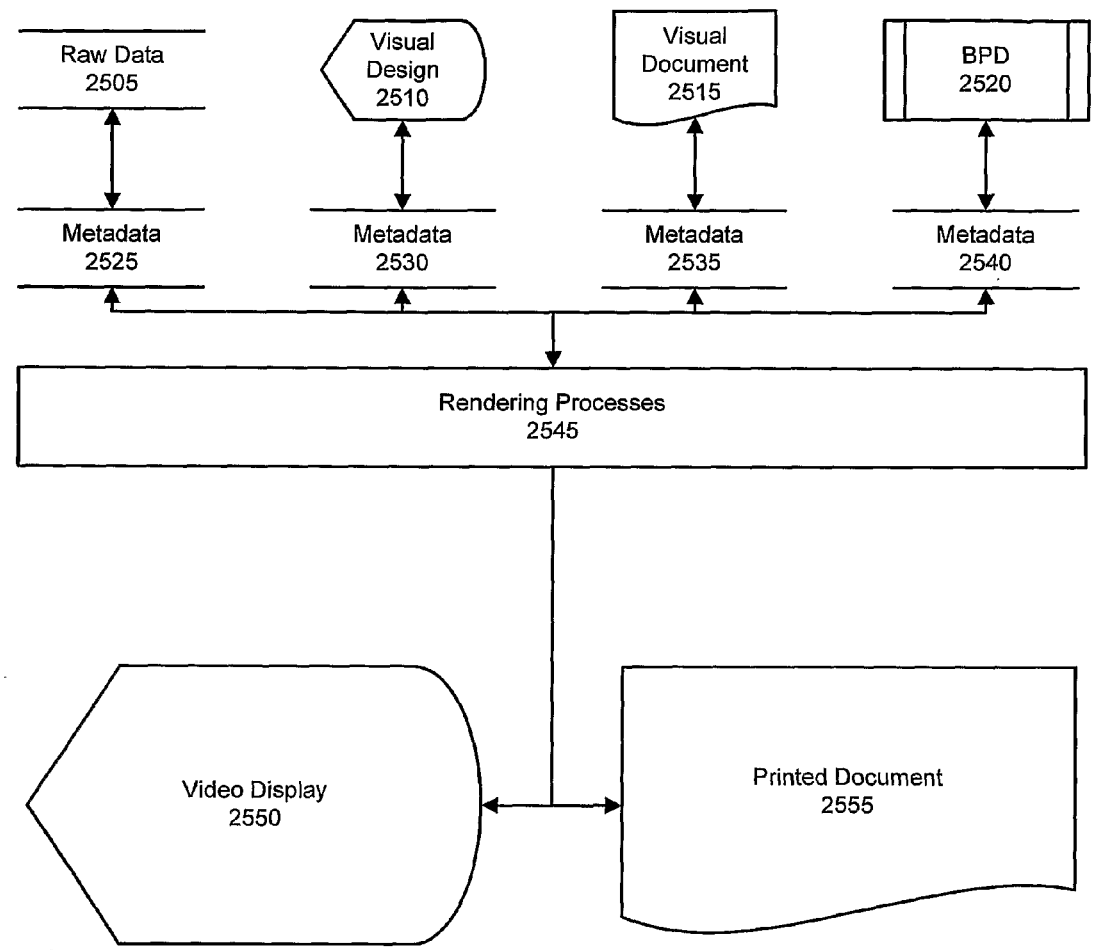
FIGS. 25A and 25B show data flow diagrams according to an embodiment of the present invention.

Referring now to FIG. 25A Metadata (2525-2540) is associated with each element (2505-2520) making each of these elements independent of one another. For example, a BPD (2520) may change and its associated metadata (2535) will change. The rendering processes (2545) use the metadata to optimize video display (2550) and printed documents (2555).

Figure 25B:
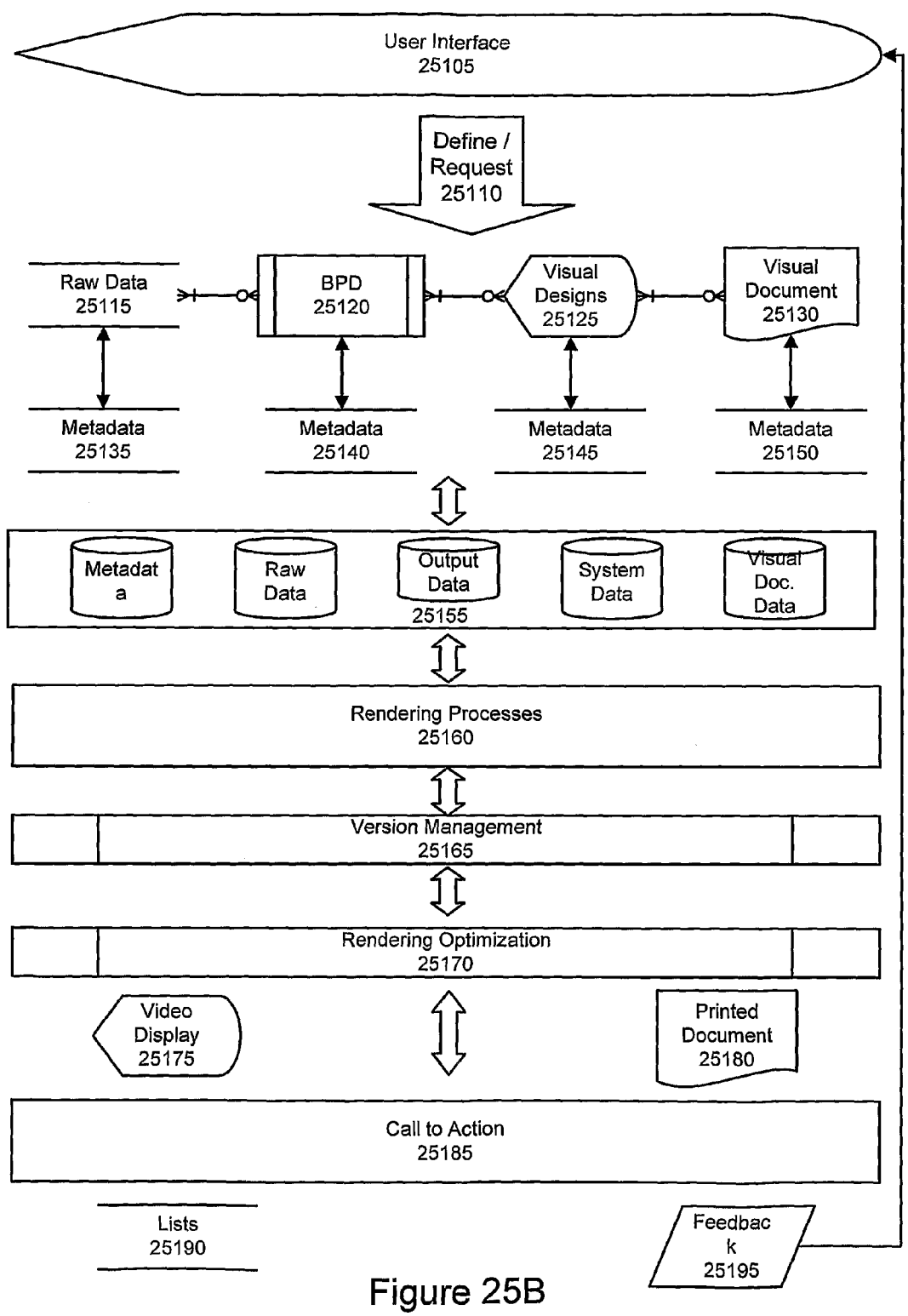

Referring now to FIG. 25B User interface 25105 is used to define the elements and request output (25110). Raw Data (25115) is used to define Business Performance Drivers (25120). BPDs drive Visual Designs (25125). Visual Designs make up Visual Documents (25130). Each of these elements are independent objects and may be used with multiple elements. This is depicted by the crow footed lines indicating a many to many relationship between the elements.

Independent metadata (25135-25150) is associated with each element allowing the Rendering Processes (25160) to correct for timeliness, versions (25165), optimize how the elements are used and rendered (25170).

Rendering is optimized for the output media. For example information regarding the video display is used to optimize content and rendering for the particular display (25175); information regarding the printer is used to optimize content and rendering for that medium (25180).

Rendered output is used for Calls to Action (25185), which may take the form of lists (25190) or various management decisions. Management success or failure is assessed, and fed back (25195) to the system in the form of adjustments to the elements.

The methods described in the previous section can be implemented in one of many ways:

Each output generation process gathers specific information relating to the output device, this could be over a TCP/IP network or could involve communication with a metadata description of the output device. The information gathered regarding the output device may then be combined with secondary information that may also have been stored in metadata. This secondary information is combined with the specifics of how the image is generated to generate an image specifically optimized for the output device.

An image that is being viewed by the user on a screen if the user requests a printout of the image then the image is re-calculated specifically taking into account the characteristics of the printer being used. The characteristics that can be used in the generation of the image include paper type, ink type, laser scan rate, production quality requested by user size of paper, resolution of printer. The re-rendering of the image also considered specific attributes of the image including number of colors, total data density, availability of summary tables of information. The output may also produce supplementary information relating to the printout such as separate pages of data tables or separate pages with additional legend details.

An image overlay may be produced on a separate and transparent printout page, this overlay information enables the consumer of the printed material to overlay transparent supplementary information that may be visual to further enhance and explain the output.

It will thus be seen that the present invention provides a method and system for output of images data that is repeatable, computationally efficient, cost effective and maximizes the output from each kind of output device.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art.

Therefore, the invention in its broader aspects is not limited to the specific details, representative apparatus and method, and illustrative examples shown and described. Accordingly, departures may be made from such details without departure from the spirit or scope of the Applicant's general inventive concept.

Note that Visual Documents rendered as a bitmap for display are at a much lower resolution than the same Visual Document rendered for printing.

Parallelism Engine

Figure 33:
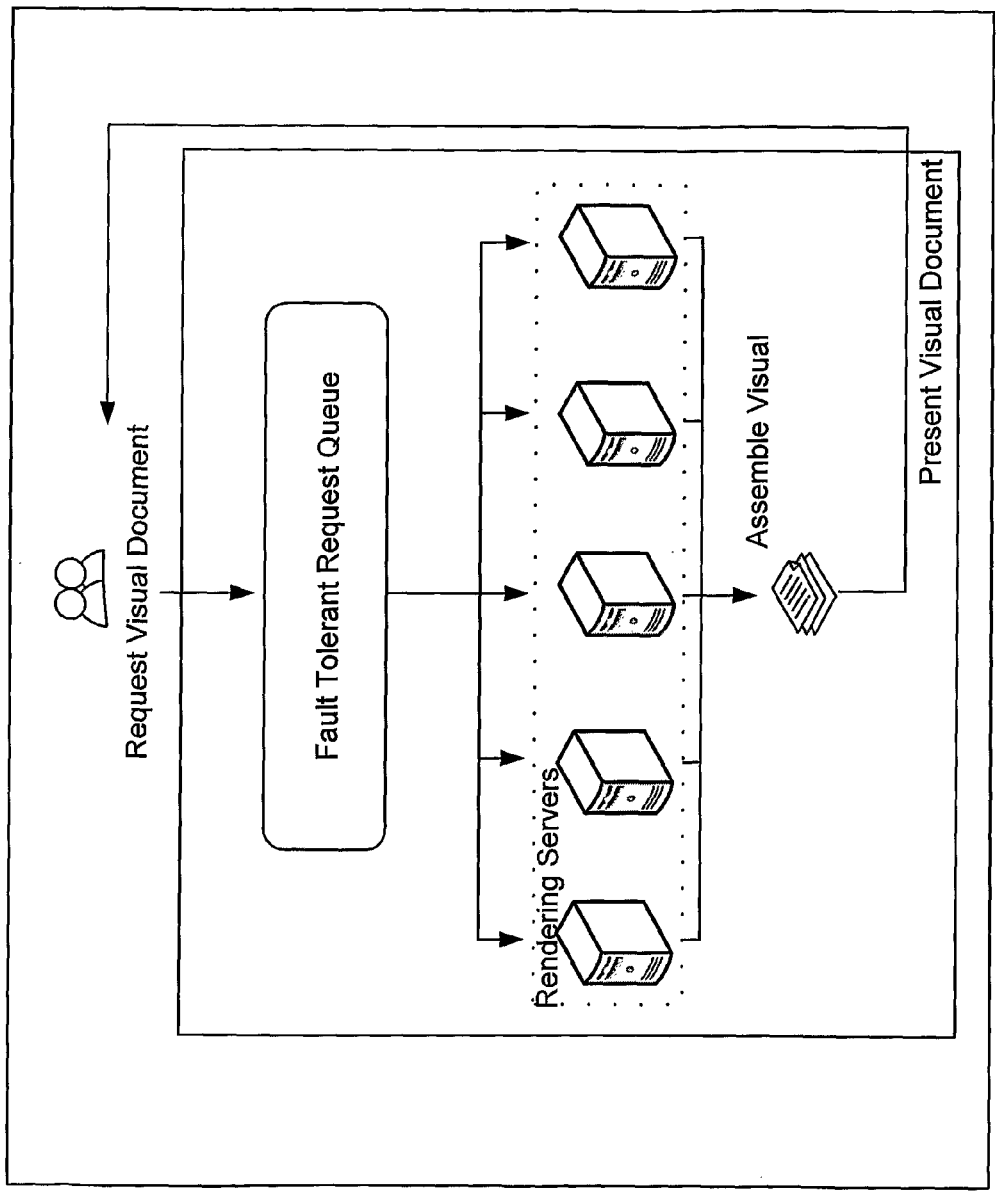
FIG. 33 shows a parallelism engine according to an embodiment of the present invention.

FIG. 33 shows a parallelism engine.

A Visual Document request can be split into several smaller requests. For example, a 100 frame animation can be split into 100 requests. This is managed by the Parallelism Engine and submitted to the Request Queue.

Due to the nature of the environment, there are things that are outside the application's control. For example, databases timing out, database load and network traffic.

This assumes that the requests have not succeeded until specific notification of success has been received.

The side issue to this is that a Visual Document request must not modify anything in the Request Queue (or any other data the request relies upon) that will affect the ability to restart the request.

When a visual design has been prepared and is ready to be rendered, it is usual for prior known systems to announce that the visual design is ready for rendering. However, if there is a failure in the announcement process then the rendering engine is not made aware that the visual design is ready.

The system described herein includes a number of modules that are arranged to provide one or more visual representations for rendering within a visual document. An indicator module is used to determine whether the visual representation is in a state that is suitable for rendering, and when the indicator module has analyzed the document's state to a point where it knows the document is ready for rendering, an indication is provided within the visual representation that indicates the document is ready.

The indication thus tags the document so as to highlight the fact that the document is ready for rendering. Subsequently, a reader module that is arranged to read the visual representations is able to determine whether those visual representations include the indication, and therefore is able to forward only those visual representations that include the indication, i.e. are ready for rendering, to a rendering module.

In this manner, the system is not going to be held up waiting for announcements as no announcement stage is used. Rather, the system provides a positive indication within the documents itself and provides modules that push forward those documents that include the indication. If the documents do not have an indication they are not pushed forward to the rendering module by the reader module. The only reason a document would not have an indication attached is if the document is not ready for rendering. If for some reason the document is lost between the reader module and the rendering module, the reader module will easily forward the document again next time it carries out a check on the documents that have been rendered and are required.

The visual representations may be rendered to form one or more visual documents. That is, any number of visual documents can be created using one or more visual representations. Also, any number of visual documents may be rendered for display on a visual display.

In addition, or alternatively, the visual document or documents may be rendered for printing. This rendering as explained herein may be the same as, or different to that required for display, or indeed storage.

The indication may be in the form of a flag that has been inserted into the visual document. The indication may include the time and/or date of processing the visual representation. Also, the indication may include a node identification based on the node that processed the visual representation. Further, the indication may include an identification of the execution path by which the visual representation was processed. The execution path may include information based on a plurality of processes that were executed in order to process the visual representation. All or some of the identification types may be included.

Figure 26:
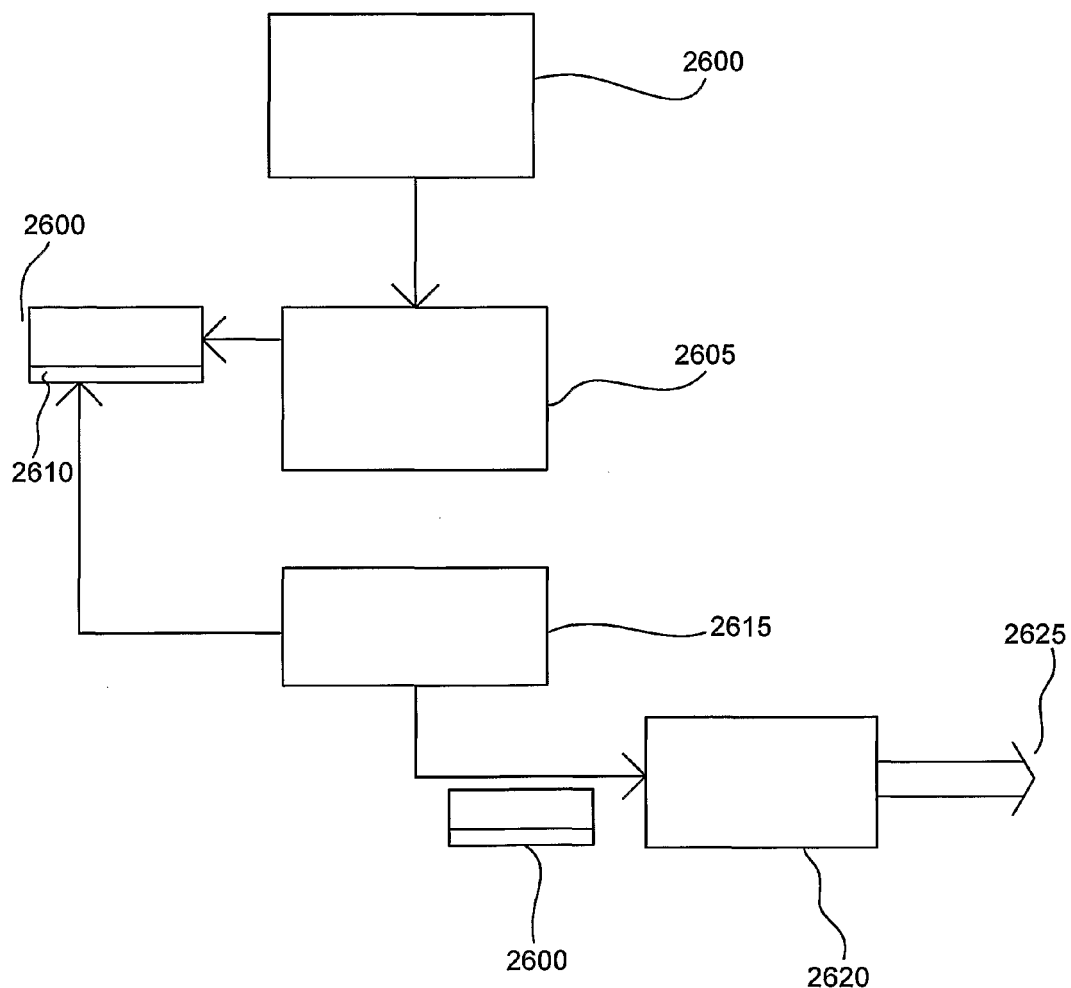
FIG. 26 shows a system block diagram according to an embodiment of the present invention.

FIG. 26 shows a flow diagram depicting the steps of inserting an indication into a visual representation.

A visual representation 2600 is provided to an indicator module 2605. The indicator module 2605 knows that the visual representation is ready for rendering when it receives it, and so flags that the visual representation is ready for rendering. An indication 2610 is then inserted into the visual representation by the indicator module 2605. A reader module 2615 analyzes the visual representation to see if it includes an indication 2610, and when it has determined this, it forwards the representation 2600 to the rendering module 2620 which renders the visual document 2625.

Map Management Tool

Maps, such as store layouts, change over time. The described solution will manage and manage the versions of these changes so that a retrospective Visual Document will be shown using the correct map. One approach could be to make the storage of historic floor plans part of the data design, and, hold the history of layouts in a relational database.

Figure 34:
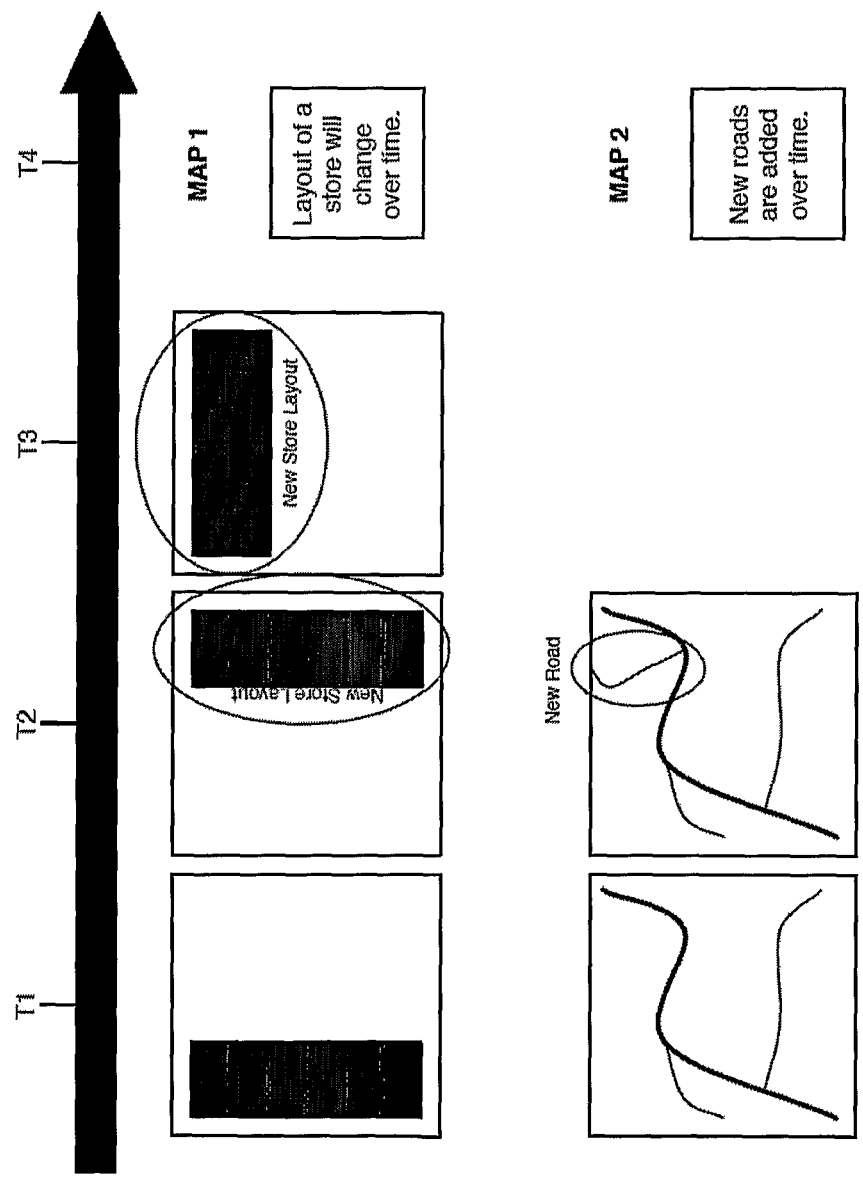
FIG. 34 shows a map management example according to an embodiment of the present invention.

FIG. 34 shows a map management example.

If an animated Visual Document (for example Map 1) was produced over time (T1 to T4) and the store layout was changed at T2 and T3, then the layout would change during the animation (to show the 3 different layouts).

Note that in Map 1, the items on the shelves are managed through data (location id) so this is not part of map management.

Management of a Sequence of Maps

A Visual Document can be reproduced on request at any time in the future. Visual Documents comprise of the original map and the original result set data.

For avoidance of doubt, the described solution will not be storing the source (transactional) data to the query in the Visual Document. The described solution may store portions of the summary data used to generate the Visual Document—which is typically a much smaller dataset than the source data. For example, a heatmap of a retail store will have a number of data points equal to and not exceeding the number of bays in the store.

In a retail store, the number of actual rows in the database is to most retailers today, the number of actual lines on the point of sale transaction list.

For example, retailer x sells 1,022 TVs, then there will be less than or equal to 1,022 records in the database. We would expect this to be close to 1022 as most transactions for TVs are likely to be one TV per customer. In the query result set—for analysis of the same TVs, there may be only 1 record for the aggregate function for those 1,022 TVs sold. The Visual Document would then only store 1 row situated with this location ID and sales information.

Overlay on Non-Matching Map

In some scenarios it may be beneficial to overlay data from the original period on the current map. That is, when providing layers of data, confusion and errors in interpretation can occur when a user views layers of data, where one of those layers is out of date. For example, laying indicators on top of an out of date map will not necessarily aid the user in interpreting the indicators if the map data has changed sufficiently that there is no longer any correlation between the data in the different layers The herein described system aims to solve or at least alleviate this problem by adjusting the visual representation of a first or second set of data formed in respective first and second layer of a visual representation. The adjustment is based on the correlation between the two sets of data.

In a visual representation various layers of data may be arranged as discussed above. For example, a first and second layer may be arranged to visually represent first and second sets of data in a single visual document.

For example, the system includes an analysis module that is arranged to analyze the first and second sets of data, in order to determine whether one of those sets of data is older than the other. If this is the case, the analysis module then determines whether there is any correlation between the first and second sets of data, or at least if the correlation is above a predefined threshold stored within the system. If it is determined that there is minimal correlation, or in other words, that the data has sufficiently changed, then the visual representation is adjusted.

The visual representation may be adjusted by reducing the intensity of the set of data that is older. The reduction of intensity may be provided by either visually fading the layer associated with the set of data that is older or visually intensifying the layer associated with set of data that is not older. Either way the data set that is most up to date is enhanced in the representation to draw the user's attention away from the changed data. The level of intensity variation between the data sets may be adjusted depending on the correlation value calculated between the data sets.

The system may determine difference data between data within the first and second sets of data, and adjust the visual representation to visually identify the determined difference data.

Further, the system may determine whether data within the younger set of data includes new information, and if so, adjust the visual representation to accommodate the determined new information within.

Also, the system may determine whether data within the older set of data is considered obsolete, and if so adjust the visual representation to visually identify the obsolete data. Therefore, the user's attention is made to the obsolete data so to ensure the user does not take it into account when analyzing the representation. Various different forms of visual identification may be used such as color, highlights, animation etc.

Figure 27A:
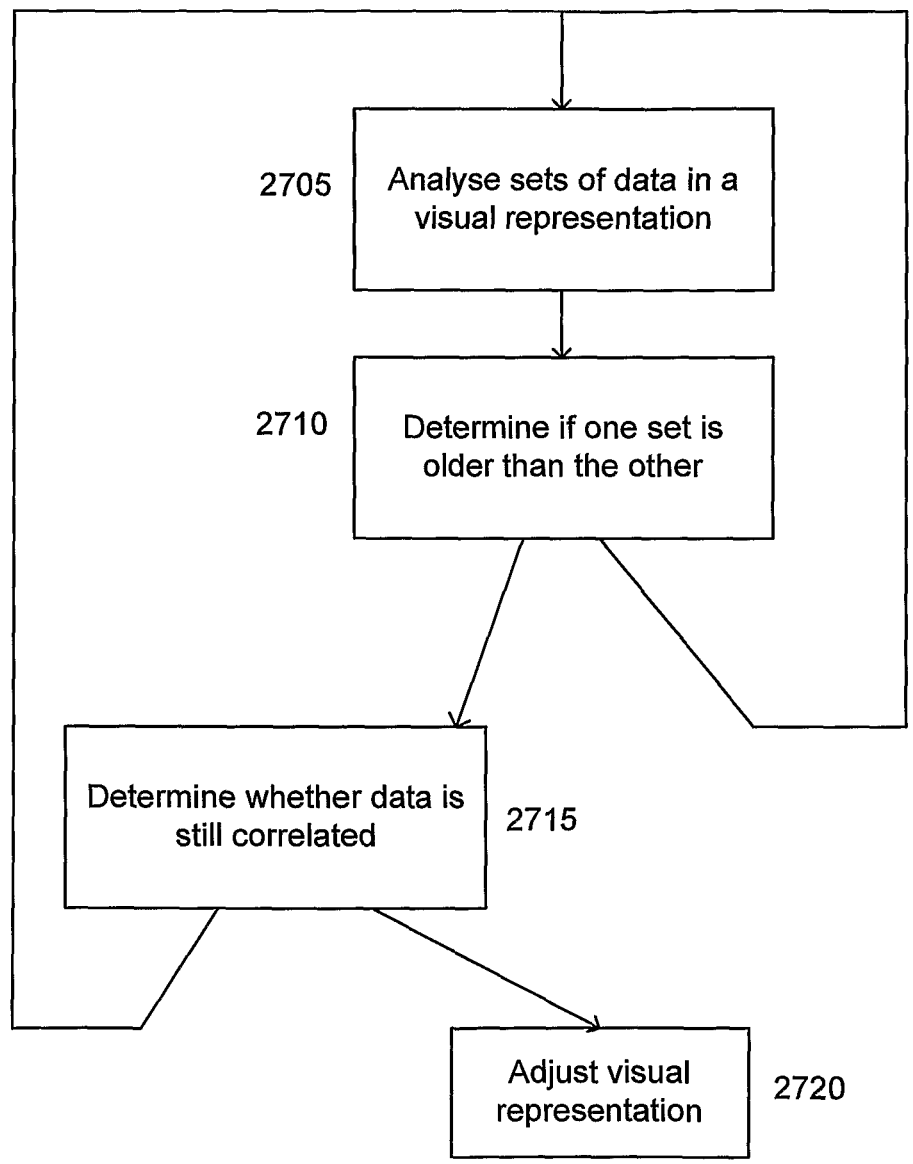
FIG. 27A shows a flow chart according to an embodiment of the present invention.

FIG. 27A shows a flow diagram of the steps taken in the above described embodiment. At step 2705 sets of data within the visual representation are analyzed. At step 2710 the system determines if one of the sets is older than the other set in the visualization. It will be understood that the visualization may represent multiple sets of data in a single representation. Upon determining one set is older, at step 2715, the system determines if the old and new sets of data correlate. If they do not correlate, or at least correlate within a predefined threshold, the visual representation is adjusted at step 2720 to cause the changed data not to be taken into account by the end user.

Figure 27B:
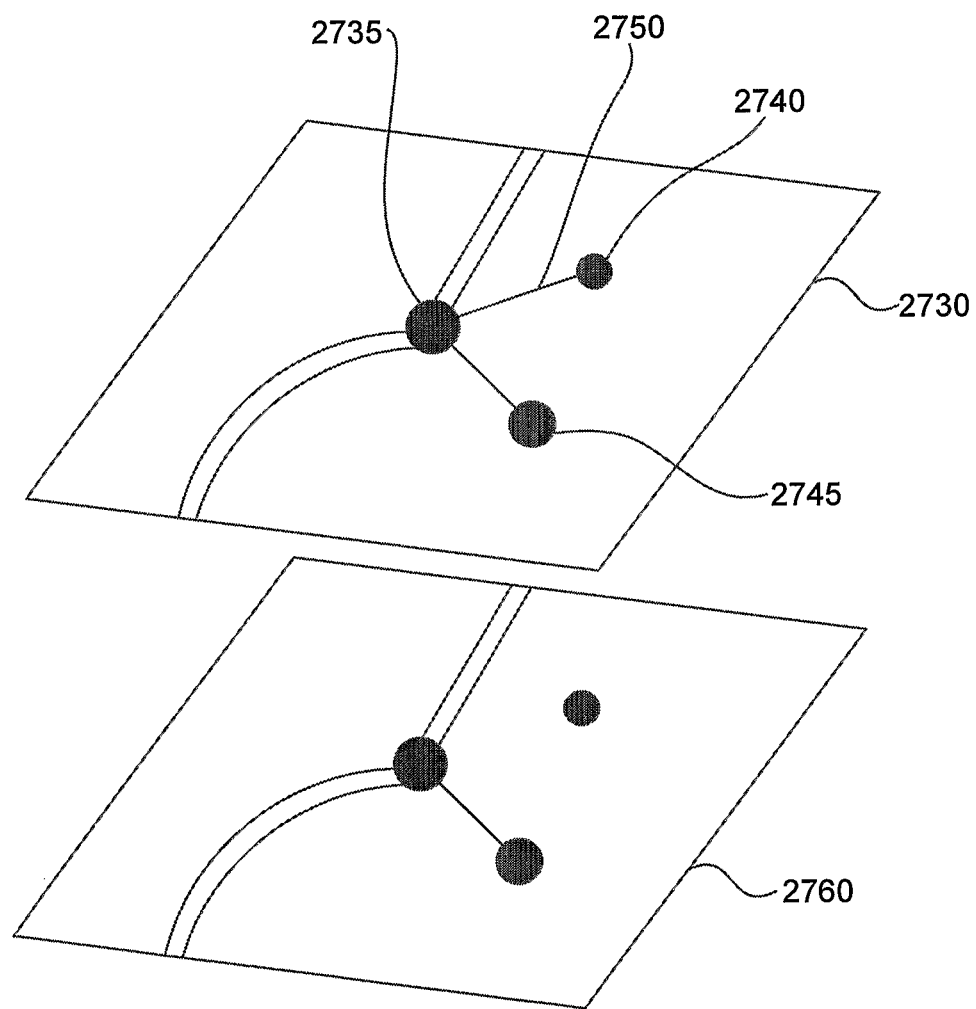
FIG. 27B shows a visualization according to an embodiment of the present invention.

FIG. 27B shows a visual example of two layers of data sets (2730, 2760). The upper layer 2730 includes updated data that the lower data does not include. This may impact on the user when interpreting this data whether in conjunction with other data or on its own.

The layers represent maps, where towns 2735, 2740 and 2745 are linked via roads on the map. In the newer version of the map 2730, a road 2750 is indicated whereas in the older version 2760 it is not. Therefore, the system intensifies the newer version in situations where the data being reviewed calls for an up tot date map to be viewed. However, in situations where the user is looking at additional data on the map, for example travel times between towns, and that data is more relevant to the older map because the data refers to travel times before the new road 2740 was built, then the older map 2760 may be visually highlighted to help the user understand the travel time data better.

Management of Map Sequences

This area is particularly important in the management of retail space plans. The described solution can be used to, but will not be limited to, producing the floor layout of a store or a casino.

There are specific needs for the tool to understand the validation of floor plan data. The following types of issues may arise (requiring complex validation):
  Every bay needs a unique number;
  Each product belongs to one or more bays;
  Bay numbers must be unique;
  Warnings for inconsistent bay heights;
  Bays have a 'front'; and
  Bays cannot overlap.

This tool is very deep and domain specific. For example, to maintain a sequence of retail floor plans the tool needs to understand retail floor plans, planograms and product placement strategies.

It will be understood that it would also be possible to integrate to a $3^{rd}$ party tool to provide some of this functionality.

OLAP Reporting

When users view visual representations in prior known systems, if a linked system is changing the data associated with the representation there is no clear indication provided on the visualization that the data is being changed, or how it affects the representation. This can therefore result in the user relying on out of date or inaccurate data.

The system described herein enables changes to business measures that are being represented in a visual representation to be indicated where those changes are being effected via another system or module.

The system uses a detection module to detect the change in data associated with the business measures, and then indicates on the visual representation, at a data point associated with the changed data, that the change in data has been detected.

This then enables a user to see that another system is updating, changing or correcting the data being used for a visual representation and also to see how those changes affect the representation.

The indication may be a change in the visual representation at an actual data point, or more likely where large data sets are being handled near the data point being changed. This may vary depending on the granularity of the information being displayed, the number of data points being changed and the area over which the data point being changed are spread.

The indication may take the form of overlying additional information onto the visual representation such that the additional information provides a further visual representation indicating the change in the data. For example, the further visual representation may be a heatmap, or it may be a surface calculated from one of a Kriging or interpolation algorithm.

The change in data may be detected due to data being added to or subtracted from the data sets, or may be detected due to an alteration of the data.

The indication may provide an indication of where the data that has been changed is at least approximately located within the visual representation. This may be particularly useful where the representation shows a vast number of data points and so the actual position of the changed data point is only required to be approximate relative to the whole display.

The detection module may detect changes in the membership of a list of the business measures, this list being altered by the other system.

In one embodiment, the detection module may detect changes in a first memory module which has shared control between the visualization module, i.e. the system that creates the visualizations, and the other module or system. Also, the detection module may manage a common list of business measures that both the visualization module and other module or system has access to in a controlled manner.

According to another embodiment, the detection module may detect changes in a memory module controlled by the visualization module and another memory module controlled by the further module or system. That is, separate memory modules are used to store commonly used business measures. In this case, the memory modules may be synchronized such that any changes made in one memory module are also made in the other.

The further module or system may be a third party system, such as a CRM system, business management systems, which includes supply chain management systems and inventory management systems.

One of the main principles is that the size or number of the data points to be indicated are based on an area that is visible to the human eye. Therefore individual data points that the user can not see are not indicated on the representation, but a suitable area is determined based on what a visually normal user would be able to comprehend.

Also, the indication on the visual representation may be identified by determining changes of the business measures over a predefined period of time. That is, for example, only data that is constantly changing, or that has changed a preset number of times within a set time period may be indicated on the visual representation.

Further, the data point may be indicated by identifying a spatial area on the visual representation using a spatial index. The nodes in the spatial index may be used as special aggregations.

Figure 28:
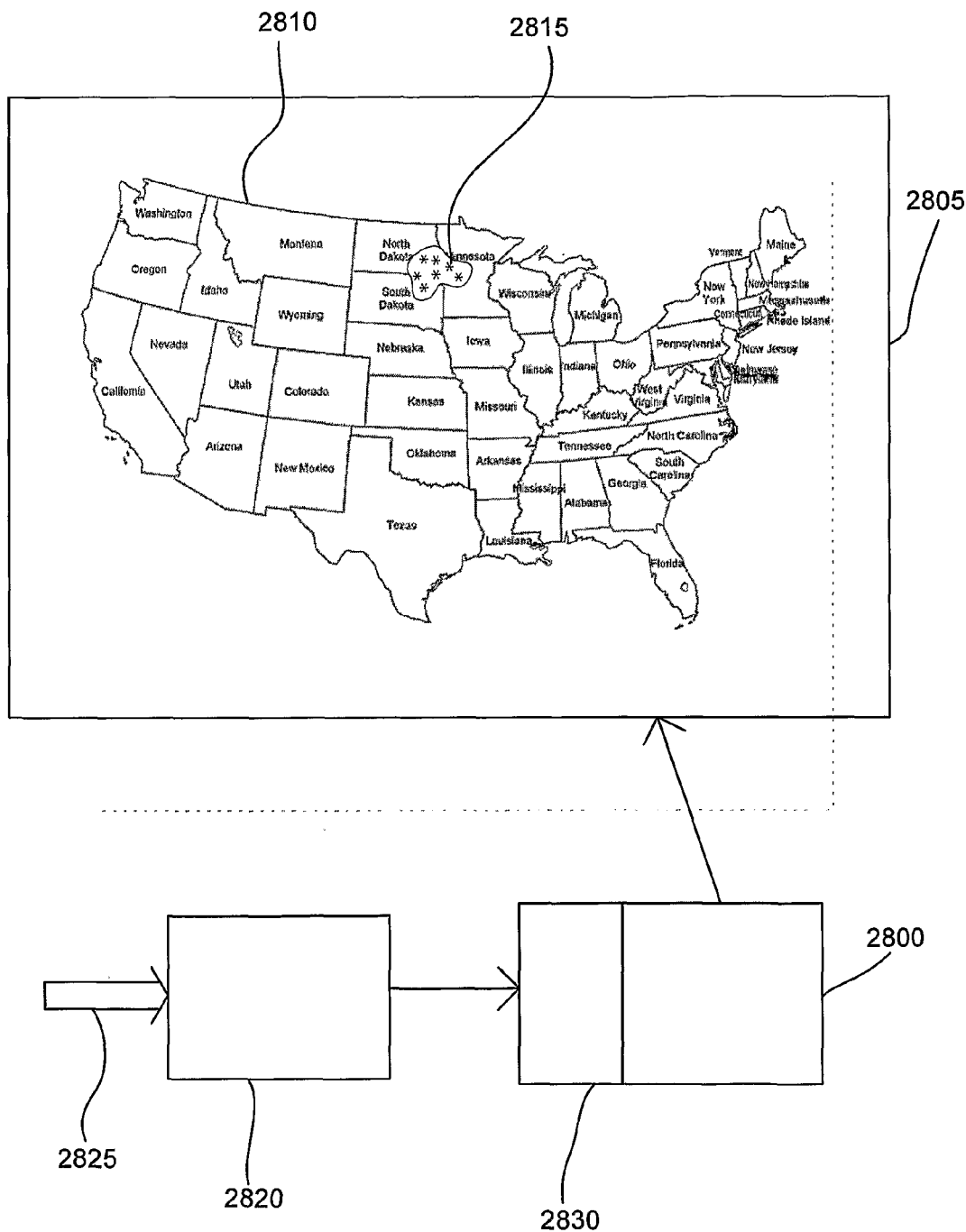
FIG. 28 shows a visualization according to an embodiment of the present invention.

FIG. 28 shows an example graphical representation of how changes in data can be represented on the graphical representation. The visualizing system or module 2800 creates a visualization 2805, which in this example is of a map of the USA 2810. The indication is graphically represented by the area 2815. the indication may be a flashing or twinkling area 2815 that draws the users attention to that area. The area 2815 is flashing or twinkling to show changes to data used to represent data points in those areas of the map. Those changes are being made by a third party system 2820 due to changes in the data 2825 being input to the system. As the visualization module 2800 and third party system 2820 are linked together via a detection module 2830, these changes can be visually represented. It will be understood that the detection module 2830 may alternatively be a module that is separate from but in communication with both the visualization module and the third party system.

OLAP functionality will be provided to the users of the described solution. This will be achieved via integration to an existing OLAP tool.

It is desirable to have both applications (the solution described and the 3rd party OLAP tool) twinkle in a simultaneous way. Specifically this means as the user selects groups of items in either the OLAP interface or the Visual document, the other tool respects this change in selection.

OLAP tools are designed to source their data directly from the database. It is therefore desirable that the interface to the OLAP tool is built in such a way that this capability is utilized.

There are a number of integration models for this. These are outlined below:

Option 1: Programmatic Tight Integration

The described solution will talk to the data source and provides the dataset to the OLAP tool. The user then uses this tool for their analysis. This is a seamless integration from the user's point of view. Specifically the OLAP tool will be tightly integrated into the described solution.

Option 2: Interface Integration

OLAP requests are passed to the OLAP module. OLAP then talks directly to the data source.

The database shown here represents the EDW not the cached database or result sets.

One variation on this option is to provide a JDBC (Java Database Connectivity) interface from the described solution to the $3^{rd}$ party tools. One potentially easier option for implementing this would be to provide only stored procedure calls in the JDBC interface; all other queries are passed directly through to the database. The described solution interface will then send a stored procedure with a unique name (number) to the $3^{rd}$ party that asks for that set of data from the JDBC data.

Option 3: Above Tight Integration

This option makes the described solution dependant on the OLAP tool (and OLAP metadata) to provide data from the data source.

For example the described solution may be embedded inside a BI tool, such as COGNOS®, in which case, the described solution may utilize the COGNOS® Message Queue, error reporting, metadata and all aspects of the COGNOS® framework.

Option 4: Hybrid Approach (Option 1 and Option 2)

Option 4 is a combination of option 1 and option 2.

With this option 4, there is tightly integrated OLAP technology described under option 1 and a loosely integrated interface to a $3^{rd}$ party tool such as COGNOS®—option 2. At this stage, this is considered the most likely option.

If this option 4 were selected, it would be implemented in 2 phases:

Phase 1: OLAP Option 1—Programmatic Tight Integration
Phase 2: OLAP Option 2—Interface Integration.

Option 5: Shared Database Approach

In this option the only communication between the Visual Document and the OLAP tool is through a shared database. If the described solution requires the OLAP tool to display some specific data then it would write this data to the database. The OLAP tool would notice the changes and respond appropriately. There would be no direct communication between applications.

Predictive Modeling System

Figure 35:
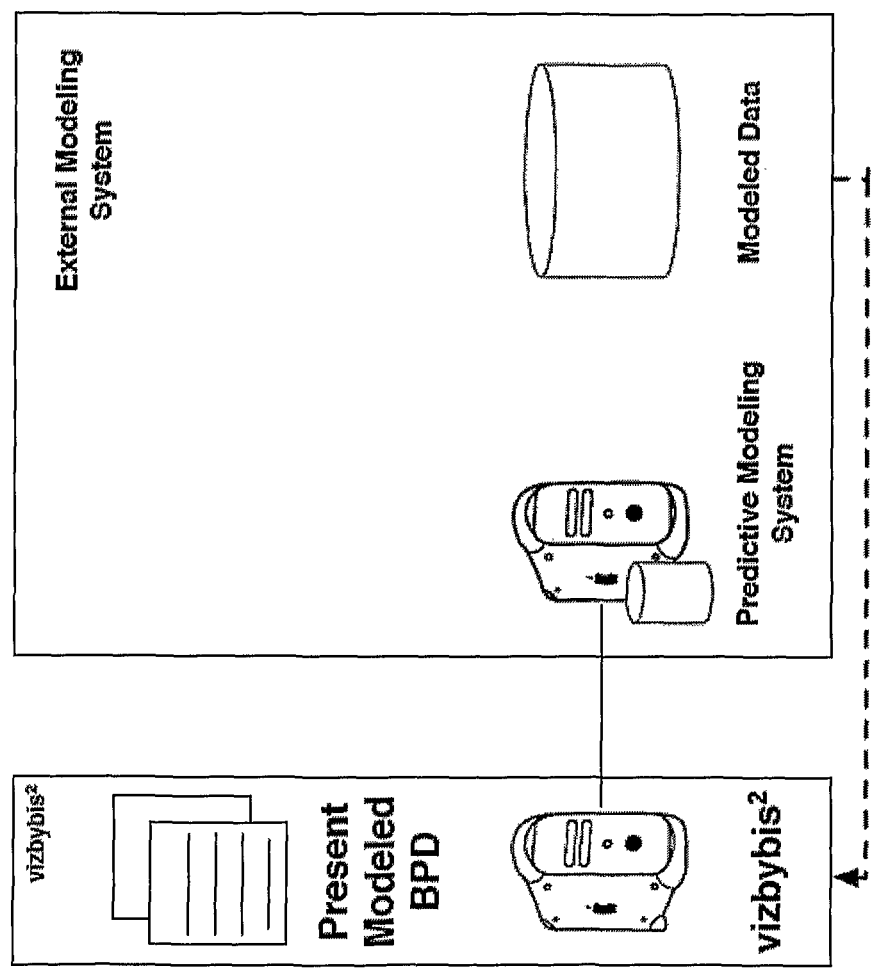
FIG. 35 shows a predictive modeling system according to an embodiment of the present invention.

FIG. 35 shows a predictive modeling system.

Predictive modeling systems have data piped (sent) to them to produce new BPDs. These predictive modeling systems then become part of the discovery process for finding new observations in the data.

This is achieved by interfacing to another system (or sub-system) that can return modeled data.

The described solution will have the capability of specifying the confidence factor for each predicted data element. The described solution could then use this information to enhance and display the significance of the predicted results.

For example, a dataset of the number and type of customer calls to a call center can be sent to a Back Propagated Neural Network (modeling system). This system then uses this data to perform the modeling and returns a dataset which the described solution will use to render the defined Visual Document.

Visual Design Management System

System Integrators will have the ability to install, remove and upgrade Visual Designs.

Visual Designs are modular. Specifically, a Visual Design can be taken out and replaced without affecting the associated BPDs.

Figure 36:
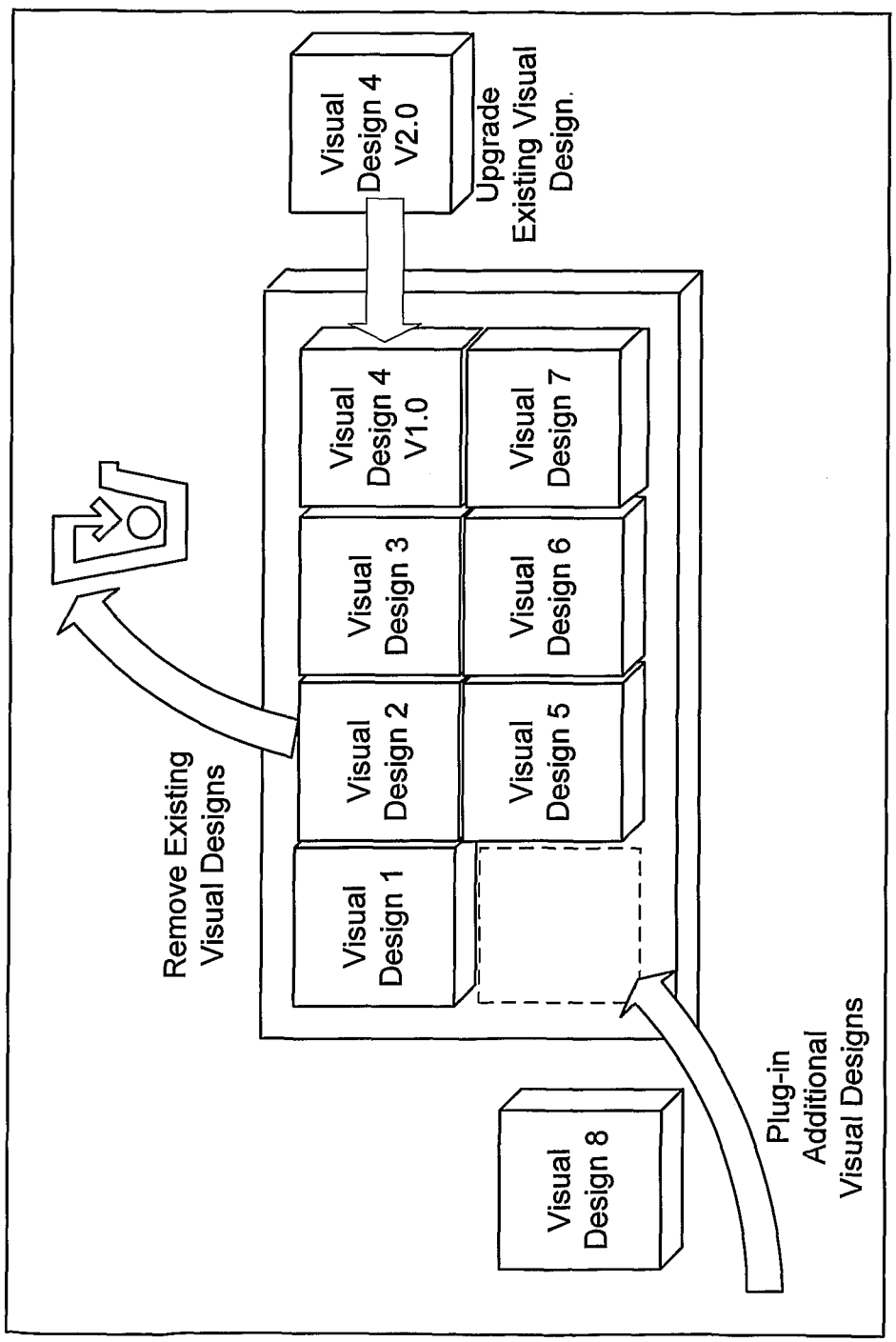
FIG. 36 shows a visual design management system according to an embodiment of the present invention.

FIG. 36 shows a visual design management system. Like Lego blocks, visual designs are modular.

A System (installation) can have many Visual Designs. One Visual Design can be used with multiple BPDs. Adding a Visual Design does not require a BPD to exist. This means if BPDs are deleted, the deletion will not affect any Visual Designs.

Whenever a user attempts to edit and/or re-run an existing Visual Document, the described solution will ask the question—do the required Visual Designs and BPDs exist to do this task? This includes the appropriate versions of BPDs and Visual Designs. If they do not exist the user is not allowed to edit or re-run the Visual Document. In a well managed system, typically users with the appropriate security will be able to edit and re-run Visual Documents. In the same well managed system old Visual Documents with retired BPDs or retired Visual Designs will not be available for editing.

Incomplete BPDs—typically BPDs with definitions of how they are displayed but not necessarily how the data for the BPD is executed—can be added to the repository. These incomplete BPDs should not be available for selection by an end user.

BPD Management and Data Access System

The BPD Management and Data Access System will manage BPDs. This capability may be used to manage the version of Data Packages and their component BPDs over time.

Data Packages (with Data)

Data Packages require the technical ability to define and manage groups of BPDs. Data Packages with data can be sold with subscription or service provision including an associated managed dataset. For example, census data will be available as a Data Package; this Data Package will enable the system users to interact and use a slowly changing dataset called census. (Census data can be updated after each census and is often modeled between each census).

Versioning BPDs

The management of BPDs over time may be over engineering the requirements. The timing of implementing this capability throughout the agile software engineering and design process will need to be addressed.

For example, an Operational Theme Park data package has a number of BPDs such as number of customers and costs. Each BPD Package is managed as a whole.

By managing the version on a BPD Package basis, the described solution can test the integrity of the business rules across one logical set of BPDs. For example, if the definition of a day is altered in some way; the start of a business day is moved from 5.30 a.m. to 6.00 a.m., all BPDs with a daily method will need to be updated and Validated.

Figure 37:
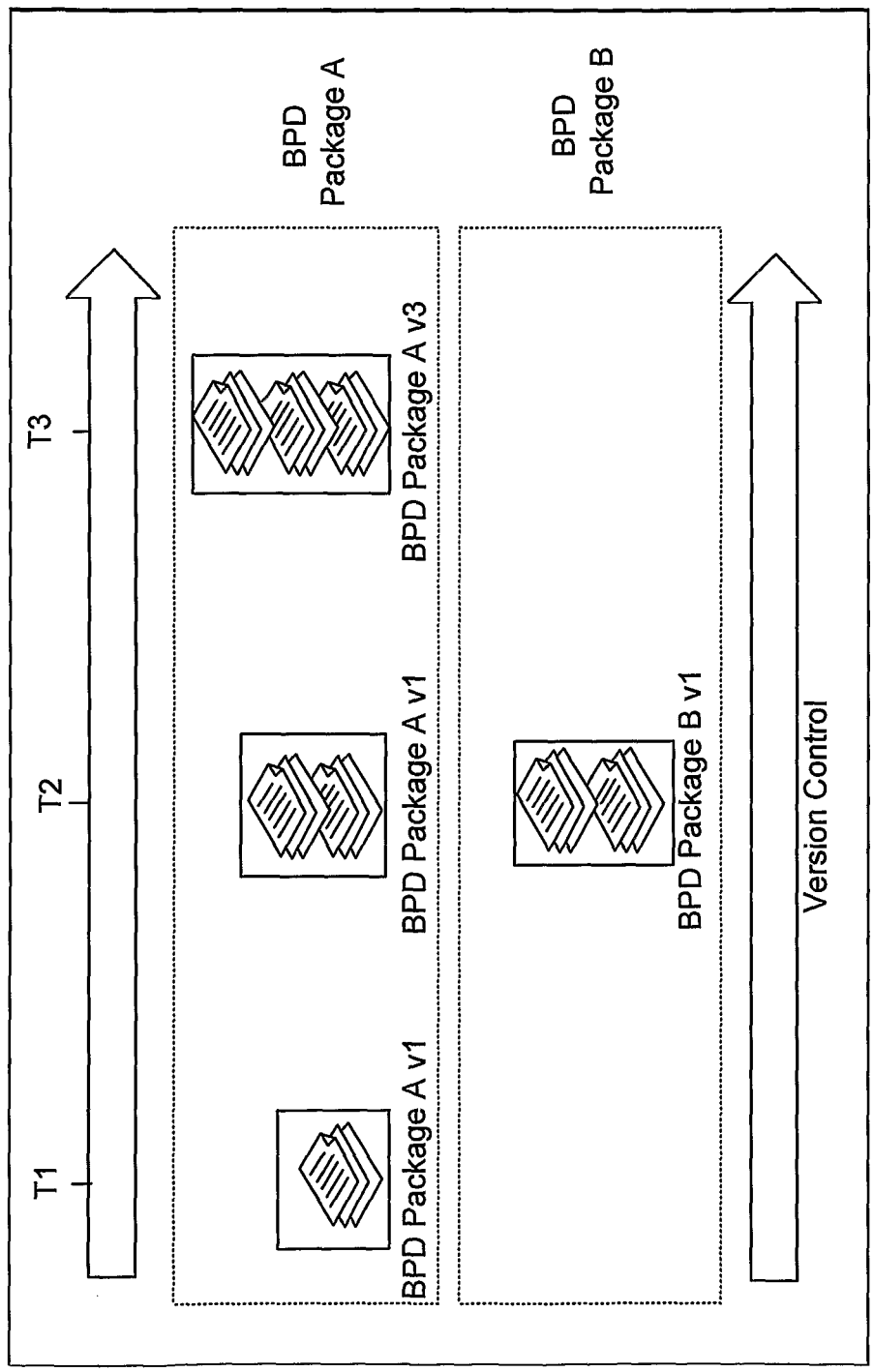
FIG. 37 shows a BPD management example according to an embodiment of the present invention.

FIG. 37 shows a BPD Management example.

In the above diagram, when a Visual Document is requested for T1 in T3, BPD A v1 may be applied (assuming it hasn't changed since T1 and is active) as this was the version for T1. V3 may also be applied if v1 has been retired, or at the specific request of the user. V2 may only be applied at the request of the user. In other words, the described solution will default to the matching version unless it is retired, in which case the current version is used. In any case, the user can force a specific non-retired version. If v2 is retired and v1 is still active, then essentially v1 will take over the role of v2 as only the end date of a BPD is managed.

If the Visual Document spans more than one BPD version then the latest BPD version is used unless it is specifically overridden.

BPDs can have different sets of breakpoints; this is required because of the variation across a business.

For example:

In retail, some stores produce 10× the revenue of others.

A store name could have a library of scheduled Visual Documents defined, where a specific breakpoint set is chosen for a visualized BPD.

BPDs within a BPD Package can change over time. There may be various reasons such as corrections, legislative reasons and breakpoint changes.

Some BPDs may have start dates. For example, a BPD is created for the introduction of GST (but can only be applied when this legislation takes effect).

For animations, the particular BPD version used is evaluated for each frame.

Output Management System

Figure 38:
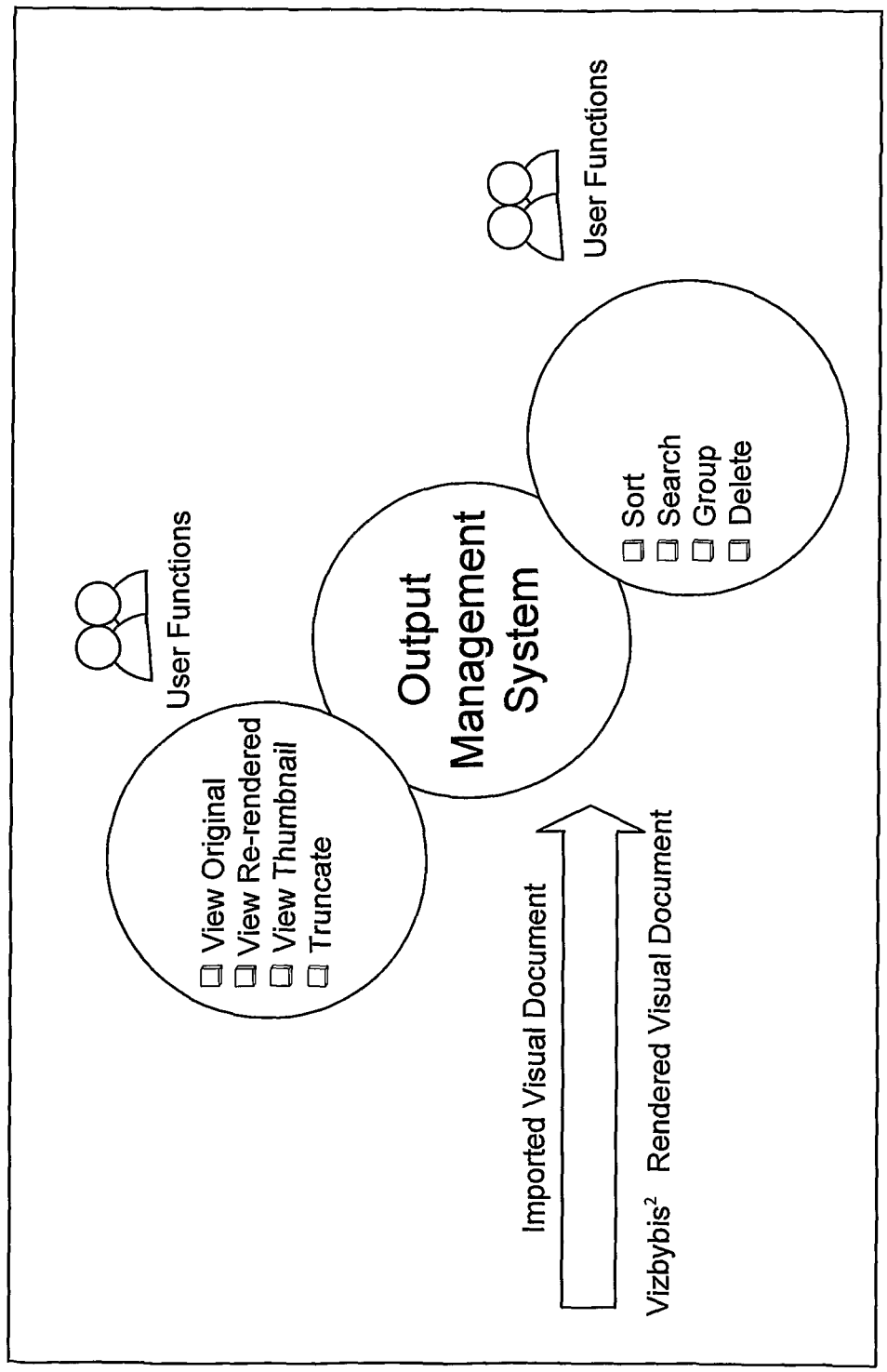
FIG. 38 shows an output management system according to an embodiment of the present invention.

FIG. 38 shows an output management system.

Catalog

A catalog is used to store permanent and temporary objects that are required for use and/or retrieval at a later date. These objects include:

BPD definitions
Customer Schema definitions
Visual Designs
Visual Documents

There are different types of catalogs such as files and database tables. These types are transparent to the system and its users. The number of catalogs and the catalog type used for each object is configured by the integrator according to their clients' needs. The integrator will specify the object being stored, the type of catalog it uses and the location of the catalog.

Items in a catalog are identified by a unique ID. This ID is assigned when adding something to a catalog which doesn't already have an ID. The ID is not designed to be easily readable and will potentially be quiet long (possibly up to 15 characters).

Nothing can be put into the catalog without getting an ID. Nothing can be retrieved from a catalog without giving an ID. Once retrieved, the details of the catalog (data described above) for a given object may be cached. This mitigates any performance degradation on subsequent requests.

One example is shown as follows:

| Object | Store Type | Details |
|---|---|---|
| BPD Definition | File | \\server\folder\subfolder |
| Client Schema | Database | server.database.username.password |

This configuration is stored separately in a file whose location will be specified by an 'environment variable', or in a "default" location.

Catalogs can reference (utilize) other catalogs. For example, a BPD may reference the client schema and a Visual Design which are stored in other Catalogs.

The diagram below depicts the process involved in the user requesting to view the Visual Document List from a catalog. The user will then select the Visual Document that they wish to view.

Figure 39:
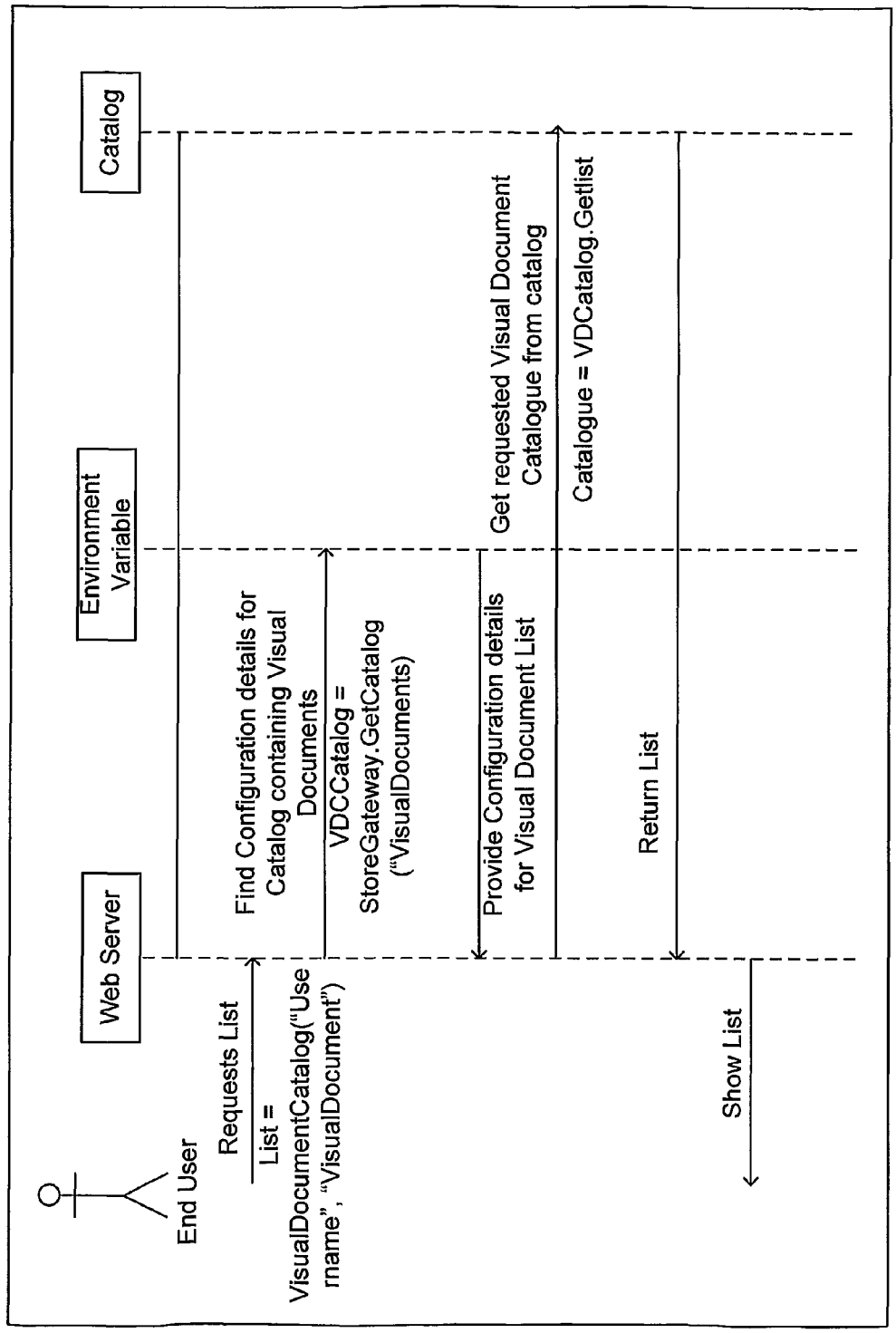
FIG. 39 shows an example of retrieving a Visual Document list from a catalog according to an embodiment of the present invention.

FIG. 39 shows an example of retrieving a Visual Document list from a catalog. Once retrieved, the details of the catalog (data described above) for a given object may be cached. This mitigates any performance degradation on subsequent requests.

The catalog itself will contain details about the object. For example, a visual document will have the following properties:

ID
Name
Description
Type
Referenced components of a visual document*

*These are referenced objects within a visual document e.g. images that belong to the Visual Document. Note: these referenced components have individual ids as they need to be retrievable individually. There are also non referenced objects e.g. individual rows of a dataset which can only be accessed by loading the entire dataset.

The number of attributes stored for an object will increase over time. For example, Rendered Visual Documents (or imported Visual Documents) will store date and time. This date and time may include:

Date & Time the Visual Document was created;
Date & Time the Visual Document was last modified;
Date & Time the Visual Document was last rendered;
The Date & Time the data in the Visual Document starts; and
The Date & Time the data in the Visual Document ends.

Visual Document List
Operations:

The Visual Documents in the Catalog are displayed to a user by way of a Visual

Document List that can then be grouped, sorted or searched. The Visual Documents can also be deleted. It should be noted that only users with the correct security access should be able to see certain Visual Documents.

The diagram below depicts the process involved in the user requesting to view the Visual Document List from a catalog. The user will then select the Visual Document that they wish to view.

Views:

Thumbnail images of the Visual Document are produced to help the user select the correct Visual Document.

Once selected, the user can then:
1. View the original Visual Document and, depending on the configuration, re-render the Visual Document.
2. Truncate by date (bulk delete). For example, delete all Visual Documents between Jan. 1, 2001 and Feb. 1, 2001.

Metadata Management

This module is very similar to the BPD management (versioning) concept. For example, if the metadata relating to the configuration of bands on a particular heatmap are changed at T2, then when the Visual Document from T1 is requested, the configuration (or metadata) that was relevant at the time should be used in the presented Visual Document.

This implies that the Visual Document may contain multiple versions of the metadata used in the rendering.

Figure 40:
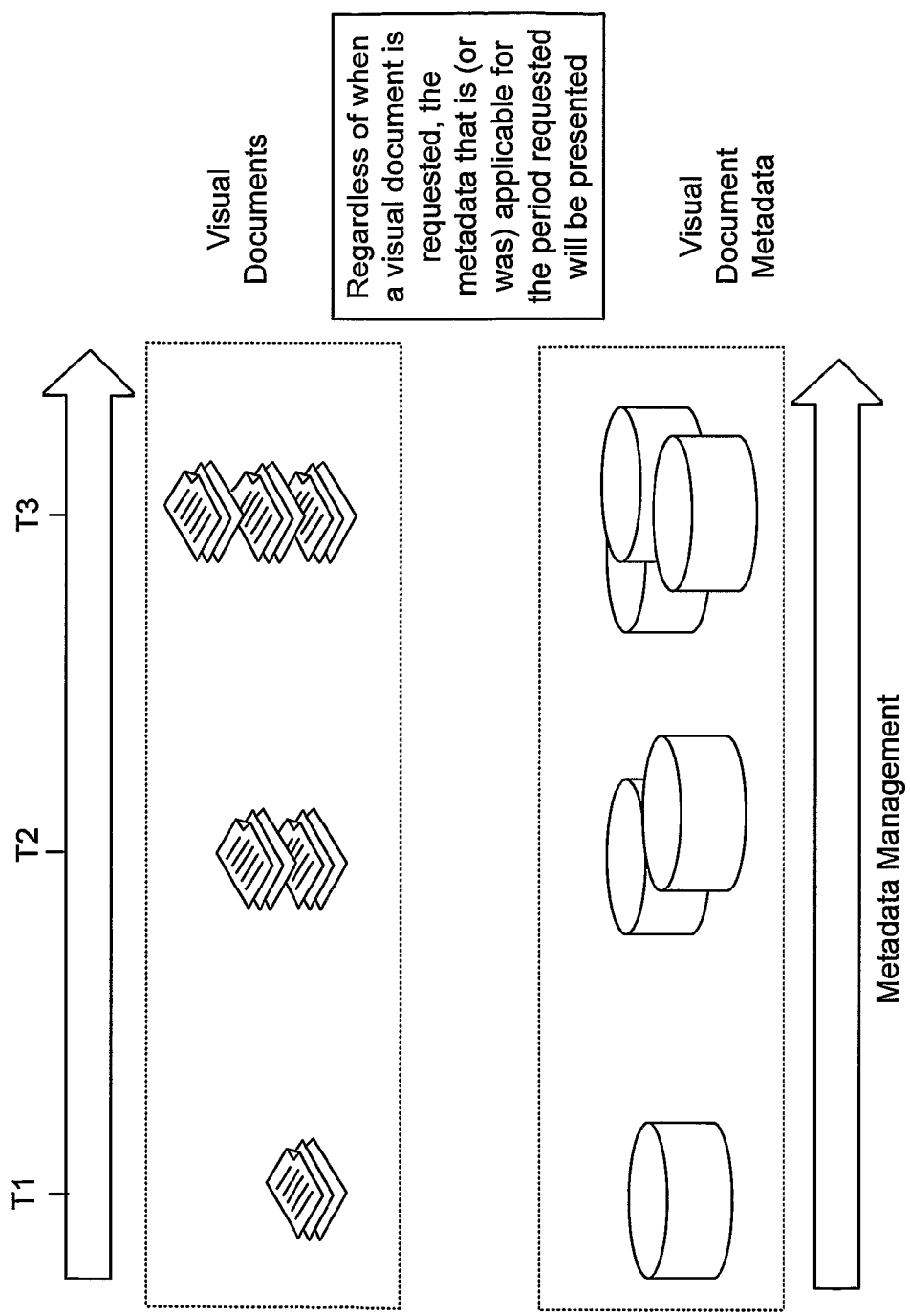
FIG. 40 shows a metadata management system according to an embodiment of the present invention.

FIG. 40 shows a metadata management system.

Security
Extended Single Sign-on Application Pattern

The system server cluster may exist in a separated environment where different servers serve different functions. This high degree of separation between functions will constrain the options available for security. This separated architecture results in a need to have an 'external security server' that will serve as a security proxy, which intercepts a request in order to map/transform user's credentials into the appropriate credential format acceptable to application servers. To support this part of the system design, the Runtime pattern for heterogeneous servers may be used with external authentication and authorization servers, as presented below.

Interfaces

The application servers may communicate via HTTP with SOAP using the web services technology. This HTTP communication will be secured using SSL, shown in the diagram as HTTPS.

Secure Connection Between Nodes

The following secure communications have been identified:

HTTPS is the secure HTTP connection using SSL. Nodes which communicate via TCP/IP use HTTP with secure SSL communication.

LDAPS is the secure LDAP connection to a directory server using SSL. LDAP directories store essential and sensitive applications and business information.

IIOP/SSL (IIOPS) is the secure communication for IIOP connections using SSL. The two application servers communicate mainly via IIOP. For example, the EJB client and EJB container.

SSL is a transport layer security protocol which can be applied to most of the protocols in use within the described solution. Other connections without named protocols can also use SSL to secure the communication.

Other communication channels between nodes can be secured on a transport layer, for example using IPSEC.

—Source IBM[xxi]

Configuration Management Tools

The configuration management tools are a key part of the application.

Figure 41:
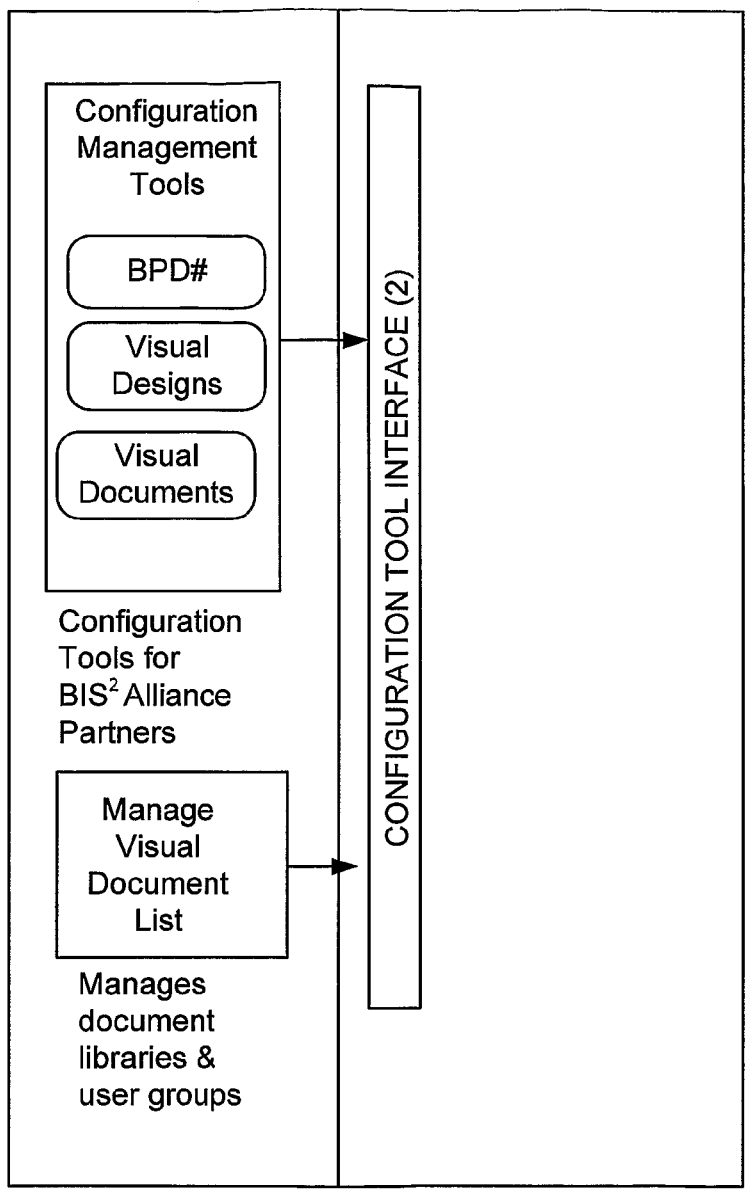
FIG. 41 shows configuration management components according to an embodiment of the present invention.

FIG. 41 shows configuration management components.

Configuration management may be implemented in two layers. The first layer is an application programming layer; in which a scriptable interface is exposed. Using this scriptable interface, a second layer of web-based configuration management tools can be implemented.

Figure 42:
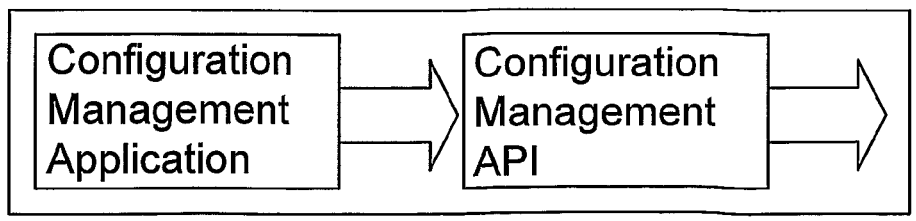
FIG. 42 shows configuration management layers according to an embodiment of the present invention.

FIG. 42 shows configuration management layers.

There are 3 areas of configuration management:
1. BPD: The business performance drivers have a Create, Read, Update and Delete (CRUD) interface.
2. Visual Designs: CRUD Interface, in addition there are specific requirements such as add layer, configure layer and delete layer.
3. Visual Documents: Visual documents can be amended to change the drilldown capabilities and metadata. As drilldowns are completed the result sets may be stored along with the visual document. This area of configuration management is less important than the first two.

User Functions

This section sets out the user functions in terms of what users will see and how they will interact with what they see.

Use Cases

User functions are described as use cases. The high-level use case model is outlined in this section with a brief description for each individual use case.

Use cases will be elaborated at a later stage into detailed use case descriptions based on priority (which align to the sprints) and product roadmap.

Figure 43:
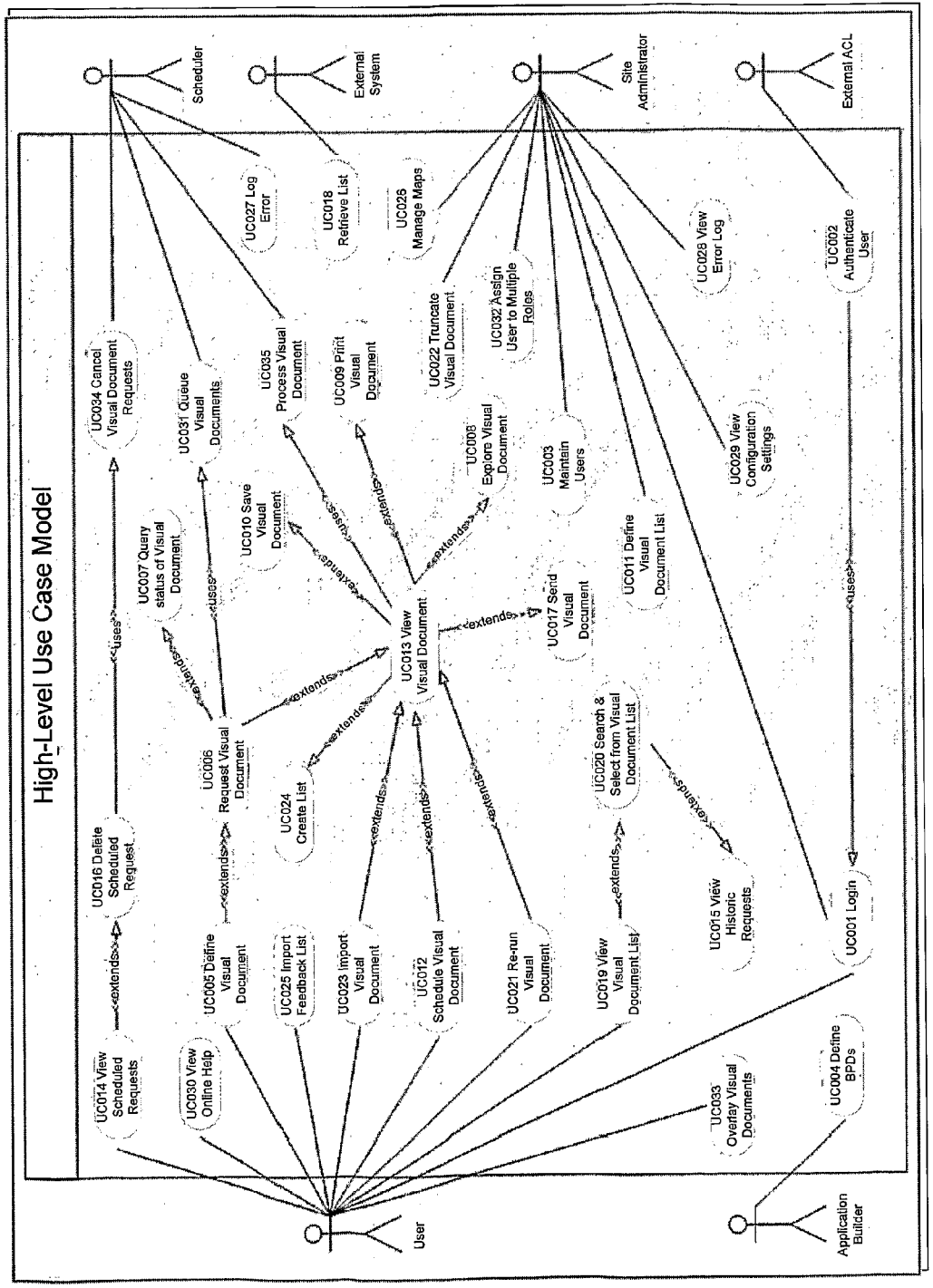
FIG. 43 shows a use case model according to an embodiment of the present invention.

FIG. 43 shows a use case model.

Actor Descriptions

| Actors | Description |
| --- | --- |
| User | The day-to-day user of the described solution. |
| Application Builder | This user has the ability to define BPDs. |

| Actors | Description |
|---|---|
| Scheduler | The scheduler is responsible for queuing and processing Visual Documents. |
| External System | An external system that receives lists from the described solution and may also produce data lists or Visual Designs to be imported into the described solution. |
| Site Administrator | The site administrator has the ability to maintain users and monitors error logs that are generated. |
| External ACL | The external access control list specifies who is allowed to access the described solution. |

High Level Use Case Descriptions

| UC # | Use Case | Description |
|---|---|---|
| UC001 | Login | The user enters their login details and submits them to the system for authentication. |
| UC002 | Authenticate User | An external system e.g. Active Directory - validates the user's credentials and associates the user to a role. Note: The described solution may optionally implement a user group and security system, or it may integrate with one or more third party tools. |
| UC003 | Maintain Users | A user can be added and removed from roles. Roles can be created and removed. Privileges can be assigned to roles Data access rights can be assigned to roles. |
| UC004 | Define BPDs | Allows the Application Builder to create/define, edit and retire Business Performance Drivers (BPDs). Note: BPDs may be defined by start and end dates (past and future). Retired BPDs may impact the Visual Document, therefore retired BPDs need to be recognized and the Visual Document identified as such. |
| UC005 | Define Visual Document | A user can select BPDs and the Visual Design for the Visual Document. Restrictions can be applied (if any) e.g. Turnover received in California between Dec. 1 2007 and Dec. 2 2007. Visual Documents can be created as: Visual only; Drill down; Re-runnable; Re-useable. |
| UC006 | Request Visual Document | The user can request that a Visual Document is generated for a particular Visual Design type. The request is passed via the Request Queue (for scheduling) to the document controller for generation. The rendering engine reads the appropriate metadata from the database and then renders the multi layered output using the defined Visual Document. |
| UC007 | Query status of Visual Document | A user can query the status of Visual Documents they have requested. |
| UC008 | Explore Visual Document | Dependent on the type of Visual Document created, the user can select points of interest, zoom in and/or drill down into the data relating to the Visual Document. |
| UC009 | Print Visual Document | A user can choose to print the Visual Document produced. Most Visual Documents will have a printable form. For example, rendered Visual Documents may have PDFs generated. For animations, this PDF may contain a sequence of thumbnails. |
| UC010 | Save Visual Document | Visual Documents will be saved in the Visual Document catalog with unique identifiers, e.g. name of document; date of document; user identifier; brief summary of document content; and key words as determined by user. The Visual Document will be kept for a preconfigured period of time. The user may also choose to save the document outside of the Visual Document catalog. |
| UC011 | Define Visual Document List | The Visual Document List is a list of all Visual Documents created and stored in the Visual Document Catalog. The Visual Documents will be able to be grouped within the catalog based on user requirements. |
| UC012 | Schedule Visual Document | A user may choose to schedule (by date and time) a previously created visual document to be produced on a regular basis. The scheduler runs the visual document as previously defined. Error logs are kept and alerts generated (if configured). |
| UC013 | View Visual Document | A user can view a Visual Document that was produced via a scheduled request, one-off request, or a re-run document. The Visual Documents are kept for a preconfigured period of time. |
| UC014 | View Scheduled Requests | A user can view a list of scheduled requests within the scheduler relevant to the user's role and security access. |
| UC015 | View Historic Requests | A user can view a list of historic requests produced relevant to the user's role and security access. |
| UC016 | Delete Scheduled Request | A user can delete scheduled requests within the scheduler relevant to the user's role and security access. |
| UC017 | Send Visual Document | A user can send and convert (e.g. user may choose to send viewable version only) the rendered document to another party, e.g. email or URL. |
| UC018 | Retrieve List | An external system (e.g. CRM) retrieves the list created by a user. The described solution provides the $3^{rd}$ party system the instructions on how to retrieve the list. |
| UC019 | View Visual Document List | A user may view the Visual Document List. The Visual Document List will contain thumbnails of the visual documents contained within to enable easy identification of a Visual Document. Users will be able to view the original Visual Document, and any re-rendered Visual Documents. |
| UC020 | Search & Select from Visual Document List | A user can search and select from the catalog using the Visual Document List, e.g. by run date; name of document or user. |
| UC021 | Re-run Visual Document | A user can choose to re-run a Visual Document as data and/or BPDs may have changed over time. The original Visual Document created will be available to the user for viewing. |
| UC022 | Truncate Visual Document | A site administrator can truncate visual documents from the Visual Document Catalog using the Visual Document List dependent on the user's role and security access. These can be done individually or in bulk. Documents can be selected for truncation by date range e.g. 01 Sep. 2003 to 01 Sep. 2004. |
| UC023 | Import Visual Document | A user may import some external Visual Documents into the described solution. Visual documents will be generated in the described solution, and they will also be generated from other systems and imported into the described solution. |
| UC024 | Create List | A user may create a list of data from a Visual Document that will be saved in the Lists Storage. The user can select a set or subset of the data from the visualization (e.g. customer type, region and product). This list can then be retrieved by a third party system. |

Note: The described solution may instruct an external system to read the list. The described solution may not be responsible for ensuring a successful write operation to external systems.

-continued

| UC # | Use Case | Description |
|---|---|---|
| UC025 | Import Feedback List | A user can import (via upload or some other method TBD) data into the described solution. The user can view the original list, the feedback list and then create a second Visual Document to view the results. |
| UC026 | Manage Maps | As maps (such as store layouts) change over time, these changes may be managed through a version control process so that a retrospective Visual Document may be shown using the correct map. |
| UC027 | Log Error | Typically, within the application, each server will be responsible for its own logging. A separate process (central log reader) will be used to consolidate these logs dynamically as and when required. |
| UC028 | View Error Log | A user will monitor the error log to ensure system performance is maintained. |
| UC029 | View Configuration Settings | A user will view the system configuration settings. Each installation will have configurable items for each: Visualization e.g. colors, scaling etc; System wide configuration e.g. currency, language; Custom configuration e.g. time definitions (e.g. Wal-Mart week). |
| UC030 | View Online Help | The User will be able to view an 'Online Help' module relevant to the construction and storage of Visual Documents. |
| UC031 | Queue Visual Documents | The Scheduler will queue all Visual Documents requested by a user. |
| UC032 | Assign User to Multiple Roles | A user can be assigned to more than one role e.g. a user may have the ability to 'view only' or the ability to 'view and delete'. |
| UC033 | Overlay Visual Documents | A user will have the ability to overlay any two runs of a visualization containing the same visual types. |
| UC034 | Cancel Visual Document Requests | The scheduler will cancel at a Users request any Visual Document requests that are currently in progress. |
| UC035 | Process Visual Documents | The Scheduler will process all Visual Document Requests made by a user. |

System Benchmarks
Background

This section describes features of the system that are not directly observed by end users.

Physical Servers (Availability, Robustness)

| Code | Event | System Response |
|---|---|---|
| SU01 | Hardware failure in a single replicated server. | The system will typically continue to operate. Performance will degrade in a predictable manner; typically critical features continue to perform with a reasonable outage if required. |
| SU02 | Intermittent network failure | The system continues after network retry. |
| SU03 | Additional server is added to the cluster | Performance increases accordingly, minor outages may be required. |
| SU04 | Extended Power Failure | The system utilizes UPS notifications of impending power failure and does a controlled shutdown. |

Logical Servers (Services) (Performance, Availability, Robustness)

| Code | Event | System Response |
|---|---|---|
| SU05 | Processes can be started and stopped. | Typically, the system will automatically restart the process if stopped. Generally, users should not notice, except that long running tasks may take more time, if the process is fault tolerant. The system must maintain its integrity, but processing may have to be repeated. |
| SU06 | Software upgrade and system backups can be completed. | Often, this will require a brief outage. Backups should be able to be run while the system is processing. |
| SU07 | If the data warehouse does not respond to a select, update or insert command, data integrity is maintained. | Sensible fail down and retry algorithms are employed. Full database transaction processing with rollback is applied to maintain transaction integrity. Proper alerts and log entries are produced. |

Server Clusters and Parallelism

| Code | Event | System Response |
|---|---|---|
| SU08 | System performance increases (approaching a linear function) when additional hardware nodes in a cluster are added. | This will only apply when the system is configured to minimize contention. |
| SU09 | Theoretical and actual performance constraints are documented. | Publish combinations of actual tested performance results. |
| SU10 | System supports parallel processing for both homogeneous and heterogeneous databases. | Clustering for homogeneous and/or round robin for heterogeneous techniques may be employed for parallel database access. |
| SU10a | System supports throttling of queries to database engines. | Not applicable. |

Animation

| Code | Event | System Response |
|---|---|---|
| SU11 | Animations within Visual Documents may be used to depict historical periods (or other appropriate X parameter) and/or real time data. | Not applicable. |
| SU13 | Visual documents are user adjustable by type, color, widgets, symbols, and icons. | Preferences and templates may be saved for later use. Changing the parameters of the document will typically require the Visual Document to be re-rendered. |
| SU14 | Default Visual Designs are provided by the system based on the selected or staged data. | These defaults are typically cartographically sensible. (This is not a system requirement but the system must be able to capture this data.) |

Real-Time Visual Documents

| Code | Event | System Response |
|---|---|---|
| SU16 | Real-time Visual Document can include cosmetic adjustments to embellishment layers. | Adjustments may be saved as preferences and/or templates. |
| SU17 | Visual documents are updated through real-time updates. These updates occur within seconds of the data becoming available to the system. | User is informed of the data's freshness (e.g., "data depicted was last updated . . . ") |
| SU18 | Software should provide a 'best guess' based default | This format should attempt to utilize sensible display options based on the |

-continued

| Code | Event | System Response |
|---|---|---|
| | format for the data being presented. | conclusions the system makes regarding the structure of the data. |
| SU19 | Data displayed accurately depicts the source data. | Metadata definitions of data acquisition are displayed for users. |

Metadata Schematic

| Code | Event | System Response |
|---|---|---|
| SU21 | Metadata may be viewed using the Visual Documents. | This means that there is a special visual design type that can be used to navigate the metadata. It is not part of the typical visual document. |
| SU22 | Metadata views are available and their parameters drawn from in order to construct new Visual Documents. | Not applicable. |
| SU23 | Metadata entries are versioned to track data elements whose characteristics change over time. | Not applicable. |

Performance Indicator Schematic

| Code | Event | System Response |
|---|---|---|
| SU24 | The system allows complex BPDs to be defined and stored based on available data. | Definitions are checked for validity and potential errors displayed to the user for correction. |

Time Selection

| Code | Event | System Response |
|---|---|---|
| SU25 | Time parameters used by the system may be relative to a standard time and date. | Not applicable. |
| SU26 | All dates and times must be capable of localization, and popular period calculations. | Examples of popular period include DST adjustments, day of week, end of month, end of quarter, last Friday. |

Selection for Action

| Code | Event | System Response |
|---|---|---|
| SU27 | Textual representation of selected data records comprising the Visual Document may be exported. | Interacting with the Visual Document allows the user to make selections for further analysis. When the action option is selected, various output textual formats are possible, for example csv, psv or tab separated. |

Selection Feedback

| Code | Event | System Response |
|---|---|---|
| SU29 | User may perform 'what if' analyzes on the Visual Document by changing actual parameters and viewing the graphical result. | This may require that the user re-run the Visual Document with different parameters. |

Static Visual Documents

| Code | Event | System Response |
|---|---|---|
| SU30 | Have all of the attributes of real time documents except that they represent a snapshot of a moment in time. | System should support a logical way to store archived static reports. User should be able to see aspects of the BPD versions utilized in the archived documents. |

Visual Documents

| Code | Event | System Response |
|---|---|---|
| SU31 | Caching routines significantly (approaching a multiplicative function) increase performance for frequently used actions. | Actions include data retrieval and Visual Document components. |
| SU32 | Performances for caching routines do not degrade over size of the cache. | Not applicable. |
| SU33 | Caching routines always provide a valid version of the item requested. | Not applicable. |

Metadata

| Code | Event | System Response |
|---|---|---|
| SU31b | Caching routines significantly (approaching a multiplicative function) increase performance for frequently used actions. | Actions include data retrieval and Visual Document components. |
| SU32b | Performances for caching routines do not degrade over size of the cache. | Not applicable. |
| SU33b | Caching routines always provide the latest version of the item requested. | Not applicable. |

Database Result Sets

| Code | Event | System Response |
|---|---|---|
| SU31c | Caching routines significantly (approaching a multiplicative function) increase performance for frequently used actions. | Actions include data retrieval and Visual Document components. |
| SU32c | Performance for caching routines do not degrade over size of the cache. | Not applicable. |
| SU33c | Caching routines always provide the latest version of the item requested. | Not applicable. |
| SU33c1 | Should consider the age of the cache as the system does not have control over the data in the source system. | In others the data can change without the application being notified. |

Impacts of Contour Heatmaps

| Code | Event | System Response |
|---|---|---|
| SU34 | Contour heat maps use color gradations and symbols for both continuous and non-continuous data. | User may adjust the color scheme/fill patterns and depicted parameters (e.g., actual change vs. % change). Changes to parameters may require the user to re submit the Visual Document for re-rendering. Source: Nasdaq Heat Maps[xxii] |

PI History

| Code | Event | System Response |
|---|---|---|
| SU35 | A complete history of active and inactive BPDs may be recalled including all components used in construction, date created, last date used. | The system provides a logical way to organize the BPD history, and indicates the version of the data elements used to create it. |

Visual Document Import

| Code | Event | System Response |
|---|---|---|
| SU36 | Visual Documents from other sources are imported. | Imported documents may be enhanced by the system and stored in the described solution format. Data may also be imported. |

Error Logging

| Code | Event | System Response |
|---|---|---|
| SU38 | All significant system actions are logged, | Not applicable. |

| Code | Event | System Response |
|---|---|---|
| | | allowing a user to filter and sort by local and relative date/time, type, and general text search on the description. |

Scheduling

| Code | Event | System Response |
|---|---|---|
| SU39 | Batch processes may be scheduled. | System provides a logical way to manage scheduling. Schedule runs may be restarted if interrupted. |

System Documentation

| Code | Event | System Response |
|---|---|---|
| SU42 | Documentation includes: Context sensitive help On-line reference manual Functional oriented manuals. Administration Data Specialist Document creator Various single task guides | Documentation is frequently tested against actual operation. Documentation includes data visualization theory (e.g., which documents work best in particular situations). As much as possible documentation should be produced from source code (provided to integrators). End user documentation may be the responsibility of the system integrator. |

Appendix 1—Glossary

The following terms are used throughout this document:

| Term | Definition |
|---|---|
| Agile Development | Agile software development is a conceptual framework for software engineering that promotes development iterations throughout the life-cycle of the project. There are many agile development methods; most minimize risk by developing software in short amounts of time. Software developed during one unit of time is referred to as an iteration, which may last from one to four weeks. Each iteration is an entire software project: including planning, requirements analysis, design, coding, testing, and documentation. An iteration may not add enough functionality to warrant releasing the product to market but the goal is to have an available release (without bugs) at the end of each iteration. At the end of each iteration, the team re-evaluates project priorities. Wikipedia[xxiii] |
| BPD Packages | A BPD Package is made up from a set of related BPDs. This relationship (between a BPD Package and its BPDs) is defined using metadata. BPD Packages can be thought of as the Visual Document's vocabulary. |
| Catalog | The described catalog is used to store permanent and temporary objects that are necessary for creation and storage of Visual Documents. These may include Visual Designs, BPDs, Configuration tools and other objects. There may be multiple catalogs of different types (such as - database, flat file) which are configured by an integrator - dependent on customer requirements. All items in a catalog are identified by a unique ID and can only be accessed by those with the correct authorization. |

-continued

| Term | Definition |
|---|---|
| Data Packages | Data Packages contain data that can be sold with subscription or service provision including an associated managed dataset. For example, census data will be available as a Data Package; this Data Package will enable the described solution users to interact and use a slowly changing dataset called census. (Census data can be updated after each census and is often modeled between each census). |
| Dimension | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia$^{xxiv}$ |
| Dimensional Modeling | DM is a logical design technique that seeks to present the data in a standard, intuitive framework that allows for high-performance access. It is inherently dimensional, and it adheres to a discipline that uses the relational model with some important restrictions. Every dimensional model is composed of one table with a multipart key, called the fact (sometimes referred to as measures) table, and a set of smaller tables called dimension tables. Each dimension table has a single-part primary key that corresponds exactly to one of the components of the multipart key in the fact table. Intelligent Enterprise$^{xxv}$ |
| Enterprise Java Beans (EJBs) | In a typical J2EE application, Enterprise JavaBeans (EJBs) contain the application's business logic and live business data. Although it is possible to use standard Java objects to contain your business logic and business data, using EJBs addresses many of the issues you would find by using simple Java objects, such as scalability, lifecycle management, and state management. Wikipedia$^{xxvi}$ |
| Fact | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia$^{xxvii}$ |
| IIOP (Internet Inter-ORB Protocol) | IIOP (Internet Inter-ORB Protocol) is a protocol that makes it possible for distributed programs written in different programming languages to communicate over the Internet. SearchCIO-Midmarket$^{xxviii}$ |
| KML | Keyhole Markup Language. Google ™ Earth is a geographic browser -- a powerful tool for viewing, creating and sharing interactive files containing highly visual location-specific information. These files are called KMLs (for Keyhole Markup Language): what HTML is to regular Internet browsers, KML is to geographic browsers. You can open KML files in both Google ™ Earth and Google ™ Maps, as well as in many other geographic browsers. Google ™ Maps$^{xxix}$ |
| MDT | The average time that a system is non-operational. This includes all time associated with repair, corrective and preventive maintenance; self imposed downtime, and any logistics or administrative delays. The difference between MDT and MTTR (mean time to repair) is that MDT includes any and all delays involved; MTTR looks solely at repair time. Wikipedia$^{xxx}$ |
| Metadata | Metadata describes how data is queried, filtered, analyzed, and displayed in the described solution. In general terms, metadata is data about data. For example, in a library the metadata (pertaining to the catalog of books) could be - the title of the book, the author(s), categories (e.g. reference, fiction, non-fiction etc), physical location. This metadata can be used in searches, directories etc to help users locate books. |
| MTBF | Mean time between failures (MTBF) is the mean (average) time between failures of a system, and is often attributed to the 'useful life' of the device i.e. not including 'infant mortality' or 'end of life'. Calculations of MTBF assume that a system is 'renewed', i.e. fixed, after each failure, and then returned to service immediately |

| Term | Definition |
| --- | --- |
| | after failure. The average time between failing and being returned to service is termed mean down time (MDT) or mean time to repair (MTTR).<br>MTBF = (downtime − uptime)/number of failures.<br>Wikipedia[xxxi] |
| MTTR | Mean Time to Recovery - the average time that a device will take to recover from a non-terminal failure.<br>Examples of such devices range from self-resetting fuses (where the MTTR would be very short, probably seconds), up to whole systems which have to be replaced. The MTTR would usually be part of a maintenance contract, where the user would pay more for a system whose MTTR was 24 hours, than for one of, say, 7 days. This does not mean the supplier is guaranteeing to have the system up and running again within 24 hours (or 7 days) of being notified of the failure. It does mean the average repair time will tend towards 24 hours (or 7 days). A more useful maintenance contract measure is the maximum time to recovery which can be easily measured and the supplier held accountable. Wikipedia[xxxii] |
| OLAP | On Line Analytical Processing.<br>OLAP performs multidimensional analysis of business data and provides the capability for complex calculations, trend analysis, and sophisticated data modeling.<br>OLAP enables end-users to perform ad hoc analysis of data in multiple dimensions, thereby providing the insight and understanding the need for better decision making.<br>Paris ™ Technologies[xxxiii] |
| Planogram | A planogram is a diagram of fixtures and products that illustrates how and where retail products should be displayed, usually on a store shelf in order to increase customer purchases. They may also be referred to as planograms, plan-o-grams, schematics (archaic) or POGs.<br>A planogram is often received before a product reaches a store, and is useful when a retailer wants multiple store displays to have the same look and feel. Often a consumer packaged goods manufacturer will release a new suggested planogram with their new product, to show how it relates to existing products in said category.<br>Planograms are used nowadays in all kind of retail areas.<br>A planogram defines which product is placed in which area of a shelving unit and with which quantity. The rules and theories for the creation of a planogram are set under the term of merchandising. Wikipedia[xxxiv] |
| Request Queue | The Request Queue manages Visual Documents requests generated by a user or the scheduler.<br>As requests are processed, the Visual Document maintains various statuses until the Visual Document is complete and available to be viewed by a user. |
| SaaS | Software as a Service.<br>A software application delivery model where a software vendor develops a web-native software application and hosts and operates (either independently or through a third-party) the application for use by its customers over the Internet. Customers do not pay for owning the software itself but rather for using it. Wikipedia[xxxv] |
| Scrum | Scrum is an agile process that can be used to manage and control software development.<br>With Scrum, projects progress via a series of iterations called sprints. These iterations could be as short as 1 week or as long as 1 month.<br>Scrum is ideally suited for projects with rapidly changing or highly emergent requirements. The work to be done on a Scrum project is listed in the Product Backlog, which is a list of all desired changes to the product. At the start of each sprint a Sprint Planning Meeting is held during which the Product Owner prioritizes the Product Backlog and the Scrum Team selects the tasks they can complete during the coming Sprint. These tasks are then moved from the Product Backlog to the Sprint Backlog.<br>Each day during the sprint a brief daily meeting is held called the Daily Scrum, which helps the team stay on track.<br>At the end of each sprint the team demonstrates the completed functionality at a Sprint Review Meeting. |

-continued

| Term | Definition |
|---|---|
| Self Organizing Maps (SOM) | A type of artificial neural network that is trained using unsupervised learning to produce a low-dimensional (typically two dimensional), representation of the input space of the training samples, called a map. The map seeks to preserve the topological properties of the input space. Wikipedia[xxxvi] |
| Servlets | Servlets are modules of Java code that run in a server application (hence the name "Servlets", similar to "Applets" on the client side) to answer client requests. Servlets are not tied to a specific client-server protocol but they are most commonly used with HTTP and the word "Servlet" is often used in the meaning of "HTTP Servlet". Servlets make use of the Java standard extension classes. Since Servlets are written in the highly portable Java language and follow a standard framework, they provide a means to create sophisticated server extensions in a server and operating system independent way. Typical uses for HTTP Servlets include: 1. Processing and/or storing data submitted by an HTML form. 2. Providing dynamic content, e.g. returning the results of a database query to the client. 3. Managing state information on top of the stateless HTTP, e.g. for an online shopping cart system which manages shopping carts for many concurrent customers and maps every request to the right customer. Servlet Essentials[xxxvii] |
| Subject Matter Expert (SME) | The Subject Matter Expert is that individual who exhibits the highest level of expertise in performing a specialized job, task, or skill within the organization. Six Sigma[xxxviii] |
| WebSphere | WebSphere is an IBM ™ brand of products that implement and extend Sun's JavaTwoEnterpriseEdition (J2EE) platform. The Java-based application and transaction infrastructure delivers high-volume transaction processing for e-business and provides enhanced capabilities for transaction management, as well as security, performance, availability, connectivity, and scalability. IBM ™ WebSphere Product Pages[xxxix] |

Further Embodiments

It will be understood that the embodiments of the present invention described herein are by way of example only, and that various changes and modifications may be made without departing from the scope of invention.

Traditionally, the gaming industry has employed slot machines loaded with a fixed set of preloaded games. It was left to the customer to locate an available machine offering the game he or she preferred to play at that moment in time. Downloadable games allow a customer to play a variety of games on any available slot machine platform. Additionally downloadable games may provide the capability for the gaming floor to be remotely configured. Information that identifies players, either collectively as groups or individually as an individual, can be collected from systems, player clubs or credit card information, or indirectly via recognition software. This identification can be used to alter the characteristics of the gaming devices or the characteristics of any of the other aspects of the facility including lighting, music, oxygen level, mist production or human elements such as service providers or entertainment. This alteration of the characteristics could either be controlled directly by the customer or by the operator. It is possible to store game preferences (game type, and preferences for each game type) on players either with their direct entry or indirectly via entry or behavioral monitoring.

In the case of the Hospitality Industry, traditionally in-room technology has been employed to perform the automation of bill review and settlement, for example using the television. Modern hotel television systems allow a customer to perform many other functions, including watching movies on demand, playing video games, ordering room service, among others. Additionally these television systems may provide the capability to offer advertisements for additional services along with their fulfillment. These offers may be personalized based on the customer profile and current activities. For instance, a customer that purchased spa services during their last visit can receive a promotional offer for a spa visit during their current visit.

Traditionally, the financial industry has employed automated teller machines (ATMs) to perform automation of routine payment, deposit and withdrawal transactions. Modern ATMs allow a customer to perform many other functions, including setting preferences for quick cash withdrawal amounts, the default account to apply transactions, among others. Additionally these ATMs may provide the capability to offer advertisements for additional services along with their fulfillment. These offers may be personalized based on the customer profile and current activities.

For the telecommunications industry, traditionally the industry has employed a wireless telephone network that allows customers to communicate from many locations. Modern networks can, especially in urban areas, determine a precise location of the wireless telephone when operating. These telephones and networks may provide the capability to offer exact location based advertisements for additional services along with their fulfillment. These offers may be personalized based on the customer profile and current activities. For instance, as a customer passes a retail outlet, they may receive a text message describing special offers, and, after viewing the product, the customer may simply press a key in order for the product to be delivered either at the store or shipped to the address on file. Charges for the purchase may be placed on the wireless phone bill or through other means.

The value of marketing data already collected by the various entities within the previously discussed industries (Retail, Gaming, Hospitality, Financial, Entertainment and Telecommunications) may be enhanced. This enhancement may be an actual increase in revenue or a reduction in the recession rate in the relevant business, or an improvement in the quality of service provided. The cross and up selling opportunities may be made available at the appropriate moments including when the customer has "money in hand" or when analytical methods indicate an opportunity exists.

Sophisticated data visualization techniques as herein described may allow the various entities in each of the industries to make sense of this plethora of data and provide their associated operators the ability to improve their outlook by for example increasing revenue or reducing costs.

With regards to the gaming industry, E-Tables are electronic versions of traditional table games, and include complete conversion of traditional games to hybrid electronic and traditional games. While retaining the social aspects (player and sometimes dealer interactions), E-Tables bring advantages compared to traditional table games. Many of these advantages have existed for electronic slot machines. These advantages may include; more precise player ratings, removal of dealer errors, reduction in chip handling, the provision of complex bonus schemes, and the offer of game variations and downloads (changed) upon request. As E-Tables grow in popularity, additional data and more opportunities to act upon the data will become available to the casino. They will also increase the options available to change the characteristics of the gaming offering. The techniques described herein can assist in the data visualization.

With regards to the Hospitality industry, on-line reservations systems, kiosks selling tickets to special events, and automated check-out processes are all examples of electronic versions of traditional front desk clerks and concierges. While retaining the security of a personal transaction, these automated functions provide many advantages. These advantages may include; more precise customer preference information, removal of clerical errors, reduction in cash handling, the provision of complex marketing incentives, and the offer of service variations and downloaded (changed) services upon request. As more traditional hotel transactions are automated, additional data and more opportunities to act upon the data will become available to the hotel. They will also increase the options available to change the characteristics of the financial offering. The techniques described herein can assist in and be assisted by the data visualization.

With regards to the financial industry, virtual banks and banking kiosks are electronic versions of traditional tellers, loan officers and ATMs. While retaining the security of a personal transaction, virtual banks and banking kiosks compared to brick and mortar financial institutions. These advantages may include; more precise customer preference information, removal of teller errors, reduction in cash handling, the provision of complex marketing incentives, and the offer of service variations and downloaded (changed) services upon request. As virtual banks and banking kiosks grow in popularity, additional data and more opportunities to act upon the data will become available to the financial institution. They will also increase the options available to change the characteristics of the financial offering. The techniques described herein can assist in and be assisted by the data visualization.

With regards to the Telecommunications industry, modern wireless devices are virtual retail catalogs, providing the consumer the ability to look at live product-based buying opportunities using the consumer's location (spatial) and the time. While retaining the security of a personal transaction, wireless devices, normally carried everywhere by a consumer, become a virtual personal shopper. The location and transaction information provide advantages that may include, for example, more precise customer preference information, reduction in the number of call centre errors, reduction in the number of dropped calls, the provision of complex marketing incentives, and the offer of service variations and downloaded (charged) services upon request. As wireless device based shopping grows in either popularity or capacity, additional data and more opportunities to act upon the data will become available to the telecommunications company. They will also increase the options available to change the characteristics of the service offering. The techniques described herein can assist in and be assisted by the data visualization.

Casinos offer a wide variety of goods and services to their customers. This includes ambiance, gaming opportunities, entertainment, lodging, health and beauty enhancement, foods and beverages, clothing, jewelry, sundries, business services, and convention services. Each individual item for sale has unique storage and delivery characteristics, appeals to varying market segments, and profit making potential. Casinos often collect a great deal of information regarding a customer's purchases through room charges, point of sale terminals, and the loyalty programs. Data visualization techniques as herein described assist in extracting the value given the diversity, quantity and quality of the data.

Further, hotels offer a wide variety of goods and services to their customers. These include food and beverages, special events, use of spa facilities, gifts, concierge services, movie and business products and services, among others. Each individual item for sale appeals to varying market segments, and profit making potential. Hotels often collect a great deal of information regarding a customer's purchases through credit card transaction, room charges, and room reservations. Data visualization techniques as herein described assist in extracting the value given the diversity, quantity and quality of the data.

Also, financial institutions offer a wide variety of goods and services to their customers. This includes a variety of savings and credit products, along with services such as investments, wire transfers, and bill paying among others. Each individual item for sale has unique eligibility and regulatory characteristics, appeals to varying market segments, and profit making potential. Financial institutions often collect a great deal of information regarding a customer's purchases through credit card transaction, mortgages, and lines of credit. Data visualization techniques as herein described assist in extracting the value given the diversity, quantity and quality of the data.

Further, telecommunications companies offer a wide variety of goods and services to their customers. This includes a variety of voice and data products, along with shopping and payment services, driving directions, web access, and entertainment products such as games, music and video among others. Each individual item for sale has unique eligibility and regulatory characteristics, appeals to varying market segments, and profit making potential. Telecommunications companies often collect a great deal of information regarding a customer's purchases through network usage analysis or online purchases. Data visualization techniques as herein described assist in extracting the value given the diversity, quantity and quality of the data.

It is well known that the location of assets (such as buildings, offices and branches for example) and products significantly affects profitability. Using data visualization techniques as herein described to monitor the myriad of data collected from these assets makes analysis in the context of the physical layout and optimal placement of these assets possible. Assets for inclusion in the analysis for the various industries discussed herein may include, for example:

Departments
Services
Vending machines
Cashiers or Tellers
Slots
Tables/E-Tables
Kiosks/ATMs
Retail Outlets
Cages
Signage
Location of retail outlets
Location of food and beverage outlets
Location of spa facilities
Location of meeting rooms
New Accounts and Loan Application Desks
Wireless Coverage Areas
Demand for Data Throughput in an Area It is well known that price discrimination (based on market, time, availability, etc.) increases revenue.

In the gaming industry, yield management has been successfully utilized within the hotel department. Given the quantity and timeliness of the sales data available, as well as the ability to quickly adjust prices for other casino assets, data visualization as herein described has the potential to assist in employee full scale yield management, as well as assisting in other areas including the gaming floor, food services or a holistic view of the whole of the gaming business.

In the retail industry, yield management has been successfully utilized. Given the quantity and timeliness of the sales data available, as well as the ability to quickly adjust prices, data visualization as herein described has the potential to assist in employee full scale yield management, as well as assisting in other areas including the retail floor, food services or a holistic view of the whole of the retail business.

In the Hospitality Industry, price discrimination, in terms of forecasting the demand for hotel room in an area, has been successfully utilized. Given the quantity and timeliness of the sales and locale data available, as well as the ability to quickly adjust prices, data visualization as herein described has the potential to assist in employees fully understanding a profile of the consumer, as well as assisting in other areas including a holistic view of the whole of the current hospitality environment.

In the financial services industry, price discrimination, in terms of risk for example, and has been successfully utilized. Given the quantity and timeliness of the sales data available, as well as the ability to quickly adjust prices, data visualization as herein described has the potential to assist in employee fully understanding a profile of an applicant, as well as assisting in other areas including a holistic view of the whole of the current financial environment.

In the entertainment industry, price discrimination and merchandizing has been successfully utilized. Given the quantity and timeliness of the sales data available, as well as the ability to quickly adjust prices, data visualization as herein described has the potential to assist in employee full scale yield management, as well as assisting in other areas including a holistic view of the whole of the entertainment business.

In the Telecommunications industry, price discrimination, in terms of business, and consumer market segments usage of talk time and data volumes for example, has been successfully utilized. Given the quantity and timeliness of the sales data available, as well as the ability to quickly adjust prices, data visualization as herein described has the potential to assist in employees fully understanding a profile of an applicant, as well as assisting in other areas including a holistic view of the whole of the product utilization.

Temporal and spatial dimensions add important contextual elements to marketing analysis in the various industries discussed herein. Data visualization as herein described assists in making these relationships apparent and therefore actionable. Data visualization may also reduce the time taken to understand the temporal and spatial data, this reduction in time has a number of benefits including reduced training costs and improved profitability.

Wireless Ethernet is not practical and secure; many assets in the various industries discussed herein (e.g., gaming machines, information kiosks, automated delivery carts, portable cash registers, cash handling equipment, coin sorters and counters, bill sorters and counters, smart shopping carts, mobile cashier stations, self service cashier stations, smart shopping lists) are currently or are becoming independent IP devices. That is, a communications system enables assets to communicate with a central control system or with each other using an Internet Protocol packet switched network. Therefore, these assets are mobile. Given that proper asset placement has proven to increase revenues, it is anticipated that frequent and possibly automated movement of these assets will become accepted. The data analysis as herein described is a key enabler providing the ability to monitor and change the characteristics of the physical setting. The control of the automated movement is a key component of risk reduction, injury to third parties and of collision with other mobile or stationary devices.

Further, location of telecommunications hardware, for example switches, cell sites, or routers, makes a telecommunications network very dynamic. In many cases services can be offered to a specific area by a variety of different means. This creates a dynamic environment where configuration changes alone can be used to optimize service levels.

In this dynamic environment it is possible for visual analytics to be linked to the actual network control. These controls result in specific optimization of both the service levels and the optimization of product offerings.

Robotic devices are currently being used in large service organizations such as hospitals to perform a variety of tasks. Large casinos, retail outlets, entertainment outlets, room service, housekeeping supply delivery, food item stock picking, financial services check, payment and money counting facilities also present several opportunities for robotic use. For example, large telecommunications operations may use robots to pull stock, fulfill mobile device orders for other items or to physically reconfigure the mobile network in response to demand. Data visualization may be used to identify potential areas of use and the optimization of robot technology. This application of potentially self aware and interactive devices includes a range of devices from fully automated human like robots to mobile devices which appear purely mechanical. Monitoring of self aware and mobile devices provides operators with the ability to oversee, manage and potentially control the robotic devices. Data visualization of the mobile device provides the ability to allocate the characteristics of this potentially highly configurable resource. Data visualization also provides the ability to analyze the historic characteristics and determine if the configuration yields any insights, insights including specific configurations that may be optimal for the yield or profit requirements. There is a huge range of potential for data visualization as herein described including, for example, direct customer interaction, automated cleaning facilities, mobility assistance, automated check-in, check-out, and food order applications, loan and new account kiosks, automated cash and check processing, automated stock picking facilities, automated order fulfillment etc.

The industries discussed herein generate a great deal of specialized data (e.g., theoretical win, market basket product associations, associations related to the products or services mix purchased by customers, associations related to the financial product mix purchased by customers), the special characteristics of which must be taken into account when generating data visualizations as herein described and acting upon the information gleaned from them.

Personalized location tracking provides additional inputs for merchandizing assets of the various industries discussed herein in terms of optimizing placement. Further, document, transaction and material tracking provide additional inputs in terms of optimizing processing and operational efficiency. Complex data visualization and modeling techniques as herein described assist in making use of the available data to optimize this activity.

Intelligent data collectors, such as video and audio mining, provide additional inputs for merchandizing assets of the various industries discussed herein in terms of optimizing placement. Complex data visualization and modeling techniques as herein described assist in making use of the available data to optimize this activity.

It is known that adjusting the ambiance, including the factors listed below, can increase revenue and loyalty. Using data from intelligent and other data collectors, data visualization techniques as herein described may assist in dynamically adjusting these factors for optimal performance. The results of the changes may be analyzed in real time.

Factors
   Temperature
   Lighting
   Sound
   Aesthetics
   Music
   Aromas
   Entertainment An upcoming trend in the gaming industry is gaming on mobile or fixed electronic devices within the walls of the casino. For instance, electronic poker games may be played not at a traditional table, but at kiosks or terminals placed in hotel rooms, cafes, or other locations within the casino.

An upcoming trend in the hospitality Industry is virtual kiosks. For instance, transactions will not be completed by a human teller, but at kiosks or internet terminals placed in hotels or in homes.

An upcoming trend in the financial services industry is virtual banking and banking kiosks. For instance, transaction will not be completed by a human teller, but at kiosks or internet terminals placed in banking outlets or in homes.

An upcoming trend in the telecommunications industry is virtual product offers and fulfillment based on location. For instance, transaction will not be completed by a human cashier, but directly through the wireless device.

Determining the optimal location of these various terminals, services offered, games offered, marketing strategies, etc. will be based on a myriad of data collected as a part of doing business. Data visualization techniques as herein described will assist in its cognition.

Figure 44:
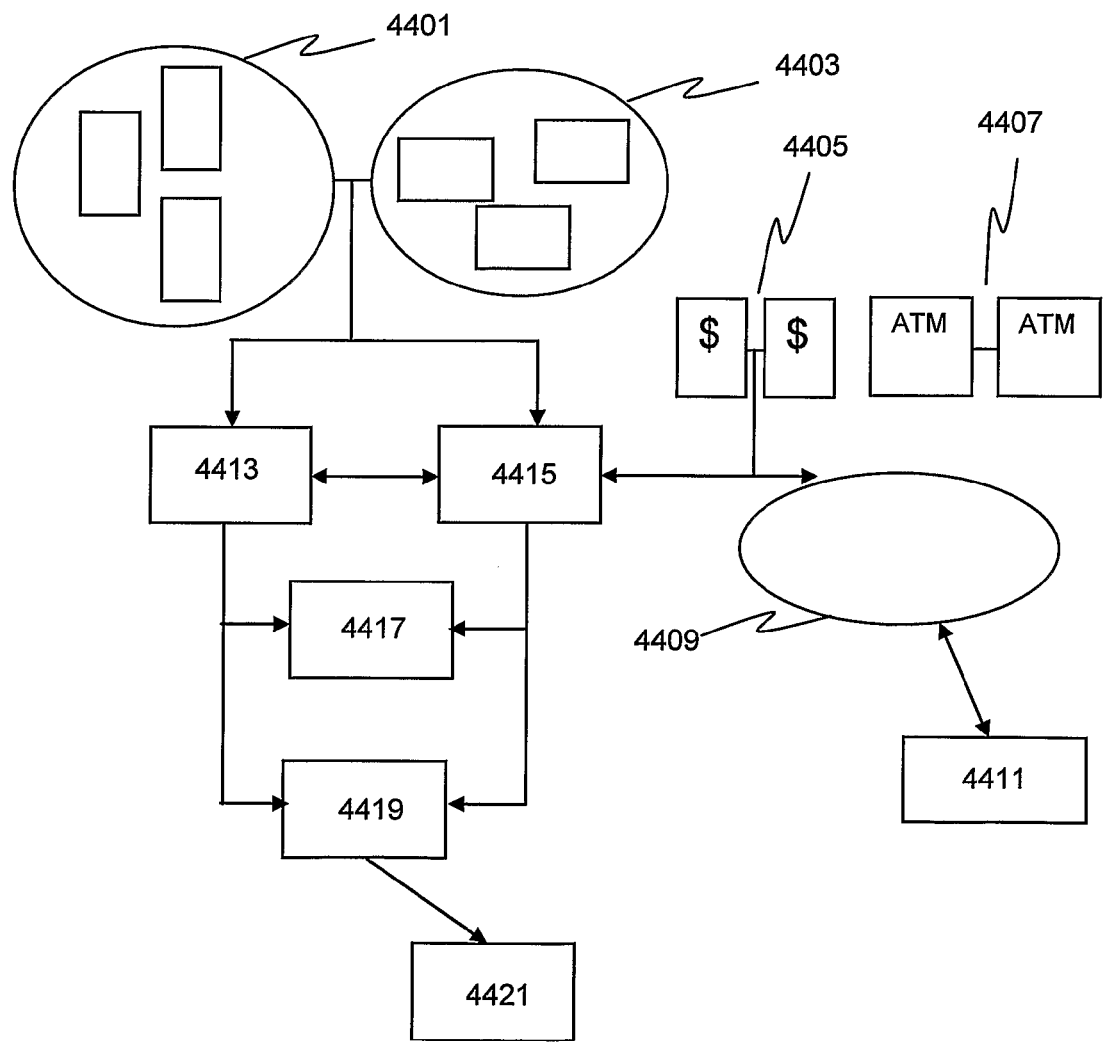
FIG. 44 shows how embodiments of the present invention may be incorporated within a gaming environment.

This extends, for example, community gaming, hospitality services, banking services and all wireless merchandizing services to include any participant with access to a global or specialized network FIG. 44 shows an example of how the herein described system may be incorporated within a gaming environment. The gaming environment consists of a number of gaming machines 4401 and electronic tables 4403 (among other electronic gaming devices) that are adapted to communicate electronically with other systems using any suitable protocols, such as data packet protocols.

The gaming environment further includes a number of electronic cashier devices 4405 and ATMs 4407 which are in communication via a Wide Area Network 4409 with one or more financial databases 4411.

Data from the gaming machines 4401 and electronic tables 4403 are transferred to a reward program database 4413 and customer database 4415. It will be understood that these two databases may be combined into a single database.

Data from the cashier devices are also transferred to the reward program database 4413 and customer database 4415. The databases 4413 and 4415 are in communication with a central hotel management system 4417 that oversees the operation of the gaming environment, including the activities of customers in other areas of a casino, such as shops, hotels, spas etc.

The system 4419 described herein is in communication with the reward program database 4413, customer database 4415 and central hotel management system 4417 so the system can retrieve all necessary data about the activities within the gaming environment. The various embodiments as described herein are employed by the system 4419 to provide an output 4421.

It will be understood that any reference to displaying a visual representation on a screen equally applies to storing that representation or printing the representation onto any suitable medium. As explained above, the data used to display, store or print may be adjusted by the system according to the purpose of the data.

Further, it will be understood that any references in this document to any modules, engines or associated processing, analysis, determination, or other steps, may be implemented in any form. For example, the modules or engines may be implemented, and the associated steps may be carried out, using hardware, firmware or software.

The disclosure of the PCT specification of PCT application PCT/NZ2009/000114 forms part of this specification.

Aspects of the present invention include:

In a data visualization system, a method of creating a visual representation of data, the method including the steps of a computer processor within the data visualization system providing instructions to an end user on a display device of the data visualization system to assist the end user in constructing multiple graphical representations of data, where each graphical representation is one of a predefined type and includes multiple layers of elements that contribute to the end user's understanding of the data, wherein the method includes the steps of the data visualization system:
   retrieving the data from a data storage module in communication with the data visualization system;
   arranging the multiple graphical representations of different types within the visual representation in a manner that enables the end user to understand and focus on the data being represented; and displaying the visual representation.

Wherein the visual representation is displayed on one of a color video screen or a printed page.

Wherein the data is based on a measured metric or an underlying factor that affects a metric.

Wherein the elements include at least one of a shape, position, color, size or animation of an object.

Wherein multiple types of graphical representations are organized within a single visual representation.

Wherein the single visual representation is arranged to be displayed as an image on a single page or screen.

Wherein multiple types of graphical representations are merged together within a single visual representation.

Further including the step of providing instructions to assist an end user in adding supplementary information to the visual representation.

Wherein the supplementary information is provided in layers.

Wherein the types of graphical representation includes at least one of a hierarchical type, a spatial type, a virtual type, a classical type, a navigational type, a temporal type, a textual type, a structural type, a pivotal type, and an interactive type.

In a data visualization system, a method of identifying measurable business objectives for creating graphical representations of the objectives, the method including the steps of a computer processor within the data visualization system providing instructions to an end user on a display device of the data visualization system to assist the end user in establishing multiple business objectives as functions of available metrics and organizing the business objectives into a contextual form that contributes to the end user's understanding of the business objectives, wherein the method includes the steps of the data visualization system:

retrieving data associated with the business objectives from a data storage module in communication with the data visualization system;

constructing one or more graphical representations of the business objectives, where each graphical representation is of a predefined type and includes multiple layers of elements that contribute to the end user's understanding of the objective;

arranging multiple graphical representations in a manner that enables the end user to understand and focus on the business objectives being represented; and displaying the organized graphical representations.

Wherein the elements include at least one of a shape, position, color, size, or animation of an object.

Wherein the business objectives are metrics associated with a business.

In a data visualization system, a method of transforming data into visually interpretable information, the method including the steps of a computer processor within the data visualization system providing instructions to an end user on a display device of the data visualization system to assist the end user in obtaining data associated with a theme, determining one or more summaries of the obtained data that enable the end user to understand the theme and organizing the determined summaries into one or more contextual representations that contribute to the end user's understanding of the theme, wherein the method includes the steps of the data visualization system:

retrieving the data from a data storage module in communication with the data visualization system;

constructing one or more graphical representations of the data, where each graphical representation is of a predefined type and includes multiple layers of elements that contribute to the end user's understanding of the theme;

arranging multiple graphical representations in a manner that enables the end user to understand and focus on the theme being represented; and displaying the organized graphical representations.

Wherein the theme is focused on objectives derived from the data.

Wherein the data is relevant, disparate or a combination thereof.

Wherein the types of graphical representation include at least one of a hierarchical type, a spatial type, a virtual type, a classical type, a navigational type, a temporal type, a textual type, a structural type, a pivotal type, and an interactive type.

Wherein the graphical representations are arranged in a visually simplistic manner.

Wherein the graphical representations are arranged to display high density data.

Wherein the graphical representations are arranged to minimize the volume of ink required to create the representation.

Wherein the graphical representations are arranged to allow supplementary information to be added.

In a graphical analysis computing system, a method of arranging data sets for graphical analysis, wherein at least two of the data sets have different periodicities, the method comprising the steps of:

a. a data retrieval module retrieving data from a data storage module in communication with the graphical analysis computing system;

b. a periodicity determination module determining a plurality of periodicities within the retrieved data to identify a plurality of data sets based on the determined periodicities; and c. an alignment module aligning a first identified data set of a first periodicity relative to a second identified data set of a second periodicity, wherein the second periodicity is different to the first periodicity.

Further including the step of aligning a plurality of first identified data sets relative to the second identified data set.

Wherein step c) further includes the step of aligning a start period of the first identified data set with the start period of the second identified data set.

Wherein step c) further includes the step of aligning an end period of the first identified data set with an end period of the second identified data set.

Wherein step c) further includes the step of determining whether the first identified data set is wholly encompassed within the second identified data set.

Whereupon a negative determination, the method further includes the step of aligning the first identified data set so that it is wholly encompassed within the second identified data set.

Wherein step c) further includes the step of modifying the first identified data set so that it aligns with the second identified data set.

Further including the step of restricting the first identified data set so that it aligns with the second identified data set.

Further including the step of compressing at least a portion of the first identified data set.

Further including the step of deleting at least a portion of the first identified data set.

Further including the step of moving at least a portion of the first identified data set.

Further including the step of expanding the first identified data set so that it aligns with the second identified data set.

Further including the step of adding new data to the first identified data set.

Wherein the data includes one or a combination of null values, average values, extrapolated values or interpolated values.

Further including the step of moving at least a portion of the first identified data set.

Further including the step of including at least a portion of a further identified data set having the same periodicity as the first.

Further including the step of analyzing the modified first identified data set.

Further including the step of replacing the first identified data set with the modified first identified data set.

Wherein the periodicity is time related.

Wherein the periodicity is calendar related.

Wherein a lowest common time base is determined from the determined periodicities, and the first identified data set is based on the determined lowest common time base.

Wherein the alignment of the first identified data set includes the step of arranging the graphical representation of the first identified data set so that it aligns with a spatial area allocated for the graphical representation of the second identified data set.

Further including the step of condensing the graphical representation of the first identified data set so that it aligns with the spatial area.

Wherein the step of condensing includes one or a combination of the steps of constricting, compressing or compacting the graphical representation.

Further including the step of reducing the size of the graphical representation of the first identified data set along one or more axes.

Further including the step of deleting at least a portion of the first identified data set to provide a condensed graphical representation of the first identified data set.

Further including the step of expanding the graphical representation of the first identified data set so that it aligns with the spatial area.

Further including the step of extending the size of the graphical representation of the first identified data set along one or more axes.

Further including the step of inserting new data into the first identified data set to provide an expanded graphical representation of the first identified data set.

Further including the step of moving the graphical representation of the first identified data set so that it aligns with the spatial area.

Further including the step of moving data within the first identified data set to a further data set having the same periodicity as the first.

Wherein the spatial area is at least a portion of a dodecagon spiral.

Wherein the spatial area is at least a portion of a box spiral.

Wherein the first and second identified data sets are displayed hierarchically.

Further including the step of retrieving supplementary information for display, wherein the supplementary information includes information associated with the first or second identified data sets.

Wherein the supplementary information identifies the different periodicities of the first and second identified data sets.

Wherein the supplementary information includes information associated with how the first and second data sets are aligned.

Wherein a graphical representation of the first identified data set is distorted to align it to the determined periodicity of the second identified data set.

Wherein the degree of distortion is increased as the graphical representation of the first identified data set is viewed at increased granularity.

Wherein a graphical representation of the first identified data set can be viewed at increasing granularity, and the method includes the further steps of:
  identifying a further data set at the increased granularity, wherein the further data set is based on a further periodicity different to the first and second periodicities; and
  aligning the further identified data set relative to the first identified data set.

In a graphical analysis computing system, a method of arranging, for graphical analysis, periodic data sets including periodic events, the method comprising the steps of:
  a. a data retrieval module retrieving data from a data storage module in communication with the graphical analysis computing system;
  b. a periodicity determination module determining periodicities within the retrieved data;
  c. identifying a plurality of data sets based on the determined periodicities; and
  d. identifying an instance of a periodic event within two or more identified data sets; and
  e. an alignment module distorting one, or both, of data and its graphical representation associated with at least one of the identified data sets to align the identified periodic event instances relative to each other.

Wherein one or both of the data and its graphical representation is distorted in only one of the identified data sets Wherein the determined periodicity is a period of time selected from a multiple, whole or portion of a second, minute, hour, day, week, month, or year.

Wherein the determined periodicity is a multiple, whole or portion of a calendar period.

Wherein the determined periodicity is a multiple, whole or portion of a social or business period.

Wherein the event is a business related event.

Wherein the event relates to a level of completion of a business event.

Wherein the event is a cultural event.

Wherein the cultural event is a measure of cultural development.

Wherein the event is a religious event.

Further including the steps of:
  the periodicity determination module identifying a first instance of the periodic event within a first data set within a first group of data sets having a first periodicity,
  identifying a second instance of the periodic event within a second data set within a second group of data sets having a first periodicity, and
  determining whether the first data set is in a same or different relative position within the first group to the position of the second data set in the second group, and the alignment module aligning one or both of the data and its graphical representation associated with the first and second instances of the periodic event according to the position determination.

Whereupon the determination that the first data set is in a different relative position, the method further includes the steps of:

the alignment module aligning the first data set in the first group with the second data set within the second group, and aligning the data associated with the first instance of the periodic event in the first data set with the data associated with the second instance of the periodic event in the second data set.

Whereupon the determination that the first data set is in the same relative position, the method further includes the step of: the alignment module aligning the data associated with the first instance of the periodic event in the first data set with the data associated with the second instance of the periodic event in the second data set.

Further including the step of the alignment module modifying the data within the first data set associated with the first instance to align the first and second instances of the periodic event.

Further including the step of the alignment module restricting at least a portion of the data within the first data set so that the first instance of the periodic event aligns with the second instance of the periodic event.

Further including the step of the alignment module compressing at least a portion of the data within the first data set.

Further including the step of the alignment module deleting at least a portion of the data within the first data set.

Further including the step of the alignment module moving at least a portion of the data within the first data set.

Further including the step of the alignment module expanding at least a portion of the data within the first data set so that the first instance of the periodic event aligns with the second instance of the periodic event.

Further including the step of the alignment module adding new data to the first data set.

Wherein the new data includes one or a combination of null values, average values, extrapolated values or interpolated values.

Further including the step of the alignment module moving at least a portion of the data within the first data set.

Further including the step of the alignment module including within the first data set at least a portion of a further identified data set having the same periodicity as the first.

Further including the step of replacing the first data set with the modified first data set.

Wherein the alignment of the first data set includes the step of distorting the graphical representation of the first instance of the periodic event so that it aligns with the graphical representation of the second instance of the periodic event.

Further including the step of condensing the graphical representation of the first data set so that the first instance of the periodic event aligns with the second instance of the periodic event.

Wherein the step of condensing includes one or a combination of the steps of constricting, compressing or compacting the graphical representation.

Further including the step of reducing the size of the graphical representation of the first data set along one or more axes.

Further including the step of deleting at least a portion of the first data set to provide a condensed graphical representation of the first data set.

Further including the step of expanding the graphical representation of the first data set so that the first instance of the periodic event aligns with the second instance of the periodic event.

Further including the step of extending the size of the graphical representation of the first data set along one or more axes.

Further including the step of inserting new data into the first data set to provide an expanded graphical representation of the first data set.

Further including the step of moving at least a portion of the graphical representation of the first data set so that the first instance of the periodic event aligns with the second instance of the periodic event.

Further including the step of moving data within the first data set to a further data set having the same periodicity as the first data set.

Wherein the graphical representation is a dodecagon spiral.

Wherein the graphical representation is a box spiral.

Wherein the data sets are displayed in the form representing two or more calendar systems.

Wherein the first and second data sets are displayed hierarchically.

Further including the step of retrieving supplementary information for display, wherein the supplementary information includes information associated with the first or second data sets.

Wherein the supplementary information identifies the different periodicities of the first and second data sets.

Wherein the supplementary information includes information associated with how the first and second event instances of the periodic event are aligned.

Wherein the degree of distortion is increased as the graphical representation of the first data set is viewed at increased granularity.

In a temporal query system, a method of constructing queries against data sets having different periodicities comprising:
a. a determination module determining the periodicity of the data sets;
b. a query resolving module resolving the temporal parameters passed in the query; and
c. a data set creation module creating data sets according to the resolved parameters.

Wherein the input parameters are times in different time zones.

Wherein the calculations of temporal or relationships functions are built on an extension of SQL.

Wherein the calculations or temporal functions or relationships use metadata to provide sensible defaults for the interpretation of results.

Wherein a rules engine in communication with the query resolving module is used to resolve queries giving an answer that is most likely to be correct based on a set of rules applied to the engine.

Wherein the implementation of visual results is produced as a result of an extended SQL query against an extended relational database.

Wherein the implementation of the query results is produced as a result of an extended SQL query against an extended relational database.

A graphical analysis computing system for arranging data sets for graphical analysis, wherein at least two of the data sets have different periodicities, the system comprising
- a data retrieval module arranged to retrieve data from a data storage module in communication with the graphical analysis computing system;
- a periodicity determination module arranged to determine a plurality of periodicities within the retrieved data to identify a plurality of data sets based on the determined periodicities; and
- an alignment module arranged to align a first identified data set of a first periodicity relative to a second identified data set of a second periodicity, wherein the second periodicity is different to the first periodicity.

A graphical analysis computing system for arranging, for graphical analysis, periodic data sets including periodic events, the system comprising
- a data retrieval module arranged to retrieve data from a data storage module in communication with the graphical analysis computing system;
- a periodicity determination module arranged to determine periodicities within the retrieved data; identify a plurality of data sets based on the determined periodicities; and identify an instance of a periodic event within two or more identified data sets; and
- an alignment module arranged to distort one, or both, of data and its graphical representation associated with at least one of the identified data sets to align the identified periodic event instances relative to each other.

Wherein the periodicity determination module is further arranged to
- identify a first instance of the periodic event within a first data set within a first group of data sets having a first periodicity,
- identify a second instance of the periodic event within a second data set within a second group of data sets having a first periodicity, and
- determine whether the first data set is in a same or different relative position within the first group to the position of the second data set in the second group, and the alignment module is further arranged to align one or both of the data and its graphical representation associated with the first and second instances of the periodic event according to the position determination output by the periodicity determination module.

A temporal query system for constructing queries against data sets having different periodicities, the system comprising
- a determination module arranged to determine the periodicity of the data sets,
- a query resolving module arranged to resolve the temporal parameters passed in the query; and
- a data set creation module arranged to create data sets according to the resolved parameters.

Further including the steps of:
- determining the location of one or more key areas within the graphical representation, wherein the location of the key areas are determined based on at least one of a characteristic of data graphically represented in those areas, related actions or related events associated with the data, and
- identifying the key area in a manner that focuses the attention of the end user upon the key area.

Wherein the location of the key area is determined based on the correlation of the data graphically represented in that area and a predefined threshold.

Wherein the correlation of the data is based on at least one of an R-squared algorithm, a least squares algorithm or a Kriging algorithm.

Wherein the location of the key area is determined based on the relationship between the data graphically represented in that area and neighboring data points.

Wherein the location of the key area is determined based on the variance of a displayed surface of the graphical representation.

Further including the step of applying weighting factors to at least one of the characteristics, related actions or related events in order to determine the location of a key area.

Further including the step of utilizing fuzzy logic to determine the location of the key area.

Wherein the key area is identified utilizing at least one of a textual reference or a graphical image.

Wherein the key area is identified in a manner utilizing at least one of a shape, positional indicator, color, size, texture, symbology, pattern or animation.

Further including the steps of enabling the identified key area to be adjusted by the end user.

Wherein the adjusted key area is utilized to identify further key areas.

Wherein the identified key area is adjustable through an interaction of the end user with an input device.

Further including the step of displaying the data associated with the identified key area in a hierarchical tree.

Further including the step of enabling the hierarchical tree to display descriptive information about the identified key area.

Wherein an interactive hierarchical diagram is provided to enable navigation of the graphical representation, the method including the step of providing instructions to the end user to assist in selecting an area in the diagram to cause a corresponding area within the graphical representation to be identified to the end user.

Further including the steps of:
- a display module displaying the visual representation on the display device; the method further including the steps of
- a determination module determining one or more data elements within the graphical representations that are based on variable data,
- the display module displaying the determined data element on the display device in a form that enables the end user to adjust the associated variable data using an input device,
- an adjustment detection module detecting the adjustment of the variable data, and
- the display module refreshing the graphical representation on the display device based on the detected adjustment of the variable data.

Further including the step of the display module displaying on the display device the original data alongside the adjusted variable data in the refreshed graphical representation.

Further including the step of the adjustment detection module determining the adjustment of the variable data by detecting signals received from an input device used by the end user.

Further including the step of the adjustment detection module detecting the identification of a region within the graphical representation via signals received from the input device used by the end user.

Further including the step of the adjustment detection module detecting the selection of variable data within the identified region via signals received from the input device used by the end user.

In a data visualization system, a method of creating a visual representation of data points from metric data, wherein the method includes the steps of:
  a data retrieval module retrieving the metric data from a data storage module in communication with the data visualization system,
  a determination module determining the data points based on the retrieved metric data, and
  a display module arranging the data points for displaying on a display device according to a predetermined visual representation,
  arranging the data points into a plurality of meta groups in a hierarchical manner, and
  arranging the meta groups into a plurality of layers, where each layer represents the data points at different levels of granularity, and
  a statistical distance determination module determining a statistical distance between items in the meta groups, and
  the display module arranging the items within the meta groups based on the determined statistical distance.

Further including the step of the display module arranging the meta groups into two or more layers, wherein the groups in each layer represent all the data points at that level of granularity.

Further including the step of the display module arranging the data points to be evenly distributed among all groups within a single layer.

Wherein a group in the first layer represents a similar number of data points as a further group in the first layer.

Wherein common data points are associated with multiple groups within the same layer.

Further including the step of an activation detection module detecting the activation of a meta group, whereupon detection of activation of the meta group, the display module indicates the data points associated with the activated meta group in the visual representation.

Further including the step of the activation detection module detecting an end user selecting a meta group using an input device.

Further including the step of the display module overlaying a graphical representation of the hierarchy over the visual representation.

Further including the step of the display module arranging the groups as a graphical tree representation.

Further including the step of determining the hierarchy from the metric data at substantially the same time as the visual representation is created.

Further including the step of the display module arranging icons that represent the meta groups to be displayed in a tree structure within the visual representation.

Further including the step of the display module displaying each meta group using a predefined icon where a relative difference between each icon indicates a relative difference in the metric data associated with each meta group.

Wherein the icon is a geometric shape.

Wherein the icon is one of a triangle, rectangle or quadrangle.

Further including the step of the display module displaying overlapping icons to represent a similarity in metric data associated with each meta group.

Further including the use of a product hierarchy as the data points.

Further including the use of customer segmentation as the data points.

Further including the use of a document table of content as the data points.

Further including the step of adapting the representation so its reproduction minimizes the use of production printing materials.

Further including the step of the display module adapting the representation so it represents a physical world entity.

Wherein the physical world entity is one of a geographic location, road location or road intersection.

Wherein the geographic location is the location of one or more stores or distribution centers.

Further including the step of the display module adapting the representation to reduce the amount of display space required to display the hierarchy.

Further including the step of the display module building the representation using a quartering algorithm where each node in each layer contains one quarter of the data of the parent node or each node contains objects whose cumulative values represent one quarter of the value of the parent node.

Wherein the values are calculated from a classifying value that is not the count of the number of items.

Wherein the distribution to each node is calculated approximately, so that the child node contains approximately 25% of the value of the parent.

Further including the step of building the representation using a tree balancing algorithm where each node in each layer contains a defined subset of the data of the parent node or each node contains objects whose cumulative values represent a subset of the value of the parent node.

Wherein the values are calculated from a classifying value that is not the count of the number of items.

Wherein the distribution to each node is calculated approximately, so that each sibling node contains approximately the same value.

A data visualization system for creating a visual representation of data points from metric data, wherein the system includes:
  a data retrieval module arranged to retrieve the metric data from a data storage module in communication with the data visualization system,
  a determination module arranged to determine the data points based on the retrieved metric data, and
  a display module arranged to arrange the data points for displaying on a display device according to a predetermined visual representation, arrange the data points into a plurality of meta groups in a hierarchical manner, and
  arrange the meta groups into a plurality of layers, where each layer represents the data points at different levels of granularity, and
  a statistical distance determination module arranged to determine a statistical distance between items in the meta groups, wherein
  the display module is further arranged to arrange the items within the meta groups based on the determined statistical distance.

Wherein the display module is further arranged to arrange the meta groups into two or more layers, wherein the groups in each layer represent all the data points at that level of granularity.

Wherein the display module is further arranged to arrange the data points to be evenly distributed among all groups within a single layer.

Further including an activation detection module arranged to detect the activation of a meta group, whereupon detection of activation of the meta group, the display module is further arranged to indicate the data points associated with the activated meta group in the visual representation.

Wherein the display module is further arranged to overlay a graphical representation of the hierarchy over the visual representation.

Wherein the display module is further arranged to arrange icons that represent the meta groups to be displayed in a tree structure within the visual representation.

Wherein the display module is further arranged to build the representation using a quartering algorithm where each node in each layer contains one quarter of the data of the parent node or each node contains objects whose cumulative values represent one quarter of the value of the parent node.

In a data visualization system, a method of creating a visual representation of data points from metric data and determining the positioning of data groups associated with the metric data in the visual representation, the method including the steps of:
 a data retrieval module retrieving the metric data from a data storage module in communication with the data visualization system,
 a data grouping module arranging the metric data into a plurality of data groups,
 a statistical distance determination module determining a minimal statistical distance between data groups positioned next to each other in the visual representation using a hierarchical force based algorithm, and
 a data visualization module visually arranging the data groups in a hierarchical manner based on the determined statistical distance to create the visual representation.

Further including the steps of:
 the statistical distance determination module determining the minimal statistical distance between data groups within each level, or between different levels, of the hierarchy, and
 the data visualization module adjusting the visual position of each parent and sibling data group pair at different hierarchical levels based on the determined minimal statistical distance between data groups at different hierarchical levels.

Wherein the data groups are non-sequential data groups.

Further including the steps of an indexing module arranging the order in which the data groups are positioned within an index, and the statistical distance determination module determining the minimal statistical distance for each individual hierarchical layer within the index.

Further including the step of the indexing module grouping the hierarchical layers in an index according to a first specified statistical distance, and grouping sub-layers in the index according to a second smaller specified statistical distance.

Further including the step of the data grouping module redefining data groups based on the determined statistical distance.

Further including the step of the data grouping module forming the metric data into data groups using a classification algorithm.

Further including the step of the data visualization module creating the visual representation by positioning the data points in the visual representation in a first dimension based on a first pre-determined characteristic, and positioning the data points in a second dimension based on the determined statistical distance.

Further including the step of the data visualization module positioning the data points in a third dimension based on a second pre-determined characteristic.

Further including the step of the statistical distance determination module determining the statistical distance based on at least one of the group consisting of: the statistical distance between the data groups; the similarity of the data groups; the sum of the squares of the data groups; the output of a heuristic algorithm; the output of a neural network, a correlation factor between the data groups.

Further including the step of the data visualization module creating the visual representation by representing the data groups within the visual representation in a hierarchical manner by arranging the data groups according to at least one of the group's position, order, size or color.

Further including the step of the data visualization module visually arranging the data groups in at least one of an R-tree representation, a skewed R-tree representation, a Ward's correlation representation, a Kamada-Kawai representation, an organizational chart, a table of contents or an index hierarchy.

A data visualization system for creating a visual representation of data points from metric data and determining the positioning of data groups associated with the metric data in the visual representation, the system including:
 a data retrieval module arranged to retrieve the metric data from a data storage module in communication with the data visualization system,
 a data grouping module arranged to arrange the metric data into a plurality of data groups,
 a statistical distance determination module arranged to determine a minimal statistical distance between the data groups positioned next to each other in the visual representation using a hierarchical force based algorithm, and
 a data visualization module arranged to visually arrange the data groups in a hierarchical manner based on the determined statistical distance to create the visual representation.

Wherein the statistical distance determination module is further arranged to determine the minimal statistical distance between data groups within each level, or between different levels, of the hierarchy, and
 the data visualization module is arranged to adjust the visual position of each parent and sibling data group pair at different hierarchical levels based on the determined minimal statistical distance between data groups at different hierarchical levels.

Wherein the data groups are non-sequential data groups.

Further including an indexing module arranged to arrange the order in which the data groups are positioned within an index, wherein the statistical distance determination module is further arranged to determine the minimal statistical distance for each individual hierarchical layer within the index.

Wherein the indexing module is further arranged to group the hierarchical layers in an index according to a first specified statistical distance, and group sub-layers in the index according to a second smaller specified statistical distance.

Wherein the data grouping module s further arranged to redefine data groups based on the determined statistical distance output from the statistical distance determination module.

Wherein the data grouping module is further arranged to form the metric data into data groups using a classification algorithm.

Wherein the data visualization module is further arranged to create the visual representation by positioning the data points in the visual representation in a first dimension based on a first pre-determined characteristic, and positioning the data points in a second dimension based on the determined statistical distance.

Wherein the data visualization module is further arranged to position the data points in a third dimension based on a second pre-determined characteristic.

Wherein the statistical distance determination module is further arranged to determine the statistical distance utilizing an algorithm based on at least one of the group consisting of: the statistical distance between the data groups; the similarity of the data groups; the sum of the squares of the data groups; the output of a heuristic algorithm; the output of a neural network, a correlation factor between the data groups.

Wherein the data visualization module is further arranged to create the visual representation by representing the data groups within the visual representation in a hierarchical manner by arranging the data groups according to at least one of the group's position, order, size or color.

Wherein the data visualization module is further arranged to visually arrange the data groups in at least one of an R-tree representation, a skewed R-tree representation, a Ward's correlation representation, a Kamada-Kawai representation, an organizational chart, a table of contents or an index hierarchy.

In a data visualization system, a method of creating a visual representation of nodes in a tree structure and determining the positioning of the nodes in the visual representation, the method including the steps of:
a data retrieval module retrieving the tree structure data from a data storage module in communication with the data visualization system,
a data grouping module arranging the tree structure data into a plurality of nodes,
a statistical distance determination module determining a minimal statistical distance between the nodes positioned next to each other in the visual representation using a hierarchical force based algorithm, and
a data visualization module arranging the nodes in a hierarchical manner based on the determined statistical distance to create the visual representation.

Further including the steps of:
the statistical distance determination module determining the minimal statistical distance between nodes within each level, or between different levels, of the hierarchy, and
the data visualization module adjusting the position of each parent and sibling node pair at different hierarchical levels based on the minimal statistical distance between nodes at different hierarchical levels.

Wherein the nodes are non-sequential nodes.

A data visualization system for creating a visual representation of nodes in a tree structure and determining the positioning of the nodes in the visual representation, the system including:
a data retrieval module arranged to retrieve a tree structure data from a data storage module in communication with the data visualization system,
a data grouping module arranged to arrange the tree structure data into a plurality of nodes,
a statistical distance determination module arranged to determine a minimal statistical distance between nodes positioned next to each other in the visual representation using a hierarchical force based algorithm, and
a data visualization module arranged to visually arrange the nodes in a hierarchical manner based on the determined statistical distance to create the visual representation.

Wherein the statistical distance determination module is further arranged to determine the minimal statistical distance between nodes within each level, and between different levels, of the hierarchy, and
the data visualization module is further arranged to adjust the position of each parent and sibling node pair at different hierarchical levels based on the minimal statistical distance between nodes at different hierarchical levels.

Wherein the nodes are non-sequential nodes.

A method for creating a visual representation of data points from metric data and determining an ordering of the metric data in the visual representation, the method including the steps of:
retrieving the metric data,
arranging the metric data into a plurality of data groups,
determining the statistical distance between the data groups, and
arranging the data groups in a hierarchical manner based on the determined statistical distance.

A method of arranging non-sequential data groups to create a visual representation of data points within the data groups, the method including the steps of:
determining a statistical distance between the data groups, and
arranging the data groups in an order that is based on the determined statistical distance.

Wherein the order is arranged within an index and the statistical distance is minimized for each individual layer within an index.

Wherein layers in an index are grouped according to a first specified distance, and sub-layers in an index are grouped according to a second smaller specified distance.

Wherein data groups are redefined based on the determined distance.

Wherein the meta groups are obtained utilizing a classification algorithm.

Further including the step of creating the visual representation by positioning the data points in the visual representation in a first dimension based on a first pre-determined characteristic, and positioning the data points in a second dimension based on the determined correlation.

Further positioning the data points in a third dimension based on a second pre-determined characteristic.

Wherein the statistical distance is based on at least one of the group consisting of: the statistical distance between the meta groups; the similarity of the meta groups; the sum of the squares of the meta groups; the output of a heuristic algorithm; the output of a neural network, a correlation factor between data groups.

Further including the step of creating the visual representation wherein the meta groups are displayed within the visual representation in a hierarchical manner by arranging the meta groups according to at least one of the group's position, order, size or color.

Wherein the meta groups are arranged in at least one of an R-tree representation, a skewed R-tree representation, a Ward's correlation representation, a Kamada-Kawai representation, an organizational chart, a table of contents or an index hierarchy.

A method of determining a visual design type to be used to represent data of multiple dimensions, the method including the steps of:

receiving determination data at a decision module, analyzing the determination data in association with data characteristics of the multi-dimensional data using the decision module, and determining, using the decision module, which of a plurality of visual design types to use to represent the multi-dimensional data based on the analysis of the data characteristics.

Wherein the determination data includes at least one of dimensional, cardinal and correlation data characteristics of the multi-dimensional data.

Wherein the decision module is one or a combination of a rules engine, an artificially intelligent module and a genetic algorithm.

Wherein the determination data is based on at least one of multi-dimensional data provided by an end user, metadata associated with multi-dimensional data, multi-dimensional data associated with one or more queries provided by an end user, or an end user profile.

Wherein multiple visual design types are determined based on the analysis.

Wherein multiple visual design types are determined upon determining that the multi-dimensional data has a number of dimensions above a predefined threshold value.

Wherein the visual design type is a graphical representation of a type including one of a hierarchical type, a spatial type, a virtual type, a classical type, a navigational type, a temporal type, a textual type, a structural type, a pivotal type, and an interactive type.

Wherein the determination of the visual design type is based on the number of dimensions associated with the multi-dimensional data.

Wherein the determination of the visual design type is based on an optimal number of data dimensions that can be represented by the visual design types.

Wherein each data dimension is given a weighting factor that affects the determination of the visual design type.

Wherein the determination step is further based on how the multi-dimensional data is to be represented in the visual design.

Wherein one or more visual designs are assigned a weighting factor based on the data characteristics.

Further including the step of determining how the multi-dimensional data is to be represented in the determined visual design.

Further including the step of determining a manner of displaying multi-dimensional data in the determined visual design based on the proportionality of data elements visually represented in the visual design.

Further including the step of displaying elements of the display in at least one of a compressed format, extended format, linear format, logarithmic format, a format based on a mathematical function, a statistically determined format, a neural network derived format, a rules engine derived format, or a regression format.

Wherein where the elements are displayed according to a regression format, the format is a least squares format.

Wherein the determined visual design is arranged to visually represent the multi-dimensional data in one or more styles, arrangements or levels of quality of the visual representation based on the data characteristics.

A method of displaying supplementary information related to display image information comprising displaying supplementary information based on user input.

A method of displaying supplementary information related to displayed primary information comprising supplementing displayed primary information with supplementary information as a user navigates to greater resolution of the primary information.

Wherein the display of supplementary information is user invoked.

Wherein the display of supplementary information is user invoked by user selection of supplementary information type.

Wherein the display of supplementary information is invoked based on monitoring of user behavior.

Wherein the display of supplementary information is invoked at least in part based on intelligent determination of user intention.

Wherein intelligent determination is based on learning.

Wherein the supplementary information is derived information.

Wherein the derived information is variance in the supplementary information.

Wherein the derived information is variance in the supplementary information over time.

Wherein the derived information is normalization of the supplementary information.

Wherein supplementary data is selected based upon historical prior user selection.

Wherein supplementary data is filtered.

Wherein filtering is threshold based.

Wherein the thresholds are user prescribed.

Wherein the thresholds are contextually set.

Wherein the thresholds are on data values of primary information.

Wherein the thresholds are based on variance of data values of primary information.

Wherein the thresholds are based on the distribution of data values of primary information.

Wherein supplementary information is displayed according to forecasting reliability.

Wherein supplementary information is displayed according to historical reliability of the historical information.

Wherein the forecasting reliability is determined by a forecasting model.

Wherein supplementary information is displayed according to relevance to user criteria.

Wherein the user criteria includes user profile information.

Wherein the user criteria includes user query information.

Wherein the reliability of information displayed is indicated.

Wherein the reliability of information displayed is indicated by color.

A method of controlling a data visualization computing system running a data visualization software application, the method comprising monitoring the behavior of a user and controlling the operation of the computing system or software application in dependence upon the monitored behavior of the user in the context of the operation of the software application, wherein the operation of the computing system or software application is controlled in relation to one or more multiple layers of elements in a graphical representation produced by the data visualization computing system, wherein an area of focus of the user is monitored by a camera and supplied to the data visualization computing system, wherein when the user is viewing information in a first format the data visualization computing system determines whether the user is looking in a prescribed area of a display and if not redisplays the information in a second format.

A method of controlling a data visualization computing system running a data visualization software application, the method comprising monitoring the behavior of a user and controlling the operation of the computing system or software application in dependence upon the monitored behavior of the user in the context of the operation of the software application, wherein the operation of the computing system or software application is controlled in relation to one or more multiple layers of elements in a graphical representation produced by the data visualization computing system, wherein an area of focus of the user is monitored by a camera and supplied to the data visualization computing system, wherein when the user is viewing information in a first format the data visualization computing system determines whether the user is looking in a prescribed area of a display and if not delays the display of subsequent information until the prescribed area has been viewed.

A method of controlling a data visualization computing system running a data visualization software application, the method comprising monitoring the behavior of a user and controlling the operation of the computing system or software application in dependence upon the monitored behavior of the user in the context of the operation of the software application, wherein the operation of the computing system or software application is controlled in relation to one or more multiple layers of elements in a graphical representation produced by the data visualization computing system, wherein an area of focus of the user is monitored by a camera and supplied to the data visualization computing system, wherein when the user is viewing information in a first format the data visualization computing system determines whether the user is looking in a prescribed area of a display and if not redisplays prior information.

A method of controlling a data visualization computing system running a data visualization software application, the method comprising monitoring the behavior of a user and controlling the operation of the computing system or software application in dependence upon the monitored behavior of the user in the context of the operation of the software application, wherein the operation of the computing system or software application is controlled in relation to one or more multiple layers of elements in a graphical representation produced by the data visualization computing system, wherein an area of focus of the user is monitored by a camera and supplied to the data visualization computing system, wherein the data visualization computing system decreases color attributes away from the area of focus.

Wherein the data visualization computing system determines when the user is looking at or towards an extremity of a display device and scrolls displayed information from the extremity towards the centre of the display device.

Wherein the second format includes a slower display rate.

Wherein the competence level of the user in a user profile is adjusted based upon the extent to which the user does not look in prescribed areas.

Wherein the color attribute is saturation.

Wherein the data visualization computing system increases information content in or near the area of focus.

Wherein the data visualization computing system displays supplementary information in or near the area of focus.

Wherein the data visualization computing system determines persistence of focus in a display area having prescribed attributes.

Wherein the prescribed attributes indicate focused user attention in prescribed screen areas.

Wherein the rate of supply of information to the user is increased when persistence of focus has prescribed attributes.

Wherein one or more ancillary devices are disabled when persistence of focus has prescribed attributes.

Wherein the user's mental state is determined based on monitoring of physical attributes of the user by the camera.

Wherein fatigue is determined based on monitoring of physical attributes of the user by the camera.

Wherein the attributes are selected from rate of blinking, duration of blinking and eye spasms.

Wherein the rate of display of information is dependent upon the user's mental state.

Wherein the format of information displayed is dependent upon the user's mental state.

Wherein important information is accentuated when it is determined that the user is fatigued.

Wherein important information is indicated by color.

Wherein important information is indicated by animation.

Wherein the animation is flashing.

Wherein the complexity of information displayed is reduced when it is determined that the user is fatigued.

Wherein the operation of software operating on the data visualization computing system is adjusted when it is determined that the user is fatigued.

Wherein stress is determined based on monitoring of physical attributes of the user by the camera.

Wherein functionality of software operating on the data visualization computing system is adjusted based upon the determined level of stress of the user.

Wherein the behavior further includes a gesture of the user.

Wherein the behavior of the user is monitored by analyzing attributes of inputs to an input device connected to the data visualization computing system.

Wherein the input device is a pointing device.

Wherein when the user is viewing information in a first format the computer determines whether a cursor is located within a prescribed area of a display and if not redisplays the information in a second format.

Wherein the second format includes a slower display rate.

Wherein the competence level of the user in a user profile is adjusted based upon the extent to which the cursor is not located in prescribed areas.

Wherein when the user is viewing information in a first format the data visualization computing system determines whether a cursor is located in a prescribed area of a display and if not delays the display of subsequent information until the prescribed area has been viewed.

Wherein when the user is viewing information in a first format the data visualization computing system determines whether a cursor is located in a prescribed area of a display and if not redisplays prior information.

Wherein the data visualization computing system decreases color attributes away from an area around the cursor.

Wherein the color attribute is saturation.

Wherein the data visualization computing system increases information content in or near an area around the cursor.

Wherein the data visualization computing system displays supplementary information in or near an area around the cursor.

Wherein the data visualization computing system determines persistence of the cursor in a display area having prescribed attributes.

Wherein the prescribed attributes indicate focused user attention in prescribed screen areas.

Wherein the rate of supply of information to the user is increased when persistence of focus has prescribed attributes.

Wherein one or more ancillary devices are disabled when persistence of focus has prescribed attributes.

Wherein a user profile is modified depending upon monitoring of the behavior of the user.

Wherein the profile is created based upon user training.

Wherein the profile is created using a trained filter.

Wherein the profile is created by back propagation through a neural network.

Further including the step of controlling a communication channel for the user by monitoring the behavior of the user and controlling the status of the communication channel in dependence upon the monitored behavior.

Wherein the behavior of the user is monitored in the context of the operation of the software application running on the data visualization computing system.

Wherein the data visualization computing system determines persistence of focus in a display area having prescribed attributes.

Wherein the prescribed attributes indicate focused user attention in prescribed screen areas.

Wherein the rate of supply of information to the user is increased when persistence of focus has prescribed attributes.

Wherein one or more ancillary devices are disabled when persistence of focus has prescribed attributes.

A method of determining supplementary information for mapping onto a visual representation of data points, the method including the steps of:
  arranging data points to be displayed as an animated visual representation where the data points are displayed in a sequence representative of multiple dimensions of data, and
  determining supplementary information based on one or more selected dimensions of the data points, where the supplementary information is arranged to provide an animated depiction of how the data points correlate between dimensions.

Wherein each dimension in a set of multiple dimensions does not overlap with any other dimension in that set.

Further including the step of overlaying the determined supplementary information onto the animated visual representation.

Further including the step of arranging the selected dimension of data points to be displayed.

Wherein a single dimension of data points are arranged to be displayed.

Wherein two or more selected dimensions are arranged to be displayed in sequence.

Wherein the animated depiction includes a directional representation.

Wherein the directional representation is an animated change in visual appearance.

Wherein the animated change in visual appearance is a change in at least one of: hue, saturation or value of a color; a texture; an image.

Wherein the directional representation is an animated directional icon.

Wherein the icon is one of an arrow, trail or wave front.

Wherein the animated depiction indicates a correlation between the currently displayed dimension and a further displayed dimension, wherein the further displayed dimension is one of a dimension that has previously been displayed or a dimension that has yet to be displayed.

Wherein the further displayed dimension and currently displayed dimension are displayed in sequence to create the animated visual representation.

Wherein the correlation is a change in the data within the currently displayed dimension when compared with the further displayed dimension.

Wherein the change in data is a relatively significant change in the data between the currently displayed dimension and the further displayed dimension.

Wherein the change in data is a change above or below a predefined threshold value.

Wherein the animated visual representation is an animated heatmap that indicates groups of data points in multiple dimensions.

Wherein the animated depiction is arranged to be positioned near boundaries between data point groups.

Further including the steps of determining an existing data boundary within a first dimension of the animated visual representation, and determining a position for the animated depiction in relation to the existing data boundary based on the correlation of data associated with the first dimension and data associated with a further dimension animated in sequence with the first dimension.

A method of processing multiple frames comprising an image to create an animated visual representation of data points associated with a metric, the method including the steps of:
  allocating the task of rendering multiple frames comprising an image required for a requested animation to multiple nodes in a computational tree,
  rendering each of the multiple frames comprising an image in parallel at a plurality of nodes utilizing a plurality of processors, wherein two or more frames are rendered at each hierarchical level of the computational tree that is lower than the top level of the hierarchy and subsequently joined at a hierarchical level of the computational tree above the hierarchical level in which the frames are rendered,
  feeding each of the rendered frames of each child node to an associated parent node, and
  joining each of the fed rendered frames at each parent node until all frames comprising the image are processed.

Wherein each parent node of the computational tree has n number of branches, where n is an integer and equals 2 or more, such that the number of nodes in a first layer of the tree varies by a multiple of n compared with the number of nodes in a second layer directly below the first layer.

Wherein the number of processors is equal to the number of child nodes that aren't also parent nodes.

Wherein the step of joining the frames at each parent node is carried out upon receiving the rendered frames from all child nodes of that parent node.

Further including the step of the parent nodes feeding the resultant joined frames to their parent nodes until all frames have been joined.

A method of determining a type of visual design for representing business measures the method including the steps of:
  categorizing the business measures based on one or more characteristics of the business measures,
  retrieving data associated with the business measures to be represented,
  determining one or more categories for the retrieved data, determining parameters based on the business measures and the determined one or more categories, wherein the parameters are associated with particular types of visual design, and determining the type of the visual design based on the determined parameters.

Further including the step of determining a form of the visual design for representing the business measures.

Wherein the determination of the form or type is based on parameters associated with the determined one or more categories.

Wherein the retrieved data is multi-dimensional data.

Wherein the categories associated with the retrieved data include SQL, predicted, arithmetic, formulae, time or time difference categories.

Further including the step of determining display options based on the determined form or type.

Further including the step of providing a menu of the determined display options to enable selection by an end user.

Wherein the determined display options are a subset of the total display options.

Further including the step of outputting the determined display options.

Wherein the determined display options are displayed.

Further including the step of automatically displaying the visual design based on the determined display options.

Wherein the display options are determined by ranking the determined parameters.

Wherein the display options are determined by applying the determined parameters to a fuzzy logic module or a rules engine.

Wherein the step of determining the form or type of the visual design further includes the step of applying iteration to the determined parameters.

Wherein the step of determining the form or type of the visual design further includes the step of applying a weighting function to the determined parameters.

Further including the step of analyzing the determined parameters to determine if normalization of the business measures is required for the visual design.

Further including the steps of determining whether the determined parameter indicates that the business measure has a confidential characteristic, and, upon a positive determination, determining the form or type of the visual design based on representing the business measure in an obfuscated manner.

Further including the steps of analyzing data associated with the business measures to determine whether the data includes any errors, and, upon a positive determination, determining the form or type of the visual design based on the data analysis.

Wherein the step of analyzing the data includes the step of analyzing the data to determine whether any portion of the data is incorrect or missing.

Wherein the step of analyzing the data includes the step of analyzing the data's history.

Wherein the history analysis includes at least one of analyzing null values, last update values, and frequency of update values.

Wherein the step of analyzing the data includes the step of analyzing whether the data is correct in the context of a query made.

Wherein the step of analyzing the data includes the step of analyzing whether the data is a reasonable result in the context of a query made.

Further including the steps of automatically formatting a visual representation output by a computer for printing or visual display comprising adjusting formatting attributes that are directly related to the visual appearance of the visual representation to a first set of values for display on a visual display and formatting attributes of the visual representation to a second set of values, different to the first set of values, for printing on a printer.

Wherein the second set of values are selected at least in part to reduce consumption of consumables.

Wherein the second set of values are selected at least in part to increase the print speed.

Wherein the second set of values are selected at least in part to minimize the cost of printing.

Wherein the second set of values are selected at least in part to reduce ink bleeding.

Wherein the second set of values are selected at least in part to increase the density of display of data on the printed material.

Wherein the second set of values include image density.

Wherein the second set of values include resolution.

Wherein the second set of values include legend values.

Wherein the second set of values include data table values.

Wherein the second set of values include font.

Wherein the second set of values include saturation.

Wherein the second set of values include color selection.

Wherein the second set of values include icon substitution.

Wherein the second set of values include alterations to the display of heat maps to increase or decrease the resolution.

Wherein the second set of values include alternations to labels.

Wherein the second set of values include alternations to annotations.

Wherein the second set of values include a thumbnail representing animation.

Wherein the second set of values is formatted according to printer attributes.

Wherein the second set of values is formatted according to paper attributes.

Wherein the second set of values is formatted according to ink attributes.

Wherein both printer and paper attributes are used to determine the format of the output.

Wherein a combination of paper, ink and printer attributes are used to determine the format of the output.

Wherein the printer attributes include printer type.

Wherein the printer attributes include print substrate type.

Wherein the printer attributes include printer consumable type.

Wherein the first set of attributes include image density.

Wherein the first set of values include resolution.

Wherein the first set of values include font.

Wherein the first set of values include saturation.

Wherein the first set of values include color selection.

Wherein the first set of values include image smoothing.

Wherein the first set of values may be used to produce supplementary information.

Wherein the first set of values may be used to generate transparent overlay information.

Further including the steps of automatically formatting a 3D visual representation output by a computer for 3D printing or 3D visual display comprising adjusting formatting attributes that are directly related to the visual appearance of the 3D visual representation to a first set of values for display on a visual display and formatting attributes of the visual representation to a second set of values, different to the first set of values, for 3D printing on a 3D printer.

Wherein the display is a 3D display.

Further including printing a visual representation output by a computer comprising adjusting formatting attributes of the visual representation to optimize them for printing.

Further including the steps of displaying a visual representation output by a computer comprising adjusting formatting attributes that are directly related to the visual appearance of the visual representation to optimize them for display on a visual display.

A method of providing one or more visual representations for rendering within a visual document, the method including the steps of:
- an indicator module, determining whether the visual representation is in a state that is suitable for rendering, and, upon a positive determination, providing an indication within the visual representation that indicates that determination, and
- a reader module, reading the one or more visual representations to determine whether those visual representations include the indication, and, upon a positive determination, forwarding the visual representation to a rendering module.

Wherein the visual representations are rendered to form one or more visual documents.

Wherein the one or more visual documents are rendered for display on a visual display.

Wherein the one or more visual documents are rendered for printing.

Wherein the indication includes a flag.

Wherein the indication includes the time and/or date of processing the visual representation.

Wherein the indication includes node identification based on the node that processed the visual representation.

Wherein the indication includes an identification of the execution path by which the visual representation was processed.

Wherein the execution path includes information based on a plurality of processes that were executed in order to process the visual representation.

A method of adjusting the visual representation of a first or second set of data formed in respective first and second layer of a visual representation, where the first and second layers are arranged to visually represent the first and second sets of data in a single visual document, the method including the steps of:
- analyzing the first and second sets of data,
- determining whether one of the first and second sets of data is older than the other, and, upon a positive determination,
- determining whether the correlation between the first and second sets of data is above a predefined threshold, and, upon a negative determination, and
- adjusting the visual representation based on the correlation determination.

Wherein the visual representation is adjusted by reducing the intensity of the set of data that is older.

Wherein the reduction of intensity is provided by visually fading the layer associated with the set of data that is older.

Wherein the reduction of intensity is provided by visually intensifying the layer associated with set of data that is not older.

Further including the steps of determining difference data between data within the first and second sets of data, and adjusting the visual representation to visually identify the determined difference data.

Further including the steps of determining whether data within the set of data that is determined not to be older includes new information, and, upon a positive determination, adjusting the visual representation to accommodate the determined new information.

Further including the steps of determining whether data within the set of data that is determined to be older is obsolete, and, upon a positive determination, adjusting the visual representation to visually identify the obsolete data.

A method of indicating changes to business measures being represented in a visual representation by a visualization module where those changes are being effected via a further module, the method including the steps of:
- detecting, using a detection module, the change in data associated with the business measures, and
- indicating on the visual representation, at a data point associated with the changed data, that the change in data has been detected.

Wherein the indication is a change in the visual representation at the data point.

Wherein the indication is a change in the visual representation near the data point.

Wherein the indication includes the step of overlying additional information over the visual representation, where the additional information provides a further visual representation indicating the change in the data.

Wherein the further visual representation is a heatmap.

Wherein the further visual representation is a surface calculated from one of a Kriging or interpolation algorithm.

Wherein the change in data includes at least one of the addition, subtraction or alteration of the data.

Wherein the indication provides an indication of where the data that has been changed is at least approximately located in the visual representation.

Wherein the detection module detects changes in the membership of a list of the business measures.

Wherein the detection module detects changes in a first memory module with shared control between the visualization module and further module.

Wherein the detection module manages a common list of the business measures.

Wherein the detection module detects changes in one of a second memory module controlled by the visualization module and a third memory module controlled by the further module.

Wherein each of the second and third memory modules are arranged to be synchronized such that any changes made in one memory module are also made in the other.

Wherein the further module is a third party system.

Wherein the third party system includes one of a CRM system, business management systems.

Wherein the size or number of the data points to be indicated are based on an area that is visible to the human eye.

Wherein the indication on the visual representation is identified by determining changes of the business measures over a predefined period of time.

Wherein the data point is indicated by identifying a spatial area on the visual representation using a spatial index.

Wherein nodes in the spatial index are used as special aggregations.

In a data visualization system, a method of graphically representing discrete data as a continuous surface in image space, the method comprising the steps of:
a data retrieval module retrieving discrete data from a data storage device in communication with the data visualization system;

an interpolation module calculating a first set of values for a weighted interpolation function based on the retrieved discrete data;
a smoothing module calculating a second set of values for one or more weighted approximation functions based on the retrieved discrete data; and
a surface combining module combining the first and second set of calculated values over the image space to graphically represent a continuous surface.

In a data visualization system, a method of graphically representing discrete data as a continuous surface in image space, the method comprising the steps of:
a data retrieval module retrieving discrete data from a data storage device in communication with the data visualization system;
an interpolation module calculating values for different weighted interpolation functions across the image space based on the discrete data; and
a surface combining module combining the values of the different weighted interpolation functions over the image space to develop a continuous surface.

Wherein the interpolation function is a gravity function.
Wherein the gravity function is an inverse function.
Wherein the gravity function is an inverse square function.
Wherein the gravity function is a variogram model.
Wherein the interpolation function is a statistical function.
Wherein the surface is obtained from kriging.
Wherein kriging minimizes variance of an estimate whilst maintaining a desired surface characteristic.
Wherein the surface characteristic is smoothness.
Wherein the surface characteristic is a linear combination of data points.
Wherein the interpolation function is a genetic algorithm.
Wherein the interpolation function is a distribution function which is a weighted average of several applications of an inverse distance weighting method using different distance functions.
Wherein the weights sum to s, where s is greater than zero.
Wherein a first interpolation is a general smoothing function.
Wherein the first interpolation function is a weighting function.
Wherein the surface generated by the first interpolation function is below or equal to every discrete data point.
Wherein a secondary smoothing function is applied to minimize differences between the surface generated by the first interpolation function and the discrete data points.
Wherein a further interpolation function is applied so that the resulting surface passes through or near every discrete data point.
Wherein the further interpolation function generates a surface having a steep gradient near discrete data points.
Wherein the further interpolation function generates a surface having dimples at or near minima and peaks at or near maxima.

In a data visualization system, a method of graphically representing discrete data as a continuous surface in image space comprising the steps of:
a data retrieval module retrieving discrete data from a data storage device in communication with the data visualization system;
a smoothing module calculating a smoothed interpolated surface for the discrete data;
an interpolation module calculating a high order interpolation for the discrete data; and
a surface combining module combining the smoothed interpolated surface with the high order interpolation to adjust source points for the discrete data so the source points pass through the source.

Wherein the source points are adjusted to pass through the source by creating a local maxima and minima.

In a data visualization system, a method of graphically representing discrete data as a continuous surface in image space comprising the steps of:
a data retrieval module retrieving discrete data from a data storage device in communication with the data visualization system;
a smoothing module generating a continuous surface using a cumulative function utilizing a first distance function; and
an interpolation module applying a second distance function to the continuous surface, where the second distance function is greater than the first distance function.

Wherein the cumulative function includes the sum of the points surrounding the discrete data divided by the first distance function.

In a data visualization system, a method of graphically representing discrete data as a continuous surface in image space comprising the steps of:
a) a data retrieval module retrieving discrete data from a data storage device in communication with the data visualization system;
b) a smoothing module calculating a primary smoothed interpolated surface for the discrete data;
c) the smoothing module calculating a secondary smoothed interpolated surface from the results of step b);
d) a weighting module applying a weighting function to the results of step c); and
e) an interpolation module applying an interpolation surface to the results of step d).

Wherein step f) includes the steps of the interpolation module calculating residuals based on the difference between the smoothed surface in step e) and the discrete data, and applying the interpolation surface based on the residuals.

Further including the step of:
b2) the weighting module applying a weighting function to the results of step b) where step c) calculates the secondary smoothed interpolated surface from the results of step b2)

In a data visualization system, a method of graphically representing discrete data as a continuous surface in an image space comprising the steps of: an interpolation module building a cumulative sequence of gravity models with increasing Power (P) values, wherein the final surface passes exactly thru the source points and the P values for the sequence of gravity models are increasing.

A data visualization system for graphically representing discrete data as a continuous surface in image space, the system comprising:
a data retrieval module adapted to retrieve discrete data from a data storage device in communication with the data visualization system;
an interpolation module adapted to calculate a first set of values for a weighted interpolation function based on the retrieved discrete data;
a smoothing module adapted to calculate a second set of values for one or more weighted approximation functions based on the retrieved discrete data; and
a surface combining module adapted to combine the first and second set of calculated values over the image space to graphically represent a continuous surface.

A data visualization system for graphically representing discrete data as a continuous surface in image space, the system comprising:
a data retrieval module adapted to retrieve discrete data from a data storage device in communication with the data visualization system;
an interpolation module adapted to calculate values for different weighted interpolation functions across the image space based on the discrete data; and
a surface combining module adapted to combine the values of the different weighted interpolation functions over the image space to develop a continuous surface.

A data visualization system for graphically representing discrete data as a continuous surface in image space, the system comprising:
  a data retrieval module adapted to retrieve discrete data from a data storage device in communication with the data visualization system;
  a smoothing module adapted to calculate a smoothed interpolated surface for the discrete data;
  an interpolation module adapted to calculate a high order interpolation for the discrete data; and
  a surface combining module adapted to combine the smoothed interpolated surface with the high order interpolation to adjust source points for the discrete data so the source points pass through the source.

A data visualization system for graphically representing discrete data as a continuous surface in image space, the system comprising:
  a data retrieval module adapted to retrieve discrete data from a data storage device in communication with the data visualization system;
  a smoothing module adapted to generate a continuous surface using a cumulative function utilizing a first distance function; and
  an interpolation module adapted to apply a second distance function to the continuous surface, where the second distance function is greater than the first distance function.

A data visualization system for graphically representing discrete data as a continuous surface in image space, the system comprising:
a data retrieval module adapted to retrieve discrete data from a data storage device in communication with the data visualization system;
a smoothing module adapted to calculate a primary smoothed interpolated surface for the discrete data, and calculate a secondary smoothed interpolated surface from the primary smoothed interpolated surface;
a weighting module adapted to apply a weighting function to the secondary smoothed interpolated surface and
an interpolation module adapted to apply an interpolation surface to the output from the weighting module.

A data visualization system for graphically representing discrete data as a continuous surface in an image space, the system comprising an interpolation module adapted to build a cumulative sequence of gravity models with increasing Power (P) values to produce a final surface, wherein the interpolation module is adapted to pass the final surface exactly thru the source points and apply increasing P values for the sequence of gravity models.

A method of analyzing market data comprising:
a. analyzing the correlation between groups of transaction items in relation to one or more transaction attribute;
b. classifying transaction items using a dimension reduction or classification technique; and
c. displaying a hierarchical representation of the transaction items according to a classification produced.

A method of analyzing market data comprising:
a. analyzing the correlation between groups of transaction items in relation to one or more transaction attribute;
b. displaying a hierarchical representation of the transaction items according to a classification based on the correlation between groups of transaction items; and
c. visually representing transaction attributes in a visual representation.

Wherein the hierarchical representation is a tree representation.

Wherein the hierarchical representation is an R-Tree representation.

A method of analyzing market data comprising:
a. analyzing the correlation between groups of transaction items in relation to one or more transaction attribute; and
b. visually representing transaction attributes in a visual representation of the transaction items.

A method of analyzing market data comprising:
a. analyzing the correlation between groups of transaction items and transaction attributes;
b. determining significant transaction attributes for groups of transaction items; and
c. visually representing significant transaction attributes in a visual representation of the transaction items.

Wherein the visual representation is in the form of a heat map.

Wherein a user can interact with the heat map to explore the detail of information upon which the heat map is based and/or supplementary information.

Wherein the correlation between all groups of transaction items in relation to one or more transaction attribute is determined.

Wherein the transaction attribute is time related.

Wherein the time related attribute is time of sale of a transaction item.

Wherein the transaction attribute is position related.

Wherein the position related attribute is location of the transaction item.

Wherein the position related attribute is a place of sale of the transaction item.

Wherein the transaction item is classified according to product type.

Wherein the transaction item is classified according to product branding.

Wherein the transaction item is classified according to market segment.

Wherein only correlations above a threshold level are displayed.

Wherein the threshold is a frequency threshold.

Wherein the threshold is a magnitude threshold.

Wherein the threshold is a business performance threshold.

Wherein the dimension reduction or classification technique is a self organizing map.

In a data visualization system, a method of arranging, in n dimensions, data points representing n or more variables, the method including the steps of:
  i. a data point ranking module ranking a set of data points with respect to a first axis of a visual representation using a first variable; and
  ii. based on a second variable, a data point distribution module distributing the set of data points along the first axis while retaining information relating to the ranking of data points determined in step i).

Wherein the data points represent n+1 or more variables. Further including the steps of:
iii. the data point ranking module ranking data points with respect to one or more further axes using one or more variables; and
iv. the data point distribution module distributing data points along the further axes while retaining information relating to the ranking of data points determined in step iii).

Wherein a maximum value on each axis is defined by data values for a particular variable.

Wherein the maximum value on each axis is defined by the sum of data values over a particular variable.

Further including the step of visually representing at least a subset of the arranged data points.

Further including the step of visually representing supplementary information over the displayed arranged data points.

Further including the step of visually representing the supplementary information in the form of a contour or heat map.

Wherein the step of distributing the data points includes the step of dividing the data points between two or more regions in the visual representation.

Wherein the regions are n-dimensional regions.

Wherein the regions are arranged within the visual representation to convey information that is based on proportions of summed variables contained within the regions.

Further including the steps of distributing data points within a region of the visual representation, by creating two or more sub-regions within the region and distributing data points between those sub-regions.

Further including the steps of dividing sub-regions of the visual representation and distributing data points within the divided sub-regions until at most a single data point is contained in each sub-region.

Further including the step of visually representing supplementary information in one or more empty regions.

Wherein the supplementary information is visually represented using a visual design.

Further including the step of displaying data points so as to provide a complete view of information of interest.

Further including the step of filtering data associated with the data points before displaying the data points.

Further including the step of applying a dimension reduction technique to data associated with the data points before displaying the data points.

Further including the step of selecting data associated with the data points for visual representation or selecting a view of arranged data points in order to maximize the visual representation of data or variables of interest associated with the data points.

Wherein the step of distributing data points includes the step of determining a unique position for each data point along each axis of the visual representation.

Further including the step of ranking the data points using a deterministic sorting function.

Further including the step of ranking the data points based on at least one of volume, importance, statistical ordering, statistical distance, quantity, or value.

A data visualization system for arranging, in n dimensions, data points representing n or more variables, the system comprising
a data point ranking module arranged to rank a set of data points with respect to a first axis of a visual representation using a first variable; and
based on a second variable, a data point distribution module arranged to distribute the set of data points along the first axis while retaining information relating to the ranking of data points determined by the data point ranking module.

Wherein the data point ranking module is further arranged to rank data points with respect to one or more further axes using one or more variables; and the data point distribution module is further arranged to distribute data points along the further axes while retaining information relating to the ranking of data points determined by the data point ranking module.

Wherein the end user is a controlling entity in a financial services environment, casino environment, store environment, hospitality environment, entertainment environment or a telecommunications environment.

Wherein the data is financial services data, gaming data, casino data, retail data, hospitality data, entertainment data or telecommunications data.

Wherein the business objectives are financial services business objectives, gaming business objectives, retail business objectives, hospitality business objectives, entertainment business objectives or telecommunications business objectives.

Wherein the theme is a financial services theme, gaming theme, retail theme, hospitality theme, entertainment theme or a telecommunications theme.

Wherein the data sets are financial services data sets, gaming data sets, retail data sets, hospitality data sets, entertainment data sets or telecommunications data sets.

Wherein the metric data is financial services metric data, gaming metric data, retail metric data, hospitality metric data, entertainment data or telecommunications data.

Wherein the metric or metrics are financial services metrics, gaming metrics, retail metrics, hospitality metrics, entertainment metrics or telecommunications metrics.

Wherein the business measures are financial services business measures, gaming business measures, retail business measures, hospitality business measures, entertainment business measures or telecommunications business measures.

Wherein the metadata is financial services metadata, gaming metadata, retail metadata, hospitality metadata, entertainment metadata or telecommunications metadata.

Wherein the supplementary information is supplementary financial services information, supplementary gaming information, supplementary retail information, supplementary hospitality information, supplementary entertainment information or supplementary telecommunications information.

Wherein the supplementary information is related to the geographical position of an individual in a financial services environment, gaming environment, retail environment, hospitality environment, entertainment environment or telecommunications environment.

Wherein the supplementary information is related to the spending habits of an individual in a financial services environment, gaming environment, retail environment, hospitality environment, entertainment environment or telecommunications environment.

Wherein the supplementary information is related to the movement of an individual in a financial services environment, gaming environment, retail environment, hospitality environment, entertainment environment or telecommunications environment.

Wherein the metric data includes structural information on financial services departments, gaming industry departments, retail industry departments, hospitality departments, entertainment industry departments or telecommunications departments.

Wherein the metric data includes further structural information on sub categories within financial services departments, gaming industry departments, retail industry departments, hospitality departments, entertainment industry departments or telecommunications departments.

What we claim is:

1. In a data visualization computing system implemented on an electronic computing device, a method of controlling the data visualization computing system, the method comprising the steps of:
retrieving data from a data storage module in communication with the data visualization system based on a user query;
constructing one or more graphical representations of the data, where each graphical representation includes multiple layers of elements;
displaying on a display device the one or more multiple layers of elements in a graphical representation produced by the data visualization computing system;
monitoring the behavior of the user using a camera by detecting an area of focus of the user on the graphical representation on the display device, and further monitoring the user's stress using the camera by monitoring physical attributes of the user other than the user's area of focus;
controlling the data visualization computing system in relation to the one or more multiple layers of elements in the graphical representation in dependence upon the monitored behavior of the user and the user's query to decrease color attributes in the one or more graphical representations on the display away from the area of focus;
controlling the data visualization computing system in relation to the one or more multiple layers of elements in the graphical representation in dependence upon the monitored behavior of the user and the user's query and, when the area of focus is a prescribed area of the graphical representation, displaying subsequent information generated from the data retrieved from the data storage module once the prescribed area of the graphical representation has been viewed; and
formatting a graphical representation output by the data visualization computer system for printing or visual display, by adjusting formatting attributes that are directly related to the visual appearance of the graphical representation to a first set of values for display on the display device, and formatting attributes of the graphical representation to a second set of values, different from the first set of values, for printing.

2. A method as claimed in claim 1 wherein the data visualization computing system determines when the user is looking at or towards an extremity of the display device and based on the determination scrolls the displayed information that the user is looking at from the extremity towards the center of the display device.

3. The method as claimed in claim 1 wherein the data visualization computing system increases the displayed information content in or near the area of focus.

4. The method as claimed in claim 1 wherein the data visualization computing system displays supplementary information generated from data retrieved from the data storage module in or near the area of focus.

5. The method as claimed in claim 1 wherein the data visualization computing system determines persistence of focus in a display area having prescribed attributes.

6. The method as claimed in claim 1 wherein monitoring the behavior of the user includes monitoring physical attributes of the user other than the eye.

7. The method as claimed in claim 6 wherein the rate of display of information is dependent upon the behavior of the user.

8. The method as claimed in claim 6 wherein the format of information displayed is dependent upon the behavior of the user.

9. The method as claimed in claim 1 wherein the behavior of the user further includes a gesture of the user other than the area of focus.

10. The method as claimed in claim 1 wherein the behavior of the user other than the area of focus is monitored by analyzing attributes of inputs to an input device connected to the data visualization computing system.

11. The method as claimed in claim 1 wherein a user profile is modified depending upon monitoring of the behavior of the user.

12. The method as claimed in claim 1 further including the step of controlling a communication channel for the user by monitoring the behavior of the user and controlling the status of the communication channel in dependence upon the monitored behavior.

13. The method of claim 1, further including the step of:
formatting a graphical representation output by the data visualization computer system for printing or visual display, the step comprising:
adjusting formatting attributes that are directly related to the visual appearance of the graphical representation to a first set of values for display on the display device; and
formatting attributes of the graphical representation to a second set of values, different to the first set of values, for printing on a printer.

14. The method of claim 1, wherein the graphical representation is a 3D graphical representation, and wherein the formatting of the attributes to the second set of values comprises formatting the attributes to the second set of values for 3D printing on a 3D printer.

15. The method of claim 1, further including the step of adjusting formatting attributes of the graphical representation that are directly related to the visual appearance of the graphical representation to optimize them for display on the display device.

16. The method as claimed in claim 1 wherein the color attribute is saturation.

17. The method as claimed in claim 1 wherein the graphical representation produced by the data visualization computing system is produced by a method including the steps of:
an indicator module, determining whether the graphical representation is in a state that is suitable for rendering, and, upon a positive determination, providing an indication within the graphical representation that indicates that determination, and
a reader module, reading the one or more graphical representations to determine whether those graphical representations include the indication, and, upon a positive determination, forwarding the graphical representation to a rendering module.

18. The method of claim 17, wherein the graphical representations are rendered to form one or more visual documents.

19. The method of claim 18, wherein the one or more visual documents are rendered for display on the display device.

20. The method of claim 18, wherein the one or more visual documents are rendered for printing.

21. The method of claim 17, wherein the indication includes a flag.

22. The method of claim 17, wherein the indication includes the time and/or date of processing the graphical representation.

23. The method of claim 17, wherein the indication includes node identification based on the node that processed the graphical representation.

24. The method of claim 17, wherein the indication includes an identification of the execution path by which the graphical representation was processed.

25. The method of claim 17, wherein the execution path includes information based on a plurality of processes that were executed in order to process the graphical representation.

\* \* \* \* \*